US012496361B2

(12) United States Patent
Gorgoulis et al.

(10) Patent No.: US 12,496,361 B2
(45) Date of Patent: Dec. 16, 2025

(54) IMAGING COMPOUNDS FOR DETECTING OR IMAGING SENESCENT CELLS

(71) Applicant: University of Dundee, Dundee (GB)

(72) Inventors: Vassilis G. Gorgoulis, Dundee (GB); Nikolaos Lougiakis, Athens (GR); Panagiotis Marakos, Athens (GR); Nicole Pouli, Athens (GR); Athanassios Kotsinas, Athens (GR); Konstantinos Evangelou, Athens (GR); Russell Petty, Dundee (GB); Ilias Christos Tzortzatos, Athens (GR)

(73) Assignee: University of Dundee, Dundee (GB)

( * ) Notice: Subject to any disclaimer, the term of this patent is extended or adjusted under 35 U.S.C. 154(b) by 0 days.

(21) Appl. No.: 18/981,276

(22) Filed: Dec. 13, 2024

(65) Prior Publication Data

US 2025/0114483 A1    Apr. 10, 2025

Related U.S. Application Data

(63) Continuation of application No. PCT/GB2024/050047, filed on Jan. 10, 2024.

(30) Foreign Application Priority Data

Jan. 12, 2023  (GR) .............................. 20230100019
Jan. 20, 2023  (GB) ..................................... 2300874

(51) Int. Cl.
    *A61K 49/00*    (2006.01)

(52) U.S. Cl.
    CPC ...... *A61K 49/0052* (2013.01); *A61K 49/0032* (2013.01); *A61K 49/0082* (2013.01)

(58) Field of Classification Search
    CPC ............ A61K 49/0082; A61K 49/0052; A61K 49/0032; C09B 56/00; C09B 56/16; G01N 33/582
    See application file for complete search history.

(56) References Cited

U.S. PATENT DOCUMENTS

2008/0038353 A1 * 2/2008 Lavasanifar .......... B82Y 30/00
                                                        514/459

FOREIGN PATENT DOCUMENTS

| CN | 115043818 A * | 9/2022 | ......... A61K 49/0032 |
| WO | WO-2018/002613 A1 | 1/2018 | |
| WO | WO-2018/002614 A1 | 1/2018 | |
| WO | WO-2024/149992 A1 | 7/2024 | |

OTHER PUBLICATIONS

CN-115043818-A, 2022, English translation. (Year: 2022).*
Evangelou et al., "Robust, universal biomarker assay to detect senescent cells in biological specimens." Aging Cell 16 (2017): 192-197.
Gonçalves, "Fluorescent labeling of biomolecules with organic probes." Chemical Reviews 109 (2009): 190-212.
International Search Report and Written Opinion for International Application No. PCT/GB24/50047 dated May 13, 2024.
Lozano-Torres et al., "Lipofuscin labeling through biorthogonal strain-promoted azide-alkyne cycloaddition for the detection of senescent cells." The FEBS Journal 290(5) (2023): 1314-1325.
Magkouta et al., "A fluorophore-conjugated reagent enabling rapid detection, isolation and live tracking of senescent cells." Molecular Cell 83(19) (2023): 3558-3573.
Qiu et al., "A rapid-response near-infrared fluorescent probe with a large Stokes shift for senescence-associated [beta]-galactosidase activity detection and imaging of senescent cells." Dyes and Pigments 182 (2020): 108657.
Search Report for GB Application No. GB2300874.1 dated Jul. 20, 2023.

* cited by examiner

*Primary Examiner* — Jake M Vu
*Assistant Examiner* — Leah H Schlientz
(74) *Attorney, Agent, or Firm* — Foley Hoag LLP; David P. Halstead; Alexander J. Chatterley

(57) ABSTRACT

A compound, or a salt or solvate thereof, according to formula I as defined herein and pharmaceutical composition comprising said compound. Compounds of formula I are capable of detecting senescence. As such, these compounds are useful in methods of detecting or imaging senescent cells or extracts thereof or senescence in a subject or a biological sample taken from a subject.

19 Claims, 11 Drawing Sheets a. PEO-b-PCL pure b. m-GLF16

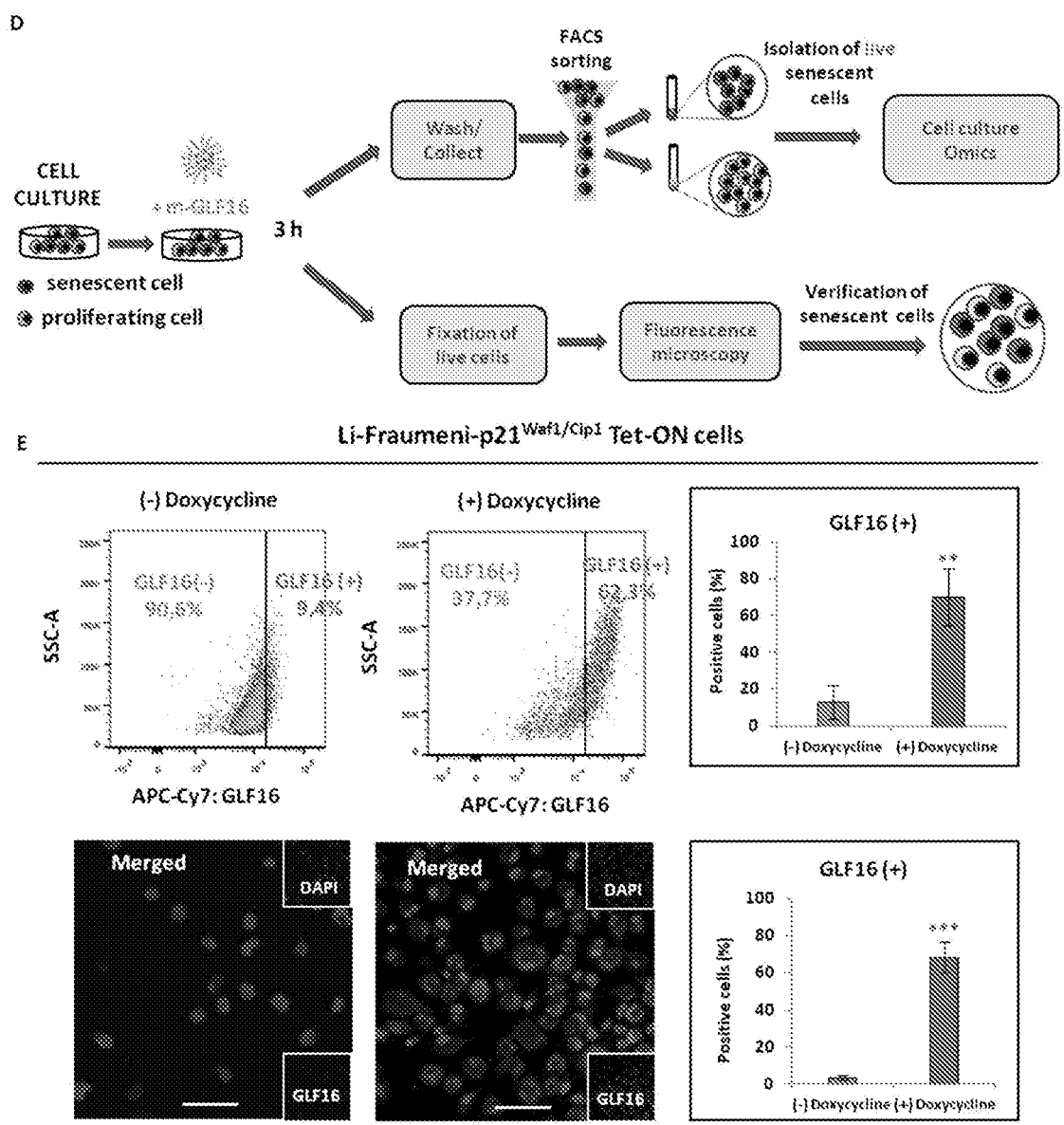

US 12,496,361 B2

IMAGING COMPOUNDS FOR DETECTING OR IMAGING SENESCENT CELLS

RELATED APPLICATIONS

This Application is a Continuation of International Application No. PCT/GB24/50047, filed Jan. 10, 2024, which claims the benefit of priority to GR Application 20230100019 filed Jan. 12, 2023, and GB Application 2300874.1 filed Jan. 20, 2023. The entire contents of PCT/GB24/50047 are incorporated herein by reference in their entirety.

INTRODUCTION

Described herein are compounds which are capable of detecting senescence. As such, these compounds are useful in methods of detecting senescent cells or extracts thereof or senescence in a subject or a biological sample taken from a subject.

BACKGROUND OF THE INVENTION

Senescence is a fundamental stress response mechanism aiming to preserve tissue or organismal homeostasis [Gorgoulis & Halazonetis, Curr Opin Cell Biol 2010; Gorgoulis et al., J Pathol 2018; Gorgoulis et al., Cell 2019]. Cells entering this state are characterized by prolonged and generally irreversible cell-cycle arrest, and resistance to apoptosis [Gorgoulis et al., Cell 2019; Childs et al., EMBO Rep 2014]. They demonstrate also macromolecular damage, deregulated metabolism [Gorgoulis et al., Cell 2019; Myrianthopoulos et al., Pharmacol & Ther 2019], and exhibit secretory features, collectively described as senescence-associated secretory phenotype (SASP) [Gorgoulis et al, Cell 2019]. SASP includes a variety of cytokines, chemokines, growth factors, proteases and other molecules, depending on the type of senescence and the cells involved [Gorgoulis et al., Cell 2019; Myrianthopoulos et al., Pharmacol & Ther 2019]. These inflammatory proteins are released in the extracellular space as soluble factors, transmembrane proteins following ectodomain shedding, or as molecules enclosed within extracellular vesicles [Ozcan et al., Aging 2016; Basisty et al., PlosBiol 2020; Faget et al., Nat Rev Cancer 2109].

The senescent phenotype is highly diverse, as triggering stimuli and maintenance mechanisms involved are not pre-requisitely preserved among the senescence programs [Gorgoulis et al., Cell 2019]. However, for conventional reasons, cellular senescence has been divided into two broad categories regarding its execution. The first category, termed replicative senescence is related to shortened telomere length and telomere dysfunction [Gorgoulis et al., Cell 2019; Myrianthopoulos et al., Pharmacol & Ther 2019]. The second category represents stress-induced senescence, a wide group of senescence phenotypes which are triggered by a variety of insults regardless of telomeres [Gorgoulis et al., Cell 2019; Myrianthopoulos et al., Pharmacol & Ther 2019].

Senescent cells continually occur and are timely removed by immune cells, throughout an organism's lifespan. Transient occurrence of this dynamic cellular state plays beneficial roles in various physiological processes ensuring cellular and organismal homeostasis. During embryogenesis, senescence facilitates tissue development and morphogenesis, while in the adult life apart from promoting tissue repair it restrains the expansion of damaged cells [Gorgoulis & Halazonetis, Curr Opin Cell Biol 2010; Gorgoulis et al., J Pathol 2018; Gorgoulis et al., Cell 2019]. For example, senescence induction in preneoplastic lesions provides an anti-tumor barrier against development of incipient cancerous cells [Halazonetis et al., Science 2008; Gorgoulis et al., J Pathol 2018]. In contrast, if senescent cells are not timely removed, and therefore remain for prolonged time, they can exert detrimental effects. A well-established harmful way is through the antagonistic paracrine and/or systematic SASP. Indeed, unconstrained senescence promotes tissue/organ dysfunction by reducing their regenerative potential and by promoting disruptive chronic inflammation and fibrosis, eventually leading to the development of age-related or degenerative pathologies and aging [Gorgoulis et al, Cell 2019]. More recent evidence have demonstrated another way, that is SASP independent, through which persistent senescent cells can override cell-cycle arrest condition, thus re-enter the cell cycle, under certain circumstances associated particularly with breaching of anti-tumor barriers [Galanos et al., Nat Cell Biol 2016; Zampetidis et al., Mol Cell 2021]. This "escape from senescence phenomenon" has been related to adverse properties and especially to tumor progression, tumor relapses and resistance to anti-tumor therapies [Galanos et al., Nat Cell Biol 2016; Myrianthopoulos et al., Pharmacol & Ther 2019; Zampetidis et al., Mol Cell 2021].

Uncovering of the pro-aging and the pro-disease harmful functions of sustained senescence prompted the development of senotherapies—pharmaceutical interventions aimed at interfering with the detrimental effect of senescent cells—that are now entering the clinical stage. Particularly, senotherapeutics is related to the discovery of agents that specifically target and eliminate senescent cells, aiming to deal with the above-mentioned detrimental effects of senescence in human disease and aging. However, unequivocal identification and examination of cellular senescence remains highly difficult because of the lack of universal and specific markers.

The most popular, until recently, biomarker for detecting cellular senescence was senescence-associated β-galactosidase activity (SA-β-gal), for which an enzymatic assay is employed that identifies increased activity of lysosomal β-D-galactosidase in senescent cells in conditions of sub-optimal pH (pH: 6.0) [Dimri et al., Proc Natl Acad Sci USA 1995; Collado & Serrano, Nat Rev Cancer 2006; U.S. Pat. No. 5,491,069]. SA-β gal is applicable for in vitro and in vivo studies, however, its major limitation is the requirement of fresh/frozen biological material that preserves the necessary enzymatic activity. This technique should be conducted under strictly monitored conditions, always in comparison with a negative control, while the overall stress in cellular systems should be avoided (i.e. serum starvation, confluent cultures), which may lead to false-positive results, [Severino et al, Exp Cell Res 2000]. In addition, SA-β-gal does not indicate exclusively senescent cells and is often used in combination with other supplementary techniques [Collado & Serrano, Nat Rev Cancer 2006]. Moreover, tissue samples should be directly frozen in liquid nitrogen and processed as soon as possible to retain enzymatic activity [Rodier & Campisi, J Cell Biol 2011; Debacq-Chainiaux et al., Nat Protoc 2009]. Hence, as SA-3-gal is not applicable to archival material and its use is rather laborious, many researchers have attempted to establish more convenient senescence biomarkers [Collado & Serrano, Nat Rev Cancer 2006; Binet et al., Cancer Res 2009].

Recognition of senescent cells, with high sensitivity and specificity, in a wide spectrum of biological materials including cultured cells, fresh/frozen, and archival (including formalin-fixed and paraffin-embedded, FFPE) tissues, in some of them not feasible before, by means of lipofuscin detection has been recently reported [Georgakopoulou et al., Aging 2013; Evangelou et al., Aging Cell 2017].

Lipofuscin accumulates in senescent cells and (i) is a by-product of the senescent process, (ii) is a non-degradable aggregate of oxidized proteins, lipids, and metals [Jung et al., 2007], and (iii) represents a new 'hallmark' of senescence [Georgakopoulou et al., Aging 2013; Galanos et al., Nat Cell Biol 2016; Liakou et al., 2016; Petrakis et al., 2016; Evangelou et al., Aging Cell 2017; Gorgoulis et al., Cell 2019; Zampetidis et al., Mol Cell 2021]. Senescence assessment through lipofuscin detection bypasses the weaknesses of SA-β-gal staining and broadens the spectrum of applications, making it an ideal marker for senescence detection [Georgakopoulou et al., Aging 2013; Evangelou et al., Aging Cell 2017; Myrianthopoulos et al., Pharmacol & Ther 2019].

At a methodological level, lipofuscin detection can be reliably achieved using the Sudan Black B (SBB) chemical dye in traditional histochemical staining [Georgakopoulou et al., Aging 2013]. Nevertheless, while this reaction is robust and specific, it lacks sensitivity and requires experienced pathological evaluation [Georgakopoulou et al., Aging 2013; Evangelou et al., Aging Cell 2017]. To bypass this limitation new innovative lipophilic SBB analogues, alone or biotin-linked, have been designed and synthesized and are suitable for sensitive and specific histochemical or antibody-enhanced (immunohistochemical), respectively, detection of lipofuscin-containing senescent cells in any biological material [Evangelou et al., Aging Cell 2017]. These compounds are described in PCT publications WO2018002614 and WO2018002613 and one of the compounds, termed GL13, is commercially available under the trademark SenTraGor® [https://sentragortech.com/products]. Moreover, due to its high sensitivity and specificity for senescence detection the GL13 compound has been included as a pivotal marker in a proposed algorithm for senescence detection, mainly by immunohistochemical means [Gorgoulis et al., Cell 2019; Kohli et al., Nat Protoc 2021].

Despite, the successful use of biotin-linked SBB analogues, principally of GL13, in in situ methods, particularly immunohistochemistry, two important issues have limited the more broad exploitation of biotin-linked SBB-like compounds in the field of senescence detection.

First, due to their lipophilic nature, in order to react specifically with lipofuscin, the SBB analogues must be diluted in ethanol for their subsequent application. Since ethanol is highly volatile, evaporation drastically affects the concentration of the SBB analogue preparation(s) and consequently its efficient methodological application. Moreover, as a solvent ethanol is not completely compatible with cells/tissues which contain water, thus there is a need to improve the performance of these compounds by making them water soluble, whilst preserving at the same time affinity for lipofuscin. Generation of water soluble SBB-analogues will expand the spectrum of applications for these sensitive and specific compounds.

Second, a labelling system that allows direct detection and visualization of the lipofuscin/water soluble SBB-analogue complex, bypassing the additional immunohistochemical steps required for biotin recognition, would be preferable.

There is a need in the art for new tools and techniques for detecting senescence, in particular, new compounds with high solubility in water or any aqueous media which permit direct visualization, and optionally isolation, of senescent cells through common imaging and cell sorting modalities, such as fluorescent microscopy procedures and fluorescence-activated cell sorting (FACS) respectively.

SUMMARY OF THE INVENTION

In view of the foregoing, the present invention provides new compounds comprising SSB analogues linked to a fluorescent dye moiety (fluorophore) which allow for the visualization of senescent cells in a simple accurate, straightforward and readily applicable manner through various methods, like histochemical and immunohistochemical staining, flow-cytometry and even in live conditions within cells/tissues/organs. Moreover, they facilitate isolation of senescent cells from mixed populations with non-senescent ones by means such as fluorescence-activated cell sorting (FACS).

The novel compounds have the ability to react with lipofuscin, in an analogous manner to the histochemical dye SBB but with improved performance. Most importantly, these compounds show an improved solubility in aqueous media.

The novel chemical compounds can be used for the detection of senescent cells in biological samples wherein the biological samples can be in either fresh or preserved state for both in vivo and in vitro applications.

In one aspect, the present invention provides a compound of Formula I as defined herein, and/or a salt or solvate thereof.

In another aspect, the present invention provides a pharmaceutical composition which comprises a compound of Formula I as defined herein, or a pharmaceutically acceptable salt or solvate thereof, and a pharmaceutically acceptable carrier or excipient.

In another aspect, the present invention provides a compound of Formula I as defined herein, or a pharmaceutically acceptable salt or solvate thereof, or a pharmaceutical composition as defined herein, for use in a method of diagnosis.

In another aspect, the present invention provides a compound of Formula I as defined herein, or a pharmaceutically acceptable salt or solvate thereof, or a pharmaceutical composition as defined herein, for use in a method of diagnosing or monitoring a disease or medical condition exhibiting senescence.

In another aspect, the present invention provides a method for detecting senescence in a subject, or a biological sample obtained therefrom, comprising:
  (i) administering to said subject or sample an effective amount of a compound of Formula I as defined herein, or a pharmaceutically acceptable salt or solvate thereof, or a pharmaceutical composition as defined herein; and
  (ii) detecting binding of said compound or pharmaceutical composition to a marker of senescence in the subject or sample.

In another aspect, the present invention provides a method for imaging a cell, tissue or organ exhibiting senescence, or a component or extract thereof, comprising
  (i) administering to said cell, tissue, organ or a component or extract thereof an effective amount of a compound of Formula I as defined herein, or a pharmaceutically acceptable salt or solvate thereof, or a pharmaceutical composition as defined herein; and
  (ii) detecting the presence of the compound or composition in the cell, tissue, organ or the component or extract thereof.

In another aspect, the present invention provides a method of identifying a subject having an increased likelihood of responsiveness or sensitivity to a senotherapy comprising:

(i) administering to said subject, or to a biological sample obtained from the subject, an effective amount of a compound of Formula I as defined herein, or a pharmaceutically acceptable salt or solvate thereof, or a pharmaceutical composition as defined herein; and (ii) detecting the presence of the compound in the subject or sample in order to determine the level of senescence in said subject or sample.

In another aspect, the present invention provides a method of identifying a subject demonstrating responsiveness or sensitivity to a senotherapy comprising (i) administering to said subject, or to a biological sample obtained from the subject, an effective amount of a compound of Formula I as defined herein, or a pharmaceutically acceptable salt or solvate thereof, or a pharmaceutical composition as defined herein; and (ii) detecting the presence of the compound in the subject or sample in order to determine the level of senescence.

Preferred, suitable, and optional features of any one particular aspect of the present invention are also preferred, suitable, and optional features of any other aspect.

DETAILED DESCRIPTION OF THE INVENTION

Definitions

Figure 1:
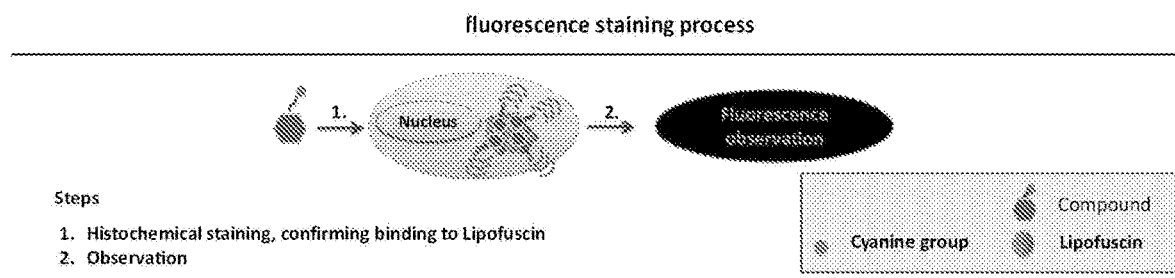
FIG. 1. Schematic layout of senescent cells detection with compounds of formula I.

The compounds and intermediates described herein may be named according to either the IUPAC (International Union for Pure and Applied Chemistry) or CAS (Chemical Abstracts Service) nomenclature systems. It should be understood that unless expressly stated to the contrary, the terms "compounds of Formula I" and the more general term "compounds" refer to and include any and all compounds described by and/or with reference to Formula I. It should also be understood that these terms encompass all stereoisomers, i.e. cis and trans isomers, as well as optical isomers, i.e. R and S enantiomers, of such compounds and all salts thereof, in substantially pure form and/or any mixtures of the foregoing in any ratio. This understanding extends to pharmaceutical compositions and methods of treatment or diagnosis that employ or comprise one or more compounds of the Formula I, either by themselves or in combination with additional agents.

The various hydrocarbon-containing moieties provided herein may be described using a prefix designating the minimum and maximum number of carbon atoms in the moiety, e.g. "$(C_{a-b})$" or "$C_a$-$C_b$" or "(a-b)C". For example, $C_{a-b}$ alkyl indicates an alkyl moiety having the integer "a" to the integer "b" number of carbon atoms, inclusive. Certain moieties may also be described according to the minimum and maximum number of members with or without specific reference to a particular atom or overall structure. For example, the terms "a to b membered ring" or "having between a to b members" refer to a moiety having the integer "a" to the integer "b" number of atoms, inclusive.

"About" when used herein in conjunction with a measurable value such as, for example, an amount or a period of time and the like, is meant to encompass reasonable variations of the value, for instance, to allow for experimental error in the measurement of said value.

As used herein by themselves or in conjunction with another term or terms, "alkyl" and "alkyl group" refer to a branched or unbranched saturated hydrocarbon chain. Unless specified otherwise, alkyl groups typically contain 1-10 carbon atoms, such as 1-6 carbon atoms or 1-4 carbon atoms or 1-3 carbon atoms, and can be substituted or unsubstituted. Representative examples include, but are not limited to, methyl, ethyl, n-propyl, i-propyl, n-butyl, i-butyl, s-butyl, t-butyl, n-pentyl, n-hexyl, n-heptyl, n-octyl, n-nonyl, n-decyl, isopropyl, tert-butyl, isobutyl, etc.

As used herein by themselves or in conjunction with another term or terms, "alkoxy" and "alkoxy group" refer to O-alkyl groups. Representative examples include, but are not limited to, —OMe, —OEt, —O-$^i$Pr and O-$^t$Bu. Alkoxy groups can be substituted or unsubstituted unless indicated otherwise.

As used herein by themselves or in conjunction with another term or terms, "alkylene" and "alkylene group" refer to a branched or unbranched saturated hydrocarbon chain. Unless specified otherwise, alkylene groups typically contain 1-10 carbon atoms, such as 1-6 carbon atoms or 1-3 carbon atoms, and can be substituted or unsubstituted. Representative examples include, but are not limited to, methylene (—$CH_2$—), the ethylene isomers (—$CH(CH_3)$— and —$CH_2CH_2$—), the propylene isomers (—$CH(CH_3)CH_2$—, —$CH(CH_2CH_3)$—, —$C(CH_3)_2$—, and —$CH_2CH_2CH_2$—), etc.

As used herein by themselves or in conjunction with another term or terms, "alkenyl" and "alkenyl group" refer to a branched or unbranched hydrocarbon chain containing at least one double bond. Unless specified otherwise, alkenyl groups typically contain 2-10 carbon atoms, such as 2-6 carbon atoms or 2-4 carbon atoms, and can be substituted or unsubstituted. Representative examples include, but are not limited to, ethenyl, 3-buten-1-yl, 2-ethenylbutyl, and 3-hexen-1-yl.

As used herein by themselves or in conjunction with another term or terms, "alkynyl" and "alkynyl group" refer to a branched or unbranched hydrocarbon chain containing at least one triple bond. Unless specified otherwise, alkynyl groups typically contain 2-10 carbon atoms, such as 2-6 carbon atoms or 2-4 carbon atoms, and can be substituted or unsubstituted. Representative examples include, but are not limited to, ethynyl, 3-butyn-1-yl, propynyl, 2-butyn-1-yl, and 3-pentyn-1-yl.

As used herein by themselves or in conjunction with another term or terms, "heteroalkyl," refers to a stable straight or branched chain, or combinations thereof, including at least one carbon atom and at least one heteroatom (e.g., O, N, P, Si, and S), and wherein the nitrogen and sulfur atoms may optionally be oxidized, and the nitrogen heteroatom may optionally be quaternized. The heteroatom(s) may be placed at any interior position of the heteroalkyl group or at the position at which the alkyl group is attached to the remainder of the molecule. A heteroalkyl group is an uncyclized chain. Examples include, but are not limited to: —$CH_2$—$CH_2$—O—$CH_3$, —$CH_2$—$CH_2$—NH—$CH_3$, —$CH_2$—$CH_2$—N($CH_3$)—$CH_3$, —$CH_2$—S—$CH_2$—$CH_3$, —S(O)—$CH_3$, —$CH_2$—$CH_2$—S(O)$_2$—$CH_3$, —CH=CH—O—$CH_3$, —Si($CH_3$)$_3$, —$CH_2$—CH=N—OCH$_3$, —CH=CH—N($CH_3$)—$CH_3$, and polyethylenoxy chains such as —(O($CH_2$)$_2$)$_n$(O$CH_2CH_3$). Up to two or three heteroatoms may be consecutive, such as, for example, —$CH_2$—NH—O$CH_3$ and —$CH_2$—O—Si($CH_3$)$_3$. A heteroalkyl moiety may include one or more heteroatoms which may be the same or different.

Similarly, the term "heteroalkylene," by itself or as part of another substituent, means, unless otherwise stated, a divalent radical derived from heteroalkyl, as exemplified, but not limited by, —$CH_2$—$CH_2$—S—$CH_2$—$CH_2$— and —$CH_2$—S—$CH_2$—$CH_2$—NH—$CH_2$—. For heteroalkylene groups, heteroatoms can also occupy either or both of the chain termini (e.g., alkyleneoxy, alkylenedioxy, alkyleneamino, alkylenediamino, and the like.

As used herein by itself or in conjunction with another term or terms, "aromatic" refers to monocyclic and polycyclic ring systems containing 4n+2 pi electrons, where n is an integer. Aromatic should be understood as referring to and including ring systems that contain only carbon atoms (i.e. "aryl") as well as ring systems that contain at least one heteroatom selected from N, O or S (i.e. "heteroaromatic" or "heteroaryl"). An aromatic ring system can be substituted or unsubstituted.

As used herein by itself or in conjunction with another term or terms, "non-aromatic" refers to a monocyclic or polycyclic ring system having at least one double bond that is not part of an extended conjugated pi system. As used herein, non-aromatic refers to and includes ring systems that contain only carbon atoms as well as ring systems that contain at least one heteroatom selected from N, O or S. A non-aromatic ring system can be substituted or unsubstituted.

As used herein by themselves or in conjunction with another term or terms, "aryl" and "aryl group" refer to phenyl and 7-15 membered bicyclic or tricyclic hydrocarbon ring systems, including bridged, spiro, and/or fused ring systems, in which at least one of the rings is aromatic. Aryl groups can be substituted or unsubstituted. Unless specified otherwise, an aryl group may contain 6 ring atoms (i.e., phenyl) or a ring system containing 9 to 15 atoms, such as 9 to 11 ring atoms, or 9 or 10 ring atoms. Representative examples include, but are not limited to, naphthyl, indanyl, 1,2,3,4-tetrahydronaphthalenyl, 6,7,8,9-tetrahydro-5H-benzocycloheptenyl, and 6,7,8,9-tetrahydro-5H-benzocycloheptenyl. Suitably an aryl group is phenyl and naphthyl, suitably phenyl.

As used herein by themselves or in conjunction with another term or terms, "arylene" and "arylene group" refer to a phenylene (—$C_6H_4$—) or to 7 to 15 membered bicyclic or tricyclic hydrocarbon ring systems, including bridged, spiro, and/or fused ring systems, in which at least one of the rings is aromatic. Arylene groups can be substituted or unsubstituted. In some embodiments, an arylene group may contain 6 (i.e., phenylene) ring atoms or be a ring system containing 9 to 15 atoms; such as 9 to 11 ring atoms; or 9 or 10 ring atoms. Arylene groups can be substituted or unsubstituted.

As used herein by themselves or in conjunction with another term or terms, "arylalkyl" and "arylalkyl group" refer to an alkyl group in which a hydrogen atom is replaced by an aryl group, wherein alkyl group and aryl group are as previously defined, such as, for example, benzyl ($C_6H_5CH_2$—). Arylalkyl groups can be substituted or unsubstituted.

As used herein by themselves or in conjunction with another term or terms, "carbocyclic group" and "carbocycle" refer to monocyclic and polycyclic ring systems that contain only carbon atoms in the ring(s), i.e., hydrocarbon ring systems, without regard or reference to aromaticity or degree of unsaturation. Thus, carbocyclic group should be understood as referring to and including ring systems that are fully saturated (such as, for example, a cyclohexyl group), ring systems that are aromatic (such as, for example, a phenyl group), as well as ring systems having fully saturated, aromatic and/or unsaturated portions (such as, for example, cyclohexenyl, 2,3-dihydro-indenyl, and 1,2,3,4-tetrahydro-naphthalenyl). The terms carbocyclic and carbocycle further include bridged, fused, and spirocyclic ring systems.

As used herein by themselves or in conjunction with another term or terms, "cycloalkyl" and "cycloalkyl group" refer to a non-aromatic carbocyclic ring system, that may be monocyclic, bicyclic, or tricyclic, saturated or unsaturated, and may be bridged, spiro, and/or fused. A cycloalkyl group may be substituted or unsubstituted. Unless specified otherwise, a cycloalkyl group typically contains from 3 to 12 ring atoms. In some instances a cycloalkyl group may contain 4 to 10 ring atoms (e.g., 4 ring atoms, 5 ring atoms, 6 ring atoms, 7 ring atoms, etc.). Representative examples include, but are not limited to, cyclopropyl, cyclopropenyl, cyclobutyl, cyclobutenyl, cyclopentyl, cyclopentenyl, cyclohexyl, cyclohexenyl, norbornyl, norbornenyl, bicyclo[2.2.1]hexane, bicyclo[2.2.1]heptane, bicyclo[2.2.1]heptene, bicyclo[3.1.1]heptane, bicyclo[3.2.1]octane, bicyclo[2.2.2]octane, bicyclo[3.2.2]nonane, bicyclo[3.3.1]nonane, and bicyclo[3.3.2]decane. Suitably, cycloalkyl groups are selected from cyclopropyl, cyclobutyl, cyclopentyl and cyclohexyl groups.

As used herein by themselves or in conjunction with another term or terms, "cycloalkylalkyl" and "cycloalkylalkyl group" refer to an alkyl group in which a hydrogen atom is replaced by a cycloalkyl group, wherein alkyl group and cycloalkyl group are as previously defined, such as, for example, cyclohexylmethyl ($C_6H_{11}CH_2$—). Cycloalkylalkyl groups can be substituted or unsubstituted.

As used herein by themselves or in conjunction with another term or terms, "haloalkyl" and "haloalkyl group" refer to alkyl groups in which one or more hydrogen atoms are replaced by halogen atoms. Haloalkyl includes both saturated alkyl groups as well as unsaturated alkenyl and alkynyl groups. Representative examples include, but are not limited to, —$CF_3$, —$CHF_2$, —$CH_2F$, —$CF_2CF_3$, —$CHFCF_3$, —$CH_2CF_3$, —$CF_2CH_3$, —$CHFCH_3$, —$CF_2CF_2CF_3$, —$CF_2CH_2CH_3$, —CF=$CF_2$, —CCl=$CH_2$, —CBr=$CH_2$, —CI=$CH_2$, —C≡C—$CF_3$, —$CHFCH_2CH_3$ and —$CHFCH_2CF_3$. Haloalkyl groups can be substituted or unsubstituted. Suitably, a haloalkyl group is selected from $CHF_2$ and $CF_3$, suitably $CF_3$.

As used herein by themselves or in conjunction with another term or terms, "haloalkoxy" and "haloalkoxy group" refer to alkoxy groups (i.e. O-alkyl groups) in which one or more hydrogen atoms are replaced by halogen atoms. Haloalkoxy includes both saturated alkoxy groups as well as unsaturated alkenyl and alkynyl groups. Representative examples include, but are not limited to, —$OCF_3$, —$OCHF_2$, —$OCH_2F$, —$OCF_2CF_3$, —$OCHFCF_3$, —$OCH_2CF_3$, —$OCF_2CH_3$, —$OCHFCH_3$, —$OCF_2CF_2CF_3$, —$OCF_2CH_2CH_3$, —OCF=$CF_2$, —OCCl=$CH_2$, —OCBr=$CH_2$, —$OCHFCH_2CH_3$ and —$OCHFCH_2CF_3$. Haloalkoxy groups can be substituted or unsubstituted. Suitably, a haloalkyoxy group is selected from —$OCHF_2$ and —$OCF_3$, suitably —$OCF_3$.

As used herein by themselves or in conjunction with another term or terms, "halo" and "halogen" include fluorine, chlorine, bromine and iodine atoms and substituents.

As used herein by themselves or in conjunction with another term or terms, "heteroaryl" and "heteroaryl group" refer to (a) 5 and 6 membered monocyclic aromatic rings, which contain, in addition to carbon atom(s), at least one heteroatom, such as nitrogen, oxygen or sulfur, and (b) 7 to 15 membered bicyclic and tricyclic rings, which contain, in addition to carbon atom(s), at least one heteroatom, such as nitrogen, oxygen or sulfur, and in which at least one of the rings is aromatic. In some instances, a heteroaryl group can contain two or more heteroatoms, which may be the same or different. Heteroaryl groups can be substituted or unsubstituted, and may be bridged, spiro, and/or fused. In some instances, a heteroaryl group may contain 5, 6, or 8 to 15 ring atoms. In other instances, a heteroaryl group may contain 5 to 10 ring atoms, such as 5, 6, 9, or 10 ring atoms. Representative examples include, but are not limited to, 2,3-dihydrobenzofuranyl, 1,2-dihydroquinolinyl, 3,4-dihydroisoquinolinyl, 1,2,3,4-tetrahydroisoquinolinyl, 1,2,3,4-tetrahydroquinolinyl, benzoxazinyl, benzothiazinyl, chromanyl, furanyl, 2-furanyl, 3-furanyl, imidazolyl, isoxazolyl, isothiazolyl, oxadiazolyl, oxazolyl, pyridinyl, 2-, 3-, or 4-pyridinyl, pyrimidinyl, 2-, 4-, or 5-pyrimidinyl, pyrazolyl, pyrrolyl, 2- or 3-pyrrolyl, pyrazinyl, pyridazinyl, 3- or 4-pyridazinyl, 2-pyrazinyl, thienyl, 2-thienyl, 3-thienyl, tetrazolyl, thiazolyl, thiadiazolyl, triazinyl, triazolyl, pyridin-2-yl, pyridin-4-yl, pyrimidin-2-yl, pyridazin-4-yl, pyrazin-2-yl, naphthyridinyl, pteridinyl, phthalazinyl, purinyl, alloxazinyl, benzimidazolyl, benzofuranyl, benzofurazanyl, 2H-1-benzopyranyl, benzothiadiazine, benzothiazinyl, benzothiazolyl, benzothiophenyl, benzoxazolyl, cinnolinyl, furopyridinyl, indolinyl, indolizinyl, indolyl, or 2-, 3-, 4-, 5-, 6-, or 7-indolyl, 3H-indolyl, quinazolinyl, quinoxalinyl, isoindolyl, isoquinolinyl, 10-aza-tricyclo[6.3.1.0$^{2,7}$]dodeca-2(7),3,5-trienyl, 12-oxa-10-aza-tricyclo[6.3.1.0$^{2,7}$]dodeca-2(7),3,5-trienyl, 12-aza-tricyclo[7.2.1.0$^{2,7}$]dodeca-2(7),3,5-trienyl, 10-aza-tricyclo[6.3.2.0$^{2,7}$]trideca-2(7),3,5-trienyl, 2,3,4,5-tetrahydro-1H-benzo[d]azepinyl, 1,3,4,5-tetrahydro-benzo[d]azepin-2-onyl, 1,3,4,5-tetrahydro-benzo[b]azepin-2-onyl, 2,3,4,5-tetrahydro-benzo[c]azepin-1-onyl, 1,2,3,4-tetrahydro-benzo[e][1,4]diazepin-5-onyl, 2,3,4,5-tetrahydro-1H-benzo[e][1,4]diazepinyl, 5,6,8,9-tetrahydro-7-oxa-benzocycloheptenyl, 2,3,4,5-tetrahydro-1H-benzo[b]azepinyl, 1,2,4,5-tetrahydro-benzo[e][1,3]diazepin-3-onyl, 3,4-dihydro-2H-benzo[b][1,4]dioxepinyl, 3,4-dihydro-2H-benzo[f][1,4]oxazepin-5-onyl, 6,7,8,9-tetrahydro-5-thia-8-aza-benzocycloheptenyl, 5,5-dioxo-6,7,8,9-tetrahydro-5-thia-8-aza-benzocycloheptenyl, and 2,3,4,5-tetrahydro-benzo[f][1,4]oxazepinyl. Suitably, a heteroaryl is a 5- or 6-membered heteroaryl ring comprising one, two or three heteroatoms selected from N, O or S.

As used herein by themselves or in conjunction with another term or terms, "heteroarylalkyl" and "heteroarylalkyl group" refer to an alkyl group in which a hydrogen atom is replaced by a heteroaryl group, wherein alkyl group and heteroaryl group are as previously defined. Heteroarylalkyl groups can be substituted or unsubstituted. Where carbon numbers are provided, e.g. heteroaryl($C_{n-m}$)alkyl, the range refers to the alkyl group. Suitably, the constituent alkyl group has 1-6 carbons, suitable 1-3 carbons.

As used herein by themselves or in conjunction with another term or terms, "heterocyclic group" and "heterocycle" refer to monocyclic and polycyclic ring systems that contain carbon atoms and at least one heteroatom selected from nitrogen, oxygen, sulfur or phosphorus in the ring(s), without regard or reference to aromaticity or degree of unsaturation. Thus, a heterocyclic group should be understood as referring to and including ring systems that are fully saturated (such as, for example, a piperidinyl group), ring systems that are aromatic (such as, for example, a pyrindinyl group), as well as ring systems having fully saturated, aromatic and/or unsaturated portions (such as, for example, 1,2,3,6-tetrahydropyridinyl and 6,8-dihydro-5H-[1,2,4]triazolo[4,3-a]pyrizinyl). The terms heterocyclic and heterocycle further include bridged, fused, and spirocyclic ring systems.

As used herein by themselves or in conjunction with another term or terms, "heterocycloalkyl" and "heterocycloalkyl group" refer to 3 to 15 membered monocyclic, bicyclic, and tricyclic non-aromatic ring systems, which contain, in addition to carbon atom(s), at least one heteroatom, such as nitrogen, oxygen, sulfur or phosphorus. Heterocycloalkyl groups may be fully saturated or contain unsaturated portions and may be bridged, spiro, and/or fused ring systems. In some instances a heterocycloalkyl group may contain at least two or heteroatoms, which may be the same or different. Heterocycloalkyl groups can be substituted or unsubstituted. In some instances a heterocycloalkyl group may contain from 3 to 10 ring atoms or from 3 to 7 ring atoms or from 5 to 7 ring atoms, such as 5 ring atoms, 6 ring atoms, or 7 ring atoms. Representative examples include, but are not limited to, tetrahydrofuranyl, pyrrolidinyl, pyrrolinyl, imidazolidinyl, imidazolinyl, pyrazolidinyl, pyrazolinyl, piperidyl, piperazinyl, indolinyl, isoindolinyl, morpholinyl, thiomorpholinyl, homomorpholinyl, homopiperidyl, homopiperazinyl, thiomorpholinyl-5-oxide, thiomorpholinyl-S,S-dioxide, pyrrolidinyl, tetrahydropyranyl, piperidinyl, tetrahydrothienyl, homopiperidinyl, homothiomorpholinyl-S,S-dioxide, oxazolidinonyl, dihydropyrazolyl, dihydropyrrolyl, dihydropyrazinyl, dihydropyridinyl, dihydropyrimidinyl, dihydrofuryl, dihydropyranyl, tetrahydrothienyl-5-oxide, tetrahydrothienyl-S,S-dioxide, homothiomorpholinyl-5-oxide, quinuclidinyl, 2-oxa-5-azabicyclo[2.2.1]heptanyl, 8-oxa-3-aza-bicyclo[3.2.1]octanyl, 3,8-diaza-bicyclo[3.2.1]octanyl, 2,5-diaza-bicyclo[2.2.1]heptanyl, 3,8-diaza-bicyclo[3.2.1]octanyl, 3,9-diaza-bicyclo[4.2.1]nonanyl, 2,6-diaza-bicyclo[3.2.2]nonanyl, [1,4]oxaphosphinanyl-4-oxide, [1,4]azaphosphinanyl-4-oxide, [1,2]oxaphospholanyl-2-oxide, phosphinanyl-1-oxide, [1,3]azaphospholidinynl-3-oxide, [1,3]oxaphospholanyl-3-oxide, 7-oxabicyclo[2.2.1]heptanyl, 6,8-dihydro-5H-[1,2,4]triazolo[4,3-a]pyrazin-7-yl, 6,8-dihydro-5H-imidazo[1,5-a]pyrazin-7-yl, 6,8-dihydro-5H-imidazo[1,2-a]pyrazin-7-yl, 5,6,8,9-tetrahydro-[1,2,4]triazolo[4,3-d][1,4]diazepin-7-yl and 6,8-dihydro-5H-[1,2,4]triazolo[4,3-a]pyrazin-7-yl. Suitably, a heterocyclylalkyl group as defined herein is a monocyclic, bicyclic or spiro heterocyclyl group comprising one, two or three heteroatoms selected from N, O or S.

As used herein by themselves or in conjunction with another term or terms, "heterocycloalkylene" and "heterocycloalkylene group" refer to 3 to 15 membered monocyclic, bicyclic, or tricyclic non-aromatic ring systems, which contain, in addition to carbon atom(s), at least one heteroatom, such as nitrogen, oxygen, sulfur or phosphorus. Heterocycloalkylene groups may be fully saturated or contain unsaturated portions and may be bridged, spiro, and/or fused. Heterocycloalkylene groups can be substituted or unsubstituted. In some instances, a heterocycloalkylene group may contain from 3 to 10 ring atoms; such as from 3 to 7 ring atoms. In other instances a heterocycloalkylene group may contain from 5 to 7 ring atoms, such as 5 ring atoms, 6 ring atoms, or 7 ring atoms.

As used herein by themselves or in conjunction with another term or terms, "heterocycloalkylalkyl" and "heterocycloalkylalkyl group" refer to an alkyl group in which a hydrogen atom is replaced by a heterocycloalkyl group, wherein alkyl group and heterocycloalkyl group are as previously defined, such as, for example, pyrrolidinylmethyl ($C_4H_8NCH_2$—). Heteroycloalkylalkyl groups can be substituted or unsubstituted. Where carbon numbers are provided, e.g. heterocycloalkyl($C_{n-m}$)alkyl, the range refers to the alkyl group. Suitably, the constituent alkyl group has 1-6 carbons, suitable 1-3 carbons.

As used herein, "oxo" refers to a double bond to oxygen, i.e. =O.

As used herein by itself or in conjunction with another term or terms, "pharmaceutically acceptable" refers to materials that are generally chemically and/or physically compatible with other ingredients (such as, for example, with reference to a formulation), and/or is generally physiologically compatible with the recipient (such as, for example, a subject) thereof.

As used herein by itself or in conjunction with another term or terms, "pharmaceutical composition" refers to a composition that can be used to treat a disease, condition, or disorder in a subject, including a human.

As used herein by themselves or in conjunction with another term or terms, "stable" and "chemically stable" refer to a compound that is sufficiently robust to be isolated from a reaction mixture with a useful degree of purity. The present application is directed solely to the preparation of stable compounds. When lists of alternative substituents include members-which, owing to valency requirements, chemical stability, or other reasons, cannot be used to substitute a particular group, the list is intended to be read in context to include those members of the list that are suitable for substituting the particular group. For example, when considering the degree of optional substitution of a particular moiety, it should be understood that the number of substituents does not exceed the valency appropriate for that moiety.

As used herein by themselves or in conjunction with another term or terms, "subject(s)" and "patient(s)", suitably refer to mammals, in particular humans.

As used herein by itself or in conjunction with another term or terms, "substituted" indicates that a hydrogen atom on a molecule has been replaced with a different atom or group of atoms and the atom or group of atoms replacing the hydrogen atom is a "substituent". It should be understood that the terms "substituent", "substituents", "moiety", "moieties", "group", or "groups" refer to substituent(s).

As used herein by themselves or in conjunction with another term or terms, "therapeutic" and "therapeutically effective amount" refer to an amount a compound, composition or medicament that (a) inhibits or causes an improvement in a particular disease, condition or disorder; (b) attenuates, ameliorates or eliminates one or more symptoms of a particular disease, condition or disorder. It should be understood that the terms "therapeutic" and "therapeutically effective" encompass any one of the aforementioned effects (a)-(b), either alone or in combination with any of the others (a)-(b). It should be understood that in, for example, a human or other mammal, a therapeutically effective amount can be determined experimentally in a laboratory or clinical setting, or a therapeutically effective amount may be the amount required by the guidelines of the United States Food and Drug Administration (FDA) or equivalent foreign regulatory body, for the particular disease and subject being treated. It should be appreciated that determination of proper dosage forms, dosage amounts, and routes of administration is within the level of ordinary skill in the pharmaceutical and medical arts.

As used herein whether by themselves or in conjunction with another term or terms, "treating", "treated" and "treatment", refer to and include ameliorative, palliative, and curative uses and results. In some embodiments, the terms "treating", "treated", and "treatment" refer to curative uses and results as well as uses and results that diminish or reduce the severity of a particular condition, characteristic, symptom, disorder, or disease described herein. For example, treatment can include diminishment of several symptoms of a condition or disorder or complete eradication of said condition or disorder.

As used herein, the terms "prevent", "preventative" or "prevention", refers to diminishing the likelihood, or delaying the onset, of one or more symptoms of a particular disease, condition or disorder described herein. It should be understood that the terms "prevent", "preventative" or "prevention" are not necessarily used in an absolute sense, but also refers to uses and results where the administration of a compound or composition diminishes the likelihood or seriousness of a condition, symptom, or disease state, and/or delays the onset of a condition, symptom, or disease state for a period of time.

As used herein, a "therapeutic agent" or "therapeutically active agent", whether used alone or in conjunction with another term or terms, refers to any compound, i.e. a drug, that has been found to be useful in the treatment of a disease, disorder or condition and is not described by Formula I. It should be understood that a therapeutic agent may or may not be approved by the FDA or an equivalent foreign regulatory body.

A "therapeutically effective amount" means the amount of a compound that, when administered to a subject or patient for treating a disease, is sufficient to effect such treatment for the disease. The "therapeutically effective amount" will vary depending on the compound, the disease and its severity and the age, weight, etc., of the subject or patient to be treated.

A bond terminating in a "⁀" or "⁀" represents that the bond is connected to another atom that is not shown in the structure. A bond terminating inside a cyclic structure and not terminating at an atom of the ring structure represents that the bond may be variably connected to atoms in the ring structure where allowed by valency unless otherwise defined.

As used herein, the term "moiety" refers a portion or functional group of a molecule. Chemical moieties are often recognized as chemical entities embedded in or appended to a molecule.

Compounds of Formula I

In one aspect the present invention relates to a compound, or a salt or solvate thereof, according to formula I:

T-L-D    (I)

wherein
D is a fluorescent dye moiety selected from:
(i) a cyanine dye moiety;
(ii) a BODIPY dye moiety;
(iii) a coumarin dye moiety; and
(iv) a xanthene dye moiety;
L is a direct bond or a linking moiety; and
T is a lipid-targeting moiety of formula II or III (where the wavy line  indicates the point of attachment to L):

(II)

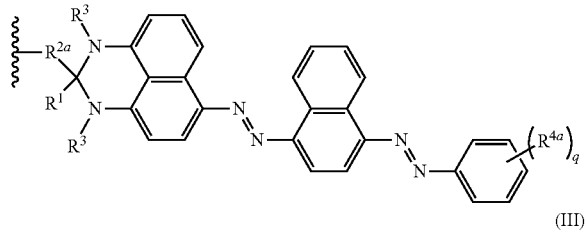

(III)

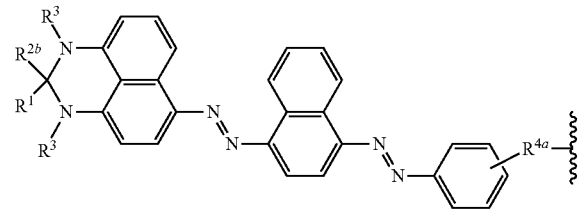

wherein
$R^1$ and $R^{2b}$ are each independently selected from hydrogen; an optionally substituted $(C_{1-10})$alkyl group; an optionally substituted aryl group; and an optionally substituted aryl$(C_{1-10})$alkyl group; or
$R^1$ and $R^{2b}$, together with the carbon to which they are attached, form an optionally substituted $C_4$ to $C_{12}$ carbocyclic ring;

$R^{2a}$ is selected from an optionally substituted $(C_{1-10})$ alkylene group; an optionally substituted arylene group; an optionally substituted aryl$(C_{1-10})$alkylene group; or $R^1$ and $R^{2a}$ together with the carbon to which they are attached form an optionally substituted $C_4$ to $C_{12}$ carbocyclic ring;

each $R^3$ is independently hydrogen or a $(C_{1-10})$alkyl group;

$R^{4a}$ is selected from hydrogen, halogen, optionally substituted $C_{1-10}$ alkyl, optionally substituted $C_{1-10}$ haloalkyl, optionally substituted $C_{1-10}$haloalkoxy, $-OR^{A4}$, $-SR^{A4}$, $-NR^{A4}R^{B4}$, $-CN$, $-NO_2$, $-N_3$, $-NR^{A4}C(O)R^{B4}$, $-C(O)NR^{A4}R^{B4}$, $-NR^{A4}C(O)OR^{B4}$, $-OC(O)NR^{A4}R^{B4}$, $-NR^{A4}C(O)NR^{A4}R^{B4}$, $-NR^{A4}SO_2R^{B4}$, $-SO_2NR^{A4}R^{B4}$, $-SO_2R^{A4}$, $-NR^{A4}C(S)R^{B4}$, $-C(S)NR^{A4}R^{B4}$, $-C(O)R^{A4}$, $-C(O)OR^{A4}$, optionally substituted $C_{3-6}$ cycloalkyl and an optionally substituted 3-7 membered heterocycloalkyl group;

q is an integer of value 0, 1, 2 or 3;

$R^{4b}$ is selected from a direct bond, $-O-$, $-S-$, $-NR^{C4}-$, $-NR^{C4}C(=O)-$, $-C(=O)NR^{C4}-$, an optionally substituted $(C_{1-10})$alkylene group; and an optionally substituted $(C_{1-10})$heteroalkylene group; and $R^{A4}$, $R^{B4}$ and $R^{C4}$, at each occurrence, are independently selected hydrogen, $C_{1-6}$ alkyl and $C_{1-6}$ heteroalkyl.

Lipid Targeting Moiety

In one embodiment, the lipid-targeting moiety, T, is a lipofuscin targeting moiety.

In one embodiment, T is of formula II. In another embodiment, T is of formula III.

In one embodiment, $R^1$ is selected from hydrogen; an optionally substituted $(C_{1-6})$alkyl group; an optionally substituted $C_{6-11}$ aryl group; and an optionally substituted aryl$(C_{1-6})$alkyl group.

In another embodiment, $R^1$ is selected from hydrogen; an optionally substituted $(C_{1-6})$alkyl group; an optionally substituted phenyl group; and an optionally substituted aryl$(C_{1-6})$alkyl group.

In another embodiment, $R^1$ is selected from hydrogen, an optionally substituted phenyl and an optionally substituted $(C_{1-6})$alkyl group.

In another embodiment, $R^1$ is selected from hydrogen and an optionally substituted $(C_{1-4})$alkyl group.

In another embodiment, $R^1$ is selected from hydrogen and $(C_{1-4})$alkyl group optionally substituted with a hydroxyl group. In another embodiment, $R^1$ is hydrogen or methyl.

In one embodiment, $R^1$ is optionally substituted by one or more substituents independently selected from halo, $-CN$, $-NO_2$, $-OR^{A1}$, $-NR^{A1}R^{B1}$, $-SR^{A1}$, $-C(O)R^{A1}$, $-C(O)OR^{A1}$, $-OC(O)R^{A1}$, $-O(CR^{A1}R^{B1})_mOR^{C1}$, $-C(O)NR^{A1}R^{B1}$, $-NR^{A1}C(O)R^{B1}$, $-SO_2R^{A1}$, $-SO_2NR^{A1}R^{B1}$, $-NR^{A1}SO_2R^{B1}$, $C_{1-6}$ alkyl, $C_{1-6}$ haloalkyl, $C_{2-6}$ alkenyl, $C_{2-6}$ alkynyl, $=O$, $=S$, $=NR^{A1}$, $C_{3-6}$ cycloalkyl, phenyl and 3- to 6-membered heterocyclyl including 1, 2 or 3 heteroatoms selected from N, O and S;

wherein $R^{A1}$, $R^{B1}$ and $R^{C1}$, at each occurrence, are independently selected hydrogen and $C_{1-6}$ alkyl and $C_{1-6}$ heteroalkyl.

In another embodiment, $R^1$ is optionally substituted by one or more substituents independently selected from halo, $-CN$, $-NO_2$, $-OR^{A1}$, $-NR^{A1}R^{B1}$, $-SR^{A1}$, $-C(O)R^{A1}$, $-C(O)OR^{A1}$, $-OC(O)R^{A1}$, $C_{1-6}$ alkyl, $C_{1-6}$ haloalkyl, $C_{2-6}$ alkenyl, $C_{2-6}$ alkynyl, $=O$, $=S$, $=NR^{A1}$, $C_{3-6}$ cycloalkyl, phenyl and 3- to 6-membered heterocyclyl including 1, 2 or 3 heteroatoms selected from N, O and S;

wherein $R^{A1}$ and $R^{B1}$, at each occurrence, are independently selected hydrogen and $C_{1-6}$ alkyl.

In another embodiment, $R^1$ is optionally substituted by one or more substituents independently selected from halo, $-CN$, $-OR^{A1}$, $-NR^{A1}R^{B1}$, $-SR^{A1}$, $C_{1-6}$ alkyl, $C_{1-6}$ haloalkyl, $=O$, $C_{3-6}$ cycloalkyl, phenyl and 3- to 6-membered heterocyclyl including 1, 2 or 3 heteroatoms selected from N, O and S; wherein $R^{A1}$ and $R^{B1}$, at each occurrence, are independently selected hydrogen and $C_{1-6}$ alkyl.

In one embodiment, $R^{2b}$ is selected from hydrogen; an optionally substituted $(C_{1-6})$alkyl group; an optionally substituted $C_{6-11}$ aryl group; and an optionally substituted aryl$(C_{1-6})$alkyl group.

In another embodiment, $R^{2b}$ is selected from hydrogen; an optionally substituted $(C_{1-6})$alkyl group; an optionally substituted phenyl group; and an optionally substituted aryl$(C_{1-6})$alkyl group.

In another embodiment, $R^{2b}$ is selected from hydrogen, an optionally substituted phenyl group and an optionally substituted $(C_{1-6})$alkyl group.

In another embodiment, $R^{2b}$ is selected from hydrogen and an optionally substituted $(C_{1-4})$alkyl group.

In another embodiment, $R^{2b}$ is selected from hydrogen and an $(C_{1-4})$alkyl group optionally substituted with a hydroxyl group. In another embodiment, $R^{2b}$ is hydrogen or methyl.

In one embodiment, $R^{2b}$ is optionally substituted by one or more substituents independently selected from halo; $-CN$, $-NO_2$, $-OR^{A2b}$, $-NR^{A2b}R^{B2b}$, $-SR^{A2b}$, $-C(O)R^{A2b}$, $-C(O)OR^{A2b}$, $-OC(O)R^{A2b}$, $-O(CR^{A2b}R^{B2b})_mOR^{C2b}$, $-C(O)NR^{A2b}R^{B2b}$, $-NR^{A2b}C(O)R^{B2b}$, $-SO_2R^{A2b}$, $-SO_2NR^{A2b}R^{B2b}$, $-NR^{A2b}SO_2R^{B2b}$, $C_{1-6}$ alkyl, $C_{1-6}$ haloalkyl, $C_{2-6}$ alkenyl, $C_{2-6}$ alkynyl, $=O$, $=S$, $=NR^{A2b}$, $C_{3-6}$ cycloalkyl, phenyl and 3- to 6-membered heterocyclyl including 1, 2 or 3 heteroatoms selected from N, O and S;

wherein $R^{A2b}$, $R^{B2b}$ and $R^{C2b}$, at each occurrence, are independently selected hydrogen and $C_{1-6}$ alkyl and $C_{1-6}$ heteroalkyl.

In another embodiment, $R^{2b}$ is optionally substituted by one or more substituents independently selected from halo, $-CN$, $-NO_2$, $-OR^{A2b}$, $-NR^{A2b}R^{B2b}$, $-SR^{A2b}$, $-C(O)R^{A2b}$, $-C(O)OR^{A2b}$, $-OC(O)R^{A2b}$, $C_{1-6}$ alkyl, $C_{1-6}$ haloalkyl, $C_{2-6}$ alkenyl, $C_{2-6}$ alkynyl, $=O$, $=S$, $=NR^{A2b}$, $C_{3-6}$ cycloalkyl, phenyl and 3- to 6-membered heterocyclyl including 1, 2 or 3 heteroatoms selected from N, O and S;

wherein $R^{A2b}$ and $R^{B2b}$, at each occurrence, are independently selected hydrogen and $C_{1-6}$ alkyl.

In another embodiment, $R^{2b}$ is optionally substituted by one or more substituents independently selected from halo, $-CN$, $-OR^{A2b}$, $-NR^{A2b}R^{B2b}$, $-SR^{A2b}$, $C_{1-6}$ alkyl, $C_{1-6}$ haloalkyl, $=O$, $C_{3-6}$ cycloalkyl, phenyl and 3- to 6-membered heterocyclyl including 1, 2 or 3 heteroatoms selected from N, O and S;

wherein $R^{A2b}$ and $R^{B2b}$, at each occurrence, are independently selected hydrogen and $C_{1-6}$ alkyl.

In one embodiment, at least one of $R^1$ and $R^{2b}$ is not hydrogen. In another embodiment, $R^1$ and $R^{2b}$ are independently selected from optionally substituted $(C_{1-10})$alkyl group, suitably an optionally substituted $(C_{1-6})$alkyl group, suitably an optionally substituted $(C_{1-4})$alkyl group.

In another embodiment, in another embodiment, $R^1$ and $R^{2b}$ are independently selected from methyl, ethyl and propyl, suitably $R^1$ and $R^{2b}$ are methyl.

In one embodiment, $R^1$ and $R^{2b}$, together with the carbon to which they are attached, form an optionally substituted $C_4$ to $C_{12}$ carbocyclic ring, and thus a spirocyclic group. In another embodiment, $R^1$ and $R^{2b}$, together with the carbon to which they are attached, form an optionally substituted $C_5$ to $C_{10}$ carbocyclic ring.

In one embodiment, $R^{2a}$ is selected from an optionally substituted $(C_{1-6})$alkylene group; an optionally substituted $C_{6-11}$ arylene group; and an optionally substituted aryl $(C_{1-6})$alkylene group.

In another embodiment, $R^{2a}$ is selected from an optionally substituted $(C_{1-6})$alkylene group; an optionally substituted phenylene group; and an optionally substituted aryl$(C_{1-6})$alkylene group.

In another embodiment, $R^{2a}$ is selected from an optionally substituted $(C_{1-6})$alkylene group.

In another embodiment, $R^{2a}$ is selected from an optionally substituted $(C_{1-4})$alkylene group. In another embodiment, $R^{2a}$ is a methylene, ethylene, propylene or butylene group, suitably methylene.

In one embodiment, $R^{2a}$ is optionally substituted by one or more substituents independently selected from halo, —CN, —NO$_2$, —OR$^{A2a}$, —NR$^{Aa2}$R$^{B2a}$, —SR$^{A2a}$, —C(O)R$^{A2a}$, —C(O)OR$^{A2a}$, —OC(O)R$^{A2a}$, —O(CR$^{A2a}$R$^{B2a}$)$_m$OR$^{C2a}$, —C(O)NR$^{A2a}$R$^{B2a}$, —NR$^{A2a}$C(O)R$^{B2a}$, —SO$_2$R$^{A2a}$, —SO$_2$NR$^{A2a}$R$^{B2a}$, —NR$^{A2a}$SO$_2$R$^{B2a}$, $C_{1-6}$ alkyl, $C_{1-6}$ haloalkyl, $C_{2-6}$ alkenyl, $C_{2-6}$ alkynyl, =O, =S, =NR$^{A2a}$, $C_{3-6}$ cycloalkyl, phenyl and 3- to 6-membered heterocyclyl including 1, 2 or 3 heteroatoms selected from N, O and S;
wherein $R^{A2a}$, $R^{B2a}$ and $R^{C2a}$, at each occurrence, are independently selected hydrogen and $C_{1-6}$ alkyl and $C_{1-6}$ heteroalkyl.

In another embodiment, $R^{2a}$ is optionally substituted by one or more substituents independently selected from halo, —CN, —NO$_2$, —OR$^{A2a}$, —NR$^{A2a}$R$^{B2a}$, —SR$^{A2a}$, —C(O)R$^{A2a}$, —C(O)OR$^{A2a}$, —OC(O)R$^{A2a}$, $C_{1-6}$ alkyl, $C_{1-6}$ haloalkyl, $C_{2-6}$ alkenyl, $C_{2-6}$ alkynyl, =O, =S, =NR$^{A2a}$, $C_{3-6}$ cycloalkyl, phenyl and 3- to 6-membered heterocyclyl including 1, 2 or 3 heteroatoms selected from N, O and S; wherein $R^{A2a}$ and $R^{B2a}$, at each occurrence, are independently selected hydrogen and $C_{1-6}$ alkyl.

In another embodiment, $R^{2a}$ is optionally substituted by one or more substituents independently selected from halo, —CN, —OR$^{A2a}$, —NR$^{A2a}$R$^{B2a}$, —SR$^{A2a}$, $C_{1-6}$ alkyl, $C_{1-6}$ haloalkyl, =O, $C_{3-6}$ cycloalkyl, phenyl and 3- to 6-membered heterocyclyl including 1, 2 or 3 heteroatoms selected from N, O and S;
wherein $R^{A2a}$ and $R^{B2a}$, at each occurrence, are independently selected hydrogen and $C_{1-6}$ alkyl.

In one embodiment, $R^1$ and $R^{2a}$, together with the carbon to which they are attached, form an optionally substituted $C_4$ to $C_{12}$ carbocyclic ring, and thus a spirocyclic group. In another embodiment, $R^1$ and $R^{2a}$, together with the carbon to which they are attached, form an optionally substituted $C_5$ to $C_{10}$ carbocyclic ring.

In one embodiment, each $R^3$ is independently hydrogen or a $(C_{1-6})$alkyl group. In another embodiment, each $R_3$ is independently hydrogen or a $(C_{1-3})$alkyl group. In another embodiment, each $R_3$ is independently hydrogen or methyl.

In one embodiment, $R^{4a}$ is selected from hydrogen, halogen, optionally substituted $C_{1-6}$ alkyl, optionally substituted $C_{1-6}$ haloalkyl, optionally substituted $C_{1-6}$ haloalkoxy, —OR$^{A4}$, —SR$^{A4}$, —NR$^{A4}$R$^{B4}$, —CN, —NO$_2$, —N$_3$, —NR$^{A4}$C(O)R$^{B4}$, —C(O)NR$^{A4}$R$^{B4}$, —NR$^{A4}$C(O)OR$^{B4}$, —OC(O)NR$^{A4}$R$^{B4}$, —NR$^{A4}$C(O)NR$^{A4}$R$^{B4}$, —NR$^{A4}$SO$_2$R$^{B4}$, —SO$_2$NR$^{A4}$R$^{B4}$, —SO$_2$R$^{A4}$, optionally substituted $C_{3-6}$ cycloalkyl and an optionally substituted 3-7 membered heterocycloalkyl group.

In another embodiment, $R^{4a}$ is selected from hydrogen, halogen, optionally substituted $C_{1-6}$ alkyl, optionally substituted $C_{1-6}$ haloalkyl, optionally substituted $C_{1-6}$ haloalkoxy, —OR$^{A4}$, —SR$^{A4}$, —NR$^{A4}$R$^{B4}$, —CN, —NO$_2$, —N$_3$, —NR$^{A4}$C(O)R$^{B4}$, —C(O)NR$^{A4}$R$^{B4}$, —NR$^{A4}$SO$_2$R$^{B4}$, —SO$_2$NR$^{A4}$R$^{B4}$, —SO$_2$R$^{A4}$, optionally substituted $C_{3-6}$ cycloalkyl and an optionally substituted 3-7 membered heterocycloalkyl group.

In another embodiment, $R^{4a}$ is selected from hydrogen, halogen, optionally substituted $C_{1-10}$ alkyl, optionally substituted $C_{1-10}$haloalkyl, optionally substituted $C_{1-10}$ haloalkoxy, —OR$^{A4}$, —CN, and —NO$_2$.

In another embodiment, $R^{4a}$ is selected from hydrogen, halogen, $C_{1-6}$ alkyl optionally substituted with a hydroxyl group, $C_{1-6}$ haloalkyl, $C_{1-6}$ haloalkoxy, —OH, —NH$_2$, —CN, $C_{3-6}$ cycloalkyl and a 3-7 membered heterocycloalkyl group.

In another embodiment, $R^{4a}$ is selected from hydrogen, $C_{1-6}$ alkyl optionally substituted with a hydroxyl group and —OH.

In one embodiment, $R^{4a}$ is optionally substituted by one or more substituents independently selected from halo, —CN, —NO$_2$, —OR$^{A4a}$, —NR$^{A4a}$R$^{B4a}$, —SR$^{A4a}$, —C(O)R$^{A4a}$, —C(O)OR$^{A4a}$, —OC(O)R$^{A4a}$, —O(CR$^{A4a}$R$^{B4a}$)$_m$OR$^{C4a}$, —C(O)NR$^{A4a}$R$^{B4a}$, NR$^{A4a}$C(O)R$^{B4a}$, —SO$_2$R$^{A4a}$, —SO$_2$NR$^{A4a}$R$^{B4a}$, —NR$^{A4a}$SO$_2$R$^{B4a}$, $C_{1-6}$ alkyl, $C_{1-6}$ haloalkyl, $C_{2-6}$ alkenyl, $C_{2-6}$ alkynyl, =O, =S, =NR$^{A4a}$, $C_{3-6}$ cycloalkyl, phenyl and 3- to 6-membered heterocyclyl including 1, 2 or 3 heteroatoms selected from N, O and S;
wherein $R^{A4a}$, $R^{B4a}$ and $R^{C4a}$, at each occurrence, are independently selected hydrogen and $C_{1-6}$ alkyl and $C_{1-6}$ heteroalkyl.

In another embodiment, $R^{4a}$ is optionally substituted by one or more substituents independently selected from halo, —CN, —NO$_2$, —OR$^{A4a}$, —NR$^{A4a}$R$^{B4a}$, —SR$^{A4a}$, —C(O)R$^{A4a}$, —C(O)OR$^{A4a}$, —OC(O)R$^{A4a}$, $C_{1-6}$ alkyl, $C_{1-6}$ haloalkyl, $C_{2-6}$ alkenyl, $C_{2-6}$ alkynyl, =O, =S, =NR$^{A4a}$, $C_{3-6}$ cycloalkyl, phenyl and 3- to 6-membered heterocyclyl including 1, 2 or 3 heteroatoms selected from N, O and S;
wherein $R^{A4a}$ and $R^{B4a}$, at each occurrence, are independently selected hydrogen and $C_{1-6}$ alkyl.

In another embodiment, $R^{4a}$ is optionally substituted by one or more substituents independently selected from halo, —CN, —OR$^{A4a}$, —NR$^{A4a}$R$^{B4a}$, —SR$^{A4a}$, $C_{1-6}$ alkyl, $C_{1-6}$ haloalkyl, =O, $C_{3-6}$ cycloalkyl, phenyl and 3- to 6-membered heterocyclyl including 1, 2 or 3 heteroatoms selected from N, O and S;
wherein $R^{A4a}$ and $R^{B4a}$, at each occurrence, are independently selected hydrogen and $C_{1-6}$ alkyl.

In one embodiment, q is 0, 1 or 2. In another embodiment, q is 0 or 1.

In one embodiment, $R^{4b}$ is selected from direct bond, —O—, —S—, —NR$^{C4}$, —NR$^{C4}$C(=O)—, —C(=O)NR$^{C4}$—, an optionally substituted $(C_{1-6})$alkylene group; and an optionally substituted $(C_{1-6})$heteroalkylene group.

In another embodiment, $R^{4b}$ is selected from direct bond, —O—, —S—, —NR$^{C4}$—, an optionally substituted $(C_{1-6})$alkylene group; and an optionally substituted $(C_{1-6})$heteroalkylene group.

In another embodiment, $R^{4b}$ is selected from direct bond, an optionally substituted $(C_{1-6})$alkylene group; and an optionally substituted $(C_{1-6})$heteroalkylene group.

In another embodiment, $R^{4b}$ is selected from —CH$_2$CH$_2$— and —CH$_2$CH$_2$O—.

In one embodiment, $R^{4b}$ is optionally substituted by one or more substituents independently selected from halo, —CN, —NO$_2$, —OR$^{A4b}$, —NR$^{A4b}$R$^{B4b}$, —SR$^{A4b}$, —C(O)R$^{A4b}$, —C(O)OR$^{A4b}$, —OC(O)R$^{A4b}$, —O(CR$^{A4b}$R$^{B4b}$)$_m$OR$^{C4b}$, —C(O)NR$^{A4b}$R$^{B4b}$, NR$^{A4b}$C(O)R$^{B4b}$, —SO$_2$R$^{A4b}$, —SO$_2$NR$^{A4b}$R$^{B4b}$, —NR$^{A4b}$SO$_2$R$^{B4b}$, C$_{1-6}$ alkyl, C$_{1-6}$ haloalkyl, C$_{2-6}$ alkenyl, C$_{2-6}$ alkynyl, =O, =S, =NR$^{A4b}$, C$_{3-6}$ cycloalkyl, phenyl and 3- to 6-membered heterocyclyl including 1, 2 or 3 heteroatoms selected from N, O and S;
wherein $R^{A4b}$, $R^{B4b}$ and $R^{C4b}$, at each occurrence, are independently selected hydrogen and C$_{1-6}$ alkyl and C$_{1-6}$ heteroalkyl.

In another embodiment, $R^{4b}$ is optionally substituted by one or more substituents independently selected from halo, —CN, —NO$_2$, —OR$^{A4b}$, —NR$^{A4b}$R$^{B4b}$, —SR$^{A4b}$, —C(O)R$^{A4b}$, —C(O)OR$^{A4b}$, —OC(O)R$^{A4b}$, C$_{1-6}$ alkyl, C$_{1-6}$ haloalkyl, C$_{2-6}$ alkenyl, C$_{2-6}$ alkynyl, =O, =S, =NR$^{A4b}$, C$_{3-6}$ cycloalkyl, phenyl and 3- to 6-membered heterocyclyl including 1, 2 or 3 heteroatoms selected from N, O and S;
wherein $R^{A4b}$ and $R^{B4b}$, at each occurrence, are independently selected hydrogen and C$_{1-6}$ alkyl.

In another embodiment, $R^{4b}$ is optionally substituted by one or more substituents independently selected from halo, —CN, —OR$^{A4b}$, —NR$^{A4b}$R$^{B4b}$, —SR$^{A4b}$ C$_{1-6}$ alkyl, C$_{1-6}$ haloalkyl, =O, C$_{3-6}$ cycloalkyl, phenyl and 3- to 6-membered heterocyclyl including 1, 2 or 3 heteroatoms selected from N, O and S;
wherein $R^{A4b}$ and $R^{B4b}$, at each occurrence, are independently selected hydrogen and C$_{1-6}$ alkyl.

In one embodiment, $R^{A4}$, $R^{B4}$ and $R^{C4}$, at each occurrence, are independently selected hydrogen, C$_{1-3}$ alkyl and C$_{1-3}$ heteroalkyl. In another embodiment, $R^{A4}$, $R^{B4}$ and $R^{C4}$, at each occurrence, are independently selected hydrogen, methyl and ethyl.

In one embodiment, T is of sub-formula IIa

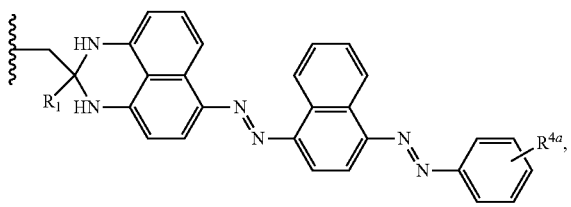

(IIa)

where $R^1$ and $R^{4a}$ are as defined in any of the above-mentioned embodiments.

In another embodiment, T is T$^1$:

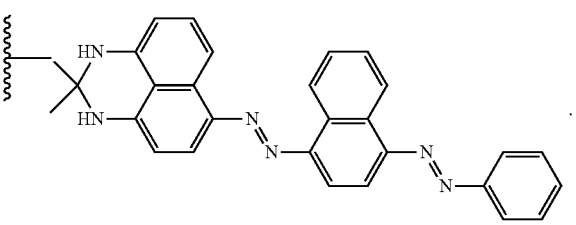

(T$^1$)

In one embodiment, T is of sub-formula IIIa

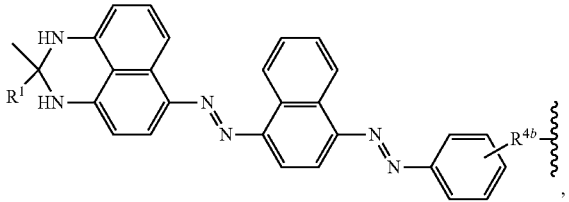

(IIIa)

where $R^1$ and $R^{4b}$ are as defined in any of the above-mentioned embodiments.

In another embodiment, T is of sub-formula IIIb:

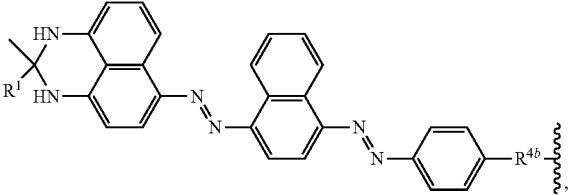

(IIIb)

where $R^1$ and $R^{4b}$ are as defined in any of the above-mentioned embodiments.

In another embodiment, T is T$^2$:

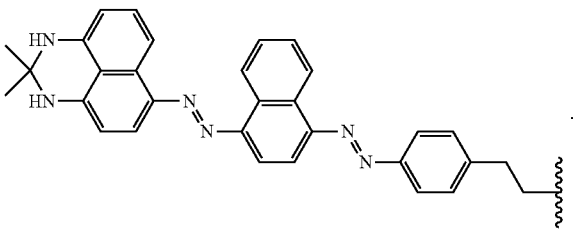

(T$^2$)

In another embodiment, T is T$^3$:

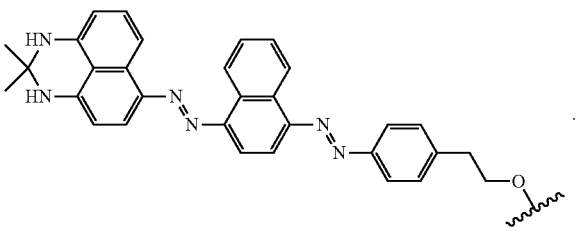

(T$^3$)

Linking Moiety, L

The linking moiety serves to connect the lipid-targeting moiety with the fluorescent dye moiety.

In one embodiment, L may be a direct bond between the lipid-targeting moiety and the fluorescent dye moiety. Alternatively, L comprises one or more atoms which covalently link the lipid-targeting moiety with the fluorescent dye moiety. In one embodiment, L is a linear moiety. In another embodiment, L is a branched moiety.

In one embodiment, L comprises one or more functional groups, particularly at the end(s) of the moiety which may facilitate covalent bonding with the lipid-targeting moiety and/or the fluorescent dye moiety. Examples of suitable functional groups include amino, amido, ester, ether, carbonyl, carboxyl, thioether, sulfonyl, and sulfonamido for instance.

Preferred linking groups are derived from groups which can react to form bonds with the lipid-targeting moiety and/or fluorescent dye moiety. Reactive groups may be selected from but not limited to a group that will react directly with other reactive groups on the lipid-targeting moiety or fluorescent dye moiety. For example, the reactive groups may include carboxy, aldehyde, amines, alcohols, thiol groups, activated methylenes, alkynes, azides, active halogen containing groups including, for example, chloromethylphenyl groups and chloroacetyl [$ClCH_2C(=O)$—] groups, activated 2-(leaving group substituted)-ethylsulfonyl and ethylcarbonyl groups such as 2-chloroethylsulfonyl and 2-chloroethylcarbonyl; vinylsulfonyl; vinylcarbonyl; epoxy; isocyanato; isothiocyanato; aldehyde; aziridine; succinimidoxycarbonyl; activated acyl groups such as carboxylic acid halides; mixed anhydrides and the like.

Reaction of the reactive groups with the reactive groups on precursor of the lipid-targeting moiety or the fluorescent dye moiety may result in a functional group in the linker adjacent to said lipid-targeting moiety or the fluorescent dye moiety, which may be referred to herein as a "bonding moiety".

Suitably, the linking moiety comprises two or more bonding moieties and one or more spacing moieties. The spacing moiety can be varied in order to control the separation between the lipid-targeting moiety and the fluorescent dye moiety. The spacing moiety may comprise or consist of aliphatic chains or polymeric chains, such as polyethylene glycol (PEG) chains. Functional groups may also be present within the spacing moiety, for instance to influence physical properties of the overall compounds, such as solubility.

The length of the linking moiety can be varied to avoid steric interaction of the lipid-targeting moiety and the fluorescent dye moiety and to allow efficient interaction of the lipid-targeting moiety with its lipid target.

The linking moiety is suitably such that it maintains the link between the lipid-targeting group and the fluorescent dye moiety under physiological conditions for an appropriate time. Nevertheless, the linking group may be cleavable, for instance, under non-physiological conditions.

In one embodiment, when steric hinderance between the lipid-targeting moiety and fluorescent dye moiety is low the linking moiety may be a direct bond.

In one embodiment, L is a linking moiety of formula IV:

$$[L^1]_m- \qquad (IV)$$

where each occurrence of $L^1$ is independently selected from —S—, —S(=O)—, —S(=O)$_2$—, —O—, —C(=O)—, —C(=O)O—, —OC(=O)—, —CR$^5$R$^6$—, —CR$^5$=CR$^6$—, —C≡C—, —NR$^5$—, —NR$^5$C(=O)—, —C(=O)NR$^5$—, —OC(=O)NR$^5$—, —NR$^5$C(=O) NR$^6$—, —NR$^5$C(=O)O—, —NR$^5$S(O)NR$^6$—, —OC(R$^5$) (R$^6$)C(R$^5$)(R$^6$)—, —S(=O)$_2$NR$^5$—, —NR$^5$S(=O)$_2$—, phenylene, piperazinyl and 1,2,3-triazolyl;

m is a number of value 1 to 50; and

R$^5$ and R$^6$, at each occurrence, are independently selected from the group consisting of hydrogen, C$_{1-4}$ alkyl, C$_{1-4}$ alkenyl, C$_{2-4}$ alkynyl, C$_{1-4}$ haloalkyl, phenyl, 5-6 membered heteroaryl, 3 to 7 membered heterocycloalkyl and C$_{3-6}$ cycloalkyl, each of which may be optionally be substituted with one or more groups selected from C$_{1-4}$ alkyl, C$_{1-4}$ alkoxy, C$_{3-6}$ cycloalkyl, phenyl, and hydroxy.

In one embodiment, $L^1$ is independently selected from —S—, —S(=O)—, —S(=O)$_2$—, —O—, —C(=O)—, —C(=O)O—, —OC(=O)—, —CR$^5$R$^6$—, —NR$^5$—, —NR$^5$C(=O)—, —C(=O)NR$^5$—, —OC(=O)NR$^5$—, —NR$^5$C(=O)NR$^6$—, —NR$^5$C(=O)O—, —NR$^5$S(O) NR$^6$—, —OC(R$^5$)(R$^6$)C(R$^5$)(R$^6$)—, —S(=O)$_2$NR$^5$—, —NR$^5$S(=O)$_2$—, phenylene and piperazinyl.

In another embodiment, $L^1$ is independently selected from —O—, —C(=O)—, —C(=O)O—, —OC(=O)—, —CR$^5$R$^6$—, —NR$^5$—, —NR$^5$C(=O)—, —C(=O)NR$^5$—, phenylene and piperazinyl.

In one embodiment, m is a number of value from 1 to 40, or 1 to 30, or 1 to 25, or 1 to 20, or 1 to 15, or 1 to 10, or 1 to 6.

In another embodiment, m is a number of value from 3 to 40, or 3 to 30, or 3 to 25, or 3 to 20, or 3 to 15, or 3 to 10, or 3 to 6.

In another embodiment, m is a number of value from 5 to 40, or 5 to 30, or 5 to 25, or 5 to 20, or 5 to 15, or 5 to 10.

In another embodiment, L is a linking moiety of formula V:

$$-[L^2]-[L^3]-[L^4]-[L^5]-[L^6]-[L^7]-[Le]-[L^9]- \qquad (V)$$

wherein $L^2$ is absent, —O—, —S—, —S(=O)—, —S(=O)$_2$—, —NR$^5$—, —CH(OH)—, —C(=O)—, —C(=O) NR$^5$—, —NR$^5$C(=O)—, —C(=O)O—, —OC (=O)—, —OC(=O)NR$^5$—, —NR$^5$C(=O)NR$^6$—, —NR$^5$C(=O)O—, —(CR$^5$R$^6$)$_p$—, —(CR$^5$R$^6$)$_q$[O(C (R$^5$)(R$^6$))(C(R$^5$)(R$^6$))]$_p$—, phenylene, piperazinyl and 1,2,3-triazolyl, where q and each p are independently a number of value 1, 2, 3, 4, 5, or 6;

$L^3$ is absent, —(CR$^5$R$^6$)$_p$—, —(CR$^5$R$^6$)$_q$[O(C(R$^5$)(R$^6$))(C (R$^5$)(R$^6$))]$_p$—, where q and each p are independently a number of value 1 to 15;

$L^4$ is absent, —O—, —S—, —S(=O)—, —S(=O)$_2$—, —NR$^5$—, —CH(OH)—, —C(=O)—, —C(=O) NR$^5$—, —NR$^5$C(=O)—, —C(=O)O—, —OC (=O)—, —OC(=O)NR$^5$—, —NR$^5$C(=O)NR$^6$—, —NR$^5$C(=O)O—, —(CR$^5$R$^6$)$_p$—, —(CR$^5$R$^6$)$_q$[O(C (R$^5$)(R$^6$))(C(R$^5$)(R$^6$))]$_p$—, phenylene, piperazinyl and 1,2,3-triazolyl, where q and each p are independently a number of value 1, 2, 3, 4, 5, or 6;

$L^5$ is absent, —(CR$^5$R$^6$)$_p$—, —(CR$^5$R$^6$)$_q$[O(C(R$^5$)(R$^6$))(C (R$^5$)(R$^6$))]$_p$—, where q and each p are independently a number of value 1 to 15;

$L^6$ is absent, —O—, —S—, —S(=O)—, —S(=O)$_2$—, —NR$^5$—, —CH(OH)—, —C(=O)—, —C(=O) NR$^5$—, —NR$^5$C(=O)—, —C(=O)O—, —OC (=O)—, —OC(=O)NR$^5$—, —NR$^5$C(=O)NR$^6$—, —NR$^5$C(=O)O—, —(CR$^5$R$^6$)$_p$—, —(CR$^5$R$^6$)$_q$[O(C (R$^5$)(R$^6$))(C(R$^5$)(R$^6$))]$_p$—, phenylene, piperazinyl and 1,2,3-triazolyl, where q and each p are independently a number of value 1, 2, 3, 4, 5, or 6;

$L^7$ is absent, —(CR$^5$R$^6$)$_p$—, —(CR$^5$R$^6$)$_q$[O(C(R$^5$)(R$^6$))(C (R$^5$)(R$^6$))]$_p$—, where q and each p are independently a number of value 1 to 15;

$L^8$ is absent, —O—, —S—, —S(=O)—, —S(=O)$_2$—, —NR$^5$—, —CH(OH)—, —C(=O)—, —C(=O) NR$^5$—, —NR$^5$C(=O)—, —C(=O)O—, —OC (=O)—, —OC(=O)NR$^5$—, —NR$^5$C(=O)NR$^6$—, —NR$^5$C(=O)O—, —(CR$^5$R$^6$)$_p$—, —(CR$^5$R$^6$)$_q$[O(C $(R^5)(R^6))(C(R^5)(R^6))]_p$—, phenylene, piperazinyl and 1,2,3-triazolyl, where q and each p are independently a number of value 1, 2, 3, 4, 5, or 6; and $L^9$ is absent, —$(CR^5R^6)_p$—, —$(CR^6R^7)_q[O(C(R^5)(R^6))(C(R^5)(R^6))]_p$—, where q and each p are independently a number of value 1 to 15;

where each occurrence of $R^5$ and $R^6$ is independently selected from the group consisting of hydrogen, $C_{1-4}$ alkyl, $C_{1-4}$ alkenyl, $C_{2-4}$ alkynyl, $C_{1-4}$ haloalkyl, phenyl, 5-6 membered heteroaryl, 3 to 7 membered heterocycloalkyl and $C_{3-6}$ cycloalkyl, each of which may be optionally be substituted with one or more groups selected from $C_{1-4}$ alkyl, $C_{1-4}$ alkoxy, $C_{3-6}$ cycloalkyl, phenyl, and hydroxy.

In another embodiment, L is a linking moiety of formula VI:

-[L²]-[L³]-[L⁴]-[L⁵]-[L⁶]-[L⁸]-    (VI)

$L^2$ is absent, —O—, —S—, —S(=O)—, —S(=O)$_2$—, —NR$^5$—, —CH(OH)—, —C(=O)—, —C(=O)NR$^5$—, —NR$^5$C(=O)—, —C(=O)O—, —OC(=O)—, —OC(=O)NR$^5$—, —NR$^5$C(=O)NR$^6$—, —NR$^5$C(=O)O—, —(CR$^5$R$^6$)$_p$—, —(CR$^5$R$^6$)$_q$[O(C(R$^5$)(R$^6$))(C(R$^5$)(R$^6$))]$_p$—, phenylene, piperazinyl and 1,2,3-triazolyl, where q and each p are independently a number of value 1, 2, 3, 4, 5, or 6;

$L^3$ is absent, —(CR$^5$R$^6$)$_p$—, —(CR$^5$R$^6$)$_q$[O(C(R$^5$)(R$^6$))(C(R$^5$)(R$^6$))]$_p$—, where q and each p are independently a number of value 1 to 15;

$L^4$ is absent, —O—, —S—, —S(=O)—, —S(=O)$_2$—, —NR$^5$—, —CH(OH)—, —C(=O)—, —C(=O)NR$^5$—, —NR$^5$C(=O)—, —C(=O)O—, —OC(=O)—, —OC(=O)NR$^5$—, —NR$^5$C(=O)NR$^6$—, —NR$^5$C(=O)O—, —(CR$^5$R$^6$)$_p$—, —(CR$^5$R$^6$)$_q$[O(C(R$^5$)(R$^6$))(C(R$^5$)(R$^6$))]$_p$—, phenylene, piperazinyl and 1,2,3-triazolyl, where q and each p are independently a number of value 1, 2, 3, 4, 5, or 6;

$L^5$ is absent, —(CR$^5$R$^6$)$_p$—, —(CR$^5$R$^6$)$_q$[O(C(R$^5$)(R$^6$))(C(R$^5$)(R$^6$))]$_p$—, where q and each p are independently a number of value 1 to 15;

$L^6$ is absent, —O—, —S—, —S(=O)—, —S(=O)$_2$—, —NR$^5$—, —CH(OH)—, —C(=O)—, —C(=O)NR$^5$—, —NR$^5$C(=O)—, —C(=O)O—, —OC(=O)—, —OC(=O)NR$^5$—, —NR$^5$C(=O)NR$^6$—, —NR$^5$C(=O)O—, —(CR$^5$R$^6$)$_P$—, —(CR$^5$R$^6$)$_q$[O(C(R$^5$)(R$^6$))(C(R$^5$)(R$^6$))]$_p$—, phenylene, piperazinyl and 1,2,3-triazolyl, where q and each p are independently a number of value 1, 2, 3, 4, 5, or 6; and $L^8$ is absent, —O—, —S—, —S(=O)—, —S(=O)$_2$—, —NR$^5$—, —CH(OH)—, —C(=O)—, —C(=O)NR$^5$—, —NR$^5$C(=O)—, —C(=O)O—, —OC(=O)—, —OC(=O)NR$^5$—, —NR$^5$C(=O)NR$^6$—, —NR$^5$C(=O)O—, —(CR$^5$R$^6$)$_P$—, —(CR$^5$R$^6$)$_q$[O(C(R$^5$)(R$^6$))(C(R$^5$)(R$^6$))]$_p$—, phenylene, piperazinyl and 1,2,3-triazolyl, where q and each p are independently a number of value 1, 2, 3, 4, 5, or 6;

where each occurrence of $R^5$ and $R^6$ is independently selected from the group consisting of hydrogen, $C_{1-4}$ alkyl, $C_{1-4}$ alkenyl, $C_{2-4}$ alkynyl, $C_{1-4}$ haloalkyl, phenyl, 5-6 membered heteroaryl, 3 to 7 membered heterocycloalkyl and $C_{3-6}$ cycloalkyl, each of which may be optionally be substituted with one or more groups selected from $C_{1-4}$alkyl, $C_{1-4}$alkoxy, $C_{3-6}$ cycloalkyl, phenyl, and hydroxy.

In one embodiment, $L^2$ is selected from absent, —O—, —C(=O)—, —C(=O)O—, —OC(=O)— and —(CR$^5$R$^6$)$_p$—. In another embodiment, $L^2$ is selected from —O—, —C(=O)—, —C(=O)O—, —OC(=O)— and —(CR$^5$R$^6$)$_p$—. In one embodiment, $L^2$ is attached to T.

In one embodiment, $L^3$ is absent or —(CR$^5$R$^6$)$_p$—. Suitably, $L^3$ is —(CH$_2$)$_p$—.

In one embodiment, $L^4$ is absent, —C(=O)—, —C(=O)NR$^5$—, —NR$^5$C(=O)—, —C(=O)O—, —OC(=O)—, —(CR$^5$R$^6$)$_p$—, phenylene and piperazinyl.

In another embodiment, $L^4$ is absent, —C(=O)—, —C(=O)NR$^5$—, —C(=O)O—, and —(CR$^5$R$^6$)$_p$—. In one embodiment, $L^4$ is attached to D.

In one embodiment, $L^5$ is absent or —(CR$^5$R$^6$)$_p$—. Suitably, $L^5$ is —(CH$_2$)$_p$—.

In one embodiment, $L^6$ is absent; —O—, —C(=O)NR$^5$—, —NR$^5$—, —NR$^5$C(=O)—, phenylene and piperazinyl. Suitably, $L^6$ is absent, —NH—, —O—, phenylene and piperazinyl. In one embodiment, $L^6$ is attached to D.

In one embodiment, $L^7$ is absent, —(CR$^5$R$^6$)$_p$— or —(CR$^5$R$^6$)$_q$[O(C(R$^5$)(R$^6$))(C(R$^5$)(R$^6$))]$_p$—.

In one embodiment, $L^7$ is absent or —(CR$^5$R$^6$)$_p$—. Suitably, $L^7$ is —(CH$_2$)$_p$—.

In one embodiment, $L^6$ is absent, —O—, —C(=O)NR$^5$—, —NR$^5$C(=O)—, —NR$^5$—, —(CR$^5$R$^6$)$_p$—, phenylene and piperazinyl. Suitably, $L^6$ is absent, —NH—, —O—, phenylene and piperazinyl. In one embodiment, $L^8$ is attached to D.

In one embodiment, $L^9$ is absent or —(CR$^5$R$^6$)$_p$—. Suitably, $L^9$ is —(CH$_2$)$_p$—.

In another embodiment, L is a linking moiety of formula VII:

-[L²]-[L³]-[L⁴]-[L¹⁰]-[L¹¹]-    (VII)

$L^2$ is absent, —O—, —S—, —S(=O)—, —S(=O)$_2$—, —NR$^5$—, —CH(OH)—, —C(=O)—, —C(=O)NR$^5$—, —NR$^5$C(=O)—, —C(=O)O—, —OC(=O)—, —OC(=O)NR$^5$—, —NR$^5$C(=O)NR$^6$—, —NR$^5$C(=O)O—, —(CR$^5$R$^6$)$_p$—, —(CR$^5$R$^6$)$_q$[O(C(R$^5$)(R$^6$))(C(R$^5$)(R$^6$))]$_p$—, phenylene, piperazinyl and 1,2,3-triazolyl, where q and each p are independently a number of value 1, 2, 3, 4, 5, or 6;

$L^3$ is absent, —(CR$^5$R$^6$)$_p$—, —(CR$^5$R$^6$)$_q$[O(C(R$^5$)(R$^6$))(C(R$^5$)(R$^6$))]$_p$—, where q and each p are independently a number of value 1 to 15;

$L^4$ is absent, —O—, —S—, —S(=O)—, —S(=O)$_2$—, —NR$^5$—, —CH(OH)—, —C(=O)—, —C(=O)NR$^5$—, —NR$^5$C(=O)—, —C(=O)O—, —OC(=O)—, —OC(=O)NR$^5$—, —NR$^5$C(=O)NR$^6$—, —NR$^5$C(=O)O—, —(CR$^5$R$^6$)$_p$—, —(CR$^5$R$^6$)$_q$[O(C(R$^5$)(R$^6$))(C(R$^5$)(R$^6$))]$_p$—, phenylene, piperazinyl and 1,2,3-triazolyl, where q and each p are independently a number of value 1, 2, 3, 4, 5, or 6;

$L^{10}$ is absent, —(CR$^5$R$^6$)$_p$—, phenylene or piperazinyl, where p is a number of value 1 to 15; and $L^{11}$ is absent, —O—, —S—, —S(=O)—, —S(=O)$_2$—, —NR$^5$—, —CH(OH)—, —C(=O)—, —C(=O)NR$^5$—, —NR$^5$C(=O)—, —C(=O)O—, —OC(=O)—, —OC(=O)NR$^5$—, —NR$^5$C(=O)NR$^6$— or —NR$^5$C(=O)O—;

where each occurrence of $R^5$ and $R^6$ is independently selected from the group consisting of hydrogen, $C_{1-4}$ alkyl, $C_{1-4}$ alkenyl, $C_{2-4}$ alkynyl, $C_{1-4}$ haloalkyl, phenyl, 5-6 membered heteroaryl, 3 to 7 membered heterocycloalkyl and $C_{3-6}$ cycloalkyl, each of which may be optionally be substituted with one or more groups selected from $C_{1-4}$ alkyl, $C_{1-4}$alkoxy, $C_{3-6}$ cycloalkyl, phenyl, and hydroxy.

In one embodiment, $L^2$, $L^3$ and $L^4$ are as defined in of the above-mentioned embodiments.

In one embodiment, $L^{10}$ is absent, $—(CH_2)_p—$, phenylene or piperazinyl. In one embodiment, $L^{10}$ is attached to D.

In one embodiment, $L^{11}$ is absent, —O—, $—NR^5—$, —C(=O)—, $—C(=O)NR^5—$, $—NR^5C(=O)—$, —C(=O)O—, or —OC(=O)—. In another embodiment, $L^{11}$ is absent, —O— or —NH—. In one embodiment, $L^{11}$ is attached to D.

In one embodiment, q and p, at each occurrence, are independently a number of value 1 to 12. Suitably, q and p, at each occurrence, are independently a number of value 1 to 10, or 1 to 6, or 1 to 5. Suitably, q and p, at each occurrence, are independently a number of value 3 to 10, or 3 to 6, or 3 to 5.

In one embodiment, $R^5$ and $R^6$, at each occurrence, are independently selected from the group consisting of hydrogen, $C_{1-4}$ alkyl, $C_{1-4}$ alkenyl, $C_{2-4}$ alkynyl, $C_{1-4}$ haloalkyl, each of which may be optionally be substituted with one or more groups selected from $C_{1-4}$ alkyl, $C_{1-4}$ alkoxy, $C_{3-6}$ cycloalkyl, phenyl, and hydroxy.

In one embodiment, $R^5$ and $R^6$, at each occurrence, are independently selected from the group consisting of hydrogen, $C_{1-4}$ alkyl, $C_{1-4}$ haloalkyl, each of which may be optionally be substituted with one or more groups selected from $C_{1-4}$ alkyl, $C_{1-4}$ alkoxy, $C_{3-6}$ cycloalkyl, phenyl, and hydroxy.

In one embodiment, $R^5$ and $R^6$, at each occurrence, are independently selected from hydrogen or $C_{1-4}$ alkyl.

In one embodiment, $R^5$ and $R^6$, at each occurrence, are independently selected from hydrogen, methyl and ethyl.

The lipid-targeting moiety and fluorescent dye moiety may be bonded to either end of the linking moiety, for instance either end of formulae IV, V, VI and VII. However, in one embodiment the lipid-targeting moiety is bonded to the left hand end of the linking moiety as depicted herein (e.g. formulae IV, V, VI and VII) and the fluorescent dye moiety is bonded to the right hand end of the linking moiety as depicted herein.

In one embodiment, the Linking moiety L is selected from:

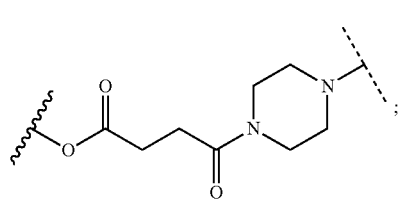
;

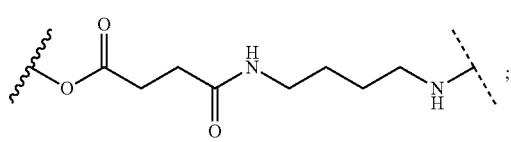
;

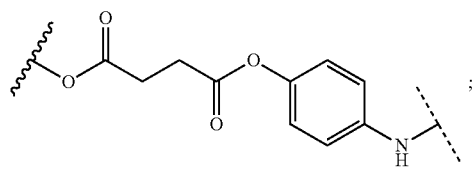
;

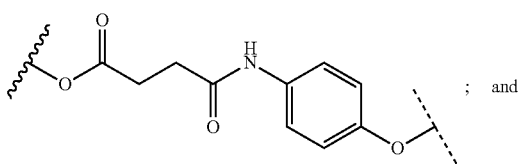
; and

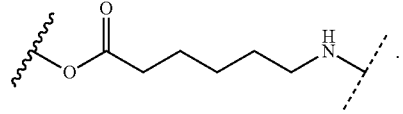
.

In another embodiment, the Linking moiety L is selected from:

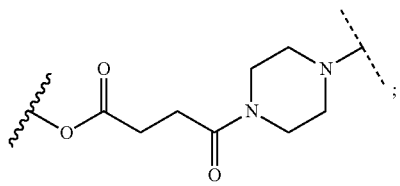
;

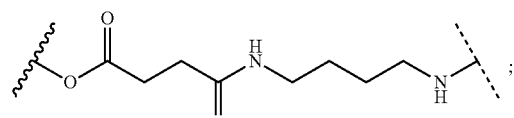
;

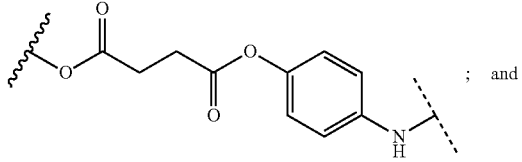
; and

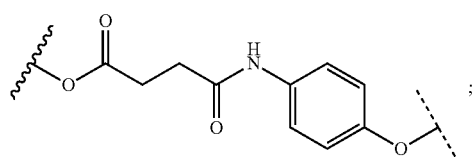
.

In one embodiment, the wavy line indicates the point of attachment to T. In another embodiment, the dotted line indicates the point of attachment to D.

In one embodiment, the lipid-targeting moiety and linking moiety, T-L-, is selected from the following, wherein the dotted line indicates the point of attachment to D:

27
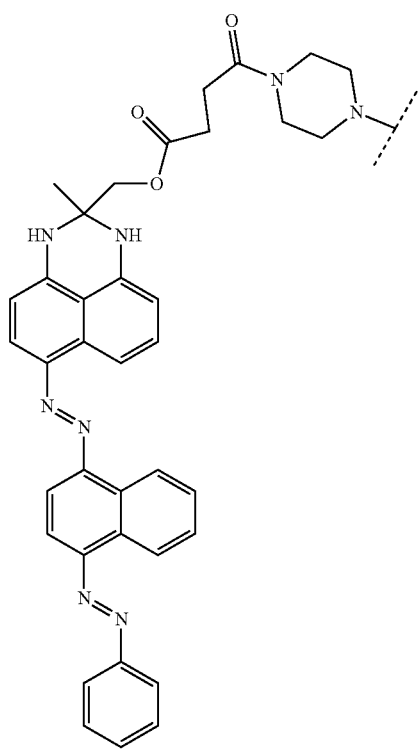
28
-continued
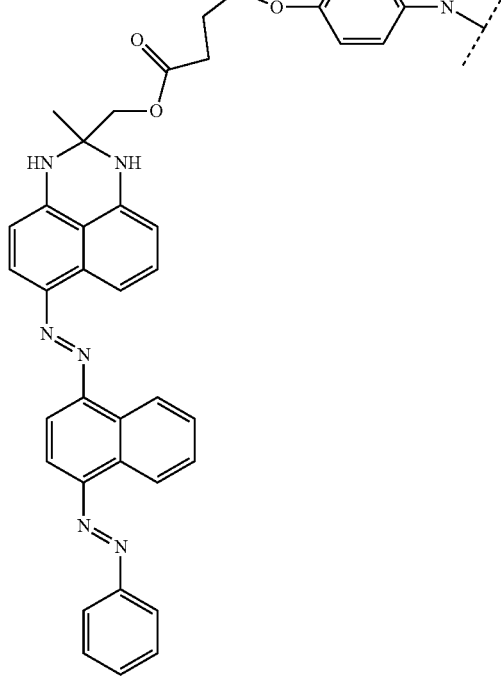
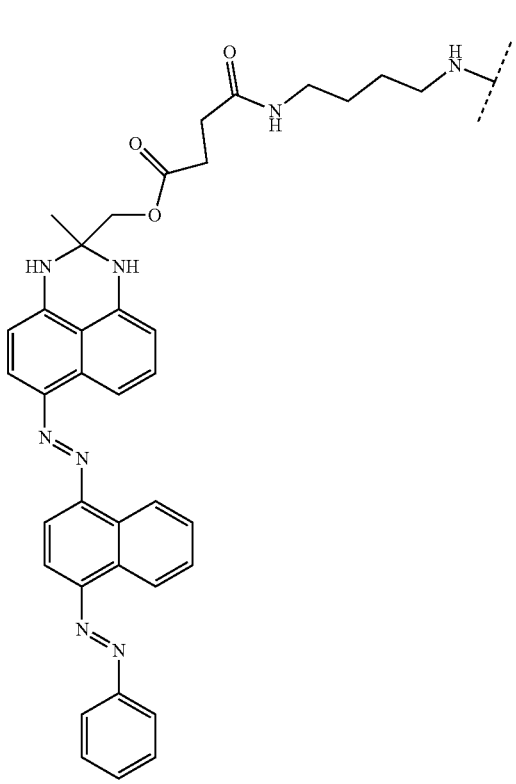
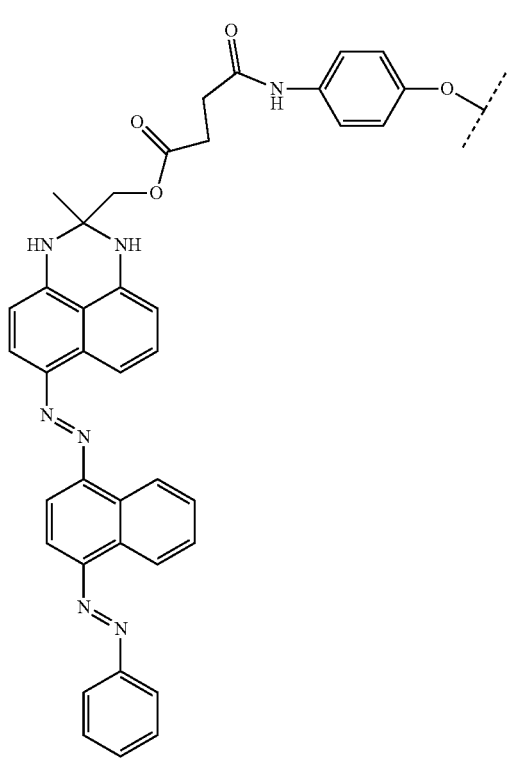

29
-continued

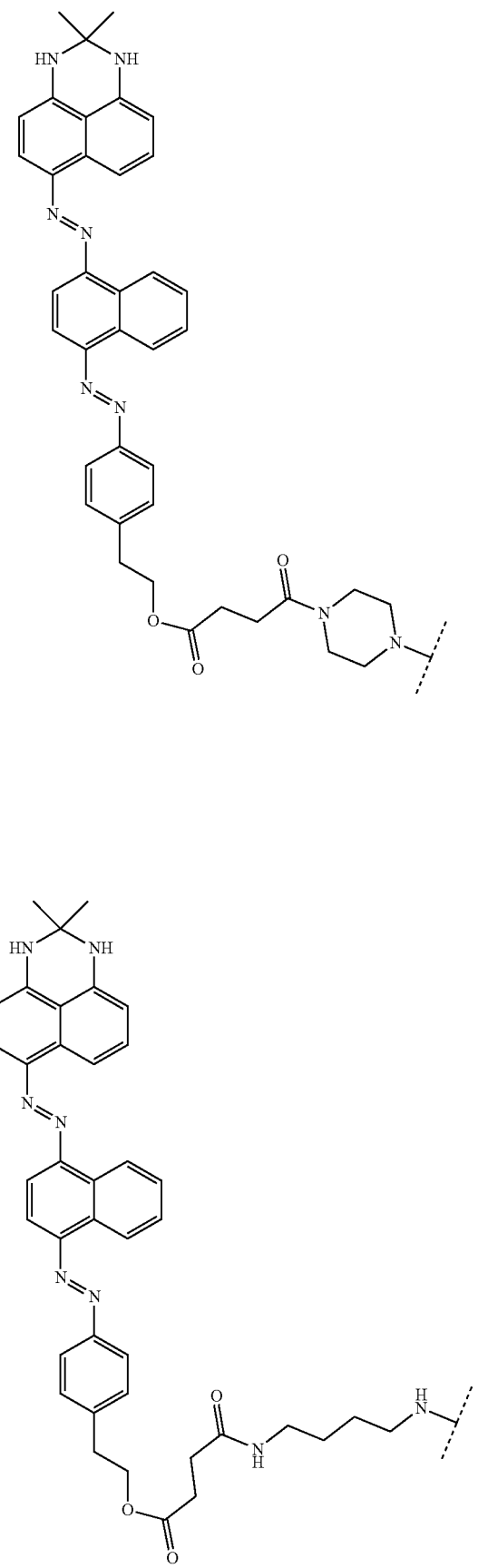

30
-continued

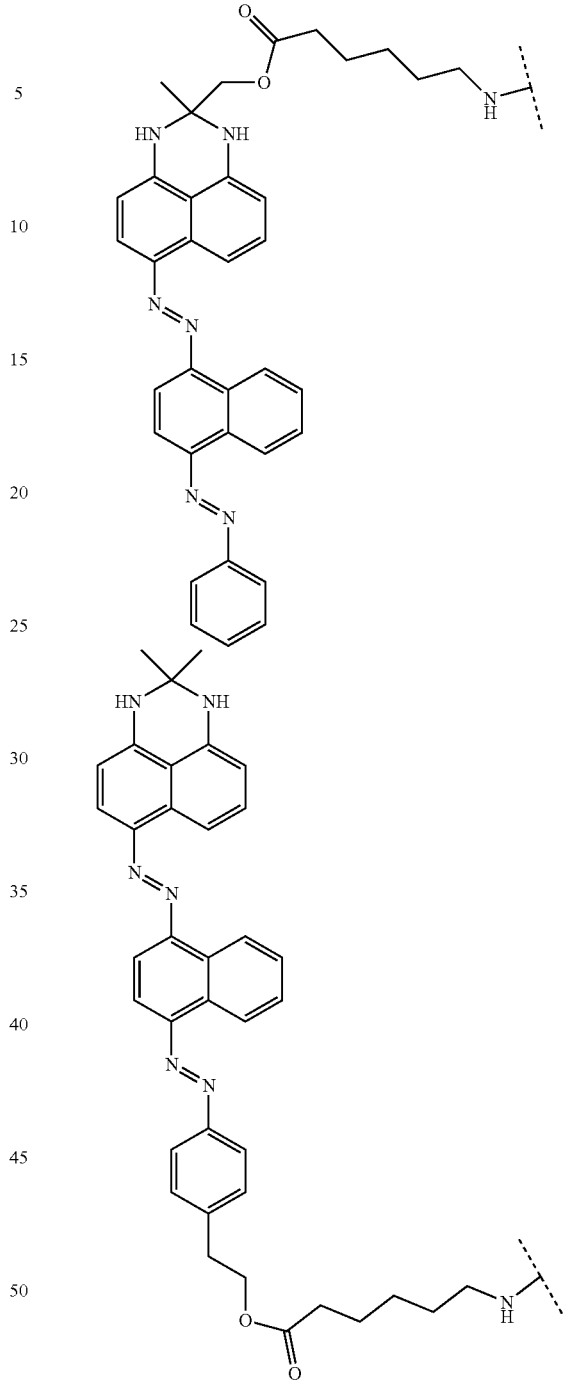

Fluorescent Dye Moiety, D

In one embodiment, D is a fluorescent dye moiety selected from a cyanine dye moiety; a BODIPY dye moiety; a coumarin dye moiety; and a xanthene dye moiety.

In one embodiment, the xanthene dye moiety is not fluorescein.

In one embodiment, the fluorescent dye moiety comprises or consists of a fluorophore selected from fluorescein, sulforhodamine 101 (Texas Red), rhodamine B, rhodamine 6G, rhodamine 19, eosin, indocyanine green, Cy3, Cy3.5, Cy5, Cy5.5, Cy7, Cy7.5, sulfo-Cy3, sulfo-Cy5, and sulfo-Cy7, 6,8-difluoro-7-hydroxy-4-methylcoumarin (Marina Blue), 3-carboxy-6,8-difluoro-7-hydroxycoumarin (Pacific Blue), difluorocarboxyfluorescein cadaverine, 5-isomer (Oregon Green 488), 2,5-dioxopyrrolidin-1-yl 2-{2',4,5,7,7'-pentafluoro-3',6'-dihydroxy-3-oxo-3H-spiro[2-benzofuran-1,9'-xanthen]-6-ylsulfanyl}acetate (Oregon Green 514), tetramethylrhodamine, 7-Amino-4-methyl-6-sulfocoumarin-3-acetic acid (Alexa Fluor 350), N,N-diethylethanaminium [9-{6-[(2,5-dioxopyrrolidin-1-yl)oxy]-6-oxohexyl}-8,8-dimethyl-2-oxo-4-(trifluoromethyl)-8,9-dihydro-2H-benzo[g]chromen-6-yl]methanesulfonate (Alexa Fluor 430), 4-(2,3,7,8-tetrahydro-2,3,3,7,7,8-hexamethyl-10,12-disulfo-1H-pyrano[3,2-f:5,6-f']diindol-5-yl)-Benzoic acid (Alexa Fluor 532), sodium 6-(2-carboxy-3,4,6-trichloro-5-{[2-({6-[(2,5-dioxopyrrolidin-1-yl)oxy]-6-oxohexyl}amino)-2-oxoethyl]thio}phenyl)-2,2,4,8,10,10-hexamethyl-3,4,5a,8,9,10,11,12a-octahydro-2H-pyrano[3,2-g:5,6-g']diquinolin-1-ium-12,14-disulfonate (Alexa Fluor 546), 4-(6-amino-3-imino-4,5-disulfo-3H-xanthen-9-yl)benzene-1,3-dicarboxylic acid (Alexa Fluor 555), Alexa Fluor 568, [6-(2-carboxy-4-{[(2,5-dioxopyrrolidin-1-yl)oxy]carbonyl}phenyl)-1,2,2,10,10,11-hexamethyl-8-(sulfomethyl)-10,11-dihydro-2H-pyrano[3,2-g:5,6-g']diquinolin-1-ium-4-yl]methanesulfonate (Alexa Fluor 594), Alexa Fluor 633, 2-[5-[3,3-dimethyl-5-sulfo-1-(3-sulfopropyl)indol-1-ium-2-yl]penta-2,4-dienylidene]-3-methyl-3-[5-oxo-5-(6-phosphonooxyhexylamino)pentyl]-1-(3-sulfopropyl)indole-5-sulfonic acid (Alexa Fluor 647), Alexa Fluor 660, Alexa Fluor 680, Alexa Fluor 700, and Alexa Fluor 750.

In one embodiment, the fluorescent dye moiety comprises or consists of a fluorophore selected from Cy3, Cy3.5, Cy5, Cy5.5, Cy7, Cy7.5 sulfo-Cy3, sulfo-Cy5, and sulfo-Cy7.

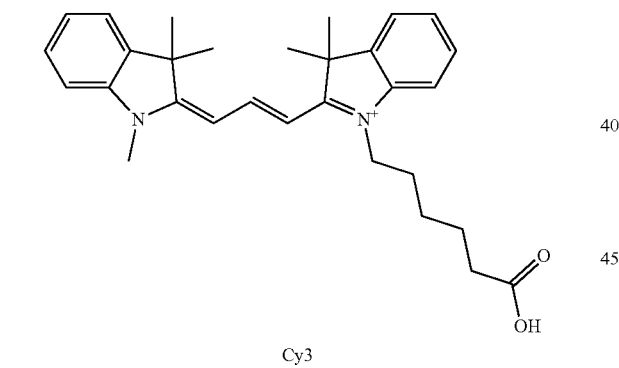
Cy3

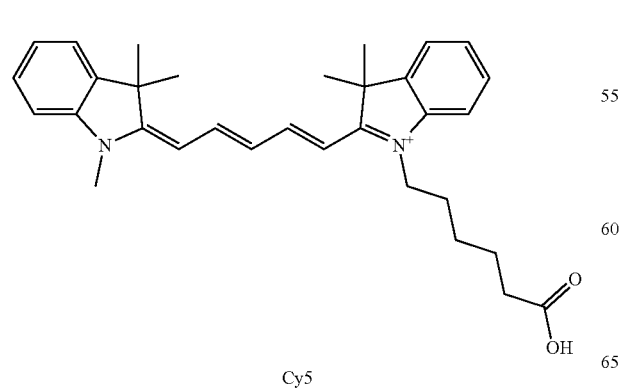
Cy5

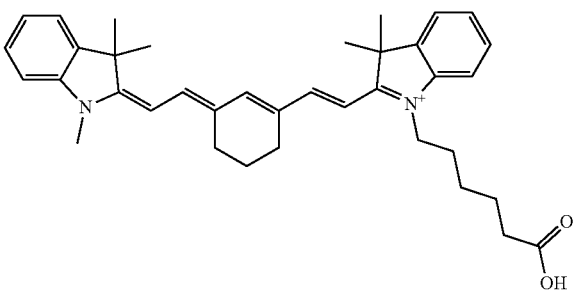
Cy7

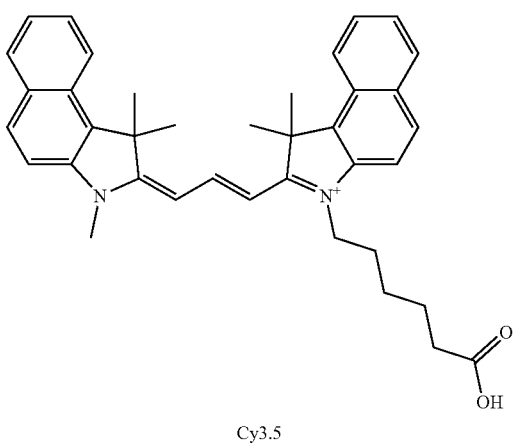
Cy3.5

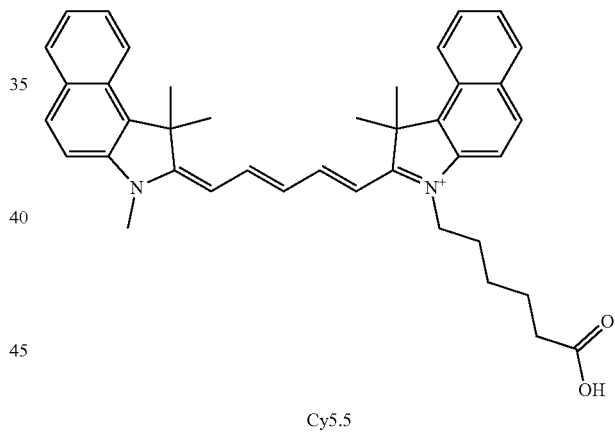
Cy5.5

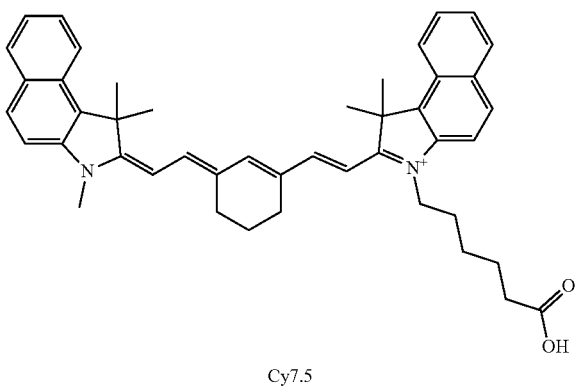
Cy7.5

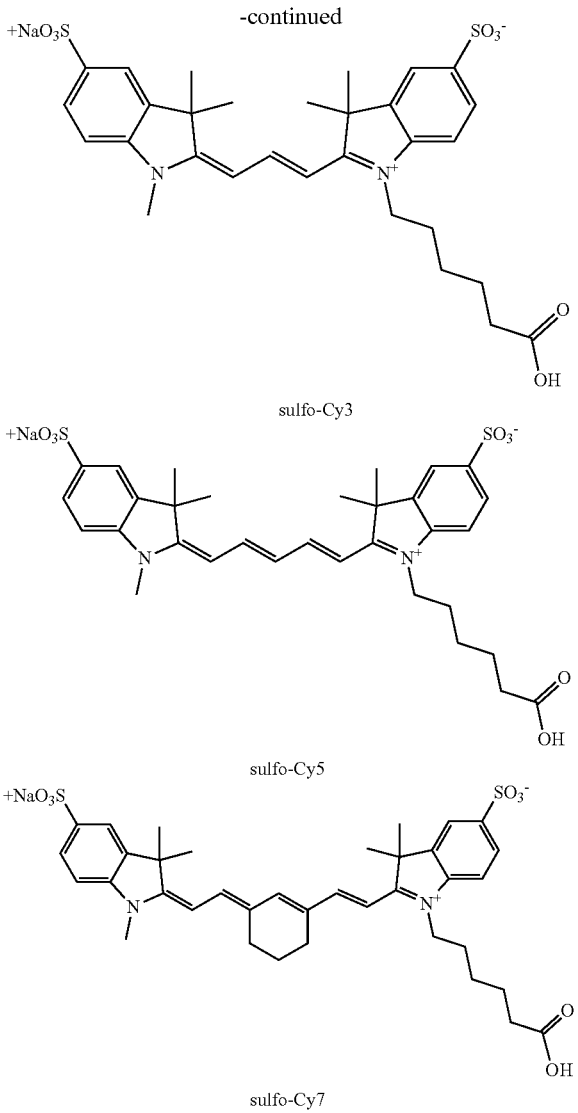

sulfo-Cy3 sulfo-Cy5 sulfo-Cy7

Particularly preferred are dyes have absorption maxima in the visible or near infrared (NIR) region, for instance, between about 400 nm and about 3 μm. In one embodiment, the fluorescent dye moiety has absorption maxima in the NIR region. In one embodiment, the fluorescent dye moiety has absorption maxima between about 600 to about 2500 nm, more particularly between about 600 and about 1300 nm.

Particularly preferred are moieties which have absorption maxima between about 600 and about 1000 nm, suitably about 600 to about 800 nm. Such absorption maxima help avoid interference with haemoglobin absorption.

In one embodiment, D is a fluorescent dye moiety selected from a cyanine dye moiety; a BODIPY dye moiety; and a coumarin dye moiety.

In one embodiment, the BODIPY dye moiety is a moiety comprising or consisting of BODIPY 576/589, BODIPY 581/591, BODIPY FL or BODIPY TR-X.

In one embodiment, the coumarin dye moiety is a moiety comprising or consisting of Coumarin 6 (3-(2-benzothiaz-olyl)-7-(diethylamino)coumarin), Coumarin 7 (3-(2-benz-imidazolyl)-7-(diethylamino)coumarin), Coumarin 30 (3-(2-N-methylbenzimidazolyl)-7-N,N-diethylaminocoumarin), 7-(diethylamino)coumarin-3-carbohydrazide or 7-(diethylamino)coumarin-3-carboxylic acid.

In one embodiment, D is a fluorescent dye moiety selected from a cyanine dye moiety, suitably a heptamethinecyanine dye moiety.

In one embodiment, D is selected from a moiety of formula VIIIa or VIIb (where the dotted line indicates the point of attachment to L):

(VIIIa)

(VIIIb)

wherein $R^9$, $R^{10}$, $R^{11}$, $R^{12}$, $R^{13}$, $R^{14}$, $R^{15}$ and $R^{16}$ are independently selected from hydrogen, $SO_3H$, $CO_2H$, $C_{1-6}$alkyl, $-OR^{A16}$, $-SR^{A16}$, $-NR^{A16}R^{B16}$, an optionally substituted aryl group; an optionally substituted $C_{3-6}$ cycloalkyl group, an optionally substituted 3-7 membered heterocycloalkyl group, and an optionally substituted heteroaryl group;

$R^{A6}$ and $R^{B16}$ are independently selected from hydrogen, $C_{1-6}$ alkyl, an optionally substituted $C_{3-6}$ cycloalkyl, an optionally substituted 3-7 membered heterocycloalkyl group, an optionally substituted aryl, and an optionally substituted heteroaryl; or any two adjacent groups selected from $R^9$, $R^{10}$, $R^{11}$, $R^{12}$, $R^{13}$, $R^{14}$, $R^{15}$ and $R^{16}$ may combine together with the atoms to which they are attached to form a fused phenyl ring which may be optionally substituted;

$R^{19}$, $R^{20}$, $R^{21}$ and $R^{22}$ are independently selected from hydrogen and (Cis)alkyl;

$R^{17}$ is selected from hydrogen, $C_{1-6}$alkyl, $(C_{1-10})$heteroalkylene group and an optionally substituted aryl group, where said alkyl and heteroalkylene are optionally substituted with one or more groups selected from OH, $NH_2$, COOH, $SO_3H$, $PO_3H$, and an optionally substituted aryl group;

$R^{18}$ is selected from $C_{1-6}$alkyl, $(C_{1-10})$heteroalkylene group and an optionally substituted aryl group, where said alkyl and heteroalkylene are optionally substituted with one or more groups selected from OH, $NH_2$, COOH, $SO_3H$, $PO_3H$, and an optionally substituted aryl group; and n is an integer selected from 0, 1 and 2; and $X^\ominus$ is a counterion.

In one embodiment, $R^9$, $R^{10}$, $R^{11}$, $R^{12}$, $R^{13}$, $R^{14}$, $R^{15}$ and $R^{16}$ are independently selected from hydrogen, $SO_3H$, $CO_2H$, $C_{1-6}$alkyl, $-OR^{A16}$, $-SR^{A6}$ and $-NR^{A16}R^{B16}$.

In another embodiment, $R^9$, $R^{10}$, $R^{11}$, $R^{12}$, $R^{13}$, $R^{14}$, $R^{15}$ and $R^{16}$ are independently selected from hydrogen, $C_{1-6}$alkyl and —$OR^{A16}$.

In another embodiment, $R^9$, $R^{11}$, $R^{12}$, $R^{13}$, $R^{15}$ and $R^{16}$ are hydrogen and $R^{10}$ and $R^{14}$ are independently selected from hydrogen, $(C_{1-6})$alkyl, O—$(C_{1-6})$alkyl, $SO_3H$ and $CO_2H$.

In another embodiment, $R^9$, $R^{11}$, $R^{12}$, $R^{13}$, $R^{15}$ and $R^{16}$ are hydrogen and $R^{10}$ and $R^{14}$ are independently selected from hydrogen, $(C_{1-4})$alkyl, O—$(C_{1-4})$alkyl, $SO_3H$ and $CO_2H$.

In another embodiment, $R^9$, $R^{11}$, $R^{12}$, $R^{13}$, $R^{15}$ and $R^{16}$ are hydrogen and $R^{10}$ and $R^{14}$ are independently selected from hydrogen, methyl, methoxy, $SO_3H$ and $CO_2H$.

In another embodiment, $R^9$, $R^{11}$, $R^{12}$, $R^{13}$, $R^{15}$ and $R^{16}$ are hydrogen and $R^{10}$ and $R^{14}$ are independently selected from hydrogen and methoxyl.

In one embodiment, $R^{A16}$ and $R^{B16}$ are independently selected from hydrogen, and $C_{1-6}$ alkyl. In another embodiment, $R^{A16}$ and $R^{B16}$ are independently selected from hydrogen and $C_{1-3}$ alkyl. In another embodiment, $R^{A16}$ and $R^{B16}$ are independently selected from hydrogen and methyl.

In another embodiment, $R^9$, $R^{10}$, $R^{11}$, $R^{12}$, $R^{13}$, $R^{14}$, $R^{15}$ and $R^{16}$ are each hydrogen.

In one embodiment, optionally substituted as used in relation to $R^9$, $R^{10}$, $R^{11}$, $R^{12}$, $R^{13}$, $R^{14}$, $R^{15}$ and $R^{16}$ refers to optionally substituted by one or more substituents independently selected from halo, —CN, —$NO_2$, —$OR^{A9}$, —$NR^{A9}R^{B9}$, —$SR^{A9}$, —$C(O)R^{A9}$, —$C(O)OR^{A9}$, —$OC(O)R^{A9}$, —$O(CR^{A9}R^{B9})_mOR^{C9}$, —$C(O)NR^{A9}R^{B9}$, —$NR^{A9}C(O)R^{B9}$, —$SO_2R^{A9}$, —$SO_2NR^{A9}R^{B9}$, —$NR^{A9}SO_2R^{B9}$, $C_{1-6}$ alkyl, $C_{1-6}$ haloalkyl, $C_{2-6}$ alkenyl, $C_{2-6}$ alkynyl, =O, =S, =$NR^{A9}$, $C_{3-6}$ cycloalkyl, phenyl and 3- to 6-membered heterocyclyl including 1, 2 or 3 heteroatoms selected from N, O and S;
wherein $R^{A9}$, $R^{B9}$ and $R^{C9}$, at each occurrence, are independently selected hydrogen and $C_{1-6}$ alkyl and $C_{1-6}$ heteroalkyl.

In another embodiment, optionally substituted as used in relation to $R^9$, $R^{10}$, $R^{11}$, $R^{12}$, $R^{13}$, $R^{14}$, $R^{15}$ and $R^{16}$ refers to optionally substituted by one or more substituents independently selected from halo, —CN, —$NO_2$, —$OR^{A9}$, —$NR^{A9}R^{B9}$, —$SR^{A9}$, —$C(O)R^{A9}$, —$C(O)OR^{A9}$, —$OC(O)R^{A9}$, $C_{1-6}$ alkyl, $C_{1-6}$ haloalkyl, $C_{2-6}$ alkenyl, $C_{2-6}$ alkynyl, =O, =S, =$NR^{A9}$, $C_{3-6}$ cycloalkyl, phenyl and 3- to 6-membered heterocyclyl including 1, 2 or 3 heteroatoms selected from N, O and S;
wherein $R^{A9}$ and $R^{B9}$, at each occurrence, are independently selected hydrogen and $C_{1-6}$ alkyl.

In another embodiment, optionally substituted as used in relation to $R^9$, $R^{10}$, $R^{11}$, $R^{12}$, $R^{13}$, $R^{14}$, $R^{15}$ and $R^{16}$ refers to optionally substituted by one or more substituents independently selected from halo, —CN, —$OR^{A9}$, —$NR^{A9}R^{B9}$, —$SR^{A9}$, $C_{1-6}$ alkyl, $C_{1-6}$ haloalkyl, =O, $C_{3-6}$ cycloalkyl, phenyl and 3- to 6-membered heterocyclyl including 1, 2 or 3 heteroatoms selected from N, O and S;
wherein $R^{A9}$ and $R^{B9}$, at each occurrence, are independently selected hydrogen and $C_{1-6}$ alkyl.

In one embodiment, $R^{A9}$, $R^{B9}$ and $R^{C9}$, at each occurrence, are independently selected hydrogen, methyl and ethyl.

In one embodiment, $R^{19}$, $R^{20}$, $R^{21}$ and $R^{22}$ are independently selected from hydrogen and $(C_{1-4})$alkyl. In another embodiment, $R^{19}$, $R^{20}$, $R^{21}$ and $R^{22}$ are independently selected from hydrogen, methyl and ethyl. In another embodiment, $R^{19}$, $R^{20}$, $R^{21}$ and $R^{22}$ are independently selected from $(C_{1-4})$alkyl. In another embodiment, $R^{19}$, $R^{20}$, $R^{21}$ and $R^{22}$ are each methyl.

In one embodiment, $R^{77}$ and $R^{18}$ are independently selected from the group consisting of optionally substituted $C_{1-6}$alkyl, $(C_{1-10})$heteroalkylene group and an optionally substituted aryl group.

In one embodiment, $R^{17}$ and $R^{18}$ are independently selected from the group consisting of $C_{1-6}$alkyl optionally substituted with one or more groups selected from OH, $NH_2$, COOH, $SO_3H$, $PO_3H$, and an optionally substituted aryl group.

In one embodiment, $R^{17}$ and $R^{18}$ are independently selected from the group consisting of $C_{1-6}$alkyl optionally substituted with one or more groups selected from OH, $NH_2$, COOH, $SO_3H$ and $PO_3H$.

In one embodiment, $R^{17}$ and $R^{18}$ are independently selected from the group consisting of optionally substituted $C_{1-4}$alkyl.

In one embodiment, $R^{17}$ and $R^{18}$ are independently selected from the group consisting of methyl, ethyl and butyl.

In one embodiment, optionally substituted as used in relation to $R^{17}$ and $R^{18}$ refers to optionally substituted by one or more substituents independently selected from halo, —CN, —$NO_2$, —$OR^{A17}$, —$NR^{A17}R^{B17}$, —$SR^{A17}$, —$C(O)R^{A17}$, —$C(O)OR^{A17}$, —$OC(O)R^{A17}$, —$O(CR^{A17}R^{B17})_mOR^{C17}$, —$C(O)NR^{A17}R^{B17}$, —$NR^{A17}C(O)R^{B17}$, $SO_2R^{A17}$, —$SO_3H$, $PO_3H$, —$SO_2NR^{A17}R^{B17}$, —$NR^{A17}SO_2R^{B17}$, $C_{1-6}$ alkyl, $C_{1-6}$ haloalkyl, $C_{2-6}$ alkenyl, $C_{2-6}$ alkynyl, =O, =S, =$NR^{A17}$, $C_{3-6}$ cycloalkyl, phenyl and 3- to 6-membered heterocyclyl including 1, 2 or 3 heteroatoms selected from N, O and S;
wherein $R^{A17}$, $R^{B17}$ and $R^{C17}$, at each occurrence, are independently selected hydrogen and $C_{1-6}$ alkyl and $C_{1-6}$ heteroalkyl.

In another embodiment, optionally substituted as used in relation to $R^{17}$ and $R^{18}$ refers to optionally substituted by one or more substituents independently selected from halo, —CN, —$NO_2$, —$SO_3H$, $PO_3H$, —$OR^{A17}$, —$NR^{A17}R^{B17}$, —$SR^{A17}$, —$C(O)R^{A17}$, —$C(O)OR^{A17}$, —$OC(O)R^{A17}$, $C_{1-6}$ alkyl, $C_{1-6}$ haloalkyl, $C_{2-6}$ alkenyl, $C_{2-6}$ alkynyl, =O, =S, =$NR^{A17}$, $C_{3-6}$ cycloalkyl, phenyl and 3- to 6-membered heterocyclyl including 1, 2 or 3 heteroatoms selected from N, O and S;
wherein $R^{A17}$ and $R^{B17}$, at each occurrence, are independently selected hydrogen and $C_{1-6}$ alkyl.

In another embodiment, optionally substituted as used in relation to $R^{17}$ and $R^{18}$ refers to optionally substituted by one or more substituents independently selected from halo, —CN, —$SO_3H$, $PO_3H$, —$OR^{A17}$, —$NR^{A17}R^{B17}$, —$SR^{A17}$, $C_{1-6}$ alkyl, $C_{1-6}$ haloalkyl, =O, $C_{3-6}$ cycloalkyl, phenyl and 3- to 6-membered heterocyclyl including 1, 2 or 3 heteroatoms selected from N, O and S;
wherein $R^{A17}$ and $R^{B17}$, at each occurrence, are independently selected hydrogen and $C_{1-6}$ alkyl.

In one embodiment, $R^{A17}$, $R^{B17}$ and $R^{C17}$, at each occurrence, are independently selected hydrogen, methyl and ethyl.

In one embodiment, n is selected from 0 and 1. In another embodiment, n is 1.

In one embodiment, $X^{\ominus}$ is a halide counterion, such as iodide or bromide. However, the skilled person would understand other counterions would be suitable, including another molecule of a compound of formula I bearing a negative charge.

In one embodiment, D is selected from a moiety of formula IXa or IXb (where the dotted line indicates the point of attachment to L):

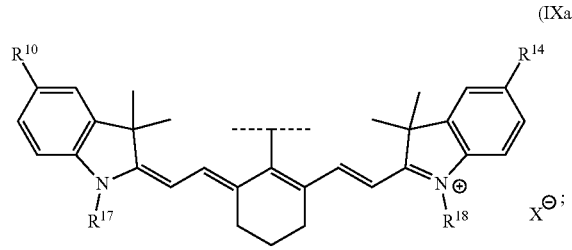

(IXa)

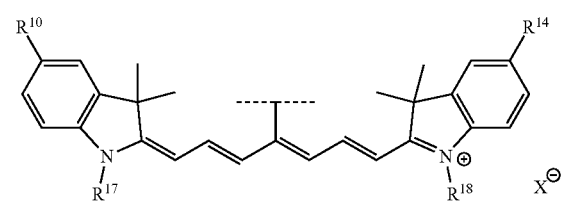

(IXb)

where $R^{10}$, $R^{14}$, $R^{17}$ and $R^{18}$ are as defined in any of the above embodiments.

In one embodiment, D is a moiety selected from $D^1$, $D^2$, $D^3$ and $D^4$:

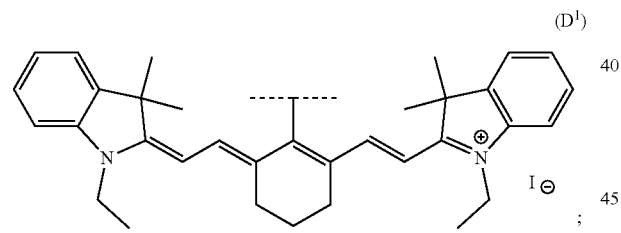

($D^1$)

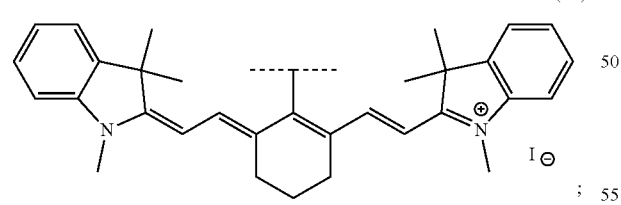

($D^2$)

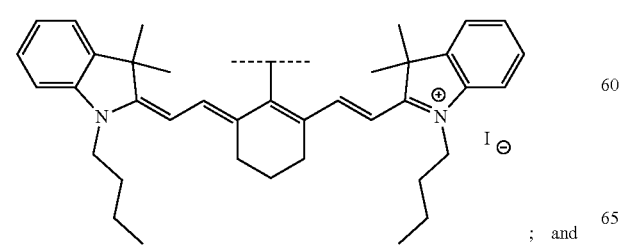

($D^3$)

; and

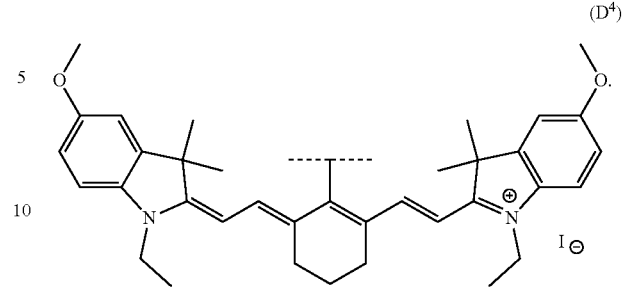

($D^4$)

In another embodiment, D is the moiety $D^1$.

In one embodiment, the moiety -L-D is selected from (where the wavy line indicates the point of attachment to T):

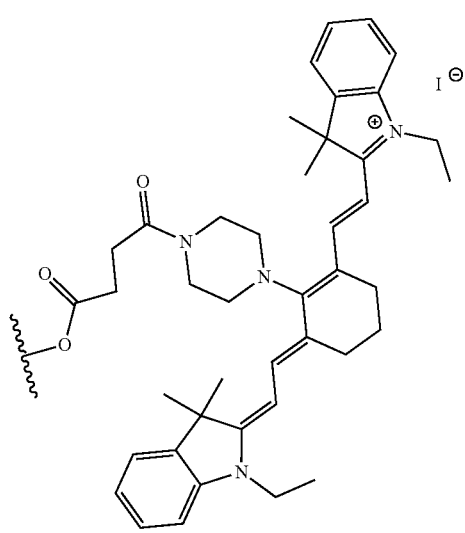

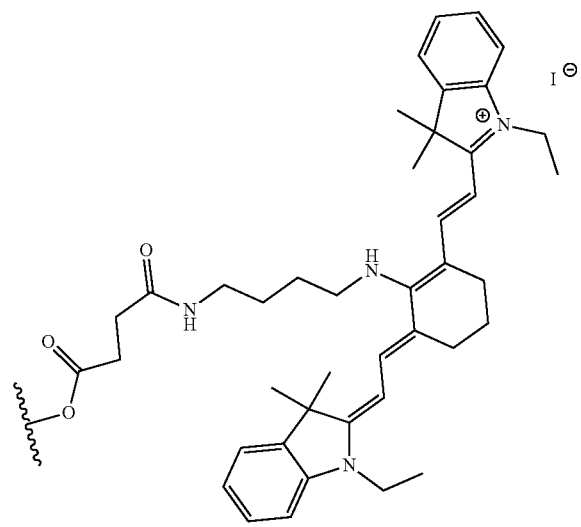

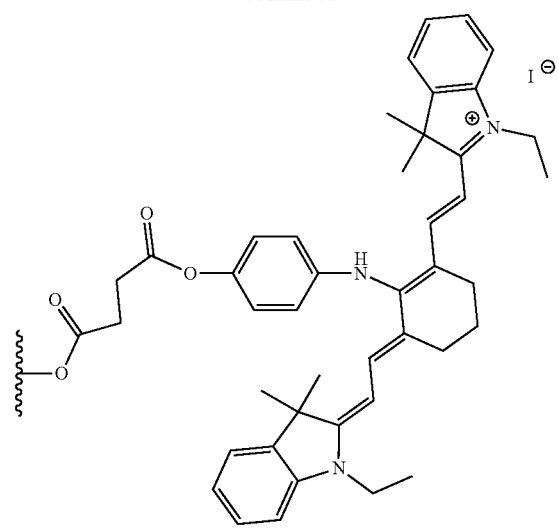
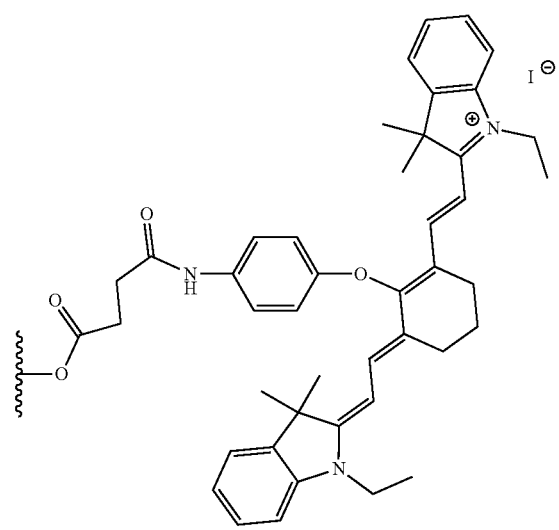
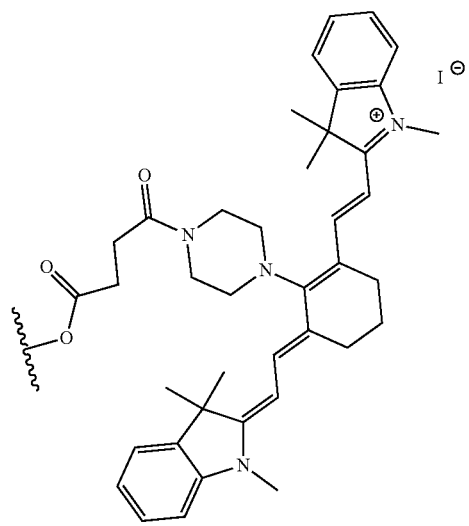
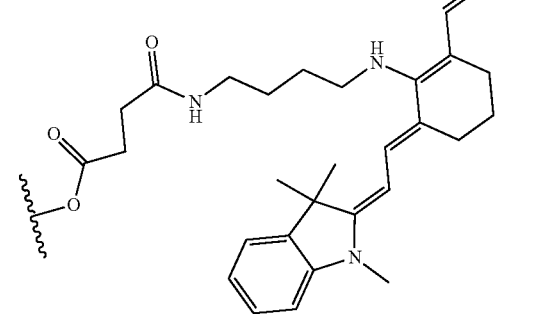
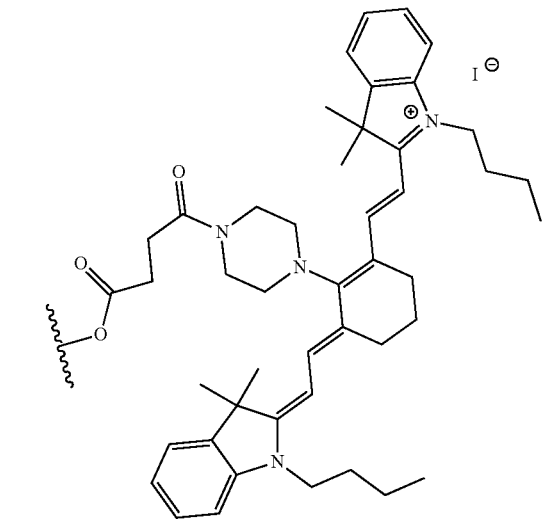
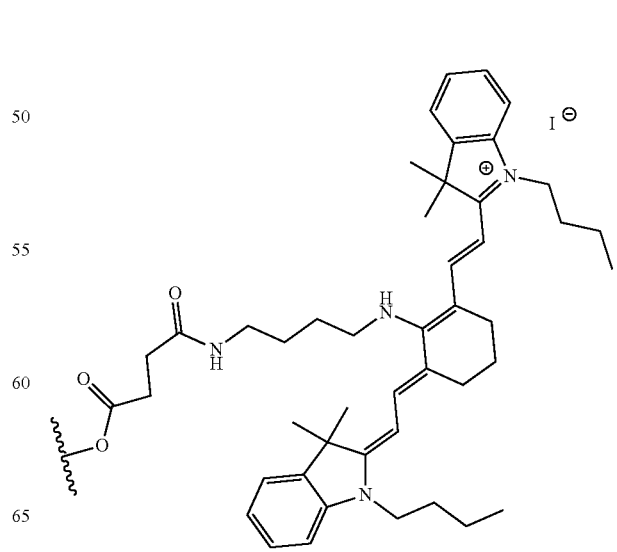

-continued
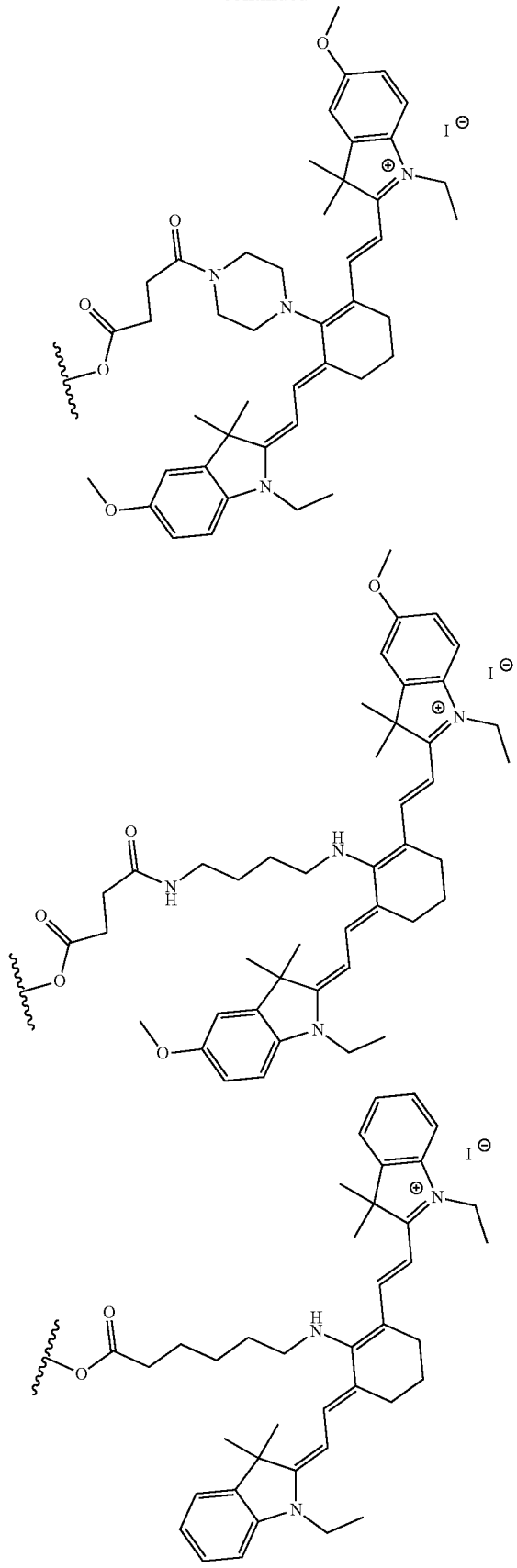
In one embodiment, the compound of formula I is selected from the following, or a salt or solvate thereof:
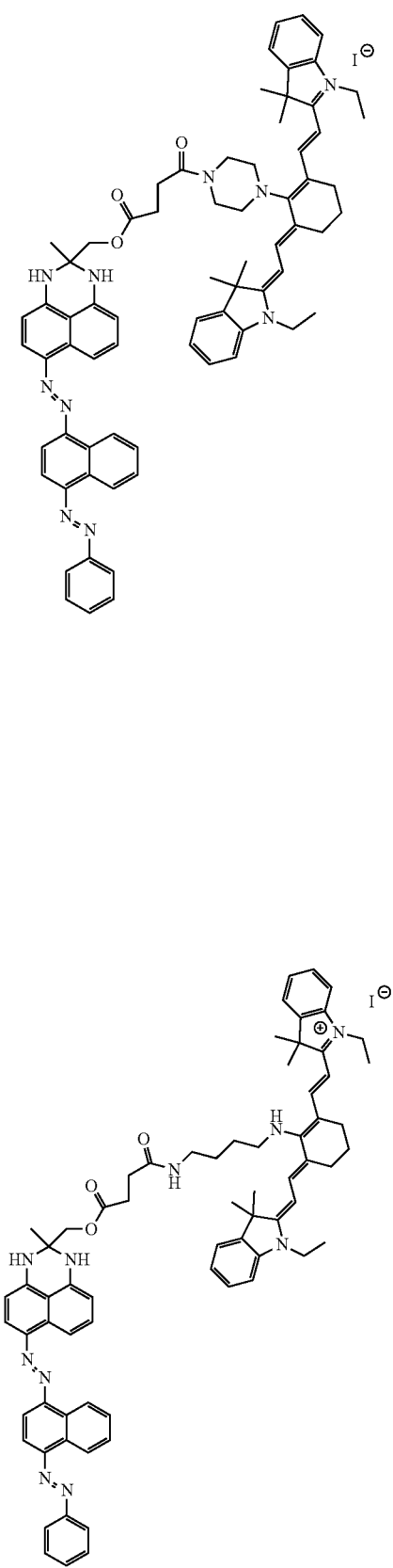

43
-continued
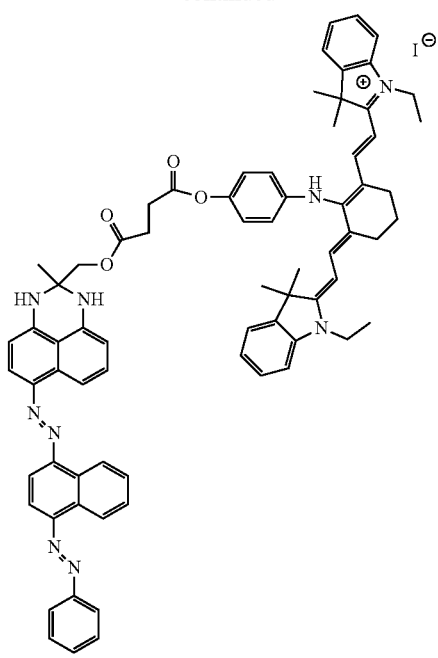
44
-continued
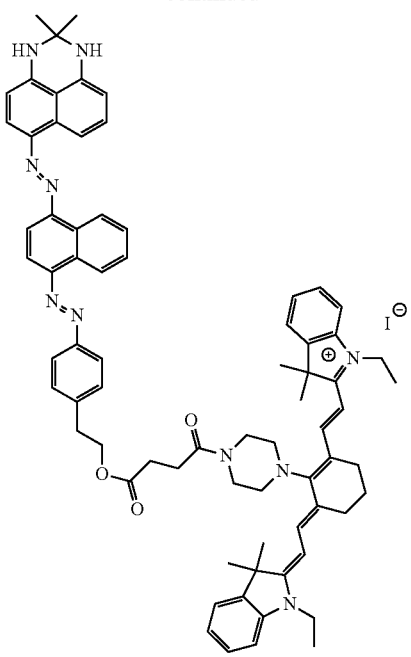
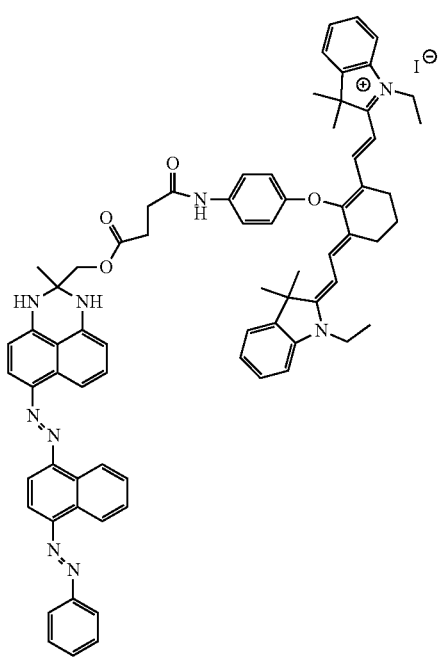
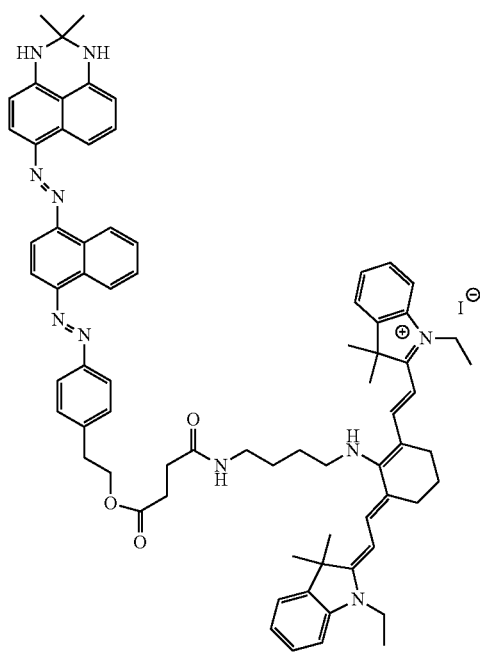

45
-continued
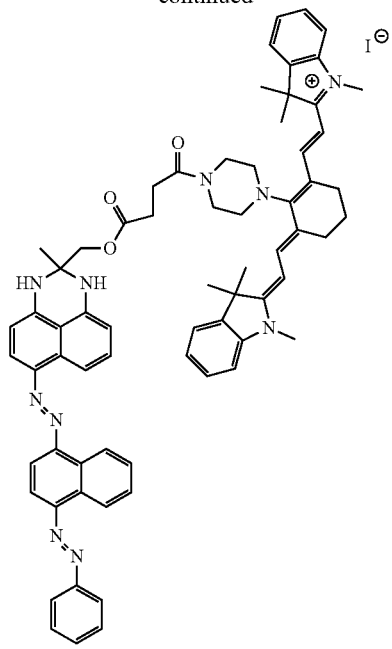
46
-continued
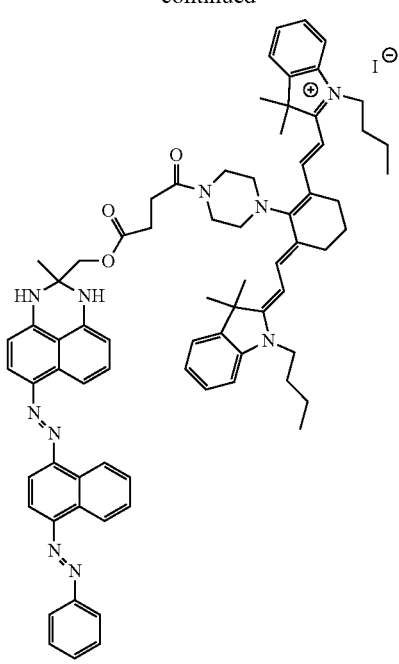
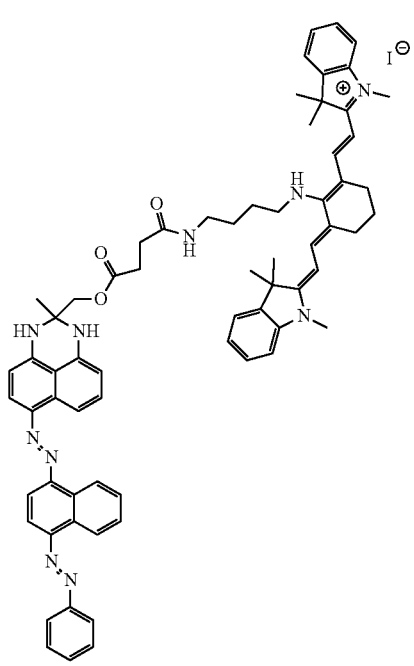
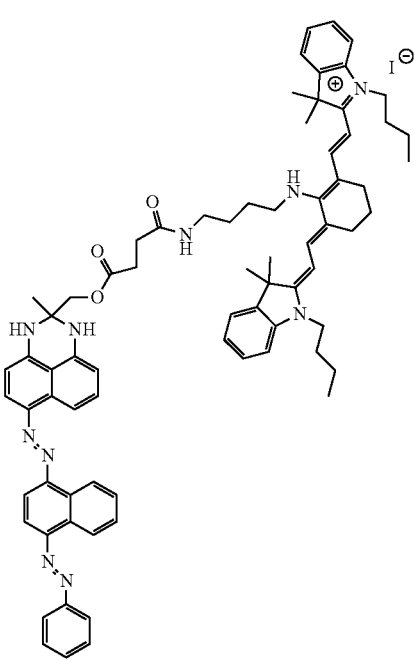

47
-continued
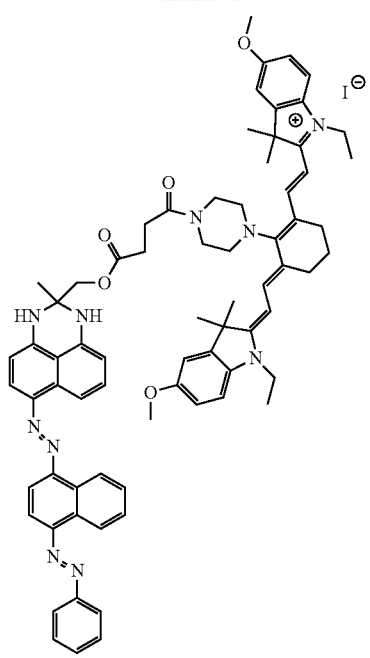
48
-continued
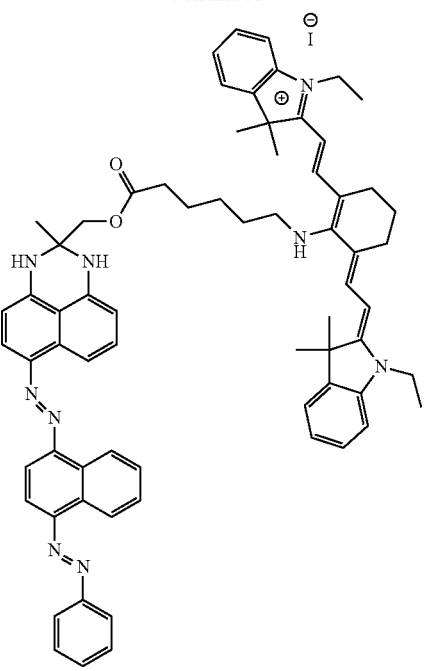
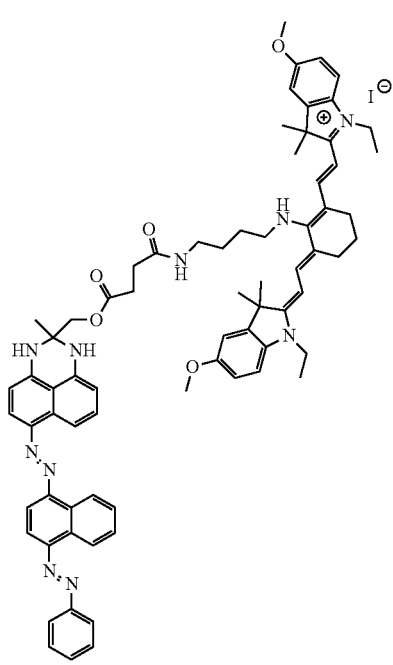

In another embodiment, the compound of formula I is selected from the following, or a salt or solvate thereof:
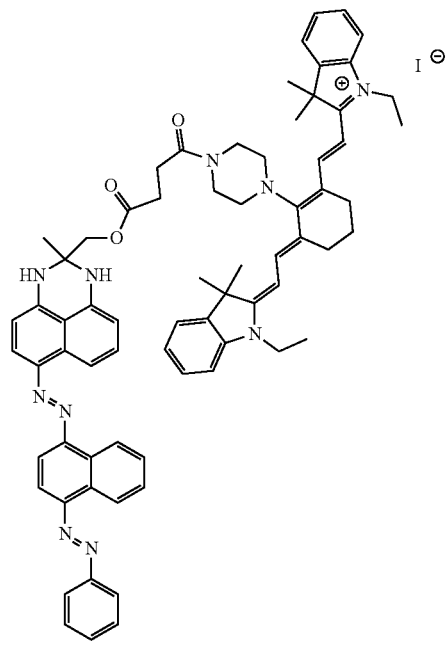
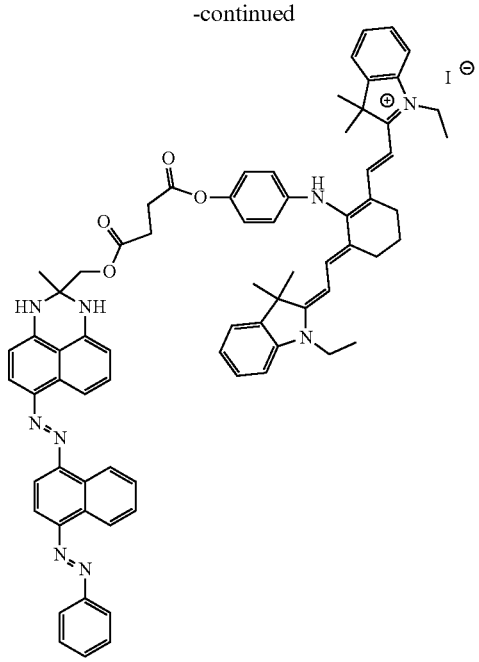
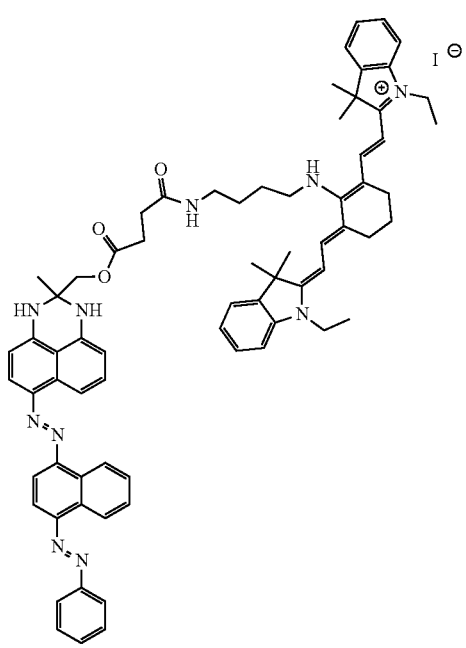
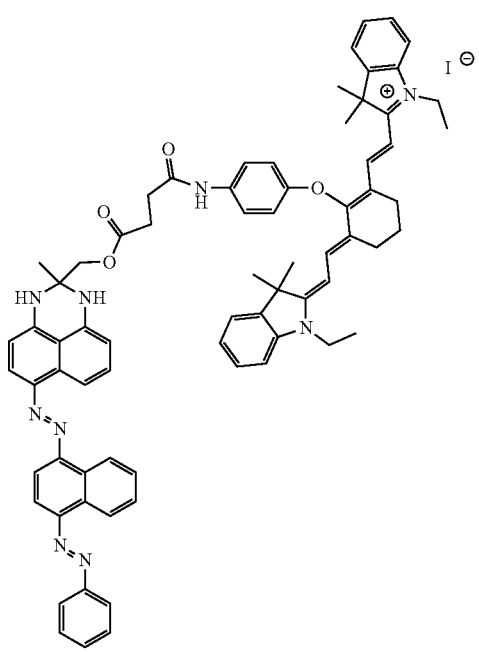

-continued

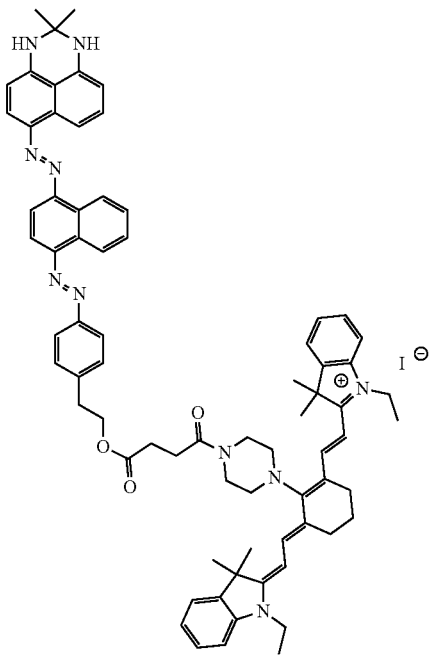

In another embodiment, the compound of formula I is

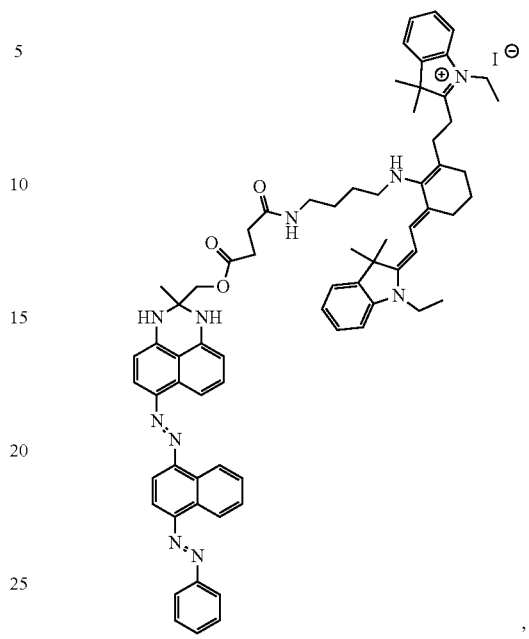

or a salt or solvate thereof.

Though the present invention may relate to any compound or particular group of compounds defined herein by way of optional, preferred or suitable features or otherwise in terms of particular embodiments, the present invention may also relate to any compound or particular group of compounds that specifically excludes said optional, preferred or suitable features or particular embodiments.

Salts and Solvates

The compounds (including final products and intermediates) described herein may be isolated and used per se or may be isolated in the form of a salt, suitably pharmaceutically acceptable salts. It should be understood that the terms "salt(s)" and "salt form(s)" used by themselves or in conjunction with another term or terms encompasses all inorganic and organic salts, including industrially acceptable salts, as defined herein, and pharmaceutically acceptable salts, as defined herein, unless otherwise specified. As used herein, industrially acceptable salts are salts that are generally suitable for manufacturing and/or processing (including purification) as well as for shipping and storage, but may not be salts that are typically administered for clinical or therapeutic use. Industrially acceptable salts may be prepared on a laboratory scale, i.e. multi-gram or smaller, or on a larger scale, i.e. up to and including a kilogram or more.

Pharmaceutically acceptable salts, as used herein, are salts that are generally chemically and/or physically compatible with the other ingredients comprising a formulation, and/or are generally physiologically compatible with the recipient thereof. Pharmaceutically acceptable salts may be prepared on a laboratory scale, i.e. multi-gram or smaller, or on a larger scale, i.e. up to and including a kilogram or more. It should be understood that pharmaceutically acceptable salts are not limited to salts that are typically administered or approved by the FDA or equivalent foreign regulatory body for clinical or therapeutic use in humans. A practitioner of ordinary skill will readily appreciate that some salts are both industrially acceptable as well as pharmaceutically acceptable salts. It should be understood that all such salts, including mixed salt forms, are within the scope of the application.

In one embodiment, the compounds of Formula I are isolated as pharmaceutically acceptable salts.

A suitable pharmaceutically acceptable salt of a compound of the invention is, for example, an acid-addition salt of a compound of the invention which is sufficiently basic, for example, an acid-addition salt with, for example, an inorganic or organic acid, for example hydrochloric, hydrobromic, sulfuric, phosphoric, trifluoroacetic, formic, citric or maleic acid. In addition a suitable pharmaceutically acceptable salt of a compound of the invention which is sufficiently acidic is an alkali metal salt, for example a sodium or potassium salt, an alkaline earth metal salt, for example a calcium or magnesium salt, an ammonium salt or a salt with an organic base which affords a physiologically-acceptable cation, for example a salt with methylamine, dimethylamine, trimethylamine, piperidine, morpholine or tris-(2-hydroxyethyl)amine.

In general, salts of the present application can be prepared in situ during the isolation and/or purification of a compound (including intermediates), or by separately reacting the compound (or intermediate) with a suitable organic or inorganic acid or base (as appropriate) and isolating the salt thus formed. The degree of ionisation in the salt may vary from completely ionised to almost non-ionised. In practice, the various salts may be precipitated (with or without the addition of one or more co-solvents and/or anti-solvents) and collected by filtration or the salts may be recovered by evaporation of solvent(s). Salts of the present application may also be formed via a "salt switch" or ion exchange/double displacement reaction, i.e. reaction in which one ion is replaced (wholly or in part) with another ion having the same charge. One skilled in the art will appreciate that the salts may be prepared and/or isolated using a single method or a combination of methods.

Representative salts include, but are not limited to, acetate, aspartate, benzoate, besylate, bicarbonate/carbonate, bisulphate/sulphate, borate, camsylate, citrate, edisylate, esylate, formate, fumarate, gluceptate, gluconate, glucuronate, hexafluorophosphate, hibenzate, hydrochloride/chloride, hydrobromide/bromide, hydroiodide/iodide, isethionate, lactate, malate, maleate, malonate, mesylate, methylsulphate, naphthylate, 2-napsylate, nicotinate, nitrate, orotate, oxalate, palmitate, pamoate, phosphate/hydrogen phosphate/dihydrogen phosphate, saccharate, stearate, succinate, tartrate, tosylate, trifluoroacetate and the like. Other examples of representative salts include alkali or alkaline earth metal cations such as sodium, lithium, potassium, calcium, magnesium, and the like, as well as non-toxic ammonium, quaternary ammonium and amine cations including, but not limited to, ammonium, tetramethylammonium, tetraethylammonium, lysine, arginine, benzathine, choline, tromethamine, diolamine, glycine, meglumine, olamine and the like.

Certain compounds of the Formula I may exist in solvated as well as unsolvated forms such as, for example, hydrated forms. It is to be understood that the invention encompasses all such solvated forms.

Polymorphs

It is also to be understood that certain compounds of the Formula I may exhibit polymorphism, and that the invention encompasses all such forms.

N-Oxides

Compounds of the Formula I containing an amine function may also form N-oxides. A reference herein to a compound of the Formula I that contains an amine function also includes the N-oxide. Where a compound contains several amine functions, one or more than one nitrogen atom may be oxidised to form an N-oxide. Particular examples of N-oxides are the N-oxides of a tertiary amine or a nitrogen atom of a nitrogen-containing heterocycle. N-Oxides can be formed by treatment of the corresponding amine with an oxidizing agent such as hydrogen peroxide or a per-acid (e.g. a peroxycarboxylic acid), see for example Advanced Organic Chemistry, by Jerry March, 4$^{th}$ Edition, Wiley Interscience, pages. More particularly, N-oxides can be made by the procedure of L. W. Deady (*Syn. Comm.* 1977, 7, 509-514) in which the amine compound is reacted with m-chloroperoxybenzoic acid (mCPBA), for example, in an inert solvent such as dichloromethane.

Tautomers

Compounds of the Formula I may exist in a number of different tautomeric forms and references to compounds of the Formula I include all such forms. For the avoidance of doubt, where a compound can exist in one of several tautomeric forms, and only one is specifically described or shown, all others are nevertheless embraced by Formula I. Examples of tautomeric forms include keto-, enol-, and enolate-forms, as in, for example, the following tautomeric pairs: keto/enol (illustrated below), pyrimidone/hydroxypyrimidine, imine/enamine, amide/imino alcohol, amidine/amidine, nitroso/oxime, thioketone/enethiol, and nitro/aci-nitro.

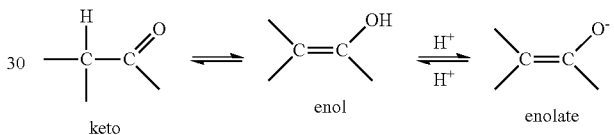

keto  enol  enolate

Isomers

Compounds that have the same molecular formula but differ in the nature or sequence of bonding of their atoms or the arrangement of their atoms in space are termed "isomers". Isomers that differ in the arrangement of their atoms in space are termed "stereoisomers". Stereoisomers that are not mirror images of one another are termed "diastereomers" and those that are non-superimposable mirror images of each other are termed "enantiomers". When a compound has an asymmetric centre, for example, it is bonded to four different groups, a pair of enantiomers is possible. An enantiomer can be characterized by the absolute configuration of its asymmetric centre and is described by the R- and S-sequencing rules of Cahn and Prelog, or by the manner in which the molecule rotates the plane of polarized light and designated as dextrorotatory or levorotatory (i.e., as (+) or (−)-isomers respectively). A chiral compound can exist as either individual enantiomer or as a mixture thereof. A mixture containing equal proportions of the enantiomers is called a "racemic mixture".

Certain compounds of Formula I may have one or more asymmetric centres and therefore can exist in a number of stereoisomeric configurations. Consequently, such compounds can be synthesized and/or isolated as mixtures of enantiomers and/or as individual (pure) enantiomers, and, in the case of two or more asymmetric centres, single diastereomers and/or mixtures of diastereomers. It should be understood that the present application includes all such enantiomers and diastereomers and mixtures thereof in all ratios.

Isotopes

The compounds of the present invention are described herein using structural formulas that do not specifically recite the mass numbers or the isotope ratios of the constituent atoms. As such it is intended that the present application includes compounds in which the constituent atoms are present in any ratio of isotope forms. For example, carbon atoms may be present in any ratio of $^{12}C$, $^{13}C$, and $^{14}C$; hydrogen atoms may be present in any ratio of $^{1}H$, $^{2}H$, and $^{3}H$; etc. Preferably, the constituent atoms in the compounds of the present invention are present in their naturally occurring ratios of isotope forms.

Prodrugs and Metabolites

The compounds of Formula I may be administered in the form of a pro-drug which is broken down in the human or animal body to release a compound of the invention. A pro-drug may be used to alter the physical properties and/or the pharmacokinetic properties of a compound of the invention.

Accordingly, the present invention includes those compounds of the Formula I as defined hereinbefore when made available by organic synthesis and when made available within the human or animal body by way of cleavage of a pro-drug thereof. Accordingly, the present invention includes those compounds of the Formula I that are produced by organic synthetic means and also such compounds that are produced in the human or animal body by way of metabolism of a precursor compound, that is a compound of the Formula I may be a synthetically-produced compound or a metabolically-produced compound.

Pharmaceutical Compositions

According to a further aspect of the invention there is provided a pharmaceutical composition which comprises a compound of the invention as defined hereinbefore, or a pharmaceutically acceptable salt, hydrate or solvate thereof, in association with a pharmaceutically acceptable diluent or carrier.

In one embodiment, the pharmaceutical composition which comprises a compound of the invention as defined hereinbefore, or a pharmaceutically acceptable salt, hydrate or solvate thereof, in association with a pharmaceutically acceptable carrier.

In one embodiment, the pharmaceutically acceptable carrier is a polymeric micelle. In one embodiment, the pharmaceutically acceptable carrier is a nanoparticle, suitably a polymeric nano-micelle.

In one embodiment, the polymeric micelle comprises an amphiphilic polymer.

In one embodiment, the amphiphilic polymer is an amphiphilic polymer block copolymer, which is a block polymer composed of two or more polymers. In one embodiment, the hydrophilic part of the amphiphilic polymer is selected from polyethylene glycol (PEO), povidone and the like, and the hydrophobic part of the amphiphilic polymer is selected from polyoxypropylene, polylactic acid, polystyrene, polycaprolactone (PCL), polyamino acid, poly(lactic-co-glycolic acid), polyacrylic acid and the like.

In one embodiment, the amphiphilic polymer is a combination of two or more of poloxamers (e.g. PEO-PPO-PEO), a polylactic acid-polyethylene glycol-polylactic acid triblock copolymer (PLA-PEO-PLA), a polyethylene glycol-polyacrylic acid block copolymer (PEO-PAA), a polyethylene glycol-polyaspartic acid block copolymer (PEO-PASP), a polyethylene glycol-poly(lactic-co-glycolic acid) block copolymer (PEO-PLAG), a polyethylene glycol-polycaprolactone block copolymer (PEO-PCL), a polyethylene glycol-polylactic acid block copolymer (PEO-PLA/PTX), or a polyethylene glycol-polystyrene block copolymer (PEO-b-PS), and the like.

In one embodiment, the amphiphilic polymer is a polyethylene glycol-polycaprolactone block copolymer (PEO-b-PCL). The copolymer may have a number-average molecular weight of 500-50000 (specifically, such as 500, 1000, 2000, 3000, 4000, 5000, 6000, 8000, 10000, 12000, 14000, 16000, 18000, 20000, 22000, 24000, 26000, 28000, 30000, 32000, 34000, 36000, 38000, 40000, 42000, 44000, 46000, 48000 and 50000).

In one embodiment, the polymeric micelle has a mean hydrodynamic diameter (Dh, nm; measured at a detection angle of 909, at 25° C., in a photon correlation spectrometer (Zetasizer 3000 HSA, Malvern, UK) and analyzed by the CONTIN method (MALVERN software)) of about 1 to about 500 nm. Suitably about 50 to about 500 nm, suitably about 75 to 500 nm, suitably about 100 to 500 nm, suitably about 100 to 150 nm.

In another embodiment, the polymeric micelle has a mean hydrodynamic diameter (Dh, nm; measured at a detection angle of 909, at 25° C., in a photon correlation spectrometer (Zetasizer 3000 HSA, Malvern, UK) and analyzed by the CONTIN method (MALVERN software)) of about 1 to about 400 nm. Suitably about 1 to about 300 nm, suitably about 1 to 200 nm.

In another embodiment, the polymeric micelle has a mean hydrodynamic diameter (Dh, nm; measured at a detection angle of 90°, at 25° C., in a photon correlation spectrometer (Zetasizer 3000 HSA, Malvern, UK) and analyzed by the CONTIN method (MALVERN software)) of about 75 to about 400 nm. Suitably about 75 to about 300 nm, suitably about 75 to 200 nm, suitably about 75 to 150 nm.

In one embodiment, the pharmaceutical compositions described herein comprise a pharmaceutically acceptable excipient or carrier which is a fluid, especially a liquid, in which the compound of formula I is suspended or dissolved, such that the composition is physiologically tolerable, i.e. can be administered to the mammalian body without toxicity or undue discomfort. The carrier medium is suitably an injectable carrier liquid such as sterile, pyrogen-free water for injection; an aqueous solution such as saline (which may advantageously be balanced so that the final product for injection is either isotonic or not hypotonic); an aqueous solution of one or more tonicity-adjusting substances (e.g. salts of plasma cations with biocompatible counterions), sugars (e.g. glucose or sucrose), sugar alcohols (e.g. sorbitol or mannitol), glycols (e.g. glycerol), or other non-ionic polyol materials (e.g. polyethylene glycols, propylene glycols and the like). The carrier may also comprise biocompatible organic solvents such as ethanol. Such organic solvents are useful to solubilise more lipophilic compounds or formulations. Preferably the carrier is pyrogen-free water for injection, isotonic saline or an aqueous ethanol solution. The pH of the carrier for intravenous injection is suitably in the range 4.0 to 10.5.

The compositions described herein may contain conventional pharmaceutical excipients, for example emulsifiers, fatty acid esters, gelling agents, stabilizers, antioxidants, osmolality adjusting agents, buffers, pH adjusting agents, etc., and may be in a form suitable for parenteral or enteral administration, for example injection or infusion or administration directly into a body cavity having an external escape duct, for example the gastrointestinal tract, the bladder or the uterus.

The compounds or compositions of the present invention may be in conventional pharmaceutical administration forms such as tablets, capsules, powders, solutions, suspensions, dispersions, syrups, suppositories etc.

For imaging of some portions of the body the most preferred mode for administering contrast agents is parenteral, e.g., intravenous administration.

In one embodiment, the compounds or compositions described herein are in a parenterally administrable forms, e.g. an intravenous solutions. Said solution should be sterile and free from physiologically unacceptable agents, and should have low osmolality to minimize irritation or other adverse effects upon administration, and thus the composition should preferably be isotonic or slightly hypertonic. The skilled person would be aware of suitable carriers for administering parenteral solutions such as Sodium Chloride Injection, Ringer's Injection, Dextrose Injection, Dextrose and Sodium Chloride Injection.

The compositions of the invention may be obtained by conventional procedures using conventional pharmaceutical carriers and excipients, well known in the art.

Therapeutic Uses and Applications

The compounds of the present invention can be used to assist in the diagnosis of patients having a disease or medical condition exhibiting senescence. For instance, the compounds of the present invention enable the level of senescent cells in the sample to be compared to a standard level, wherein a difference in the level of senescence in the sample to a standard level is indicative of the subject having a condition associated with senescence.

Accordingly, in one aspect, the present invention provides a compound of formula I, or a pharmaceutical composition, as described herein for use in a method of diagnosis.

In another aspect, the present invention provides a compound of formula I, or a pharmaceutical composition, as described herein for use in a method of diagnosing or monitoring a disease or medical condition exhibiting senescence.

In another aspect, the present inventions provides the use of a compound of formula I, or a pharmaceutical composition, as described herein in a method of diagnosing or monitoring a disease or medical condition exhibiting senescence.

In another aspect, the present invention provides a method of diagnosing or monitoring a disease or medical condition exhibiting senescence in a subject, or a biological sample obtained therefrom, comprising:
(i) administering to said subject or sample an effective amount of a compound of formula I, or a pharmaceutical composition, as described herein; and
(ii) detecting binding of said compound or pharmaceutical composition to a marker of senescence in the subject or sample.

In one embodiment, the biological sample is selected from tissues of animal origin, ranging from invertebrates to mammals, including humans, in the live or preserved state; single animal cells either derived from the above tissues or in suspension, in the live or preserved state.

In one embodiment, the subject is an animal. In one embodiment, the subject is a mammal, suitably a human.

In one embodiment, the disease or medical condition exhibiting senescence is selected from cancer, chronic obstructive pulmonary disease (COPD), cystic fibrosis, osteoporosis, frailty, transplantation, ophthalmic disorders, disc degeneration, osteoarthritis, renal diseases, neurodegenerative diseases, hepatic steatosis, metabolic dysfunction, fibrosis, neoplasias (pre- and neoplastic), diabetes, neuro-degenerative diseases, cardiovascular diseases, obesity, immune dysfunction, aging and age related functional decline.

In another aspect, the present invention provides a compound of formula I, or a pharmaceutical composition, as described herein for use in a method of diagnosing or monitoring a fibrotic disorder.

In another aspect, the present invention provides a method of diagnosing or monitoring a fibrotic disorder in a subject, or a biological sample obtained therefrom, comprising:
(i) administering to said subject or sample an effective amount of a compound of formula I, or a pharmaceutical composition, as described herein; and
(ii) detecting binding of said compound or pharmaceutical composition to a marker of senescence in the subject or sample.

The fibrotic disorder may be a disorder characterised by excess fibrosis, e.g., an excess of fibrous connective tissue in a tissue or organ, e.g., triggered by a reparative or reactive process, e.g., in response to injury (e.g., scarring, healing, radiotherapy) or excess fibrotic tissue arising from a single cell line (e.g., fibroma).

In one embodiment, the fibrotic disorder is selected from:
(i) a fibrotic disorder affecting the lungs, for example pulmonary fibrosis secondary to cystic fibrosis; idiopathic pulmonary fibrosis; coal worker's progressive massive fibrosis; cryptogenic fibrosing alveolitis, chronic fibrosing interstitial pneumonia, interstitial lung disease (ILD), diffuse parenchymal lung disease (DPLD), emphysema and chronic obstructive pulmonary disease (COPD), or chronic asthma; or
(ii) a fibrotic disorder affecting the liver, for example cirrhosis, and associated conditions such as chronic viral hepatitis B or C, Wilson's disease, non-alcoholic fatty liver disease (NAFLD), alcoholic steatohepatitis (ASH), non-alcoholic steatohepatitis (NASH), primary biliary cirrhosis (PBC), biliary cirrhosis or autoimmune hepatitis; or
(iii) a fibrotic disorder affecting the kidneys, for example diabetic nephropathy, vesicoureteral reflux, tubulointerstitial renal fibrosis; glomerulonephritis or glomerular nephritis, including focal segmental glomerulosclerosis and membranous glomerulonephritis or mesangiocapillary glomerular nephritis;
(iv) a fibrotic disorder affecting the heart or vascular system, for example endomyocardial fibrosis; old myocardial infarction; atrial fibrosis; congestive heart failure, cardiomyopathy, hypertensive heart disease (HHD), hypertension (for example pulmonary hypertension) and fibrosis associated with hypertension, atherosclerosis, restenosis (e.g. coronary, carotid, and cerebral lesions), and heart disease associated with cardiac ischemic events; or
(v) a fibrotic disorder affecting the mediastinum, for example mediastinal fibrosis; or
(vi) a fibrotic disorder affecting bone, for example myelofibrosis, including primary myelofibrosis, post polycythemia vera or post essential thrombocythemia myelofibrosis; or
(vii) a fibrotic disorder affecting the retroperitoneum, for example retroperitoneal fibrosis skin; or
(viii) a fibrotic disorder affecting the skin, for example nephrogenic systemic fibrosis, keloid formation and scarring, systemic sclerosis, scleroderma, hypertrophic scarring, scleredema (Buschke disease), systemic amyloidosis, lipodermatosclerosis, progeroid disorders, stiff skin syndrome, Dupuytren's contracture, nephrogenic fibrosing dermopathy (NFD), mixed connective tissue disease, scleromyxedema, graft-versus-host disease (GVHD), Peyronie's disease and eosinophilic fasciitis; or
(ix) a fibrotic disorder affecting the GI tract, for example a fibrotic intestinal disorder, inflammatory bowel disease, ulcerative colitis or Crohn's disease; or
(x) a fibrotic disorder affecting connective tissue, for example arthrofibrosis; or capsulitis; or
(xi) a fibrotic disorder affecting the eye, for example ocular scarring, ocular fibrosis following surgery or pseudoexfoliation syndrome glaucoma.
(xii) a fibrotic disorder induced by radiation, such as fibrosis following radiotherapy. The fibrotic condition induced by radiation may occur in any tissue treated by radiotherapy, for instance, the skin and subcutaneous tissue, lungs, breast, gastrointestinal and genitourinary tracts, muscles, and other organs.

In another aspect, the present invention provides a compound of formula I, or a pharmaceutical composition, as described herein for use in a method of diagnosing or monitoring a cancer.

In another aspect, the present invention provides a method of diagnosing or monitoring a cancer in a subject, or a biological sample obtained therefrom, comprising
(i) administering to said subject or sample an effective amount of a compound of formula I, or a pharmaceutical composition, as described herein; and
(ii) detecting binding of said compound or pharmaceutical composition to a marker of senescence in the subject or sample.

The cancer may be a solid tumour or a haematological ("liquid") cancer. In one embodiment, the cancer is selected from:
(1) Carcinoma, including for example tumours derived from stratified squamous epithelia (squamous cell carcinomas) and tumours arising within organs or glands (adenocarcinomas). Examples include breast, colon, lung, prostate, ovary, esophageal carcinoma (including, but not limited to, esophageal adenocarcinoma and squamous cell carcinoma), basal-like breast carcinoma, basal cell carcinoma (a form of skin cancer), squamous cell carcinoma (various tissues), head and neck carcinoma (including, but not limited to, squamous cell carcinomas), stomach carcinoma (including, but not limited to, stomach adenocarcinoma, gastrointestinal stromal tumor), signet ring cell carcinoma, bladder carcinoma (including transitional cell carcinoma (a malignant neoplasm of the bladder)), bronchogenic carcinoma, colorectal carcinoma (including, but not limited to, colon carcinoma and rectal carcinoma), anal carcinoma, gastric carcinoma, lung carcinoma (including but not limited to small cell carcinoma and non-small cell carcinoma of the lung, lung adenocarcinoma, squamous cell carcinoma, large cell carcinoma, bronchioloalveolar carcinoma, and mesothelioma), neuroendocrine tumors (including but not limited to carcinoids of the gastrointestinal tract, breast, and other organs), adrenocortical carcinoma, thyroid carcinoma, pancreatic carcinoma (including, but not limited to, pancreatic ductal adenocarcinoma, pancreatic adenocarcinoma, acinar cell carcinoma, intraductal papillary mucinous neoplasm with invasive carcinoma, mucinous cystic neoplasm with invasive carcinoma, islet cell carcinoma and neuroendocrine tumors), breast carcinoma (including, but not limited to, ductal carcinoma, lobular carcinoma, inflammatory breast cancer, clear cell carcinoma, mucinous carcinoma), ovarian carcinoma (including, but not limited to, ovarian epithelial carcinoma or surface epithelial-stromal tumor including serous tumor, endometrioid tumor and mucinous cystadenocarcinoma, sex-cord-stromal tumor), liver and bile duct carcinoma (including, but not limited to, hepatocellular carcinoma, cholangiocarcinoma and hemangioma), prostate carcinoma, adenocarcinoma, brain tumours (including, but not limited to glioma, glioblastoma and medulloblastoma), germ cell tumors, sweat gland carcinoma, sebaceous gland carcinoma, papillary carcinoma, papillary adenocarcinoma, cystadenocarcinoma, kidney carcinoma (including, but not limited to, renal cell carcinoma, clear cell carcinoma and Wilm's tumor), medullary carcinoma, ductal carcinoma in situ or bile duct carcinoma, choriocarcinoma, seminoma, embryonal carcinoma, cervical carcinoma, uterine carcinoma (including, but not limited to, endometrial adenocarcinoma, uterine papillary serous carcinoma, uterine clear-cell carcinoma, uterine sarcomas and leiomyosarcomas, mixed mullerian tumors), testicular carcinoma, osteogenic carcinoma, epithelial carcinoma, sarcomatoid carcinoma, nasopharyngeal carcinoma, laryngeal carcinoma; oral and oropharyngeal squamous carcinoma;
(2) Sarcomas, including: osteosarcoma and osteogenic sarcoma (bone); chondrosarcoma (cartilage); leiomyosarcoma (smooth muscle); rhabdomyosarcoma (skeletal muscle); mesothelial sarcoma and mesothelioma (membranous lining of body cavities); fibrosarcoma (fibrous tissue); angiosarcoma and hemangioendothelioma (blood vessels); liposarcoma (adipose tissue); glioma and astrocytoma (neurogenic connective tissue found in the brain); myxosarcoma (primitive embryonic connective tissue); chordoma, endotheliosarcoma, lymphangiosarcoma, lymphangioendotheliosarcoma, synovioma, Ewing's sarcoma, mesenchymous and mixed mesodermal tumor (mixed connective tissue types) and other soft tissue sarcomas;
(3) Myeloma and multiple myeloma;
(4) Hematopoietic tumours, including: myelogenous and granulocytic leukemia (malignancy of the myeloid and granulocytic white blood cell series); lymphatic, lymphocytic, and lymphoblastic leukemia (malignancy of the lymphoid and lymphocytic blood cell series); polycythemia vera and erythremia (malignancy of various blood cell products, but with red cells predominating); myelofibrosis.
(5) Lymphomas, including: Hodgkin and Non-Hodgkin lymphomas;
(6) Solid tumors of the nervous system including medulloblastoma, craniopharyngioma, ependymoma, pinealoma, hemangioblastoma, acoustic neuroma, oligodendroglioma, meningioma, neuroblastoma and schwannoma;
(7) Melanoma, uveal melanoma and retinoblastoma; and
(8) Mixed Types, including, e.g., adenosquamous carcinoma, mixed mesodermal tumor, carcinosarcoma or teratocarcinoma.

In one embodiment, the cancer is selected from anus cancer, bile duct cancer, bladder cancer, blood cancer, brain cancer, breast cancer, uterine cervix cancer, colon cancer, endometrial cancer, esophageal cancer, Ewing's sarcoma, gallbladder cancer, head and neck cancer, hypopharyngeal cancer, pancreatic cancer, pharyngeal cancer, lip and oral cancer, liver cancer, lung cancer, melanoma, mesothelioma, multiple myeloma, ovarian cancer, pancreatic cancer, prostate cancer, renal cancer, skin cancer, stomach cancer, testicular cancer and thyroid gland cancer.

In another embodiment, the cancer is selected from bladder cancer, blood cancer, brain cancer, breast cancer, colon cancer, esophageal cancer, head and neck cancer, pancreatic cancer, liver cancer, lung cancer, ovarian cancer, pancreatic cancer, prostate cancer, renal cancer, skin cancer, stomach cancer, testicular cancer and thyroid gland cancer.

In another embodiment, the cancer is selected from pancreatic cancer, colon cancer, breast cancer and lung cancer.

In one embodiment of each of the above aspects, the marker of senescence is lipofuscin.

In another aspect, the present invention provides a compound of formula I, or a pharmaceutical composition, as described herein for use in a method of detecting senescence in a subject, or a biological sample obtained therefrom.

In another aspect, the present invention provides method for detecting senescence in a subject, or a biological sample obtained therefrom, comprising:
(i) administering to said subject or sample an effective amount of a compound of formula I, or a pharmaceutical composition, as described herein; and
(ii) detecting binding of said compound or pharmaceutical composition to a marker of senescence in the subject or sample.

In another aspect, the present invention provides a method for quantifying senescence in a subject, or a biological sample obtained therefrom, comprising:
(i) administering to said subject or sample an effective amount of a compound according to formula I or a pharmaceutical composition, described herein; and
(ii) detecting and quantifying senescence in the subject or sample.

In another aspect, the present invention provides the use of a compound according to formula I or a pharmaceutical composition, described herein for imaging a cell, tissue or organ exhibiting senescence, or a component or extract thereof.

In another aspect, the present invention provides a method for imaging a cell, tissue or organ exhibiting senescence, or a component or extract thereof, comprising:
(i) administering to said cell, tissue, organ or a component or extract thereof an effective amount of a compound according to formula I or a pharmaceutical composition, described herein; and
(ii) detecting the presence of the compound or composition in the cell, tissue, organ or the component or extract thereof.

In one embodiment of any of the above imaging methods, the presence of the compound or composition in the tissue, organ or component thereof is detected by an imaging modality, suitably an optical imaging modality, such as fluorescence imaging (e.g. fluorescence microscopy). In one embodiment, the presence of the compound or composition in cells is detected using flow cytometry.

In one embodiment of any of above methods, the method is carried out using a device adapted to separate and/or quantify cells. Suitably, the device is a FACS device.

In another aspect, the present invention relates to a method for detecting and isolating a senescent cell from a population of cells comprising:
(i) administering to said population of cells an effective amount of a compound according to formula I or a pharmaceutical composition, described herein; and
(ii) performing fluorescence-activated cell sorting (FACS) analysis on said population of cells.

In one embodiment, the population of cells is present in a sample. In one embodiment, the sample is a fluid sample. For instance, the sample may comprise a body fluid of a subject, such as urine, lymph, saliva, mucus, milk or amniotic fluid, blood, plasma or serum.

In one embodiment, the sample is human in origin, but alternatively it may be from another mammal or animal such as from commercially farmed animals such as horses, cattle, sheep or pigs or may alternatively be pets such as cats or dogs.

The sample is typically processed prior to being analysed, for example by centrifugation or by passage through a membrane, for instance, to remove unwanted molecules or cells.

FACS analysis is a well-known cell sorting technique which the skilled person would be familiar with.

In one embodiment of each of the above aspects, the method is an in vivo method. In another, embodiment of each of the above aspects the method is an ex vivo or in vitro method.

In one embodiment of each of the above aspects, the senescent cell detection methods are compatible with a wide range of in vivo, ex vivo and in vitro biological samples. In one embodiment, the biological sample is selected from:
1) Live organisms: senescent cells that accumulate lipofuscin can be detected directly in tissues from lower (evolutionary) invertebrates up to mammals, including humans;
2) Tissues of animal origin: senescent cells that accumulate lipofuscin can be detected in tissues (in situ) from lower (evolutionary) invertebrates up to mammals, including humans;
3) Single animal cells: either derived from the above tissues using tissue disaggregation methods or that are in suspension, for example body fluids such as blood cells, or grown in laboratory culture can be evaluated for the senescence state.
4) Plant origin: senescent cells that accumulate lipofuscin can be detected in such tissues.
5) The biological samples described at points 2), 3) and 4) can be either in:
i) a fresh state, such as live cells; or
ii) preserved (fixed), to avoid decomposition, by physical means such as freezing, or by chemical treatment, such as immersion in formaldehyde, including if necessary, embedding in inert supportive material, like paraffin.

Notably, the vast majority of biological samples available in hospitals, research institutions, private clinics, etc., are in the form of fixed tissues that are usually embedded in paraffin to facilitate thin-sectioning for further analyses.

The methods of the present invention can be utilised to determine subjects who are likely to benefit from treatment with a senotherapy. By determining the level of senescence, and then comparing the measured value to a standard level it is possible to identify those patients likely to benefit from treatment with a senotherapy.

In another aspect, the present invention provides a method of identifying a subject having an increased likelihood of responsiveness or sensitivity to a senotherapy comprising:
(i) administering to said subject, or to a biological sample obtained from the subject, an effective amount of a compound according to formula I or a pharmaceutical composition, described herein; and
(ii) detecting the presence of the compound or composition in the subject or sample in order to determine the level of senescence in said subject or sample.

In one embodiment, an increase in the level of senescence in the subject or sample as compared to a reference value indicates an increased likelihood of responsiveness or sensitivity to a senotherapy.

In one embodiment, the method further comprises:
(iii) administering to said subject, or a biological sample obtained from said subject, an effective amount of a compound of formula I, or pharmaceutical composition, described herein at a later time point; and
(iv) detecting the presence of the compound or composition in the subject or sample at the later time point in order to determine the level of senescence; and
(v) comparing the level of senescence at the earlier and later time points in order to identify a subject having an increased likelihood of responsiveness or sensitivity to a senotherapy.

In another embodiment, the methods of the present invention provide a highly selective and sensitive measure of the level of senescence and can use this as a surrogate end-point for the assessment of serotherapeutic efficacy.

In another aspect, the present invention a method of identifying a subject demonstrating responsiveness or sensitivity to a senotherapy comprising
(i) administering to said subject, or to a biological sample obtained from the subject, an effective amount of a compound of formula I, or a pharmaceutical composition as described herein; and
(ii) detecting the presence of the compound or composition in the subject or sample in order to determine the level of senescence.

In one embodiment, the method further comprises:
(iii) administering to said subject, or a biological sample obtained from said subject, an effective amount of a compound of formula I, or pharmaceutical composition, described herein at a later time point; and
(iv) detecting the binding of the compound in the subject or sample at the later time point in order to determine the level of senescence; and
(v) comparing the level of senescence at the earlier and later time points in order to identify a subject demonstrating responsiveness or sensitivity to a senotherapy.

In one embodiment, a reduced level of senescence at the later timepoint indicates responsiveness or sensitivity to a senotherapy.

Kits

According to a further aspect of the present invention, there is provided a kit for detecting senescence and/or differentiating senescent cells comprising:
a compound of formula I, or a pharmaceutical composition, as defined hereinabove; and
one or more additional reagents required to implement a method of the present invention, as defined hereinabove.

In one embodiment, there is provided a kit for detecting senescence and/or differentiating senescent cells comprising:
a lyophilized compound of formula I, or a pharmaceutical composition, as defined hereinabove;
a phosphate-buffered saline (PBS) solution to dilute the lyophilized compound; and
4',6-diamidino-2-phenylindole (DAPI).

EXAMPLES

Chemistry

The following examples are provided solely to illustrate the present invention and are not intended to limit the scope of the invention, as described herein.

The compounds of the invention may be prepared using synthetic techniques that are known in the art (as illustrated by the examples herein).

Several methods for the chemical synthesis of the compounds of the present application are described herein. These and/or other well-known methods may be modified and/or adapted in various ways in order to facilitate the synthesis of additional compounds within the scope of the present application and claims. Such alternative methods and modifications should be understood as being within the spirit and scope of this application and claims. Accordingly, it should be understood that the methods set forth in the following descriptions, schemes and examples are intended for illustrative purposes and are not to be construed as limiting the scope of the disclosure.

Synthesis and Characterisation

Melting points were determined on a Büchi apparatus and are uncorrected. $^1$H NMR spectra, $^{13}$C NMR spectra and 2D spectra were recorded on a Bruker Avance III 600 instrument or a Bruker Avance DRX 400 instrument, in deuterated solvents and were referenced to TMS (δ scale). Mass spectra were recorded with a LTQ Orbitrap Discovery instrument, possessing an Ionmax ionization source. Flash chromatography was performed on Merck silica gel 60 (0.040-0.063 mm). Analytical thin layer chromatography (TLC) was carried out on precoated (0.25 mm) Merck silica gel F-254 plates. All the reagents were purchased from commercial suppliers and were used with no further purification.

Example 1

Synthesis of 1-ethyl-2-((E)-2-((E)-3-((E)-2-(1-ethyl-3,3-dimethylindolin-2-ylidene)ethylidene)-2-(4-(4-((2-methyl-6-((E)-(4-((E)-phenyldiazenyl)naphthalen-1-yl)diazenyl)-2,3-dihydro-1H-perimidin-2-yl)methoxy)-4-oxobutanoyl)piperazin-1-yl)cyclohex-1-en-1-yl)vinyl)-3,3-dimethyl-3-indol-1-ium iodide (13, Scheme 1)

Scheme 1

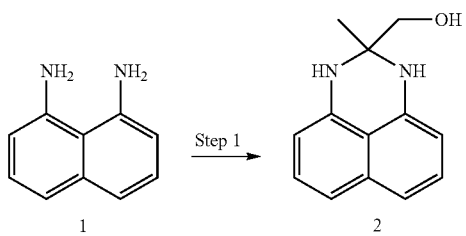

-continued
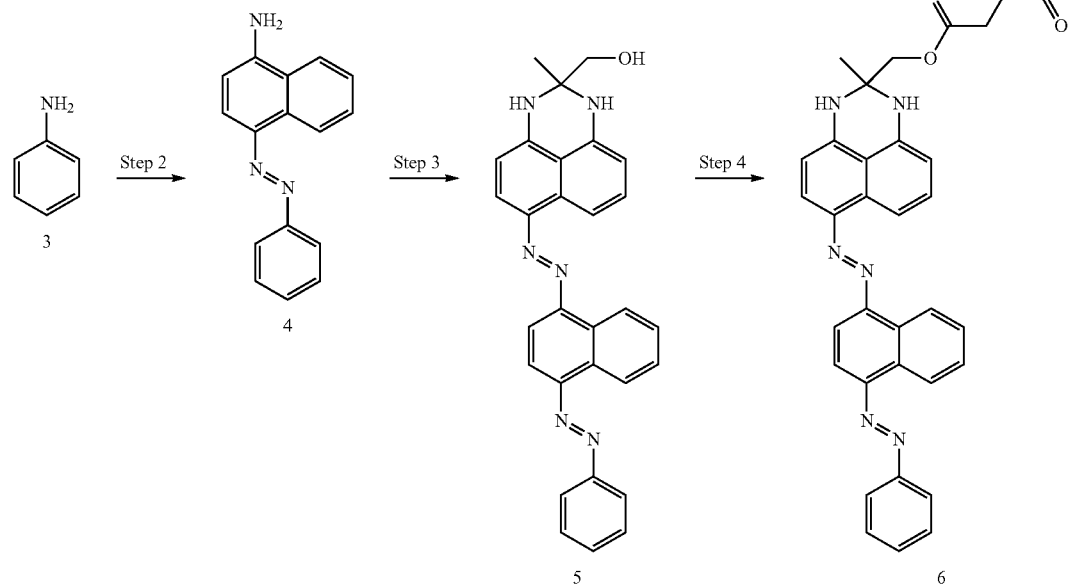
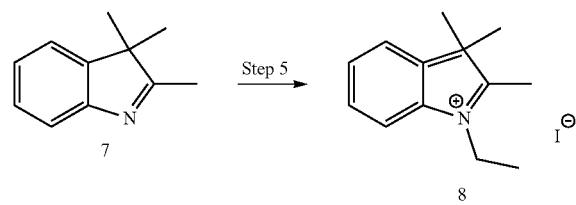
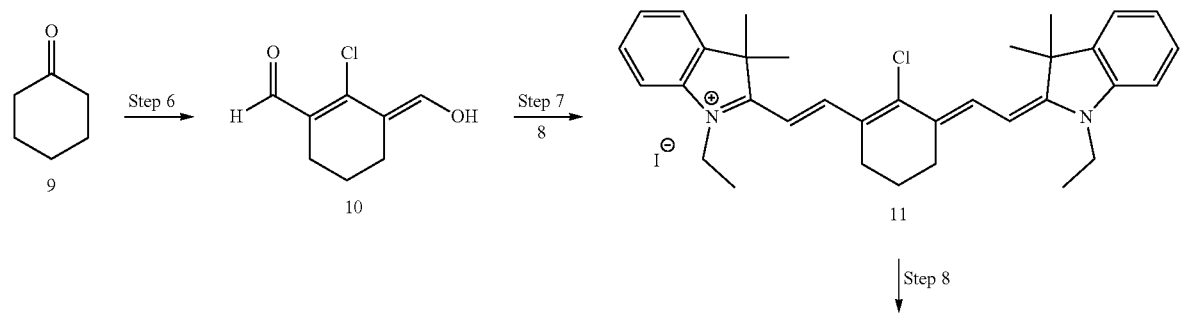
Step 8

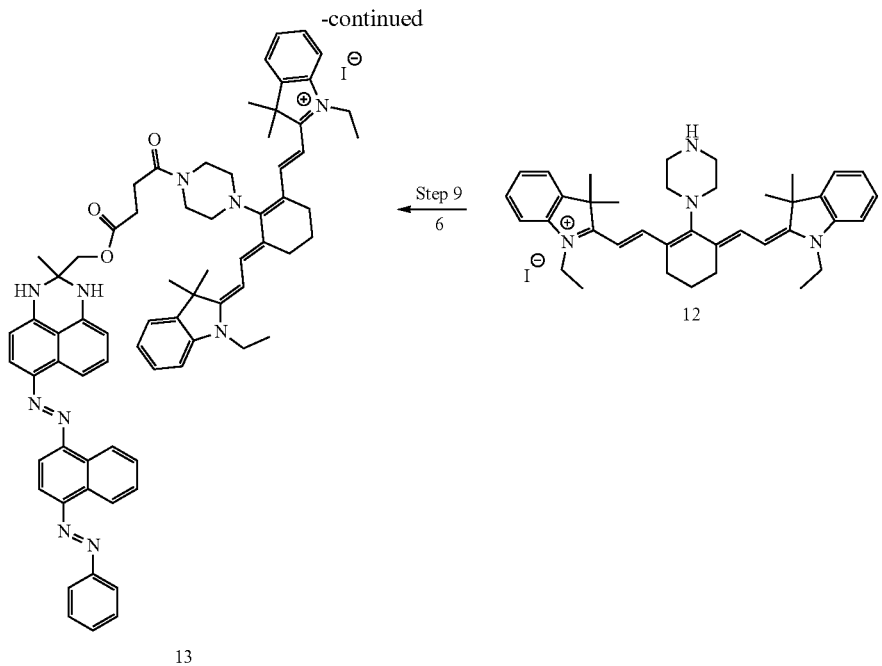

Step 1: Synthesis of (2-methyl-2,3-dihydro-1H-perimidin-2-yl)methanol (2)

Hydroxyacetone (1.84 ml, 26.33 mmol) was added into a solution of 1,8-diaminonaphthalene (1, 3.85 g, 24.34 mmol) in absolute ethanol (6 ml) and the resulting mixture was heated at 75° C. for 3 hrs. Upon completion of the reaction the solvent was evaporated, $Et_2O$ (10 ml) was added into the flask and this mixture was stirred at room temperature for 10 min and then evaporated to result into 2 (5.2 g, yield 100%) as a beige solid, which was used to the next step with no further purification. Mp 126-7° C. (reported 126-7° C.). $^1$H-NMR (600 MHz, $CDCl_3$) δ 1.46 (s, 3H), 3.62 (s, 2H), 3.60-3.80 (brs, 2H, $D_2O$ exch.), 6.57 (d, 2H, J=7.2 Hz), 7.20 (d, 2H, J=7.5 Hz), 7.24 (t, 2H, J=8.2 Hz). $^{13}$C-NMR (151 MHz, $CDCl_3$) δ 24.69, 67.06, 67.13, 107.10, 113.34, 118.02, 127.18, 134.69, 139.20.

Step 2: Synthesis of (E)-4-(phenyldiazenyl)naphthalen-1-amine (4)

Aniline (3, 3.3 ml, 36.4 mmol) was added into a mixture of $H_2O$ (10 ml) and HCl (10N, 7.4 ml) at 0° C. followed by dropwise addition of an aqueous solution (6 ml) of $NaNO_2$ (2.52 g, 36.5 mmol) over a period of 5 min and then this mixture was stirred at 0° C. for 2 hrs. Then sodium acetate trihydrate was added to the solution until pH was 5 and then the diazonium salt was added dropwise into a suspension of 1-naphthylamine (5.2 g, 36.32 mmol) in a mixture of $H_2O$ (100 ml), EtOH (15 ml) and HCl (10N, 3.6 ml) over a period of 30 min. The deep purple coloured suspension was stirred at 0° C. for 2 hrs and then an additional amount of $H_2O$ (50 ml) and EtOH (25 ml) was added and stirring was continued at room temperature for 20 hrs. The solution was then neutralized with addition of saturated aqueous solution of $NaHCO_3$ and the resulting red precipitate was filtered under vacuum, washed with $H_2O$ adequately and left air dried. The crude product was purified by column chromatography using a mixture of cyclohexane/dichloromethane (from 50/50 up to 0/100, v/v) as the eluent to provide 4 as a red solid (6.4 g, yield 71%). M.p. 126-8° C. (reported 127-8° C.). $^1$H-NMR (600 MHz, $CDCl_3$) δ 4.55 (brs, 2H, $D_2O$ exch.), 6.77 (d, 1H, J=7.8 Hz), 7.48 (t, 1H, J=8.2 Hz), 7.54 (m, 1H), 7.58 (t, 2H, J=7.9 Hz), 7.68 (m, 1H), 7.77 (d, 1H, J=9.3 Hz), 7.98 (d, 1H, J=7.8 Hz), 8.07 (d, 2H, J=7.2 Hz), 9.12 (d, 1H, J=10.3 Hz). $^{13}$C-NMR (151 MHz, $CDCl_3$) δ 109.15, 113.99, 120.71, 122.51, 122.73, 124.14, 125.39, 127.17, 129.13, 129.86, 133.22, 140.39, 146.39, 153.64.

Step 3: Synthesis of (2-methyl-6-((E)-(4-((E)-phenyldiazenyl)naphthalen-1-yl)diazenyl)-2,3-dihydro-1H-perimidin-2-yl)methanol (5)

(E)-4-(Phenyldiazenyl)naphthalen-1-amine (4, 0.5 g, 2.02 mmol) was dissolved in DMF (2 ml) and then $H_2O$ (3 ml) and HCl (10N, 0.6 ml) were added. This mixture was cooled at 0° C. and then an aqueous solution (1 ml) of $NaNO_2$ (139 mg, 2.02 mmol) was added dropwise over a period of 5 min. The diazonium salt was stirred at 0° C. for 2 hrs and then was added dropwise into a beaker containing perimidine 2 (473 mg, 2.02 mmol) in ethanol (6 ml) under vigorous stirring at 0° C. The reaction mixture was stirred at 0° C. for 30 min and then at room temperature for 90 min. The solution was then neutralized with addition of saturated solution of $NaHCO_3$ and the resulting dark precipitate was left at 0° C. for 60 min and then filtered under vacuum, washed with $H_2O$ and air dried. The crude product was purified by column chromatography using a mixture of dichloromethane/ethyl acetate (from 100/0 up to 100/30, v/v) as the eluent to provide pure 5 as a black solid, in 47% yield. Mp>270° C.$_{(decomp.)}$ (reported>270° C.$_{(decomp.)}$. $^1$H-NMR (600 MHz, acetone-$d_6$) δ 1.58 (s, 3H), 3.66 (d, 2H, J=5.7 Hz), 4.35 (t, 1H, $D_2O$ exch., J=5.7 Hz), 5.99 (brs, 1H, $D_2O$ exch.), 6.67 (d, 1H, J=7.4 Hz), 6.71 (d, 1H, J=8.4 Hz), 6.98 (brs, 1H, $D_2O$ exch.), 7.44 (t, 1H, J=8.2 Hz), 7.56 (t, 1H, J=7.3 Hz), 7.62 (t, 2H, J=7.3 Hz), 7.77 (m, 2H), 8.05 (d, 1H, J=8.3 Hz), 8.08-8.12 (m, 3H), 8.23 (d, 1H, J=8.4 Hz), 8.35 (d, 1H, J=8.4 Hz), 9.09 (m, 1H), 9.17 (m, 1H).

$^{13}$C-NMR (151 MHz, acetone-d$_6$) δ 24.66, 67.57, 68.35, 106.27, 106.95, 111.97, 112.02, 112.41, 113.51, 118.83, 123.97, 124.16, 124.94, 127.62, 128.18, 130.27, 130.67, 132.11, 132.74, 133.56, 134.96, 140.41, 142.50, 147.74, 148.05, 151.53, 154.38.

Step 4: Synthesis of 4-((2-methyl-6-((E)-(4-((E)-phenyldiazenyl)naphthalen-1-yl)diazenyl)-2,3-dihydro-1H-perimidin-2-yl)methoxy)-4-oxobutanoic acid (6)

DMAP (194 mg, 1.6 mmol) and succinic anhydride (128 mg, 1.28 mmol) were added into a solution of alcohol 5 (0.3 g, 0.64 mmol) in dichloromethane (8 ml) and this mixture was stirred at room temperature for 2 hrs. Upon completion of the reaction, an aqueous solution of HCl (0.1N, 40 ml) was added, followed by extraction with dichloromethane (3×50 ml). The combined organic layers were dried over sodium sulfate and the solvent was evaporated to dryness. The crude product was purified by flash column chromatography, using ethyl acetate as the eluent, to provide the pure carboxylic acid 6 as a black solid, in 85% yield. Mp 110° C. $^1$H-NMR (600 MHz, acetone-d$_6$) δ 1.63 (s, 3H), 2.59-2.61 (m, 4H), 4.22 (d, 1H, J=10.7 Hz), 4.29 (d, 1H, J=10.7 Hz), 6.19 (brs, 1H, D$_2$O exch.), 6.67 (d, 1H, J=7.4 Hz), 6.71 (d, 1H, J=8.4 Hz), 7.07 (brs, 1H, D$_2$O exch.), 7.44 (t, 1H, J=8.2 Hz), 7.59 (t, 1H, J=7.3 Hz), 7.65 (t, 2H, J=7.3 Hz), 7.77-7.82 (m, 2H), 8.06 (d, 1H, J=8.3 Hz), 8.09-8.12 (m, 3H), 8.21 (d, 1H, J=8.4 Hz), 8.35 (d, 1H, J=8.4 Hz), 9.09 (d, 1H, J=7.7 Hz), 9.17 (d, 1H, J=7.7 Hz), 10.77 (brs, 1H, D$_2$O exch.). $^{13}$C-NMR (151 MHz, acetone-d$_6$) δ 25.25, 29.28, 29.35, 66.90, 68.29, 106.33, 107.00, 112.07, 112.47, 112.60, 113.56, 118.65, 124.05, 124.25, 124.98, 127.79, 128.30, 130.37, 130.67, 132.26, 132.86, 133.59, 134.85, 140.77, 142.00, 147.42, 148.06, 151.55, 154.50, 172.51, 174.10. MS (ESI) m/z: calcd for C$_{33}$H$_{28}$N$_6$O$_4$, [M1+H]$^+$ =573.2245, found 573.2245.

Step 5: Synthesis of 1-ethyl-2,3,3-trimethyl-3H-indol-1-ium iodide (8)

2,3,3-Trimethylindolenine (7, 2 g, 18.8 mmol) was dissolved in toluene (15 ml) and then ethyl iodide (3.5 ml, 39.5 mmol) was added. The mixture was heated at 100° C. under Ar atmosphere for 20 hrs. The reaction was cooled to room temperature, the solid was filtered under vacuum and was washed with a mixture of EtOAc/Et$_2$O (10 ml, 1/1 v/v) and air dried to provide pure 8 as pink solid (4.2 g, yield 71%). Mp 230-2° C. (reported 217-221° C.). $^1$H-NMR (600 MHz, DMSO-d$_6$) δ 1.45 (t, 3H, J=7.4 Hz), 1.54 (s, 6H), 2.85 (s, 3H), 4.51 (q, 2H, J=7.3 Hz), 7.60-7.65 (m, 2H), 7.83-7.87 (m, 1H), 7.96-8.00 (m, 1H). $^{13}$C-NMR (151 MHz, DMSO-d$_6$) δ 12.58, 13.82, 21.81, 43.00, 54.02, 115.21, 123.43, 128.84, 129.28, 140.61, 141.87, 195.99.

Step 6: Synthesis of (E)-2-chloro-3-(hydroxymethylene)cyclohex-1-enecarbaldehyde (10)

To a chilled solution of dry DCM (20 ml) and dry DMF (20 ml, 273 mmol) under Ar atmosphere, a solution of phosphorous oxychloride (17.5 ml, 115 mmol) in 20 ml dry DCM was added dropwise. After 30 min, cyclohexanone (9, 5 g, 50 mmol) was added dropwise and the resulting mixture was refluxed for 6 hrs. Upon cooling, the mixture was carefully poured into ice-water mixture and left standing overnight. The solid was filtered under vacuum and left to air dry so as to obtain 10 as yellow solid (5.4 g, yield 63%). Mp 126-8° C. (reported 129-131° C.). $^1$H-NMR (600 MHz, DMSO-d$_6$) δ 1.54-1.62 (m, 2H), 2.36 (brs, 4H). $^{13}$C-NMR (151 MHz, DMSO-d$_6$) δ 19.94, 23.67, 112.21, 126.89, 146.01, 149.49, 189.02.

Step 7: Synthesis of 2-((E)-2-((E)-2-chloro-3-((E)-2-(1-ethyl-3,3-dimethylindolin-2-ylidene)ethylidene)cyclohex-1-en-1-yl)vinyl)-1-ethyl-3,3-dimethyl-3H-indol-1-ium iodide (11)

Intermediate 8 (2.00 g, 6.34 mmol) and sodium acetate (0.26 g, 3.00 mmol) were added into a solution of the aldehyde 10 (0.52 g, 3.01 mmol) in acetic anhydride (18.6 ml) and this mixture was heated at 60° C. for 3 hrs under Ar atmosphere. Then the mixture was cooled to room temperature and filtered under vacuum. The precipitate was washed with a saturated aqueous solution of NaHCO$_3$ until no bubble appeared. The solid was washed with water twice and air dried to afford 11 as green-gold solid (1.2 g, yield 63%). Mp 267-9° C. $^1$H-NMR (600 MHz, methanol-d$_4$) δ 1.42 (t, 6H, J=7.3 Hz), 1.74 (s, 12H), 1.95-2.00 (m, 2H), 2.75 (t, 4H, J=6.2 Hz), 4.23 (q, 4H, J=7.3 Hz), 6.30 (d, 2H, J=14.1 Hz), 7.30 (td, 2H, J=7.4 Hz+0.6 Hz), 7.34 (d, 2H, J=7.9 Hz), 7.44 (td, 2H, J=8.0 Hz+1.1 Hz), 7.53 (d, 2H, J=7.3 Hz), 8.46 (d, 2H, J=14.1 Hz). $^{13}$C-NMR (151 MHz, methanol-d$_4$) δ 12.47, 22.13, 27.37, 28.23, 40.37, 50.67, 101.93, 112.04, 123.56, 126.57, 127.94, 129.94, 142.77, 143.17, 145.68, 151.19, 173.91.

Step 8: Synthesis of 1-ethyl-2-((E)-2-((E)-3-((E)-2-(1-ethyl-3,3-dimethylindolin-2-ylidene)ethylidene)-2-(piperazin-1-yl)cyclohex-1-en-1-yl)vinyl)-3,3-dimethyl-3H-indol-1-ium iodide (12)

Piperazine (203 mg, 2.35 mmol) was added into a solution of the chloro derivative 11 (300 mg, 0.47 mmol) in acetonitrile (20 ml) and this mixture was refluxed for 4 hrs under Ar atmosphere. Then, the organic solvent was evaporated under vacuum and the residue was purified by silica gel column chromatography using a mixture of dichloromethane/methanol (from 95/5 up to 90/10, v/v) as the eluent, to provide pure 12 as blue black solid (300 mg, yield 93%). Mp 188-190° C. $^1$H-NMR (600 MHz, acetone-d$_6$) δ 1.36 (t, 6H, J=7.2 Hz), 1.72 (s, 12H), 1.80-1.86 (m, 2H), 2.58 (t, 4H, J=6.6 Hz), 3.24-3.29 (m, 4H), 3.97-4.00 (m, 4H), 4.15 (q, 4H, J=7.2 Hz), 6.04 (d, 2H, J=13.4 Hz), 7.15 (td, 2H, J=7.5 Hz+0.7 Hz), 7.20 (d, 2H, J=7.9 Hz), 7.36 (td, 2H, J=7.8 Hz+1.1 Hz), 7.48 (d, 2H, J=7.4 Hz), 7.82 (d, 2H, J=13.4 Hz). $^{13}$C-NMR (151 MHz, acetone-d$_6$) δ 12.08, 22.66, 25.81, 29.27, 39.03, 48.00, 48.91, 56.27, 96.19, 110.22, 123.10, 124.13, 124.78, 129.31, 141.61, 141.65, 143.63, 169.14, 175.31.

Step 9: Synthesis of 1-ethyl-2-((E)-2-((E)-3-((E)-2-(1-ethyl-3,3-dimethylindolin-2-ylidene)ethylidene)-2-(4-(4-((2-methyl-6-((E)-(4-((E)-phenyldiazenyl) naphthalen-1-yl)diazenyl)-2,3-dihydro-1H-perimidin-2-yl)methoxy)-4-oxobutanoyl)piperazin-1-yl)cyclohex-1-en-1-yl)vinyl)-3,3-dimethyl-3H-indol-1-ium iodide (13)

1-Ethyl-3-(3-dimethylaminopropyl)carbodiimide hydrochloride (EDC-HCl, 31 mg, 0.16 mmol) and 1-hydroxybenzotriazole (HOBt, 22 mg, 0.16 mmol) were added into a solution of the carboxylic acid 6 (83 mg, 0.14 mmol) in dry DCM (3 mL) and this mixture was stirred at room temperature for 40 min, under Ar atmosphere. Then, cyanine intermediate 12 (96 mg, 0.14 mmol) and N-methylmorpholine (0.03 mL, 0.29 mmol) were added at 0° C. and the mixture was stirred for 10 min at this temperature and then at room temperature for 20 hrs. Upon completion of the reaction, the organic solvent was evaporated under vacuum and the residue was purified by silica gel column chromatography using a mixture of ethyl acetate/methanol (100/10, v/v) as the eluent. A second purification was necessary, using a mixture of dichloromethane/methanol (from 95/5 up to 90/10, v/v) as the eluent, in order to obtain pure 13 as blue black solid (yield 60%). Mp 188-190° C. $^1$H-NMR (600 MHz, acetone-d$_6$) δ 1.34 (t, 6H, J=7.2 Hz), 1.66 (s, 12H), 1.72-1.77 (m, 5H), 2.49 (t, 4H, J=6.4 Hz), 2.55-2.72 (m, 4H), 3.69-3.73 (brs, 2H), 3.73-3.78 (brs, 2H), 3.84-3.89 (brs, 2H), 3.91-3.96 (brs, 2H), 4.13 (q, 4H, J=7.2 Hz), 4.29 (d, 1H, J=11.0 Hz), 4.52 (d, 1H, J=11.0 Hz), 6.03 (d, 2H, J=13.6 Hz), 6.38 (brs, 1H, D$_2$O exch.), 6.69 (d, 1H, J=7.3 Hz), 6.81 (d, 1H, J=8.5 Hz), 7.13 (t, 2H, J=7.4 Hz), 7.20 (d, 2H, J=7.9 Hz), 7.34 (t, 2H, J=7.5 Hz), 7.40 (t, 1H, J=7.9 Hz), 7.43 (d, 2H, J=7.3 Hz), 7.48 (brs, 1H, D$_2$O exch.), 7.60 (t, 1H, J=7.2 Hz), 7.66 (t, 2H, J=7.2 Hz), 7.69 (t, 1H, J=7.5 Hz), 7.76 (t, 1H, J=7.2 Hz), 7.83 (d, 2H, J=13.6 Hz), 8.00-8.05 (m, 2H), 8.10 (d, 2H, J=7.5 Hz), 8.20 (d, 1H, J=8.4 Hz), 8.28 (d, 1H, J=8.2 Hz), 9.07 (d, 1H, J=8.4 Hz), 9.10 (d, 1H, J=8.4 Hz). $^{13}$C-NMR (151 MHz, acetone-d$_6$) δ 12.22, 22.60, 25.72, 25.81, 29.08, 29.11, 30.43, 39.32, 44.14, 47.64, 49.25, 55.47, 67.43, 68.92, 71.42, 97.66, 106.44, 106.79, 110.68, 111.80, 112.02, 112.44, 113.59, 118.96, 123.23, 124.03, 124.24, 124.77, 124.99, 126.15, 127.69, 128.27, 129.39, 130.41, 130.78, 132.28, 132.79, 133.64, 134.86, 140.45, 141.78, 142.59, 143.37, 147.85, 148.13, 151.53, 154.51, 170.31, 171.32, 172.76.

Example 2

Synthesis of 1-ethyl-2-((E)-2-((E)-3-((E)-2-(1-ethyl-3,3-dimethylindolin-2-ylidene)ethylidene)-2-((4-(4-((2-methyl-6-((E)-(4-((E)-phenyldiazenyl)naphthalen-1-yl)diazenyl)-2,3-dihydro-1H-perimidin-2-yl)methoxy)-4-oxobutanamido)butyl)amino)cyclohex-1-en-1-yl)vinyl)-3,3-dimethyl-3H-indol-1-ium iodide (15, Scheme 2), (GLF 16)

Scheme 2

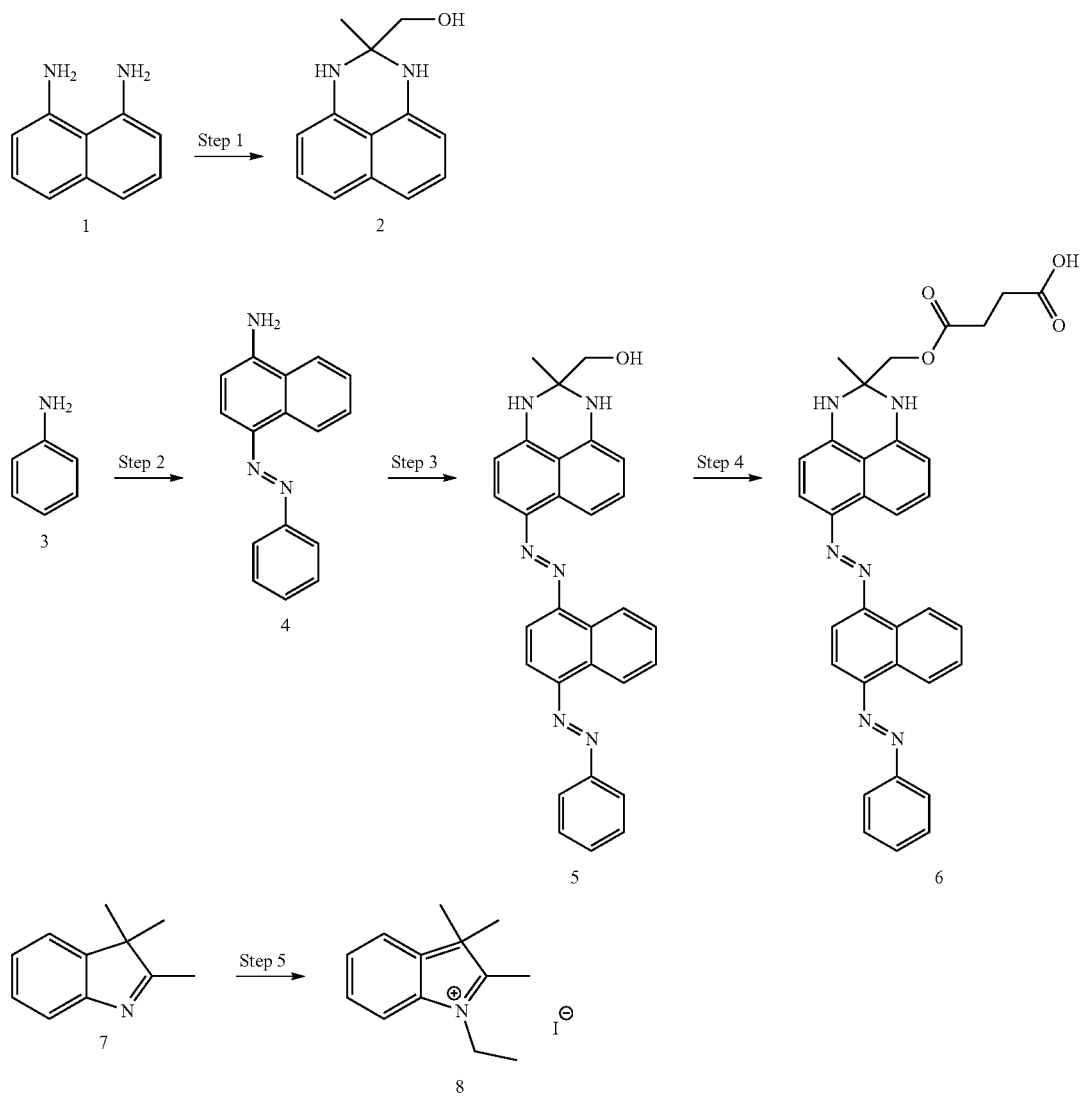

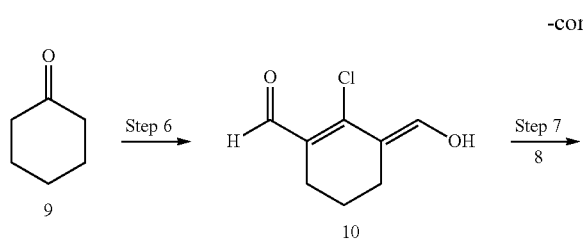
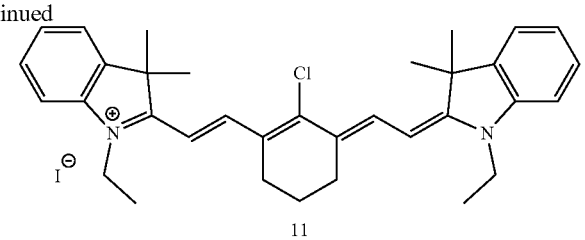
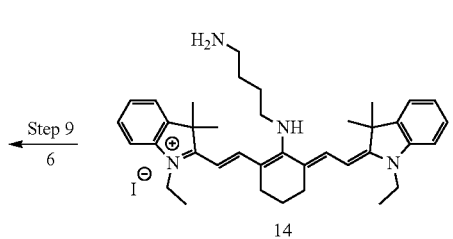
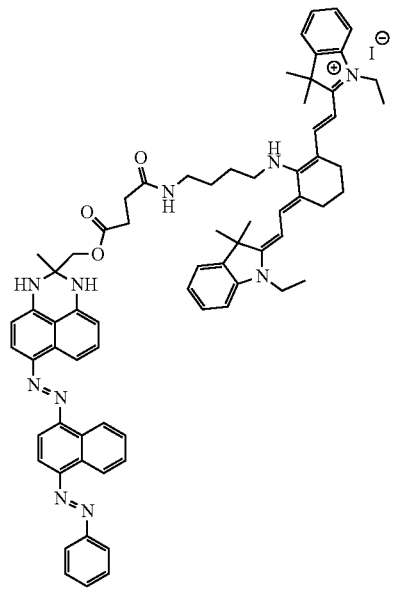

Step 8: Synthesis of 2-((E)-2-((E)-2-((4-aminobutyl)amino)-3-((E)-2-(1-ethyl-3,3-dimethylindolin-2-ylidene)ethylidene)cyclohex-1-en-1-yl)vinyl)-1-ethyl-3,3-dimethyl-3H-indol-1-ium iodide (14)

1,4-Diaminobutane (551 mg, 6.25 mmol) was added into a solution of the chloro derivative 11 (800 mg, 1.25 mmol, its synthesis is described at steps 5-7 of the typical example 1) in acetonitrile (20 ml) and this mixture was refluxed for 5 hrs under Ar atmosphere. Then, the organic solvent was evaporated under vacuum and the residue was purified by silica gel column chromatography using a mixture of dichloromethane/methanol (from 95/5 up to 80/20, v/v) as the eluent, to provide pure 14 as blue black solid (150 mg, yield 17%). Mp 148-150° C. $^1$H-NMR (400 MHz, methanol-$d_4$) δ 1.35 (t, 6H, J=7.0 Hz), 1.68 (s, 12H), 1.70-1.79 (m, 2H), 1.80-1.95 (m, 4H), 2.57 (t, 4H, J=6.2 Hz), 2.91-2.99 (m, 2H), 3.82 (t, 2H, J=7.2 Hz), 4.02 (q, 4H, J=7.7 Hz), 5.86 (d, 2H, J=13.1 Hz), 7.06-7.15 (m, 4H), 7.34 (t, 2H, J=7.2 Hz), 7.39 (d, 2H, J=7.2 Hz), 7.79 (d, 2H, J=13.3 Hz). $^{13}$C-NMR (100 MHz, methanol-$d_4$) δ 11.77, 22.90, 25.98, 26.15, 29.18, 29.54, 38.93, 40.39, 51.14, 95.31, 109.92, 121.47, 123.15, 124.06, 129.47, 140.26, 141.43, 143.96, 168.86, 170.58.

Step 9: Synthesis of 1-ethyl-2-((E)-2-((E)-3-((E)-2-(1-ethyl-3,3-dimethylindolin-2-ylidene)ethylidene)-2-((4-(4-((2-methyl-6-((E)-(4-((E)-phenyldiazenyl)naphthalen-1-yl)diazenyl)-2,3-dihydro-1H-perimidin-2-yl)methoxy)-4-oxobutanamido)butyl)amino)cyclohex-1-en-1-yl)vinyl)-3,3-dimethyl-3H-indol-1-ium iodide (15), (GLF 16)

1-Ethyl-3-(3-dimethylaminopropyl)carbodiimide hydrochloride (EDC-HCl, 31 mg, 0.16 mmol) and 1-hydroxybenzotriazole (HOBt, 22 mg, 0.16 mmol) were added into a solution of the carboxylic acid 6 (83 mg, 0.14 mmol, its synthesis is described at steps 1-4 of the typical example 1) in dry DCM (3 ml) and this mixture was stirred at room temperature for 40 min, under Ar atmosphere. Then, cyanine intermediate 14 (97 mg, 0.14 mmol) and N-methylmorpholine (0.03 ml, 0.29 mmol) were added at 0° C. and the mixture was stirred for 10 min at this temperature and then at room temperature for 20 hrs. Upon completion of the reaction, the organic solvent was evaporated under vacuum and the residue was purified by silica gel column chromatography using a mixture of dichloromethane/methanol (from 95/5 up to 90/10, v/v) as the eluent, in order to obtain pure 15 as blue black solid (yield 55%). Mp 173-5° C. $^1$H-NMR (600 MHz, acetone-$d_6$) δ 1.26-1.31 (m, 6H), 1.60-1.65 (m, 15H), 1.68-1.72 (m, 2H), 1.74-1.79 (m, 2H), 1.95-2.01 (m, 2H), 2.52 (t, 4H, J=6.2 Hz), 2.56-2.67 (m, 4H), 3.34 (q, 2H, J=6.6 Hz), 3.84-3.90 (m, 2H), 3.97-4.03 (m, 4H), 4.19 (d, 1H, J=10.7 Hz), 4.37 (d, 1H, J=10.8 Hz), 5.81 (d, 2H, J=12.9 Hz), 6.42 (brs, 1H, D$_2$O exch.), 6.73 (d, 1H, J=7.4 Hz), 6.82-6.85 (m, 1H), 6.99-7.06 (m, 4H), 7.25 (t, 2H, J=7.3 Hz), 7.35 (d, 2H, J=7.3 Hz), 7.41 (t, 1H, J=7.9 Hz), 7.52 (brs, 1H, D$_2$O exch.), 7.59 (t, 1H, J=7.3 Hz), 7.65 (t, 2H, J=7.6 Hz), 7.72-7.81 (m, 4H), 7.87-7.90 (m, 1H, D$_2$O exch), 8.02-8.07 (m, 2H), 8.11 (d, 2H, J=7.2 Hz), 8.18 (d, 1H, J=8.4 Hz), 8.32 (d, 1H, J=8.4 Hz), 9.08 (d, 1H, J=8.2 Hz), 9.14 (d, 1H, J=7.9 Hz). $^{13}$C-NMR (151 MHz, acetone-d$_6$) δ 11.84, 22.50, 25.49, 26.11, 27.72, 29.18, 30.95, 31.82, 38.68, 39.27, 48.56, 51.12, 67.16, 67.23, 67.98, 95.04, 106.61, 107.06, 109.60, 111.94, 112.21, 112.50, 113.59, 119.01, 121.30, 123.03, 123.57, 124.03, 124.22, 125.04, 127.71, 128.26, 129.12, 130.38, 130.71, 132.23, 132.79, 133.62, 134.87, 139.38, 140.60, 141.20, 142.28, 143.77, 147.87, 147.98, 151.66, 154.51, 168.00, 170.44, 172.60, 172.88.

Example 3

Synthesis of 1-ethyl-2-((E)-2-((E)-3-((E)-2-(1-ethyl-3,3-dimethylindolin-2-ylidene)ethylidene)-2-((4-((4-((2-methyl-6-((E)-(4-((E)-phenyldiazenyl)naphthalen-1-yl)diazenyl)-2,3-dihydro-1H-perimidin-2-yl)methoxy)-4-oxobutanoyl)oxy)phenyl)amino)cyclohex-1-en-1-yl)vinyl)-3,3-dimethyl-3H-indol-1-ium iodide (17, Scheme 3)

Scheme 3

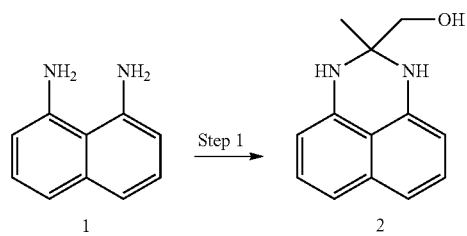

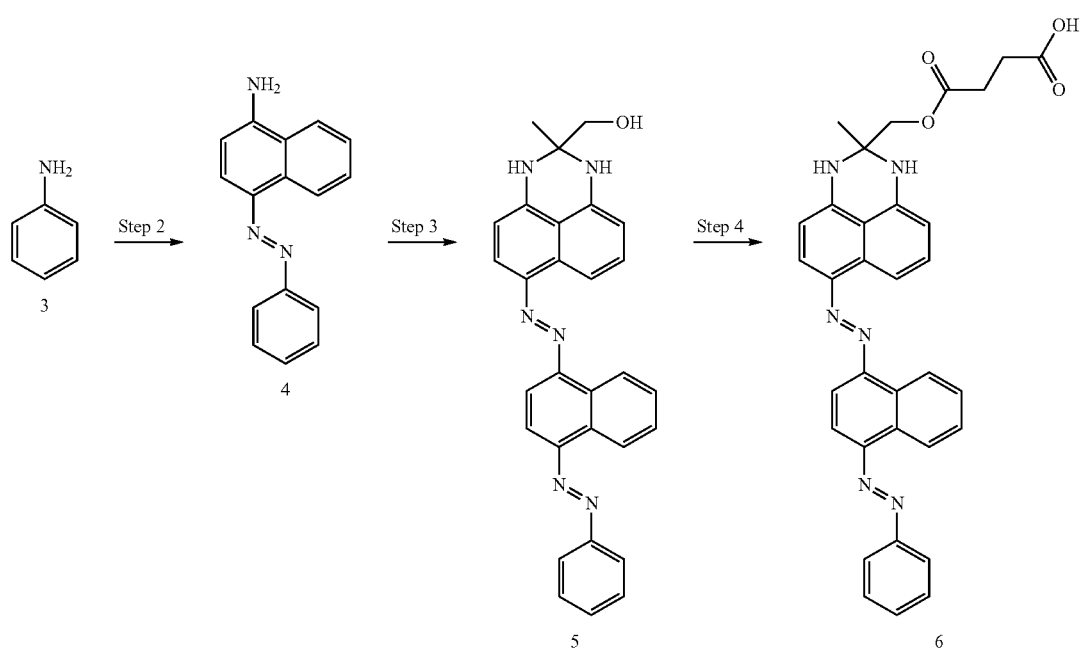

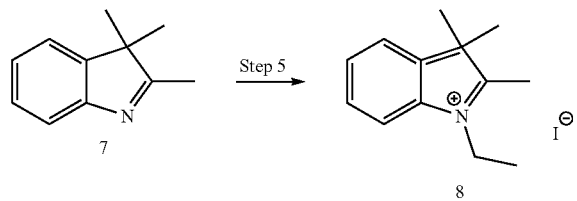

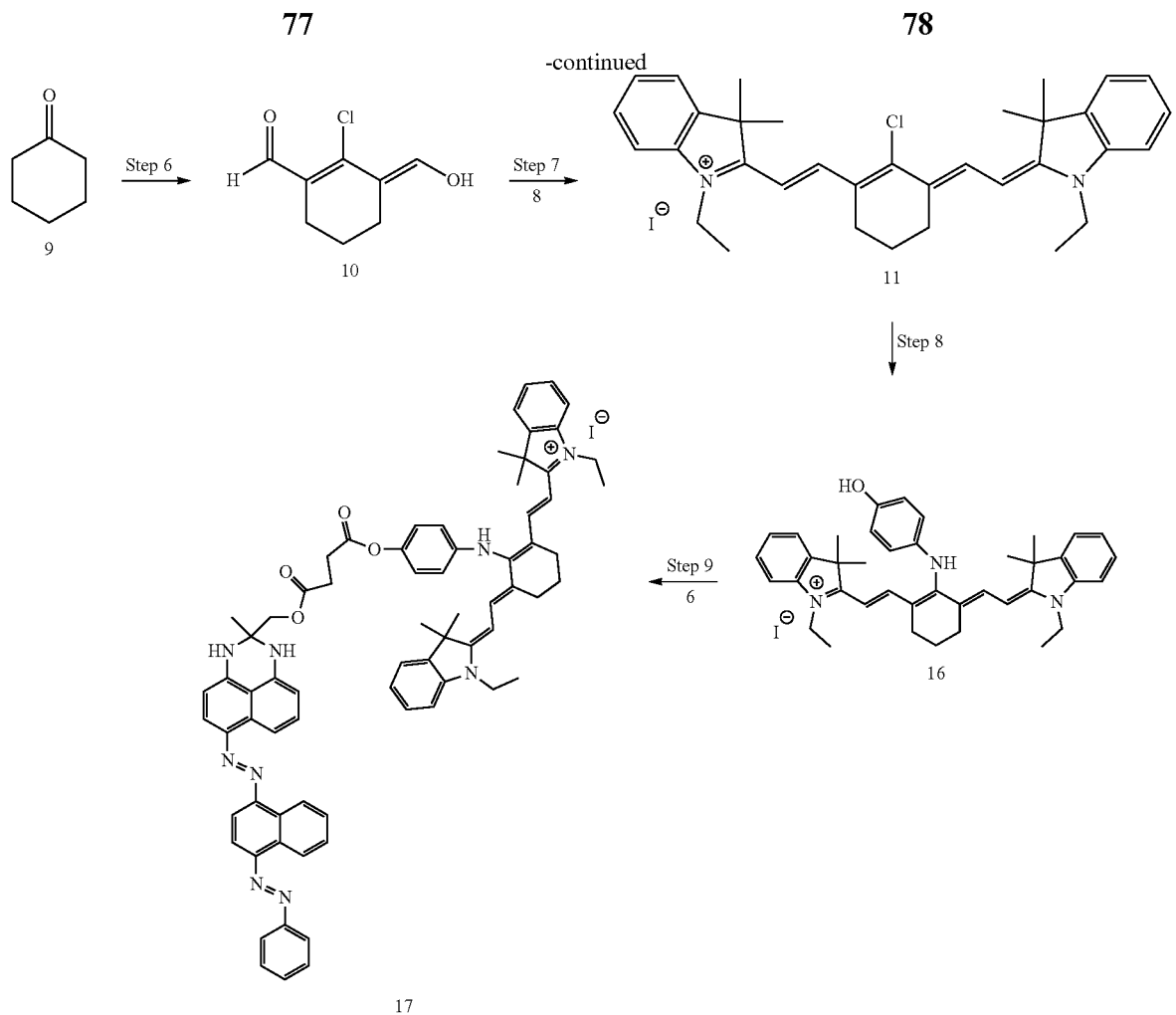

Step 8: Synthesis of 1-ethyl-2-((E)-2-((E)-3-((E)-2-(1-ethyl-3,3-dimethylindolin-2-ylidene)ethylidene)-2-((4-hydroxyphenyl)amino)cyclohex-1-en-1-yl)vinyl)-3,3-dimethyl-3H-indol-1-ium iodide (16)

4-Aminophenol (154 mg, 1.41 mmol) was added into a solution of the chloro derivative 11 (300 mg, 0.47 mmol, its synthesis is described at steps 5-7 of the typical example 1) in acetonitrile (20 ml) and this mixture was refluxed for 20 hrs under Ar atmosphere. Then, the organic solvent was evaporated under vacuum and the residue was purified by silica gel column chromatography using a mixture of dichloromethane/methanol (from 98/2 up to 95/5, v/v) as the eluent. A second purification was necessary, using a mixture of ethyl acetate/methanol (from 90/10 up to 80/20, v/v) as the eluent, in order to obtain pure 16, as blue black solid (150 mg, yield 45%). Mp 267-9° C. $^1$H-NMR (400 MHz, DMSO-$d_6$) δ 1.22 (t, 6H, J=6.9 Hz), 1.33 (s, 12H), 1.79-1.88 (m, 2H), 2.53-2.63 (m, 4H), 4.01-4.11 (m, 4H), 5.93 (d, 2H, J=13.6 Hz), 6.72 (d, 2H, J=8.5 Hz), 6.97 (d, 2H, J=8.5 Hz), 7.10 (t, 2H, J=7.4 Hz), 7.22 (d, 2H, J=7.9 Hz), 7.31 (t, 2H, J=7.6 Hz), 7.42 (d, 2H, J=7.3 Hz), 7.93 (d, 2H, J=13.5 Hz), 8.95 (brs, 1H, $D_2O$ exch.), 9.10 (brs, 1H, $D_2O$ exch.). $^{13}$C-NMR (100 MHz, DMSO-$d_6$) δ 11.63, 21.47, 24.29, 27.61, 37.90, 47.72, 96.61, 109.72, 116.40, 120.11, 122.14, 122.51, 123.39, 128.25, 137.94, 140.40, 141.53, 142.02, 152.34, 160.63, 168.66.

Step 9: Synthesis of 1-ethyl-2-((E)-2-((E)-3-((E)-2-(1-ethyl-3,3-dimethylindolin-2-ylidene)ethylidene)-2-((4-((4-((2-methyl-6-((E)-(4-((E)-phenyldiazenyl)naphthalen-1-yl)diazenyl)-2,3-dihydro-1H-perimidin-2-yl)methoxy)-4-oxobutanoyl)oxy)phenyl)amino)cyclohex-1-en-1-yl)vinyl)-3,3-dimethyl-3H-indol-1-ium iodide (17)

DCC (33 mg, 0.16 mmol) and DMAP (4 mg, 0.03 mmol) were added under argon, into a solution of the carboxylic acid 6 (83 mg, 0.14 mmol, its synthesis is described at steps 1-4 of the typical example 1) in anhydrous dichloromethane (3 ml), and this mixture was stirred at room temperature for 40 min, followed by the addition of the cyanine intermediate 16 (100 mg, 0.14 mmol). The reaction mixture was stirred at room temperature for 48 hrs. Then the organic solvent was evaporated under reduced pressure and the residue was purified by flash column chromatography, using a mixture of dichloromethane/methanol (from 95/5 up to 80/20, v/v) as the eluent, to provide pure 17 as blue black solid (yield 17%). Mp 194-6° C. $^1$H-NMR (600 MHz, acetone-$d_6$) δ 1.32 (t, 6H, J=7.2 Hz), 1.39 (s, 12H), 1.60 (s, 3H), 1.85-1.93 (m, 2H), 2.60-2.65 (m, 6H), 2.74-2.80 (m, 2H, overlapping with $H_2O$ of acetone-$d_6$), 4.13 (q, 4H, J=7.2 Hz), 4.26 (d, 1H, J=10.9 Hz), 4.33 (d, 1H, J=10.9 Hz), 6.12 (d, 2H, J=13.8 Hz), 6.24 (brs, 1H, $D_2O$ exch.), 6.64 (d, 1H, J=7.4 Hz), 6.72 (d, 1H, J=8.4 Hz), 6.99 (d, 2H, J=8.9 Hz), 7.10-7.15 (m, 4H), 7.20-7.23 (m, 3H), 7.32 (t, 2H, J=7.7 Hz), 7.37 (d, 2H, J=7.3 Hz), 7.40 (t, 1H, J=7.4 Hz), 7.60 (t, 1H, J=7.3 Hz), 7.66 (t, 2H, J=7.5 Hz), 7.75-7.81 (m, 2H), 8.05-8.12 (m, 4H), 8.15 (d, 2H, J=13.8 Hz), 8.19 (d, 1H, J=8.4 Hz), 8.33 (d, 1H, J=8.4 Hz), 9.09 (d, 1H, J=7.7 Hz), 9.17 (d, 1H, J=9.0 Hz). $^{13}$C-NMR (151 MHz, acetone-$d_6$) δ 12.35, 22.54, 25.32, 25.41, 28.53, 29.84 (overlapping with acetone-$d_6$), 39.62, 49.59, 67.08, 68.73, 99.22, 106.40, 106.98, 111.02, 111.99, 112.30, 112.57, 113.59, 118.19, 118.93, 123.18, 123.85, 124.05, 124.26, 125.02, 125.17, 125.72, 127.79, 128.32, 129.36, 130.40, 130.73, 132.29, 132.83, 133.62, 134.81, 140.70, 142.11, 142.16, 143.20, 143.97, 145.26, 145.89, 147.72, 147.98, 151.63, 154.50, 159.32, 171.72, 172.33, 172.35.

Example 4

Synthesis of 1-ethyl-2-((E)-2-((E)-3-((E)-2-(1-ethyl-3,3-dimethylindolin-2-ylidene)ethylidene)-2-(4-(4-((2-methyl-6-((E)-(4-((E)-phenyldiazenyl)naphthalen-1-yl)diazenyl)-2,3-dihydro-1H-perimidin-2-yl)methoxy)-4-oxobutanamido)phenoxy)cyclohex-1-en-1-yl)vinyl)-3,3-dimethyl-3H-indol-1-ium iodide (19, Scheme 4)

Scheme 4

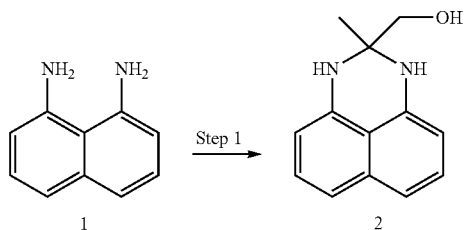

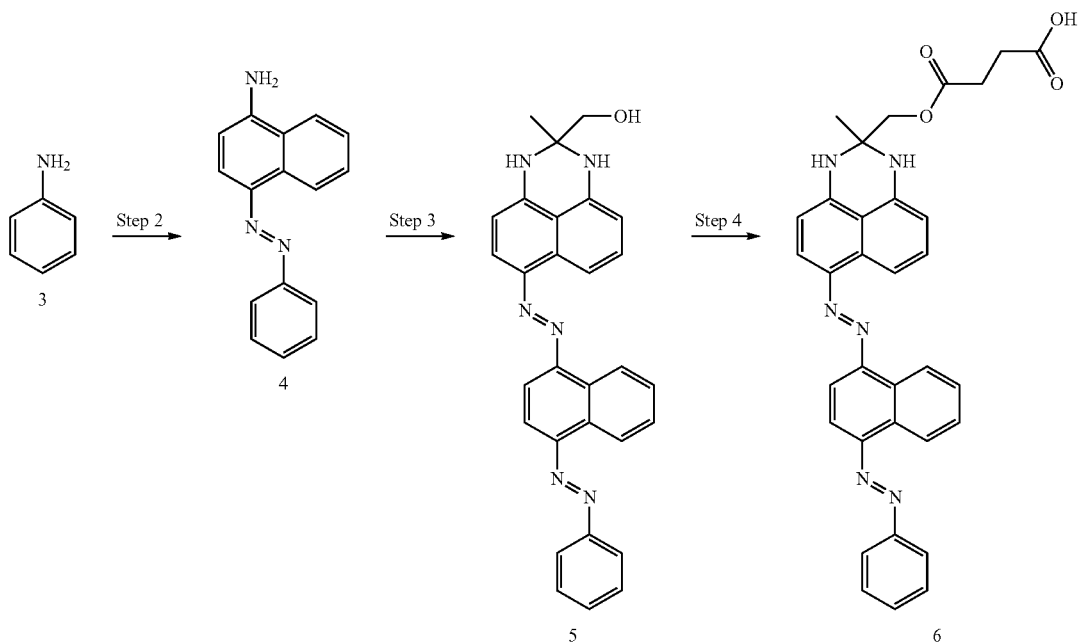

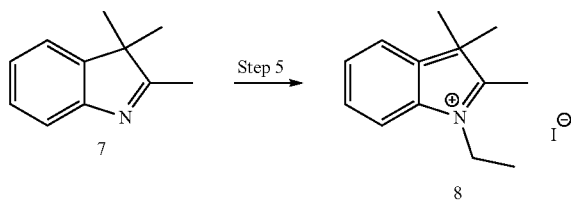

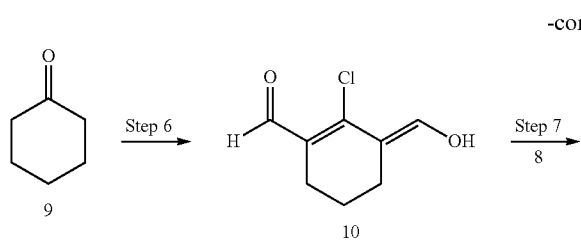
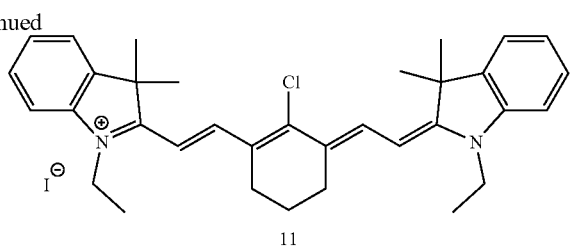
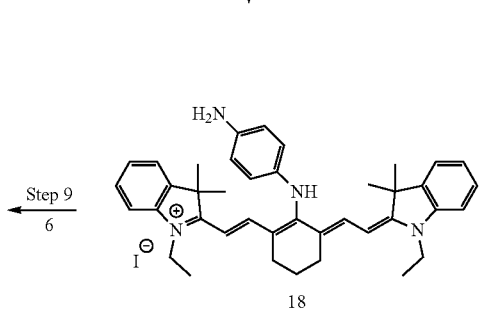
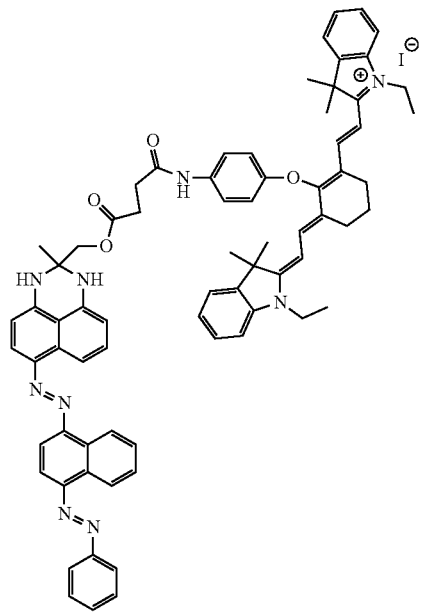

Step 8: Synthesis of 2-((E)-2-((E)-2-(4-aminophenoxy)-3-((E)-2-(1-ethyl-3,3-di methylindolin-2-ylidene)ethylidene)cyclohex-1-en-1-yl)vinyl)-1-ethyl-3,3-dimethyl-3H-indol-1-ium iodide (18)

Potassium carbonate (48 mg, 0.34 mmol) was added into a solution of 4-aminophenol (34 mg, 0.31 mmol) in acetonitrile (10 ml) and this mixture was heated at 50° C. for 30 min under Ar atmosphere. Then, the chloro derivative 11 (200 mg, 0.31 mmol, its synthesis is described at steps 5-7 of the typical example 1) was added and the mixture was refluxed for 5 hrs under Ar atmosphere. The organic solvent was evaporated under vacuum and the residue was purified by silica gel column chromatography, using a mixture of dichloromethane/methanol (from 100/0 up to 90/10, v/v) as the eluent, to provide 18 as blue black solid (150 mg, yield 67%). Mp 268-271° C. $^1$H-NMR (600 MHz, DMSO-$d_6$) δ 1.26 (t, 6H, J=7.2 Hz), 1.34 (s, 12H), 1.85-1.95 (m, 2H), 2.69 (t, 4H, J=5.8 Hz), 4.16 (q, 4H, J=7.0 Hz), 4.80-5.00 (brs, 2H, D$_2$O exch.), 6.15 (d, 2H, J=14.3 Hz), 6.59 (d, 2H, J=8.7 Hz), 6.85 (d, 2H, J=8.8 Hz), 7.20 (t, 2H, J=7.1 Hz), 7.32-7.41 (m, 4H), 7.51 (d, 2H, J=7.4 Hz), 7.90 (d, 2H, J=14.2 Hz). $^{13}$C-NMR (151 MHz, DMSO-$d_6$) δ 11.97, 20.71, 23.70, 27.15, 38.60, 48.47, 99.50, 110.78, 114.56, 115.26, 121.91, 122.34, 124.60, 128.42, 140.97, 141.20, 141.59, 151.63, 163.91, 170.96.

Step 9: Synthesis of 1-ethyl-2-((E)-2-((E)-3-((E)-2-(1-ethyl-3,3-dimethylindolin-2-ylidene)ethylidene)-2-(4-(4-((2-methyl-6-((E)-(4-((E)-phenyldiazenyl) naphthalen-1-yl)diazenyl)-2,3-dihydro-1H-perimidin-2-yl)methoxy)-4-oxobutanamido) phenoxy)cyclohex-1-en-1-yl)vinyl)-3,3-dimethyl-3H-indol-1-ium iodide (19)

1-Ethyl-3-(3-dimethylaminopropyl)carbodiimide hydrochloride (EDC-HCl, 31 mg, 0.16 mmol) and 1-hydroxybenzotriazole (HOBt, 22 mg, 0.16 mmol) were added into a solution of the carboxylic acid 6 (83 mg, 0.14 mmol, its synthesis is described at steps 1-4 of the typical example 1) in dry DCM (3 ml) and this mixture was stirred at room temperature for 40 min, under Ar atmosphere. Then, cyanine intermediate 18 (100 mg, 0.14 mmol) and N-methylmorpholine (0.03 ml, 0.29 mmol) were added at 0° C. and the mixture was stirred for 10 min at this temperature and then at room temperature for 20 hrs. Upon completion of the reaction, the organic solvent was evaporated under vacuum and the residue was purified by silica gel column chromatography using a mixture of dichloromethane/methanol (from 95/5 up to 90/10, v/v) as the eluent to provide pure 19 as blue black solid (yield 45%). Mp 166-8° C. $^1$H-NMR (400 MHz, DMSO-$d_6$) δ 1.18-1.31 (m, 18H), 1.46 (s, 3H), 1.85-1.93 (m, 2H), 2.53-2.62 (m, 4H), 2.63-2.78 (m, 4H), 4.04 (d, 1H, J=10.7 Hz), 4.09-4.18 (m, 5H), 6.15 (d, 2H, J=14.3 Hz), 6.54 (d, 1H, J=7.2 Hz), 6.60 (d, 1H, J=8.6 Hz), 6.85 (brs, 1H, D$_2$O exch.), 7.09 (d, 2H, J=9.0 Hz), 7.12-7.17 (m, 2H), 7.31-7.39 (m, 5H), 7.41 (d, 2H, J=7.2 Hz), 7.58-7.64 (m, 3H), 7.67 (t, 2H, J=7.3 Hz), 7.77-7.84 (m, 4H), 7.96-8.01 (m, 3H), 8.08 (d, 2H, J=7.2 Hz), 8.13 (d, 1H, J=2.8 Hz), 8.15 (d, 1H, J=3.1 Hz), 8.99-9.03 (m, 1H), 9.06-9.10 (m, 1H), 9.97 (brs, 1H, D$_2$O exch.). $^{13}$C-NMR (100 MHz, DMSO-d$_6$) δ 12.07, 20.64, 23.69, 24.37, 27.13, 28.68, 30.63, 38.69, 48.51, 65.46, 67.06, 99.81, 105.17, 105.51, 109.81, 110.16, 110.91, 111.33, 112.74, 114.39, 118.66, 120.92, 121.50, 122.37, 122.93, 123.05, 123.76, 124.72, 127.02, 127.66, 128.48, 129.60, 130.17, 131.03, 131.57, 131.98, 133.22, 133.75, 138.51, 140.82, 140.97, 141.29, 141.56, 145.97, 147.07, 149.97, 152.82, 155.21, 162.71, 169.73, 171.05, 172.01.

Example 5

Synthesis of 2-((E)-2-((E)-2-(4-(4-(4-((E)-(4-((E)-(2,2-dimethyl-2,3-dihydro-1H-perimidin-6-yl)diazenyl)naphthalen-1-yl)diazenyl)phenethoxy)-4-oxobutanoyl)piperazin-1-yl)-3-((E)-2-(1-ethyl-3,3-dimethylindolin-2-ylidene)ethylidene)cyclohex-1-en-1-yl)vinyl)-1-ethyl-3,3-dimethyl-3H-indol-1-ium iodide (25, Scheme 5)

Scheme 5

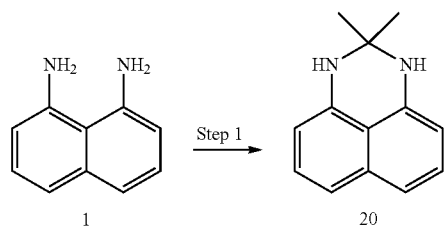

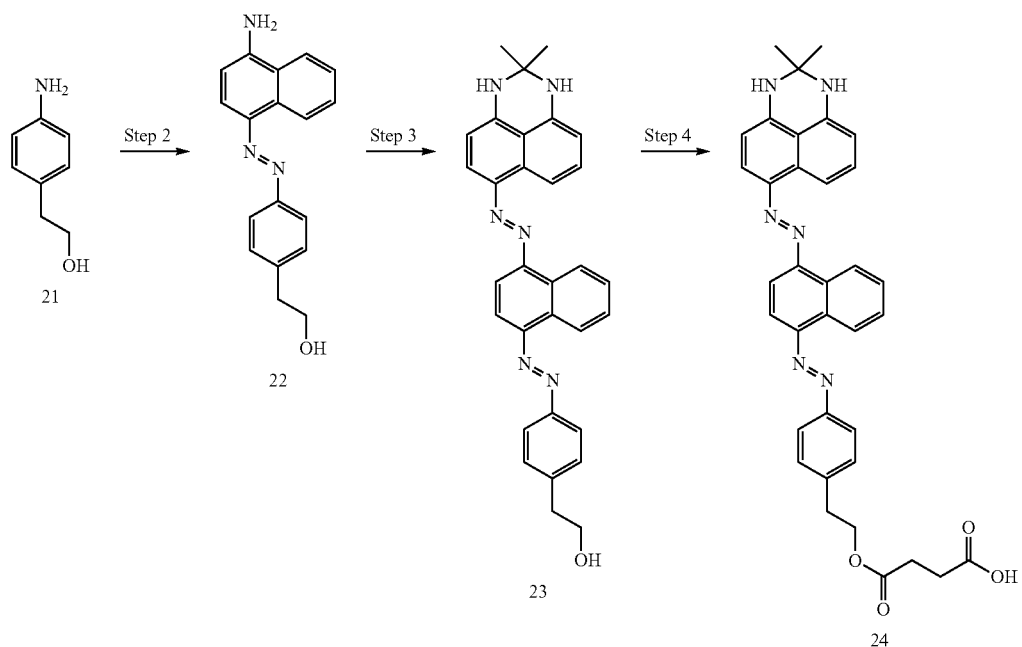

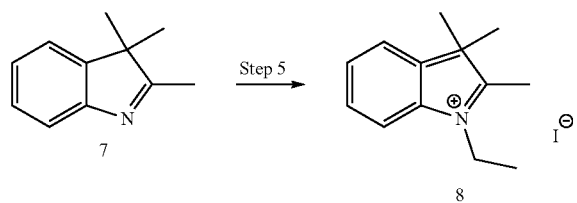

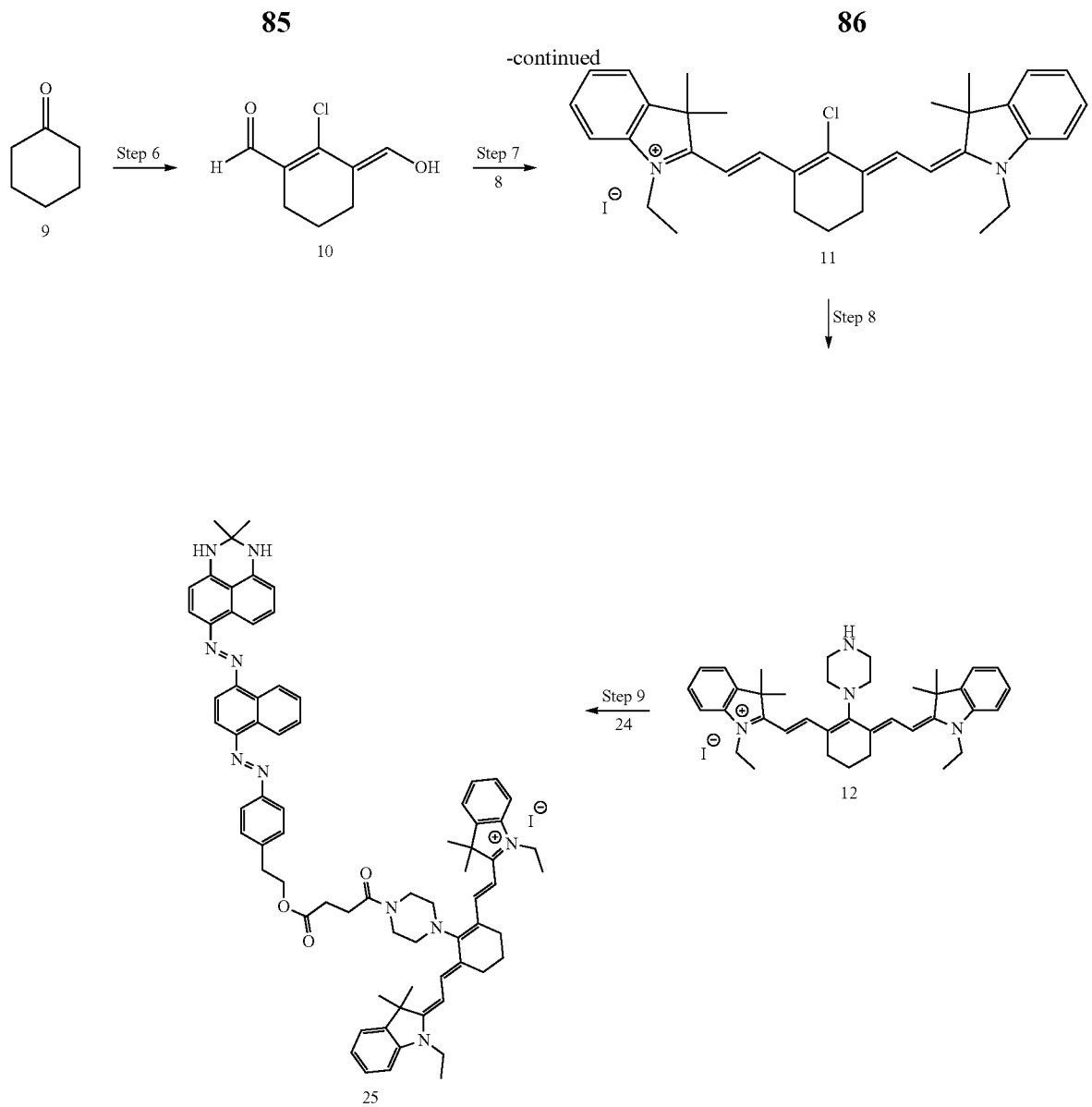

Step 1: Synthesis of 2,2-dimethyl-2,3-dihydro-1H-perimidine (20)

A solution of 1,8-diaminonaphthalene (1, 4 g, 25.28 mmol) in acetone (14 ml) was stirred at room temperature for 3 days. Upon completion of the reaction, the solvent was evaporated under reduced pressure, diethylether (40 ml) was added into the oily residue and evaporated, causing the crystallization of the perimidine 20. By this procedure 5 g of the perimidine 20 were obtained, as a beige solid. Yield 100%. Mp 114-6° C. (reported 115-6° C.).[6] 1H NMR (600 MHz, CDCl$_3$) δ 1.46 (s, 6H), 4.14 (brs, 2H, D$_2$O exch.), 6.48 (d, 2H, J=7.3 Hz), 7.19 (d, 2H, J=7.9 Hz), 7.27 (t, 2H, J=7.4 Hz+8.1 Hz). 13C NMR (151 MHz, CDCl$_3$) δ 28.80, 64.62, 106.06, 113.05, 117.14, 127.12, 134.70, 140.34.

Step 2: Synthesis of (E)-2-(4-((4-aminonaphthalen-1-yl)diazenyl)phenyl)ethanol (22)

2-(4-Aminophenyl)ethanol (21, 4 g, 29.16 mmol) was added into a mixture of H$_2$O (12 ml) and HCl (10N, 6.4 ml) at 0° C. followed by dropwise addition of an aqueous solution (6 ml) of NaNO$_2$ (2.21 g, 32.03 mmol) over a period of 10 min and then this mixture was stirred at 0° C. for 100 min. Then 0.6 g of sodium acetate trihydrate was added to the solution and stirring was continued for additional 15 min. This solution of the diazonium salt was added dropwise into a suspension of 1-naphthylamine (4.15 g, 29 mmol) in a mixture of H$_2$O (80 ml), EtOH (9 ml) and HCl (10N, 3 ml) over a period of 30 min. The deep purple colored suspension was stirred at 0° C. for 90 min and then at room temperature for 16 hrs. The solution was then neutralized with addition of saturated aqueous solution of NaHCO$_3$ and the resulting precipitate was filtered under vacuum, washed with H$_2$O adequately and air dried. The crude product was purified by column chromatography using a mixture of dichloromethane/ethyl acetate (from 100/5 up to 100/25, v/v) as the eluent to provide 5.2 g of 22 as an orange colored solid. Yield 62%. Mp 110-2° C. (reported 110-2° C.).[1] 1H NMR (600 MHz, DMSO-d6) δ 2.81 (t, 2H, J=6.9 Hz), 3.67 (q, 2H, J=6.9 Hz+5.5 Hz), 4.69 (t, 1H, D$_2$O exch., J=5.3 Hz), 6.77 (d, 1H, J=8.5 Hz), 6.85 (brs, 2H, D$_2$O exch.), 7.38 (d, 2H, J=8.1 Hz), 7.48 (t, 1H, J=7.8 Hz+7.3 Hz), 7.62 (t, 1H, J=7.9 Hz+7.3 Hz), 7.80 (d, 2H, J=8.1 Hz), 7.88 (d, 1H, J=8.5 Hz), 8.20 (d, 1H, J=8.5 Hz), 8.90 (d, 1H, J=8.5 Hz). 13C NMR (151 MHz, DMSO-d6) δ 38.82, 62.01, 107.31, 114.78, 121.23, 121.76, 122.61, 122.72, 124.28, 127.29, 129.72, 133.14, 136.84, 141.16, 149.96, 151.60.

Step 3: Synthesis of 2-(4-((E)-(4-((E)-(2,2-dimethyl-2,3-dihydro-1H-perimidin-6-yl)diazenyl)naphthalen-1-yl)diazenyl)phenyl)ethanol (23)

(E)-2-(4-((4-aminonaphthalen-1-yl)diazenyl)phenyl) ethanol (22, 873 mg, 3 mmol) was added into a mixture of H$_2$O (9 ml), HCl (10N, 0.9 ml) and N,N-dimethylformamide (0.6 ml) at 0° C. followed by dropwise addition of an aqueous solution (2 ml) of NaNO$_2$ (207 mg, 3 mmol) over a period of 10 min and then this mixture is stirred at 0° C. for 2 hrs. Then sodium acetate trihydrate (180 mg) was added to the solution and stirring was continued for additional 15 min. This solution of the diazonium salt was added dropwise into a solution of 2,2-dimethyl-2,3-dihydro-1H-perimidine (20, 594 mg, 3 mmol) in EtOH (10 ml) over a period of 10 min. The deep purple colored suspension was stirred at 0° C. for 30 min and then at room temperature for 90 min. The solution was then neutralized with addition of saturated aqueous solution of NaHCO$_3$ and the resulting precipitate was filtered under vacuum, washed with H$_2$O adequately and air dried. The crude product was purified by column chromatography using a mixture of dichloromethane/ethyl acetate (from 100/1 up to 100/10, v/v) as the eluent to provide 1 g of 23 as a black solid. Yield 67%. M.p. 249-252° C.$_{(decomp.)}$ (reported 249-252° C.$_{(decomp.)}$).[1] $^1$H-NMR (600 MHz, DMSO-d$_6$) δ 1.48 (s, 6H), 2.86 (t, 2H, J=6.9 Hz), 3.71 (q, 2H, J=6.9 Hz+5.1 Hz), 4.74 (t, 1H, D$_2$O exch., J=5.1 Hz), 6.56 (d, 1H, J=6.9 Hz), 6.60 (d, 1H, J=8.6 Hz), 6.78 (brs, 1H, D$_2$O exch.), 7.43 (t, 1H, J=8.1 Hz+7.7 Hz), 7.48 (d, 2H, J=8.4 Hz), 7.76-7.83 (m, 2H), 7.96-8.02 (m, 5H), 8.17 (d, 1H, J=8.9 Hz), 8.20 (d, 1H, J=8.6 Hz), 9.00 (m, 1H), 9.09 (m, 1H). $^{13}$C-NMR (151 MHz, DMSO-d$_6$) δ 28.27, 38.90, 61.82, 64.59, 105.08, 105.53, 109.82, 109.96, 111.22, 112.64, 119.12, 122.78, 123.02, 123.77, 126.83, 127.45, 130.01, 130.28, 131.00, 131.95, 133.51, 138.25, 142.28, 143.83, 145.84, 147.82, 149.96, 151.38.

Step 4: Synthesis of 4-(4-((E)-(4-((E)-(2,2-dimethyl-2,3-dihydro-1H-perimidin-6-yl)diazenyl)naphthalen-1-yl)diazenyl)phenethoxy)-4-oxobutanoic acid (24)

DMAP (182 mg, 1.50 mmol) and succinic anhydride (120 mg, 1.20 mmol) were added into a solution of alcohol 23 (0.3 g, 0.60 mmol) in dichloromethane (8 ml) and this mixture was stirred at room temperature for 2 hrs. Upon completion of the reaction, the organic solvent was evaporated and then an aqueous solution of HCl (0.1N, approximately 40 ml) was added until pH was 5. The precipitate was filtered under vacuum, washed with deionized water and air-dried. The crude product was purified by flash column chromatography, using a mixture of dichloromethane/methanol (from 99/1 up to 96/4, v/v) as the eluent, to provide the pure carboxylic acid 24 as a black solid (250 mg, yield 69%). Mp 119-120° C. $^1$H-NMR (600 MHz, DMSO-d$_6$) δ 1.47 (s, 6H), 2.46-2.53 (m, 4H, overlapping with DMSO-d$_6$), 3.03 (t, 2H, J=6.7 Hz), 4.32 (t, 2H, J=6.7 Hz), 6.55 (d, 1H, J=7.4 Hz), 6.58 (d, 1H, J=8.6 Hz), 6.77 (brs, 1H, D$_2$O exch.), 7.41 (t, 1H, J=7.9 Hz), 7.54 (d, 2H, J=8.3 Hz), 7.77-7.84 (m, 2H), 7.96-8.04 (m, 5H), 8.14 (d, 1H, J=8.4 Hz), 8.17 (d, 1H, J=8.6 Hz), 8.99-9.02 (m, 1H), 9.06-9.09 (m, 1H). $^{13}$C-NMR (151 MHz, DMSO-d$_6$) δ 28.23, 28.70, 28.76, 34.19, 64.14, 64.55, 105.03, 105.49, 109.75, 109.89, 111.19, 112.69, 119.19, 122.91, 122.99, 123.73, 126.84, 127.48, 129.99, 130.25, 130.93, 131.91, 133.43, 138.21, 142.03, 142.23, 145.80, 147.81, 150.03, 151.58, 172.02, 173.28.

Step 9: Synthesis of 2-((E)-2-((E)-2-(4-(4-(4-((E)-(4-((E)-(2,2-dimethyl-2,3-dihydro-1H-perimidin-6-yl)diazenyl)naphthalen-1-yl)diazenyl)phenethoxy)-4-oxobutanoyl)piperazin-1-yl)-3-((E)-2-(1-ethyl-3,3-dimethylindolin-2-ylidene)ethylidene)cyclohex-1-en-1-yl)vinyl)-1-ethyl-3,3-dimethyl-3H-indol-1-ium iodide (25)

1-Ethyl-3-(3-dimethylaminopropyl)carbodiimide hydrochloride (EDC-HCl, 31 mg, 0.16 mmol) and 1-hydroxybenzotriazole (HOBt, 22 mg, 0.16 mmol) were added into a solution of the carboxylic acid 24 (84 mg, 0.14 mmol) in dry DCM (3 ml) and this mixture was stirred at room temperature for 40 min, under Ar atmosphere. Then, cyanine intermediate 12 (96 mg, 0.14 mmol, its synthesis is described at steps 5-8 of the typical example 1) and N-methylmorpholine (0.03 ml, 0.29 mmol) were added at 0° C. and the mixture was stirred for 10 min at this temperature and then at room temperature for 20 hrs. Upon completion of the reaction, the organic solvent was evaporated under vacuum and the residue was purified by silica gel column chromatography using a mixture of dichloromethane/methanol (from 95/5 up to 90/10, v/v) as the eluent, in order to obtain pure 25 as blue black solid (yield 41%). Mp 182-4° C. $^1$H-NMR (600 MHz, acetone-d$_6$) δ 1.34 (t, 6H, J=7.2 Hz), 1.61 (s, 6H), 1.67 (s, 12H), 1.76 (t, 2H, J=6.0 Hz), 2.50 (t, 4H, J=6.0 Hz), 2.64-2.68 (m, 4H), 3.14 (t, 2H, J=6.5 Hz), 3.63-3.68 (brs, 2H), 3.71-3.73 (brs, 2H), 3.83-3.87 (brs, 4H), 4.14 (q, 4H, J=6.7 Hz), 4.47 (t, 2H, J=6.5 Hz), 6.03 (d, 2H, J=13.6 Hz), 6.10 (brs, 1H, D$_2$O exch.), 6.65 (d, 1H, J=7.4 Hz), 6.72 (d, 1H, J=8.5 Hz), 7.16 (t, 2H, J=7.4 Hz), 7.21-7.24 (m, 3H), 7.36 (t, 2H, J=7.5 Hz), 7.42 (t, 1H, J=7.9 Hz), 7.45 (d, 2H, J=7.4 Hz), 7.59 (d, 2H, J=8.3 Hz), 7.72-7.76 (m, 2H), 7.83 (d, 2H, J=13.6 Hz), 8.00 (d, 1H, J=8.4 Hz), 8.04-8.08 (m, 3H), 8.22 (d, 1H, J=7.5 Hz), 8.31 (d, 1H, J=7.6 Hz), 9.03-9.06 (m, 1H), 9.14-9.17 (m, 1H). $^{13}$C-NMR (151 MHz, acetone-d$_6$) δ 12.21, 22.60, 25.79, 28.82, 28.90, 29.06, 30.42, 35.79, 39.33, 44.05, 47.64, 49.23, 55.30, 65.09, 66.16, 97.70, 106.31, 106.95, 110.75, 111.86, 112.11, 112.41, 113.51, 119.31, 123.13, 124.13, 124.77, 125.06, 126.19, 127.64, 128.20, 129.43, 130.83, 131.18, 132.80, 133.61, 135.13, 140.38, 141.80, 142.61, 143.23, 143.39, 143.42, 147.64, 148.70, 151.63, 153.24, 170.32, 170.60, 172.77, 173.37.

Example 6
Synthesis of 2-((E)-2-((E)-2-((4-(4-(4-((E)-(4-((E)-(2,2-dimethyl-2,3-dihydro-1H-perimidin-6-yl)diazenyl)naphthalen-1-yl)diazenyl)phenethoxy)-4-oxobutanamido)butyl)amino)-3-((E)-2-(1-ethyl-3,3-dimethylindolin-2-ylidene)ethylidene)cyclohex-1-en-1-yl)vinyl)-1-ethyl-3,3-dimethyl-3H-indol-1-ium iodide (26, Scheme 6)
Scheme 6
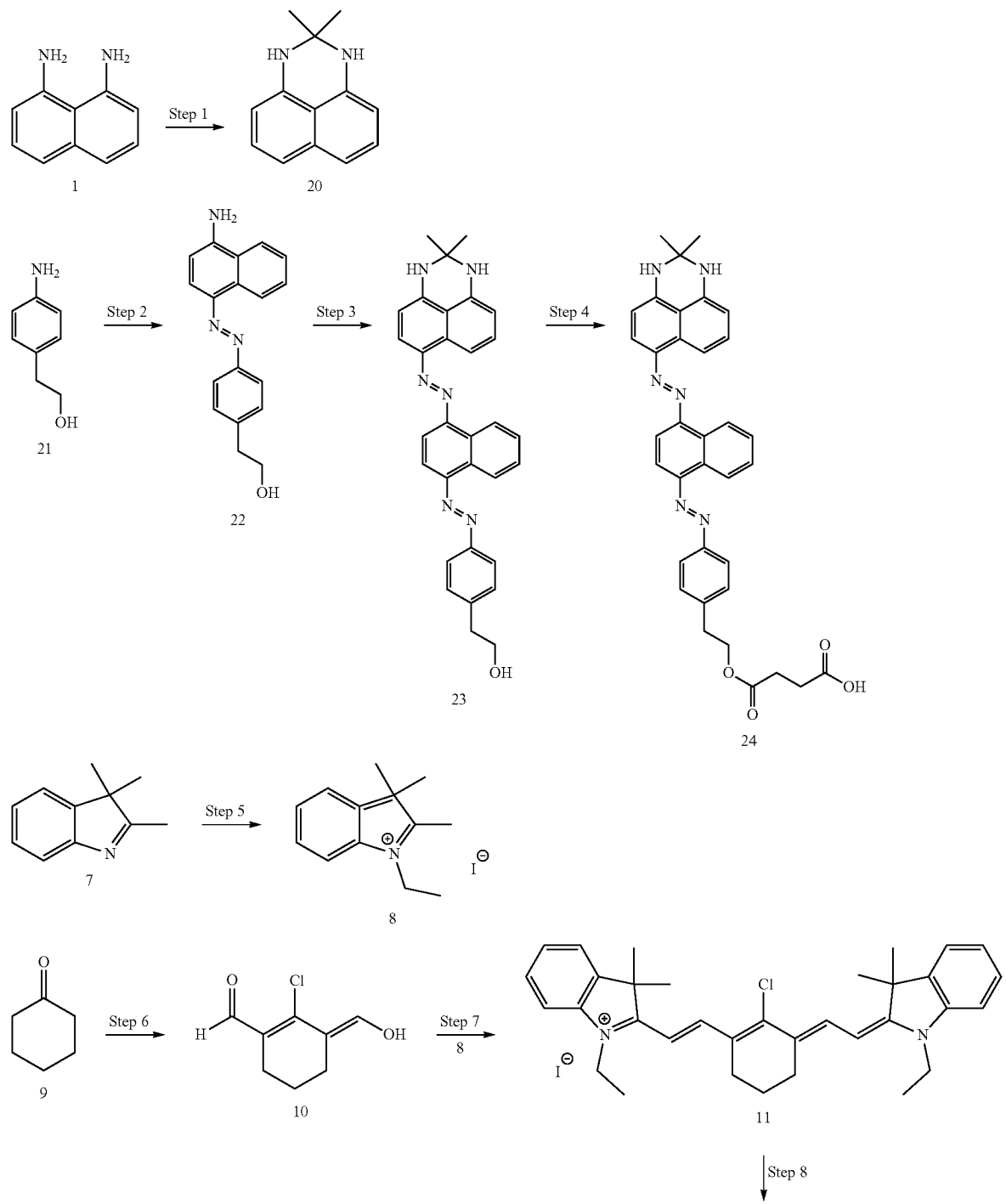

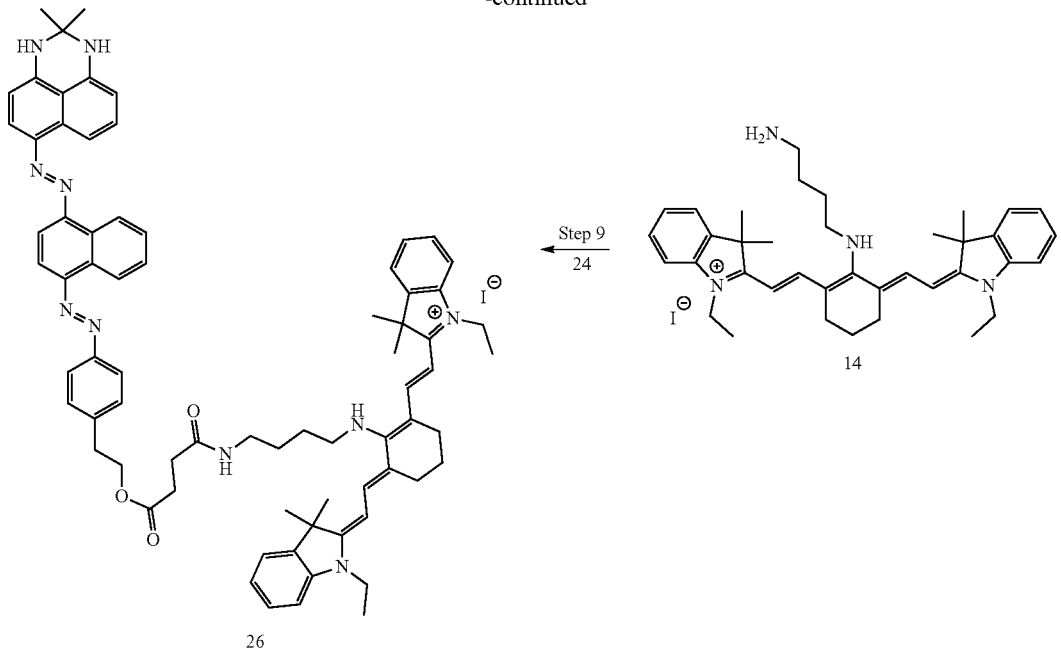

Step 9: Synthesis of 2-((E)-2-((E)-2-((4-(4-(4-((E)-(4-((E-(2,2-dimethyl-2,3-dihydro-1H-perimidin-6-yl)diazenyl)naphthalen-1-yl)diazenyl)phenethoxy)-4-oxobutanamido)butyl)amino)-3-((E)-2-(1-ethyl-3,3-dimethylindolin-2-ylidene)ethylidene)cyclohex-1-en-1-yl)vinyl)-1-ethyl-3,3-dimethyl-3H-indol-1-ium iodide (26)

1-Ethyl-3-(3-dimethylaminopropyl)carbodiimide hydrochloride (EDC-HCl, 31 mg, 0.16 mmol) and 1-hydroxybenzotriazole (HOBt, 22 mg, 0.16 mmol) were added into a solution of the carboxylic acid 24 (84 mg, 0.14 mmol, its synthesis is described at steps 1-4 of the typical example 5) in dry DCM (3 ml) and this mixture was stirred at room temperature for 40 min, under Ar atmosphere. Then, cyanine intermediate 14 (97 mg, 0.14 mmol, its synthesis is described at steps 5-8 of the typical example 2) and N-methylmorpholine (0.03 ml, 0.29 mmol) were added at 0° C. and the mixture was stirred for 10 min at this temperature and then at room temperature for 20 hrs. Upon completion of the reaction, the organic solvent was evaporated under vacuum and the residue was purified by silica gel column chromatography using a mixture of dichloromethane/methanol (from 95/5 up to 90/10, v/v) as the eluent, in order to obtain pure 26 as blue black solid (yield 45%). Mp 162-4° C. $^1$H-NMR (600 MHz, acetone-$d_6$) δ 1.28-1.32 (m, 6H), 1.60 (s, 6H), 1.64-1.67 (m, 15H), 1.76-1.82 (m, 2H), 1.91-1.95 (m, 2H), 2.49-2.52 (m, 2H), 2.53-2.57 (m, 4H), 2.59-2.62 (m, 2H), 3.06 (t, 2H, J=6.6 Hz), 3.24-3.28 (m, 2H), 3.85-3.89 (m, 2H), 4.01-4.06 (m, 4H), 4.35 (t, 2H, J=6.6 Hz), 5.85 (d, 2H, J=12.9 Hz), 6.05 (brs, 1H, D$_2$O exch.), 6.64 (d, 1H, J=7.3 Hz), 6.68 (d, 1H, J=8.5 Hz), 7.05-7.09 (m, 4H), 7.12 (brs, 1H, D$_2$O exch.), 7.29 (t, 2H, J=7.6 Hz), 7.39-7.43 (m, 3H), 7.53 (d, 2H, J=7.9 Hz), 7.75-7.82 (m, 4H), 8.01-8.07 (m, 4H), 8.21 (d, 1H, J=8.4 Hz), 8.31 (d, 1H, J=8.4 Hz), 9.05-9.08 (m, 1H), 9.14-9.18 (m, 1H). $^{13}$C-NMR (151 MHz, acetone-$d_6$) δ 11.85, 22.49, 26.13, 27.99, 28.98, 29.11, 30.42, 31.33, 35.74, 38.70, 39.14, 48.56, 51.19, 65.27, 66.11, 95.03, 106.25, 106.94, 109.69, 111.92, 112.45, 113.54, 119.20, 121.28, 123.02, 123.63, 124.15, 124.23, 125.04, 127.67, 128.20, 129.20, 130.79, 131.04, 132.81, 133.59, 135.13, 139.40, 141.21, 143.18, 143.34, 143.81, 147.82, 148.58, 150.23, 151.62, 153.25, 168.08, 170.54, 172.11, 173.32.

Example 7
Synthesis of 1,3,3-trimethyl-2-((E)-2-((E)-2-(4-(4-((2-methyl-6-((E)-(4-((E)-phenyldiazenyl)naphthalen-1-yl)diazenyl)-2,3-dihydro-1H-perimidin-2-yl)methoxy)-4-oxobutanoyl)piperazin-1-yl)-3-((E)-2-(1,3,3-trimethylindolin-2-ylidene)ethylidene)cyclohex-1-en-1-yl)vinyl)-3H-indol-1-ium iodide (30, Scheme 7)
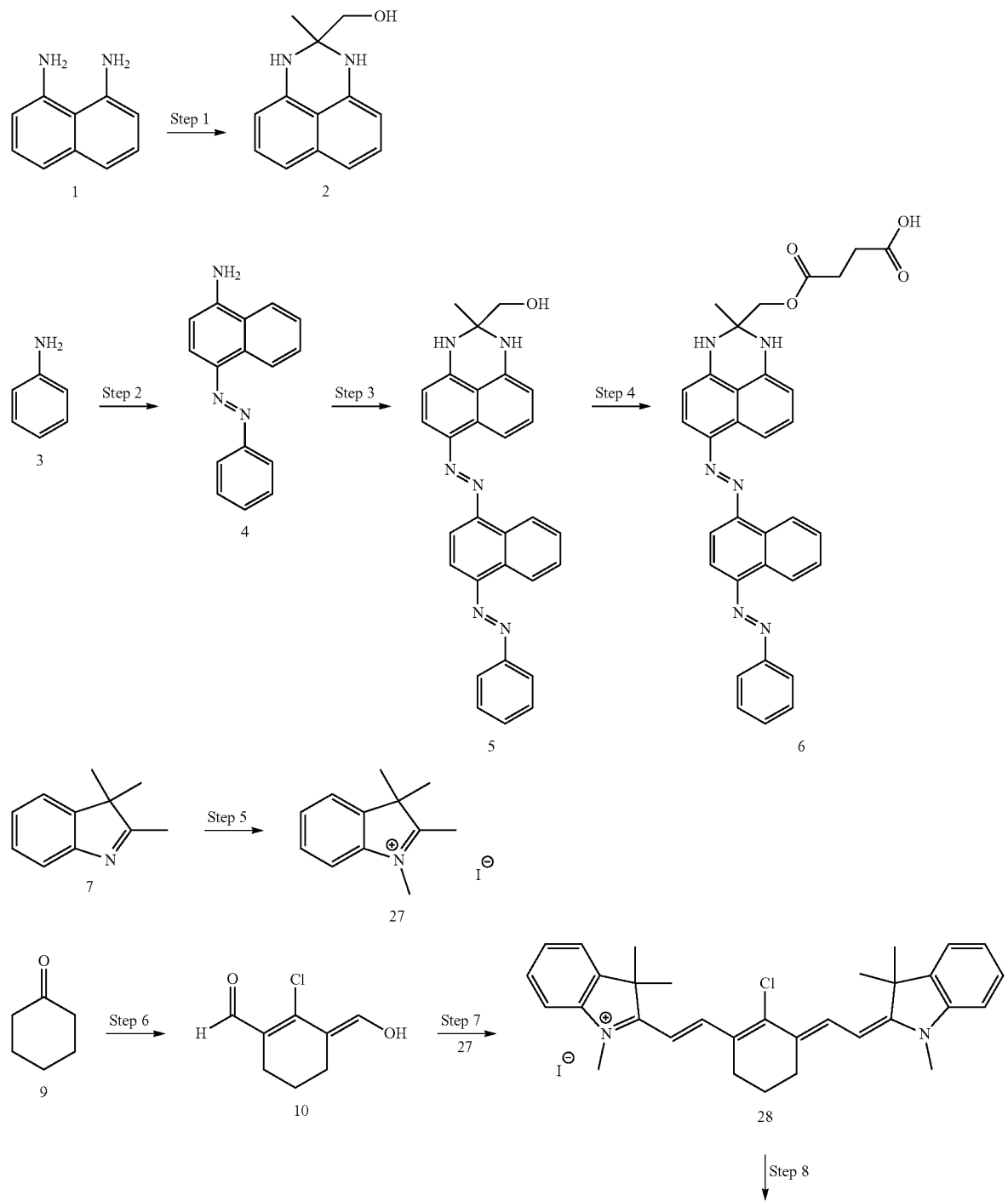
Scheme 7

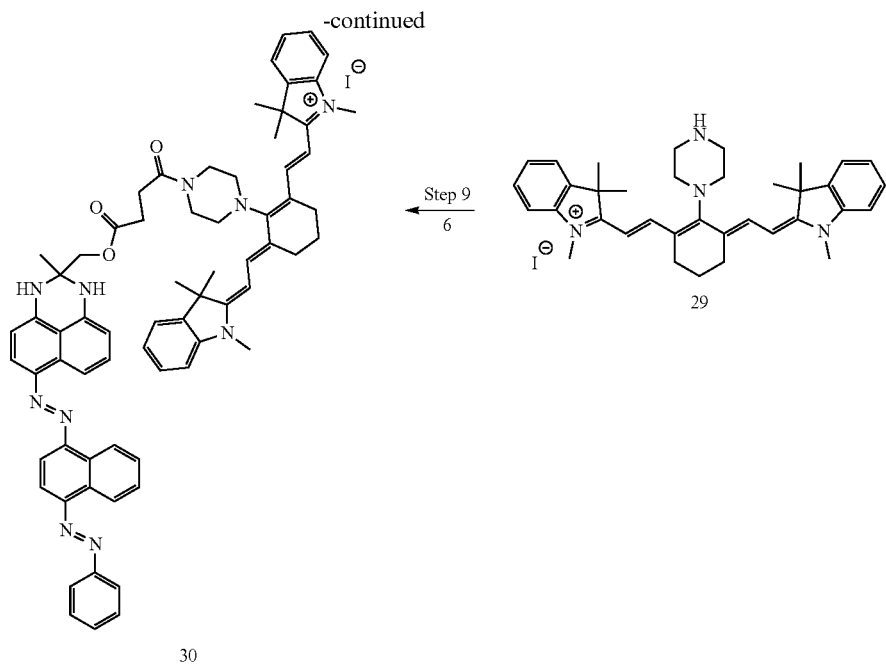

Step 5: Synthesis of 1,2,3,3-tetramethyl-3H-indol-1-ium iodide (27)

2,3,3-Trimethylindolenine (7, 2 g, 12.56 mmol) was dissolved in toluene (15 ml) and then methyl iodide (1.6 ml, 25.70 mmol) was added. The mixture was heated at 100° C. under Ar atmosphere for 20 hrs. The reaction was cooled to room temperature, the solid was filtered under vacuum and was washed with a mixture of EtOAc/Et$_2$O (10 ml, 1/1 v/v) and air dried to provide pure 27 as pink solid (3.2 g, yield 85%). Mp 278-279° C. $^1$H-NMR (600 MHz, DMSO-d$_6$) δ 1.54 (s, 6H), 2.78 (s, 3H), 3.99 (s, 3H), 7.60-7.65 (m, 2H), 7.81-7.85 (m, 1H), 7.90-7.94 (m, 1H). $^{13}$C-NMR (151 MHz, DMSO-d$_6$) δ 14.24, 21.63, 34.76, 53.83, 115.03, 123.18, 128.68, 129.19, 141.50, 141.98, 195.89.

Step 7: Synthesis of 2-((E)-2-((E)-2-chloro-3-((E)-2-(1,3,3-trimethylindolin-2-ylidene)ethylidene)cyclohex-1-en-1-yl)vinyl)-1,3,3-trimethyl-3H-indol-1-ium iodide (28)

Intermediate 27 (2.56 g, 8.50 mmol) and sodium acetate (0.33 g, 4.05 mmol) were added into a solution of the aldehyde 10 (0.7 g, 4.05 mmol, its synthesis is described at step 6 of the typical example 1) in acetic anhydride (25 ml) and this mixture was heated at 60° C. for 3 hrs under Ar atmosphere. Then the mixture was cooled to room temperature and filtered under vacuum. The precipitate was washed with a saturated aqueous solution of NaHCO$_3$ until no bubble appeared. The solid was washed with water twice and air dried to afford 28 as green-gold solid (1.7 g, yield 69%). Mp 269-271° C. $^1$H-NMR (600 MHz, methanol-d$_4$) δ 1.74 (s, 12H), 1.92-2.00 (m, 2H), 2.75 (t, 4H, J=6.1 Hz), 3.68 (s, 6H), 6.28 (d, 2H, J=14.2 Hz), 7.29 (t, 2H, J=7.5 Hz), 7.34 (d, 2H, J=7.9 Hz), 7.44 (t, 2H, J=7.5 Hz), 7.52 (d, 2H, J=7.4 Hz), 8.44 (d, 2H, J=14.2 Hz). $^{13}$C-NMR (151 MHz, methanol-d$_4$) δ 22.28, 27.51, 28.35, 31.95, 50.69, 102.58, 112.20, 123.53, 126.66, 128.15, 130.01, 142.68, 144.48, 145.59, 151.12, 174.98.

Step 8: Synthesis of 1,3,3-trimethyl-2-((E)-2-((E)-2-(piperazin-1-yl)-3-((E)-2-(1,3,3-trimethylindolin-2-ylidene)ethylidene)cyclohex-1-en-1-yl)vinyl)-3H-indol-1-ium iodide (29)

Piperazine (267 mg, 3.1 mmol) was added into a solution of the chloro derivative 28 (300 mg, 0.49 mmol) in acetonitrile (10 ml) and this mixture was refluxed for 4 hrs under Ar atmosphere. Then, the organic solvent was evaporated under vacuum and the residue was purified by silica gel column chromatography using a mixture of dichloromethane/methanol (from 98/2 up to 90/10, v/v) as the eluent, to provide pure 29 as blue black solid (300 mg, yield 93%). Mp 253-256° C. $^1$H-NMR (400 MHz, acetone-d$_6$) δ 1.69 (s, 12H), 1.79-1.87 (m, 2H), 2.56 (t, 4H, J=6.7 Hz), 3.11-3.23 (m, 4H), 3.56 (s, 6H), 3.87-3.96 (m, 4H), 5.95 (d, 2H, J=13.3 Hz), 7.12 (t, 2H, J=7.4 Hz), 7.17 (d, 2H, J=8.0 Hz), 7.35 (t, 2H, J=7.6 Hz), 7.46 (d, 2H, J=7.4 Hz), 7.76 (d, 2H, J=13.3 Hz). $^{13}$C-NMR (100 MHz, acetone-d$_6$) δ 22.58, 25.64, 29.16, 31.14, 48.56, 48.73, 57.28, 96.02, 110.05, 122.91, 123.86, 124.36, 129.22, 141.15, 141.33, 144.77, 169.81, 176.14.

Step 9: Synthesis of 1,3,3-trimethyl-2-((E)-2-((E)-2-(4-(4-((2-methyl-6-((E)-(4-((E)-phenyldiazenyl)naphthalen-1-yl)diazenyl)-2,3-dihydro-1H-perimidin-2-yl)methoxy)-4-oxobutanoyl)piperazin-1-yl)-3-((E)-2-(1,3,3-trimethylindolin-2-ylidene)ethylidene)cyclohex-1-en-1-yl)vinyl)-3H-indol-1-ium iodide (30)

1-Ethyl-3-(3-dimethylaminopropyl)carbodiimide hydrochloride (EDC-HCl, 31 mg, 0.16 mmol) and 1-hydroxybenzotriazole (HOBt, 22 mg, 0.16 mmol) were added into a solution of the carboxylic acid 6 (83 mg, 0.14 mmol, its synthesis is described at steps 1-4 of the typical example 1) in dry dichloromethane (3 ml) and this mixture was stirred at room temperature for 40 min, under Ar atmosphere. Then, cyanine intermediate 29 (93 mg, 0.14 mmol) and N-methylmorpholine (0.03 ml, 0.29 mmol) were added at 0° C. and the mixture was stirred for 10 min at this temperature and then at room temperature for 20 hrs. Upon completion of the reaction, the organic solvent was evaporated under vacuum and the residue was purified by silica gel column chromatography using a mixture of dichloromethane/methanol (from 95/5 up to 85/15, v/v) as the eluent to provide pure 30 as blue black solid (80 mg, yield 47%). Mp 191-192° C. $^1$H-NMR (400 MHz, acetone-$d_6$) δ 1.67 (s, 12H), 1.71 (s, 3H), 1.76-1.83 (m, 2H), 2.48 (t, 4H, J=6.5 Hz), 2.59-2.71 (m, 4H), 3.51 (s, 6H), 3.60-3.65 (m, 4H), 3.68-3.72 (m, 2H), 3.89-3.95 (m, 2H), 4.24 (d, 1H, J=4.0 Hz), 4.54 (d, 1H, J=4.0 Hz), 5.75 (brs, 1H, $D_2O$ exch.), 5.88 (d, 2H, J=13.6 Hz), 6.68-6.75 (m, 2H), 7.11-7.22 (m, 5H), 7.39-7.45 (m, 4H), 7.51-7.53 (m, 1H), 7.67-7.77 (m, 5H), 7.87 (d, 2H, J=12.0 Hz), 8.06 (d, 1H, J=8.4 Hz), 8.12 (d, 1H, J=8.4 Hz), 8.18-8.22 (m, 2H), 8.28 (d, 1H, J=8.5 Hz), 8.35 (d, 1H, J=8.3 Hz), 9.12-9.18 (m, 2H). $^{13}$C-NMR (100 MHz, acetone-$d_6$) δ 22.54, 25.12, 25.70, 28.99, 29.03, 30.67, 31.47, 44.06, 47.66, 49.06, 55.48, 67.31, 67.39, 68.80, 97.88, 106.40, 106.72, 110.65, 111.72, 111.92, 112.39, 113.54, 118.82, 123.03, 124.02, 124.20, 124.61, 124.96, 125.94, 127.69, 128.28, 129.28, 130.41, 130.76, 132.29, 132.76, 133.62, 134.85, 140.35, 141.41, 142.41, 144.47, 147.74, 148.11, 151.42, 154.42, 171.21, 171.27, 172.84, 173.01.

Example 8

Synthesis of 1,3,3-trimethyl-2-((E)-2-((E)-2-((4-(4-((2-methyl-6-((E)-(4-((E)-phenyldiazenyl)naphthalen-1-yl)diazenyl)-2,3-dihydro-1H-perimidin-2-yl)methoxy)-4-oxobutanamido)butyl)amino)-3-((E)-2-(1,3,3-trimethylindolin-2-ylidene)ethylidene)cyclohex-1-en-1-yl)vinyl)-3H-indol-1-ium iodide (32, Scheme 8)

Scheme 8

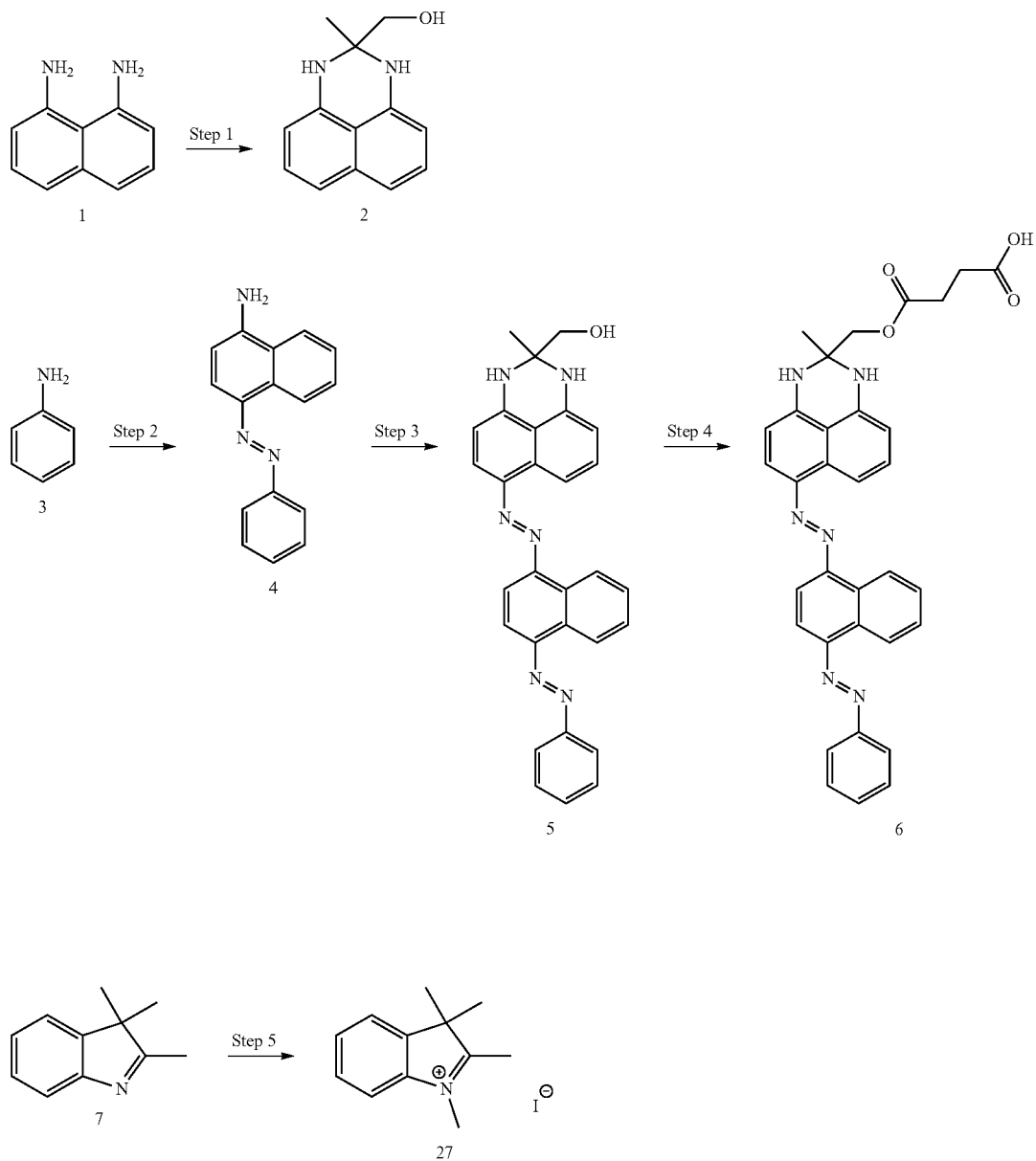

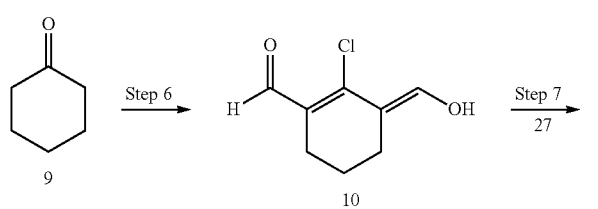

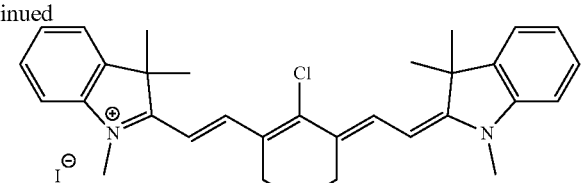

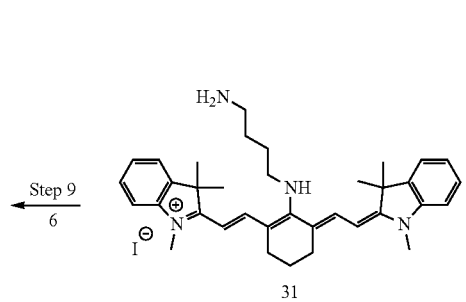

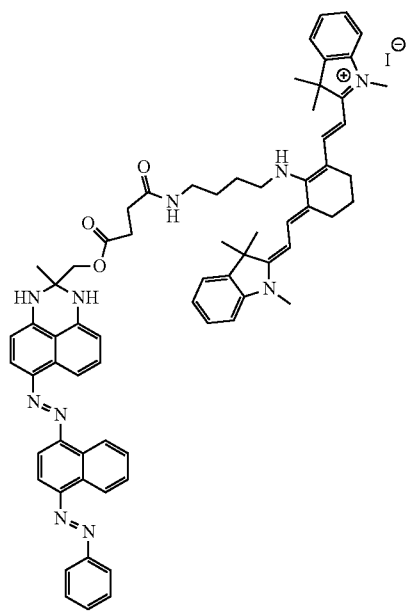

Step 8: Synthesis of 2-((E)-2-((E)-2-((4-aminobutyl)amino)-3-((E)-2-(1,3,3-trimethylindolin-2-ylidene)ethylidene)cyclohex-1-en-1-yl)vinyl)-1,3,3-trimethyl-3H-indol-1-ium iodide (31)

1,4-Diaminobutane (259 mg, 2.94 mmol) and N,N-diisopropylethylamine (0.17 ml, 0.98 mmol) were added into a solution of the chloro derivative 28 (600 mg, 0.98 mmol, its synthesis is described at steps 5-7 of the typical example 7) in acetonitrile (30 ml) and this mixture was refluxed for 5 hrs under Ar atmosphere. Then, the organic solvent was evaporated under vacuum and the residue was purified by silica gel column chromatography using a mixture of dichloromethane/methanol (from 95/2 up to 80/20, v/v) as the eluent, to provide pure 31 as blue black solid (150 mg, yield 23%). Mp 108-110° C. $^1$H-NMR (400 MHz, methanol-$d_4$) δ 1.67 (s, 12H), 1.70-1.75 (m, 2H), 1.80-1.92 (m, 4H), 2.56 (t, 4H, J=6.2 Hz), 2.91-2.96 (m, 2H), 3.46 (s, 6H), 3.82 (t, 2H, J=7.2 Hz), 5.79 (d, 2H, J=13.1 Hz), 7.04-7.11 (m, 4H), 7.31 (t, 2H, J=7.2 Hz), 7.37 (d, 2H, J=7.3 Hz), 7.77 (d, 2H, J=13.1 Hz). $^{13}$C-NMR (100 MHz, methanol-$d_4$) δ 23.03, 26.20, 26.31, 26.70, 29.29, 30.90, 33.22, 40.53, 48.12, 95.92, 110.08, 121.86, 123.15, 124.19, 129.60, 140.31, 141.35, 145.20, 170.27, 171.05.

Step 9: Synthesis of 1,3,3-trimethyl-2-((E)-2-((E)-2-((4-(4-((2-methyl-6-((E)-(4-((E)-phenyldiazenyl)naphthalen-1-yl)diazenyl)-2,3-dihydro-1H-perimidin-2-yl)methoxy)-4-oxobutanamido)butyl)amino)-3-((E)-2-(1,3,3-trimethylindolin-2-ylidene)ethylidene)cyclohex-1-en-1-yl)vinyl)-3H-indol-1-ium iodide (32)

1-Ethyl-3-(3-dimethylaminopropyl)carbodiimide hydrochloride (EDC·HCl, 31 mg, 0.16 mmol) and 1-hydroxybenzotriazole (HOBt, 22 mg, 0.16 mmol) were added into a solution of the carboxylic acid 6 (83 mg, 0.14 mmol, its synthesis is described at steps 1-4 of the typical example 1) in dry dichloromethane (3 ml) and this mixture was stirred at room temperature for 40 min, under Ar atmosphere. Then, cyanine intermediate 31 (93 mg, 0.14 mmol) and N-methylmorpholine (0.03 ml, 0.29 mmol) were added at 0° C. and the mixture was stirred for 10 min at this temperature and then at room temperature for 20 hrs. Upon completion of the reaction, the organic solvent was evaporated under vacuum and the residue was purified by silica gel column chromatography using a mixture of dichloromethane/methanol (from 98/2 up to 90/10, v/v) as the eluent to provide pure 32 as blue black solid (65 mg, yield 38%). Mp 188-190° C. $^1$H-NMR (400 MHz, acetone-$d_6$) δ 1.61 (s, 3H), 1.66 (s, 12H), 1.72-1.86 (m, 6H), 2.49 (t, 4H, J=6.4 Hz), 2.53-2.62 (m, 4H), 3.31-3.36 (m, 2H), 3.40 (s, 6H), 3.71-3.77 (m, 2H), 4.15 (d, 1H, J=10.9 Hz), 4.39 (d, 1H, J=10.9 Hz), 5.69 (d, 2H, J=13.0 Hz), 5.76 (brs, 1H, D$_2$O exch.), 6.68-6.74 (m, 2H), 6.83 (brs, 1H, D$_2$O exch.), 7.04 (d, 2H, J=7.9 Hz), 7.12 (t, 2H, J=7.5 Hz), 7.33-7.39 (m, 4H), 7.50-7.55 (m, 1H), 7.67 (d, 2H, J=12.6 Hz), 7.70-7.77 (m, 3H), 7.81-7.91 (m, 2H), 8.08 (d, 1H, J=8.4 Hz), 8.13 (d, 1H, J=8.4 Hz), 8.17-8.21 (m, 2H), 8.25 (d, 1H, J=8.5 Hz), 8.38 (d, 1H, J=7.7 Hz), 9.13-9.21 (m, 2H). $^{13}$C-NMR (151 MHz, acetone-d$_6$) δ 22.46, 25.45, 26.00, 27.83, 29.08, 29.16, 30.67, 30.73, 31.64, 39.29, 48.40, 51.14, 67.17, 67.91, 95.43, 106.55, 106.99, 109.68, 111.87, 112.17, 112.47, 113.52, 118.82, 121.31, 122.86, 123.53, 124.03, 124.21, 124.98, 127.72, 128.28, 129.07, 130.39, 130.70, 132.27, 132.77, 133.60, 134.86, 139.39, 140.53, 140.89, 142.21, 144.81, 147.83, 147.89, 151.53, 154.43, 169.20, 170.39, 172.60, 172.89.

Example 9

Synthesis of 1-butyl-2-((E)-2-((E)-3-((E)-2-(1-butyl-3,3-dimethylindolin-2-ylidene)ethylidene)-2-(4-(4-((2-methyl-6-((E)-(4-((E)-phenyldiazenyl)naphtha-len-1-yl)diazenyl)-2,3-dihydro-1H-perimidin-2-yl)methoxy)-4-oxobutanoyl)piperazin-1-yl)cyclohex-1-en-1-yl)vinyl)-3,3-dimethyl-3H-indol-1-ium iodide (36, Scheme 9)

Scheme 9

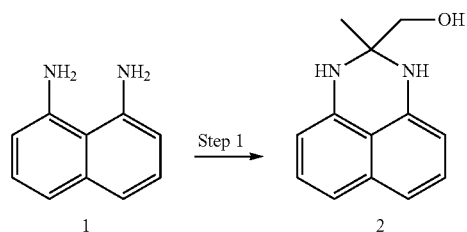

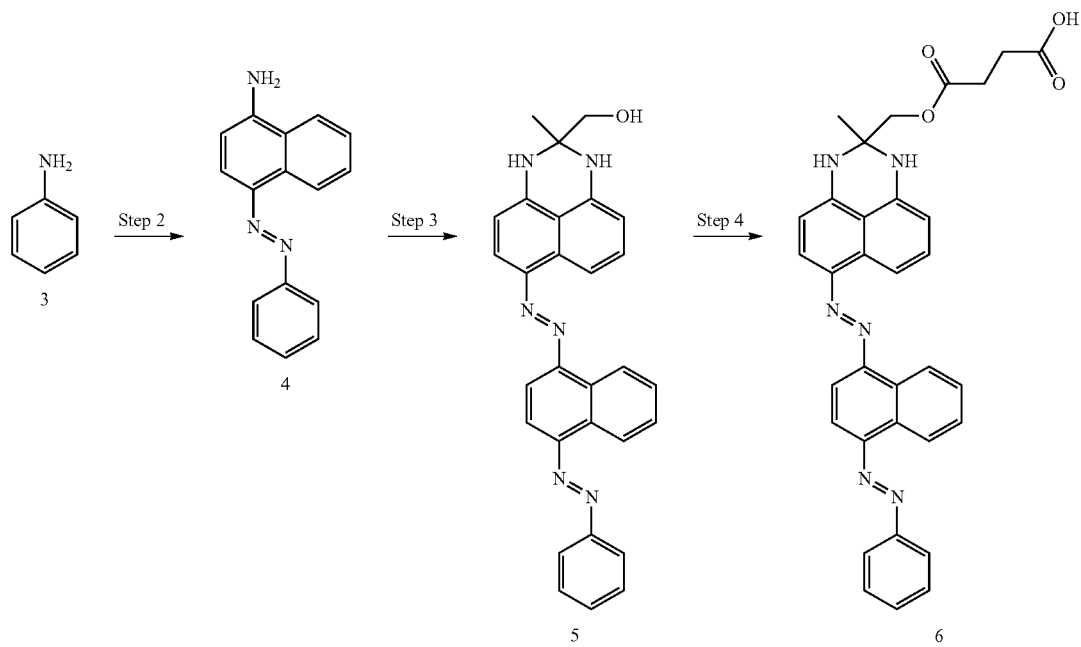

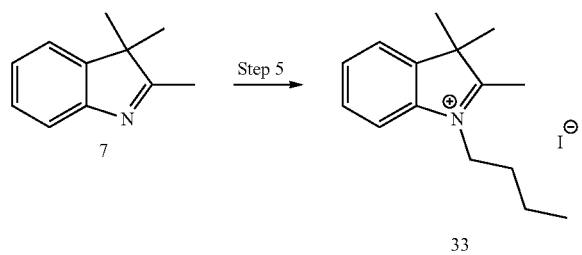

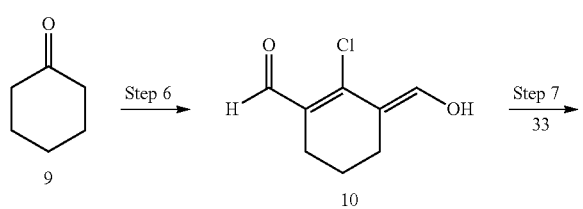

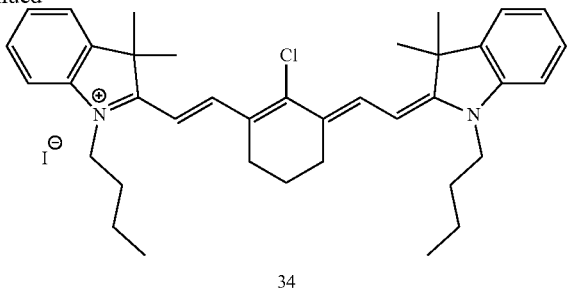

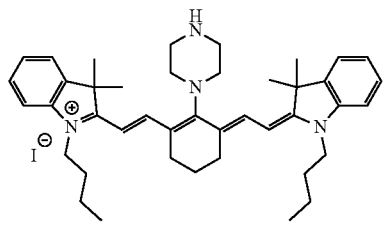

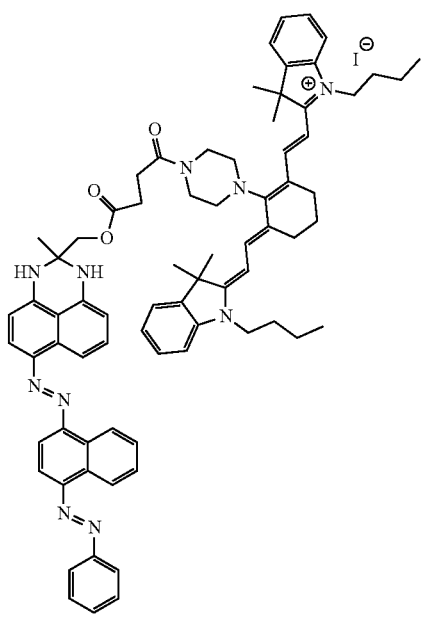

Step 5: Synthesis of 1-butyl-2,3,3-trimethyl-3H-indol-1-ium iodide (33)

2,3,3-Trimethylindolenine (7, 2 g, 12.56 mmol) was dissolved in toluene (15 ml) and then 1-iodobutane (3 ml, 26.36 mmol) was added. The mixture was heated at 100° C. under Ar atmosphere for 20 hrs. The reaction was cooled to room temperature, the solid was filtered under vacuum and was washed with a mixture of EtOAc/Et$_2$O (10 ml, 1/1 v/v) and air dried to provide pure 33 as pink solid (1.4 g, yield 32%). Mp 128-130° C. $^1$H-NMR (400 MHz, DMSO-d$_6$) δ 0.94 (t, 3H, J=7.3 Hz), 1.39-1.46 (m, 2H), 1.54 (s, 6H), 1.78-1.86 (m, 2H), 2.84 (s, 3H), 4.45 (t, 2H, J=7.7 Hz), 7.60-7.66 (m, 2H), 7.82-7.86 (m, 1H), 7.94-8.00 (m, 1H). $^{13}$C-NMR (151 MHz, DMSO-d$_6$) δ 13.61, 14.06, 19.35, 22.05, 29.28, 47.49, 54.19, 115.51, 123.55, 128.99, 129.45, 141.07, 141.89, 196.45.

Step 7: Synthesis of 1-butyl-2-((E)-2-((E)-3-((E)-2-(1-butyl-3,3-dimethylindolin-2-ylidene)ethylidene)-2-chlorocyclohex-1-en-1-yl)vinyl)-3,3-dimethyl-3H-indol-1-ium iodide (34)

Intermediate 33 (2.92 g, 8.50 mmol) and sodium acetate (0.33 g, 4.05 mmol) were added into a solution of the aldehyde 10 (0.7 g, 4.05 mmol, its synthesis is described at step 6 of the typical example 1) in acetic anhydride (25 ml) and this mixture was heated at 60° C. for 3 hrs under Ar atmosphere. Then the mixture was cooled to room temperature and filtered under vacuum. The precipitate was washed with a saturated aqueous solution of NaHCO$_3$ until no bubble appeared. The solid was washed with water twice and air dried to afford 34 as green-gold solid (1.9 g, yield 67%). Mp 260-261° C. $^1$H-NMR (400 MHz, methanol-d$_4$) δ 1.03 (t, 6H, J=7.4 Hz), 1.45-1.55 (m, 4H), 1.74 (s, 12H), 1.79-1.87 (m, 4H), 1.94-2.01 (m, 2H), 2.74 (t, 4H, J=6.1 Hz), 4.19 (t, 4H, J=7.4 Hz), 6.30 (d, 2H, J=14.2 Hz), 7.27-7.35 (m, 4H), 7.44 (t, 2H, J=7.7 Hz), 7.53 (d, 2H, J=7.4 Hz), 8.45 (d, 2H, J=14.2 Hz). $^{13}$C-NMR (100 MHz, methanol-d$_4$) δ 14.32, 21.38, 22.28, 27.50, 28.46, 30.72, 45.29, 50.82, 102.46, 112.47, 123.69, 126.72, 128.04, 130.06, 142.79, 143.81, 145.67, 151.27, 174.44.

Step 8: Synthesis of 1-butyl-2-((E)-2-((E)-3-((E)-2-(1-butyl-3,3-dimethylindolin-2-ylidene)ethylidene)-2-(piperazin-1-yl)cyclohex-1-en-1-yl)vinyl)-3,3-dimethyl-3H-indol-1-ium iodide (35)

Piperazine (267 mg, 3.1 mmol) was added into a solution of the chloro derivative 34 (340 mg, 0.49 mmol) in acetonitrile (12 ml) and this mixture was refluxed for 4 hrs under Ar atmosphere. Then, the organic solvent was evaporated under vacuum and the residue was purified by silica gel column chromatography using a mixture of dichloromethane/methanol (from 98/2 up to 90/10, v/v) as the eluent, to provide pure 35 as blue black solid (320 mg, yield 88%). Mp 185-187° C. $^1$H-NMR (400 MHz, acetone-$d_6$) δ 0.99 (t, 6H, J=7.4 Hz), 1.45-1.54 (m, 4H), 1.73 (s, 12H), 1.76-1.85 (m, 6H), 2.57 (t, 4H, J=6.5 Hz), 3.22-3.31 (m, 4H), 3.93-4.01 (m, 4H), 4.10 (t, 4H, J=7.4 Hz), 6.04 (d, 2H, J=13.4 Hz), 7.15 (t, 2H, J=7.5 Hz), 7.21 (d, 2H, J=8.0 Hz), 7.36 (t, 2H, J=8.3 Hz), 7.48 (d, 2H, J=7.4 Hz), 7.81 (d, 2H, J=13.3 Hz). $^{13}$C-NMR (100 MHz, acetone-$d_6$) δ 14.27, 20.92, 22.63, 25.77, 29.31 (overlapping with acetone-$d_6$), 30.36 (overlapping with acetone-$d_6$), 43.85, 47.98, 48.86, 56.22, 96.55, 110.48, 123.04, 124.10, 124.66, 129.24, 141.48, 141.57, 144.06, 169.53, 175.10.

Step 9: Synthesis of 1-butyl-2-((E)-2-((E)-3-((E)-2-(1-butyl-3,3-dimethylindolin-2-ylidene)ethylidene)-2-(4-(4-((2-methyl-6-((E)-(4-((E)-phenyldiazenyl) naphthalen-1-yl)diazenyl)-2,3-dihydro-1H-perimidin-2-yl)methoxy)-4-oxobutanoyl)piperazin-1-yl)cyclohex-1-en-1-yl)vinyl)-3,3-dimethyl-3H-indol-1-ium iodide (36)

1-Ethyl-3-(3-dimethylaminopropyl)carbodiimide hydrochloride (EDC·HCl, 31 mg, 0.16 mmol) and 1-hydroxybenzotriazole (HOBt, 22 mg, 0.16 mmol) were added into a solution of the carboxylic acid 6 (83 mg, 0.14 mmol, its synthesis is described at steps 1-4 of the typical example 1) in dry dichloromethane (3 ml) and this mixture was stirred at room temperature for 40 min, under Ar atmosphere. Then, cyanine intermediate 35 (104 mg, 0.14 mmol) and N-methylmorpholine (0.03 ml, 0.29 mmol) were added at 0° C. and the mixture was stirred for 10 min at this temperature and then at room temperature for 20 hrs. Upon completion of the reaction, the organic solvent was evaporated under vacuum and the residue was purified by silica gel column chromatography using a mixture of dichloromethane/methanol (from 95/5 up to 85/15, v/v) as the eluent to provide pure 36 as blue black solid (65 mg, yield 36%). Mp 184-186° C. $^1$H-NMR (400 MHz, acetone-$d_6$) δ 0.97 (t, 6H, J=7.5 Hz), 1.42-1.49 (m, 4H), 1.67 (s, 12H), 1.70-1.81 (m, 9H), 2.48 (t, 4H, J=6.6 Hz), 2.58-2.66 (m, 4H), 3.68-3.77 (m, 4H), 3.82-3.87 (m, 2H), 3.93-3.96 (m, 2H), 4.09 (t, 4H, J=7.4 Hz), 4.26 (d, 1H, J=10.9 Hz), 4.52 (d, 1H, J=10.9 Hz), 6.04 (d, 2H, J=13.7 Hz), 6.36 (brs, 1H, $D_2O$ exch.), 6.67 (d, 1H, J=7.4 Hz), 6.75 (d, 1H, J=8.5 Hz), 7.14 (t, 2H, J=7.4 Hz), 7.23 (d, 2H, J=7.9 Hz), 7.32-7.45 (m, 5H), 7.59-7.71 (m, 5H), 7.75-7.79 (m, 1H), 7.84 (d, 2H, J=13.7 Hz), 8.01-8.07 (m, 2H), 8.10-8.14 (m, 2H), 8.20 (d, 1H, J=8.5 Hz), 8.28 (d, 1H, J=8.4 Hz), 9.06-9.13 (m, 2H). $^{13}$C-NMR (151 MHz, acetone-$d_6$) δ 14.24, 20.90, 22.56, 25.67, 25.77, 28.99, 29.16, 30.67, 32.70, 44.10, 47.69, 49.18, 54.96, 55.39, 67.39, 68.83, 98.00, 106.41, 106.72, 110.92, 111.70, 111.89, 112.35, 113.52, 118.89, 123.17, 124.01, 124.19, 124.73, 124.96, 126.05, 127.66, 128.25, 129.31, 130.40, 130.76, 132.28, 132.74, 133.62, 134.84, 140.33, 141.64, 142.44, 143.75, 147.71, 148.17, 151.44, 154.42, 170.64, 171.30, 172.60, 172.84.

Example 10

Synthesis of 1-butyl-2-((E)-2-((E)-3-((E)-2-(1-butyl-3,3-dimethylindolin-2-ylidene)ethylidene)-2-((4-(4-((2-methyl-6-((E)-(4-((E)-phenyldiazenyl)naphthalen-1-yl)diazenyl)-2,3-dihydro-1H-perimidin-2-yl) methoxy)-4-oxobutanamido)butyl)amino)cyclohex-1-en-1-yl)vinyl)-3,3-dimethyl-3H-indol-1-ium iodide (38, Scheme 10)

Scheme 10

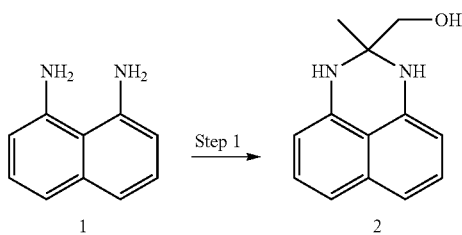

-continued
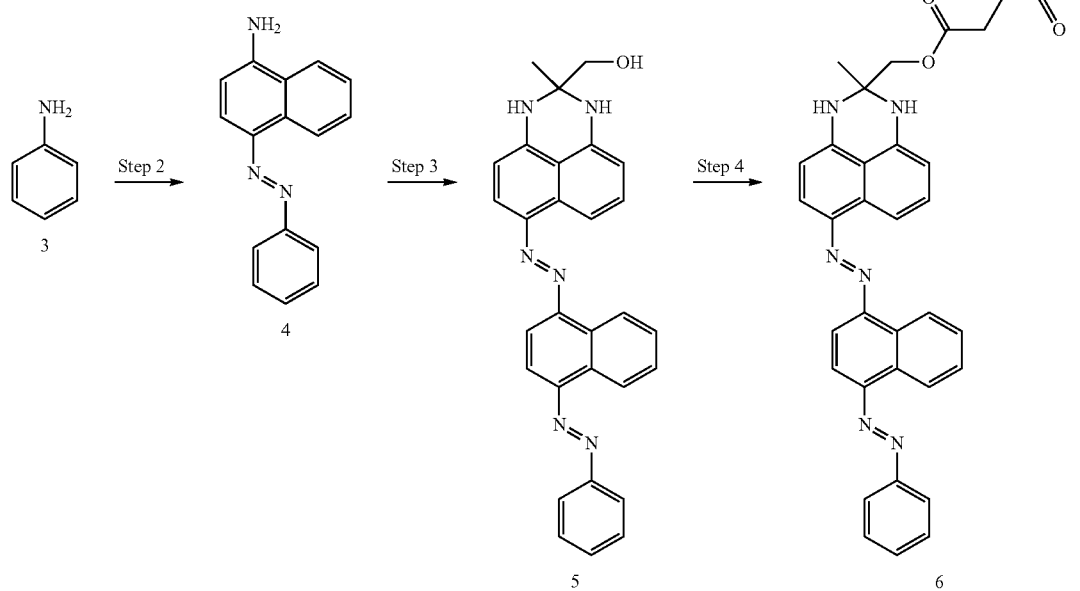
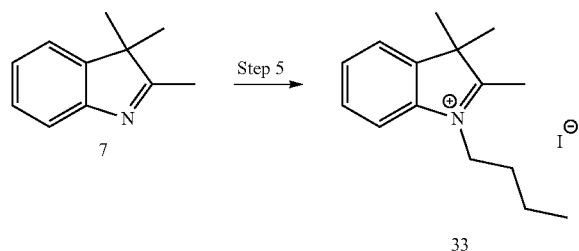
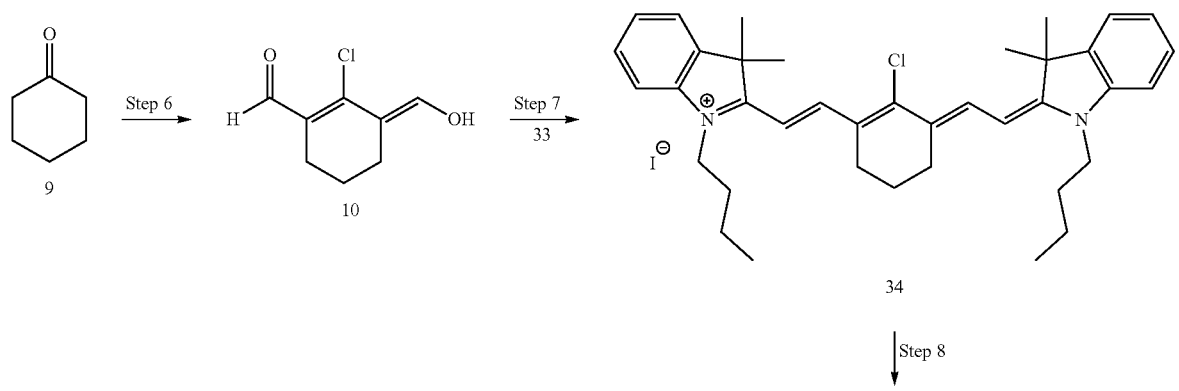
Step 8

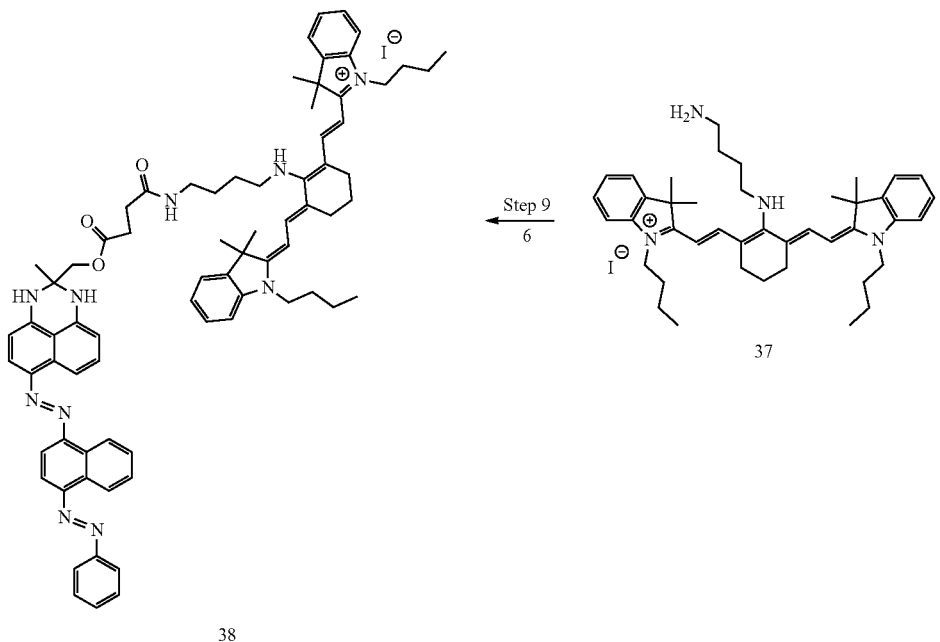

Step 8: Synthesis of 2-((E)-2-((E)-2-((4-aminobutyl)amino)-3-((E)-2-(1-butyl-3,3-dimethylindolin-2-ylidene)ethylidene)cyclohex-1-en-1-yl)vinyl)-1-butyl-3,3-dimethyl-3H-indol-1-ium iodide (37)

1,4-Diaminobutane (130 mg, 1.47 mmol) and N,N-diisopropylethylamine (0.085 ml, 0.49 mmol) were added into a solution of the chloro derivative 34 (340 mg, 0.49 mmol, its synthesis is described at steps 5-7 of the typical example 9) in acetonitrile (15 ml) and this mixture was refluxed for 5 hrs under Ar atmosphere. Then, the organic solvent was evaporated under vacuum and the residue was purified by silica gel column chromatography using a mixture of dichloromethane/methanol (from 95/5 up to 80/20, v/v) as the eluent, to provide pure 37 as blue black solid (108 mg, yield 26%). Mp 132-134° C. $^1$H-NMR (600 MHz, methanol-$d_4$) δ 1.02 (t, 6H, J=7.4 Hz), 1.45-1.51 (m, 4H), 1.67 (s, 12H), 1.72-1.79 (m, 6H), 1.83-1.92 (m, 4H), 2.55 (t, 4H, J=6.4 Hz), 2.98-3.00 (m, 2H), 3.81 (t, 2H, J=7.2 Hz), 3.96 (t, 4H, J=7.3 Hz), 5.85 (d, 2H, J=13.0 Hz), 7.08 (d, 2H, J=7.9 Hz), 7.10 (t, 2H, J=7.4 Hz), 7.32 (t, 2H, J=7.7 Hz), 7.38 (d, 2H, J=7.3 Hz), 7.77 (d, 2H, J=13.1 Hz). $^{13}$C-NMR (100 MHz, methanol-$d_4$) δ 14.44, 21.45, 23.03, 26.10, 26.36, 29.42, 29.67, 30.04, 40.54, 44.05, 51.29, 96.04, 110.34, 121.67, 123.25, 124.17, 129.55, 140.27, 141.51, 144.62, 169.48, 170.72.

Step 9: Synthesis of 1-butyl-2-((E)-2-((E)-3-((E)-2-(1-butyl-3,3-dimethylindolin-2-ylidene)ethylidene)-2-((4-(4-((2-methyl-6-((E)-(4-((E)-phenyldiazenyl)naphthalen-1-yl)diazenyl)-2,3-dihydro-1H-perimidin-2-yl)methoxy)-4-oxobutanamido)butyl)amino)cyclohex-1-en-1-yl)vinyl)-3,3-dimethyl-3H-indol-1-ium iodide (38)

1-Ethyl-3-(3-dimethylaminopropyl)carbodiimide hydrochloride (EDC-HCl, 31 mg, 0.16 mmol) and 1-hydroxybenzotriazole (HOBt, 22 mg, 0.16 mmol) were added into a solution of the carboxylic acid 6 (83 mg, 0.14 mmol, its synthesis is described at steps 1-4 of the typical example 1) in dry dichloromethane (3 ml) and this mixture was stirred at room temperature for 40 min, under Ar atmosphere. Then, cyanine intermediate 37 (104 mg, 0.14 mmol) and N-methylmorpholine (0.03 ml, 0.29 mmol) were added at 0° C. and the mixture was stirred for 10 min at this temperature and then at room temperature for 20 hrs. Upon completion of the reaction, the organic solvent was evaporated under vacuum and the residue was purified by silica gel column chromatography using a mixture of dichloromethane/methanol (from 98/2 up to 90/10, v/v) as the eluent to provide pure 38 as blue black solid (80 mg, yield 44%). Mp 198-200° C. $^1$H-NMR (400 MHz, acetone-$d_6$) δ 1.03 (t, 6H, J=7.4 Hz), 1.43-1.52 (m, 4H), 1.61 (s, 3H), 1.66 (s, 12H), 1.70-1.89 (m, 10H), 2.50 (t, 4H, J=6.4 Hz), 2.52-2.62 (m, 4H), 3.29-3.37 (m, 2H), 3.70-3.77 (m, 2H), 3.86 (t, 4H, J=7.3 Hz), 4.15 (d, 1H, J=10.8 Hz), 4.40 (d, 1H, J=10.8 Hz), 5.75 (d, 2H, J=12.8 Hz), 6.67-6.74 (m, 2H), 6.78 (brs, 1H, D$_2$O exch.), 7.05 (d, 2H, J=7.9 Hz), 7.12 (t, 2H, J=7.5 Hz), 7.32-7.40 (m, 4H), 7.51-7.55 (m, 1H), 7.66 (d, 2H, J=12.8 Hz), 7.70-7.78 (m, 3H), 7.80-7.92 (m, 2H), 8.08 (d, 1H, J=8.4 Hz), 8.13 (d, 1H, J=8.4 Hz), 8.18-8.22 (m, 2H), 8.25 (d, 1H, J=8.5 Hz), 8.38 (d, 1H, J=9.1 Hz), 9.14-9.21 (m, 2H). $^{13}$C-NMR (151 MHz, acetone-d$_6$) δ 14.25, 20.92, 22.47, 25.42, 26.08, 27.78, 29.19, 30.67, 30.84, 31.73, 39.24, 43.54, 48.49, 51.14, 67.18, 67.85, 95.42, 106.56, 106.99, 109.87, 111.86, 112.14, 112.45, 113.51, 118.86, 121.14, 122.96, 123.54, 124.01, 124.19, 125.00, 127.69, 128.25, 129.05, 130.37, 130.68, 132.24, 132.76, 133.60, 134.85, 139.29, 140.51, 141.04, 142.23, 144.18, 147.78, 147.93, 151.56, 154.42, 168.40, 170.18, 172.56, 172.89.

Example 11

Synthesis of 1-ethyl-2-((E)-2-((E)-3-((E)-2-(1-ethyl-5-methoxy-3,3-dimethylindolin-2-ylidene)ethylidene)-2-(4-(4-((2-methyl-6-((E)-(4-((E)-phenyldiazenyl)naphthalen-1-yl)diazenyl)-2,3-dihydro-1H-perimidin-2-yl)methoxy)-4-oxobutanoyl)piperazin-1-yl)cyclohex-1-en-1-yl)vinyl)-5-methoxy-3,3-dimethyl-3H-indol-1-ium iodide (45, Scheme 11)

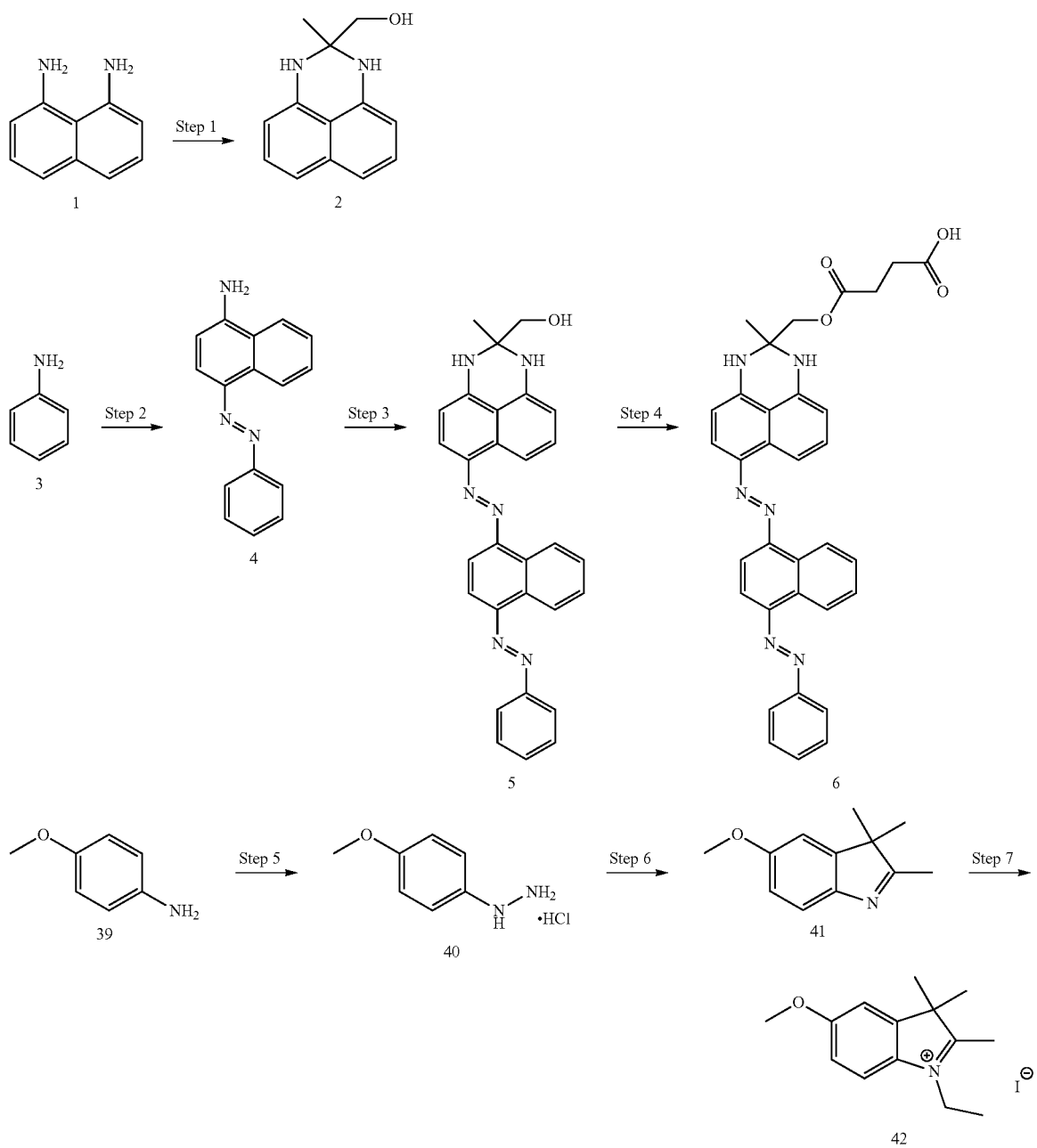

Scheme 11

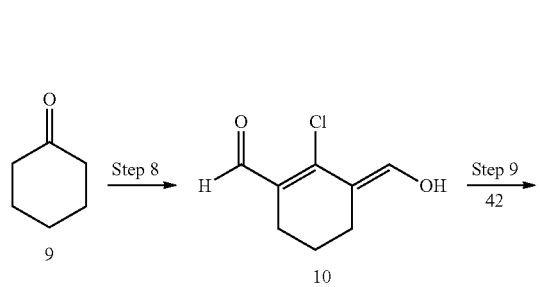
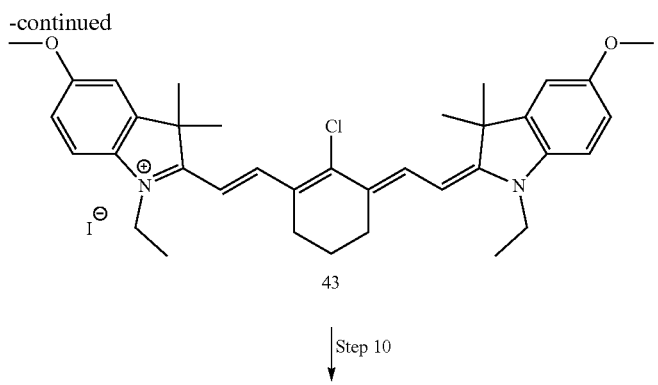
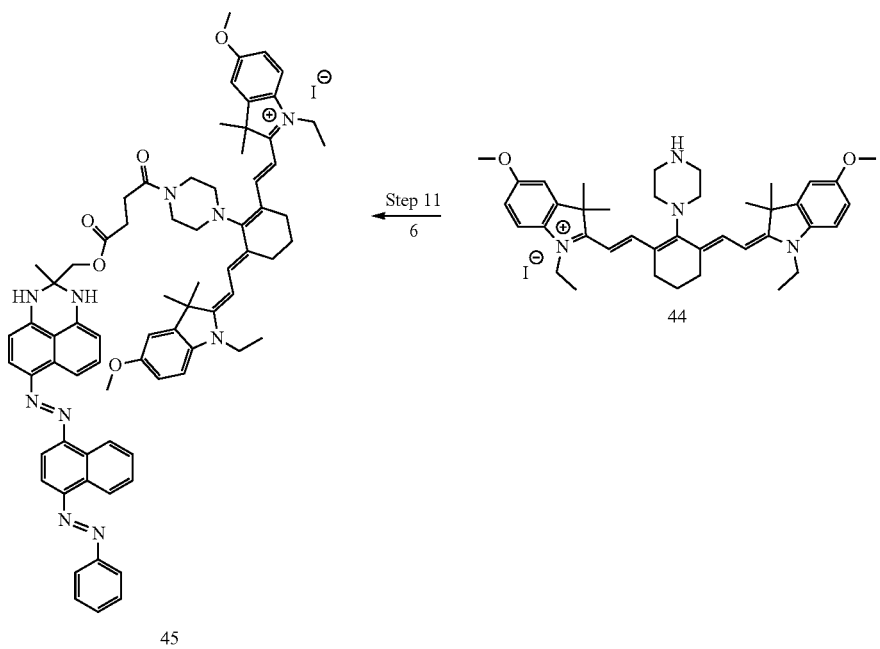

Step 5: Synthesis of (4-methoxyphenyl)hydrazine hydrochloride (40)

4-Methoxyaniline (4.93 g, 40 mmol) was dissolved in a mixture of water (12 ml) and concentrated hydrochloric acid (12 ml), followed by dropwise addition of an aqueous solution of sodium nitrite (3.3 g, 47.83 mmol, in 10 ml of water) over a period of 15 min, at 0° C. This mixture was stirred at that temperature for 90 min and then a solution of stannous chloride dihydrate (19 g, 84.20 mmol) in concentrated hydrochloric acid (15 ml) was added dropwise over a period of 20 min. This mixture was stirred at that temperature for 30 min and then the solid was filtered under vacuum, washed with water (20 ml), ethanol (12 ml) and diethylether (50 ml) to provide pure 40 as a pink solid (4.3 g, yield 62%). Mp 153-155° C. $^1$H-NMR (600 MHz, DMSO-d$_6$) δ 3.69 (s, 3H), 6.87 (d, 2H, J=8.8 Hz), 7.02 (d, 2H, J=8.8 Hz), 10.12 (brs, 3H, D$_2$O exch.). $^{13}$C-NMR (151 MHz, DMSO-d$_6$) δ 55.36, 114.33, 117.24, 138.87, 154.81.

Step 6: Synthesis of 5-methoxy-2,3,3-trimethyl-3H-indole (41)

Hydrazine derivative 40 (2.5 g, 14.33 mmol) was added into a solution of 3-methyl-2-butanone (2 ml, 18.63 mmol) in acetic acid (45 ml) and this mixture was refluxed for 6 hrs under argon. Upon cooling, the reaction mixture was poured into cold water, neutralized with an aqueous solution of sodium hydroxide (25% w/v) and extracted with ethyl acetate. The combined organic layers were dried over sodium sulfate and evaporated. The residue was purified by silica gel column chromatography using a mixture of cyclohexane/ethyl acetate (from 80/20 up to 60/40, v/v) as the eluent to provide pure 41 as red amorphous solid (1.6 g, yield 59%). ¹H-NMR (400 MHz, CDCl₃) δ 1.27 (s, 6H), 2.24 (s, 3H), 3.80 (s, 3H), 6.77-6.83 (m, 2H), 7.43 (d, 1H, J=8.3 Hz). ¹³C-NMR (100 MHz, CDCl₃) δ 15.50, 23.40, 53.90, 55.30, 108.30, 112.10, 120.20, 147.40, 147.60, 158.00, 186.00.

Step 7: Synthesis of 1-ethyl-5-methoxy-2,3,3-trimethyl-3H-indol-1-ium iodide (42)

5-Methoxy-2,3,3-trimethylindolenine (41, 1 g, 5.29 mmol) was dissolved in toluene (8 ml) and then ethyl iodide (0.94 ml, 11.64 mmol) was added. The mixture was heated at 100° C. under Ar atmosphere for 12 hrs. The reaction was cooled to room temperature, the solid was filtered under vacuum and was washed with a mixture of EtOAc/Et₂O (10 ml, 1/1 v/v) and air dried to provide pure 42 as brown solid (1.4 g, yield 77%). Mp 178-180° C. ¹H-NMR (600 MHz, DMSO-d₆) δ 1.43 (t, 3H, J=7.3 Hz), 1.52 (s, 6H), 2.77 (s, 3H), 3.86 (s, 3H), 4.45 (q, 2H, J=7.3 Hz), 7.14 (dd, 1H, J=2.5 Hz, 8.8 Hz), 7.48 (d, 1H, J=2.4 Hz), 7.87 (d, 1H, J=8.8 Hz). ¹³C-NMR (151 MHz, DMSO-d₆) δ 12.68, 13.43, 21.92, 42.95, 53.86, 56.08, 109.43, 114.32, 116.20, 133.84, 144.03, 160.59, 193.05.

Step 9: Synthesis of 2-((E)-2-((E)-2-chloro-3-((E)-2-(1-ethyl-5-methoxy-3,3-dimethylindolin-2-ylidene)ethylidene)cyclohex-1-en-1-yl)vinyl)-1-ethyl-5-methoxy-3,3-dimethyl-3H-indol-1-ium iodide (43)

Intermediate 42 (1.1 g, 3.19 mmol) and sodium acetate (124 mg, 1.51 mmol) were added into a solution of the aldehyde 10 (261 mg, 1.51 mmol, its synthesis is described at step 6 of the typical example 1) in acetic anhydride (10 ml) and this mixture was heated at 60° C. for 3 hrs under Ar atmosphere. Then the mixture was cooled to room temperature, diluted with diethyl ether and filtered under vacuum. The precipitate was washed with a saturated aqueous solution of NaHCO₃ until no bubble appeared. The solid was washed with water twice and air dried to afford 43 as green-gold solid (0.85 g, yield 80%). Mp 257-259° C. ¹H-NMR (400 MHz, DMSO-d₆) δ 1.29 (t, 6H, J=7.1 Hz), 1.66 (s, 12H), 1.80-1.87 (m, 2H), 2.64-2.74 (m, 4H), 3.81 (s, 6H), 4.15-4.27 (m, 4H), 6.24 (d, 2H, J=13.2 Hz), 6.99 (dd, 2H, J=2.5 Hz, 8.7 Hz), 7.31 (d, 2H, J=2.5 Hz), 7.37 (d, 2H, J=8.1 Hz), 8.20 (d, 2H, J=13.2 Hz). ¹³C-NMR (100 MHz, DMSO-d₆) δ 12.28, 20.51, 25.90, 27.40, 38.88 (overlapping with DMSO-d₆), 49.19, 55.95, 100.85, 109.32, 112.05, 113.78, 125.26, 135.19, 141.91, 143.05, 146.93, 157.98, 170.78.

Step 10: Synthesis of 1-ethyl-2-((E)-2-((E)-3-((E)-2-(1-ethyl-5-methoxy-3,3-dimethylindolin-2-ylidene)ethylidene)-2-(piperazin-1-yl)cyclohex-1-en-1-yl)vinyl)-5-methoxy-3,3-dimethyl-3H-indol-1-ium iodide (44)

Piperazine (267 mg, 3.1 mmol) was added into a solution of the chloro derivative 43 (343 mg, 0.49 mmol) in acetonitrile (12 ml) and this mixture was refluxed for 4 hrs under Ar atmosphere. Then, the organic solvent was evaporated under vacuum and the residue was purified by silica gel column chromatography using a mixture of dichloromethane/methanol (from 98/2 up to 90/10, v/v) as the eluent, to provide pure 44 as blue black solid (300 mg, yield 82%). Mp 272-274° C. ¹H-NMR (400 MHz, acetone-d₆) δ 1.37 (t, 6H, J=7.0 Hz), 1.74 (s, 12H), 1.79-1.85 (m, 2H), 2.55 (t, 4H, J=6.4 Hz), 3.16-3.21 (m, 4H), 3.73-3.77 (m, 4H), 3.85 (s, 6H), 4.14 (q, 4H, J=7.2 Hz), 6.02 (d, 2H, J=13.6 Hz), 6.95 (dd, 2H, J=2.4 Hz, 8.5 Hz), 7.12-7.18 (m, 4H), 7.88 (d, 2H, J=13.6 Hz). ¹³C-NMR (100 MHz, acetone-d₆) δ 12.14, 22.82, 25.71, 28.97, 39.24, 48.73, 49.34, 56.32, 57.04, 96.56, 110.21, 111.01, 113.99, 124.68, 137.00, 141.88, 143.28, 158.27, 169.35, 174.55.

Step 11: Synthesis of 1-ethyl-2-((E)-2-((E)-3-((E)-2-(1-ethyl-5-methoxy-3,3-dimethylindolin-2-ylidene)ethylidene)-2-(4-(4-((2-methyl-6-((E)-(4-((E)-phenyldiazenyl)naphthalen-1-yl)diazenyl)-2,3-dihydro-1H-perimidin-2-yl)methoxy)-4-oxobutanoyl)piperazin-1-yl)cyclohex-1-en-1-yl)vinyl)-5-methoxy-3,3-dimethyl-3H-indol-1-ium iodide (45)

1-Ethyl-3-(3-dimethylaminopropyl)carbodiimide hydrochloride (EDC·HCl, 31 mg, 0.16 mmol) and 1-hydroxybenzotriazole (HOBt, 22 mg, 0.16 mmol) were added into a solution of the carboxylic acid 6 (83 mg, 0.14 mmol, its synthesis is described at steps 1-4 of the typical example 1) in dry dichloromethane (3 ml) and this mixture was stirred at room temperature for 40 min, under Ar atmosphere. Then, cyanine intermediate 44 (105 mg, 0.14 mmol) and N-methylmorpholine (0.03 ml, 0.29 mmol) were added at 0° C. and the mixture was stirred for 10 min at this temperature and then at room temperature for 20 hrs. Upon completion of the reaction, the organic solvent was evaporated under vacuum and the residue was purified by silica gel column chromatography using a mixture of dichloromethane/methanol (from 95/5 up to 85/15, v/v) as the eluent to provide pure 45 as blue black solid (90 mg, yield 49%). Mp 203-205° C. ¹H-NMR (400 MHz, acetone-d₆) δ 1.33 (t, 6H, J=7.1 Hz), 1.68 (s, 12H), 1.71-1.75 (m, 5H), 2.46 (t, 4H, J=6.4 Hz), 2.55-2.64 (m, 4H), 3.51-3.59 (m, 4H), 3.73-3.82 (m, 8H), 3.88-3.94 (m, 2H), 4.13 (q, 4H, J=7.2 Hz), 4.30 (d, 1H, J=11.0 Hz), 4.53 (d, 1H, J=11.0 Hz), 6.00 (d, 2H, J=13.8 Hz), 6.40 (brs, 1H, D₂O exch.), 6.68 (d, 1H, J=7.3 Hz), 6.79 (d, 1H, J=8.5 Hz), 6.91 (dd, 2H, J=2.5 Hz, 8.6 Hz), 7.14-7.18 (m, 4H), 7.40 (t, 1H, J=7.5 Hz), 7.49 (brs, 1H, D₂O exch.), 7.58-7.70 (m, 4H), 7.74-7.78 (m, 1H), 7.87 (d, 2H, J=13.8 Hz), 7.99-8.06 (m, 2H), 8.09-8.14 (m, 2H), 8.20 (d, 1H, J=8.5 Hz), 8.27 (d, 1H, J=8.5 Hz), 9.08 (m, 2H). ¹³C-NMR (151 MHz, acetone-d₆) δ 12.33, 22.61, 25.73, 25.87, 28.89, 29.08, 30.51, 39.61, 44.21, 47.81, 49.72, 54.38, 54.86, 56.42, 67.42, 68.91, 98.27, 106.40, 106.68, 110.08, 111.57, 111.65, 111.89, 112.23, 113.52, 114.28, 118.83, 124.01, 124.18, 124.94, 126.42, 127.63, 128.24, 130.40, 130.77, 132.27, 132.76, 133.62, 134.85, 136.68, 140.30, 142.02, 142.45, 143.59, 147.72, 148.14, 151.37, 154.43, 158.70, 169.66, 170.27, 171.22, 172.82.

Example 12
Synthesis of 1-ethyl-2-((E)-2-((E)-3-((E)-2-(1-ethyl-5-methoxy-3,3-dimethylindolin-2-ylidene)ethylidene)-2-((4-(4-((2-methyl-6-((E)-(4-((E)-phenyldiazenyl)naphthalen-1-yl)diazenyl)-2,3-dihydro-1H-perimidin-2-yl)methoxy)-4-oxobutanamido)butyl)amino)cyclohex-1-en-1-yl)vinyl)-5-methoxy-3,3-dimethyl-3H-indol-1-ium iodide (47, Scheme 12)
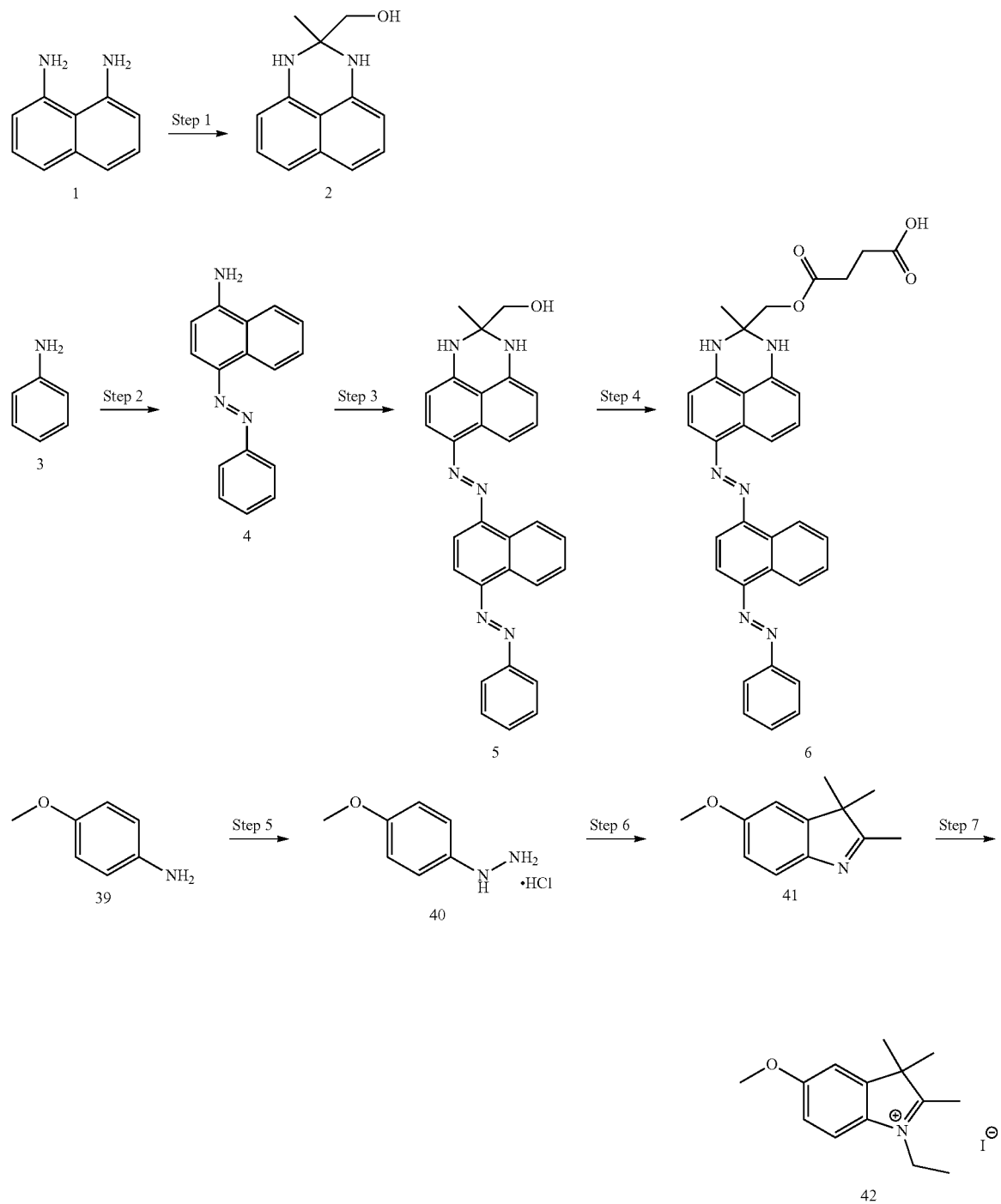
Scheme 12

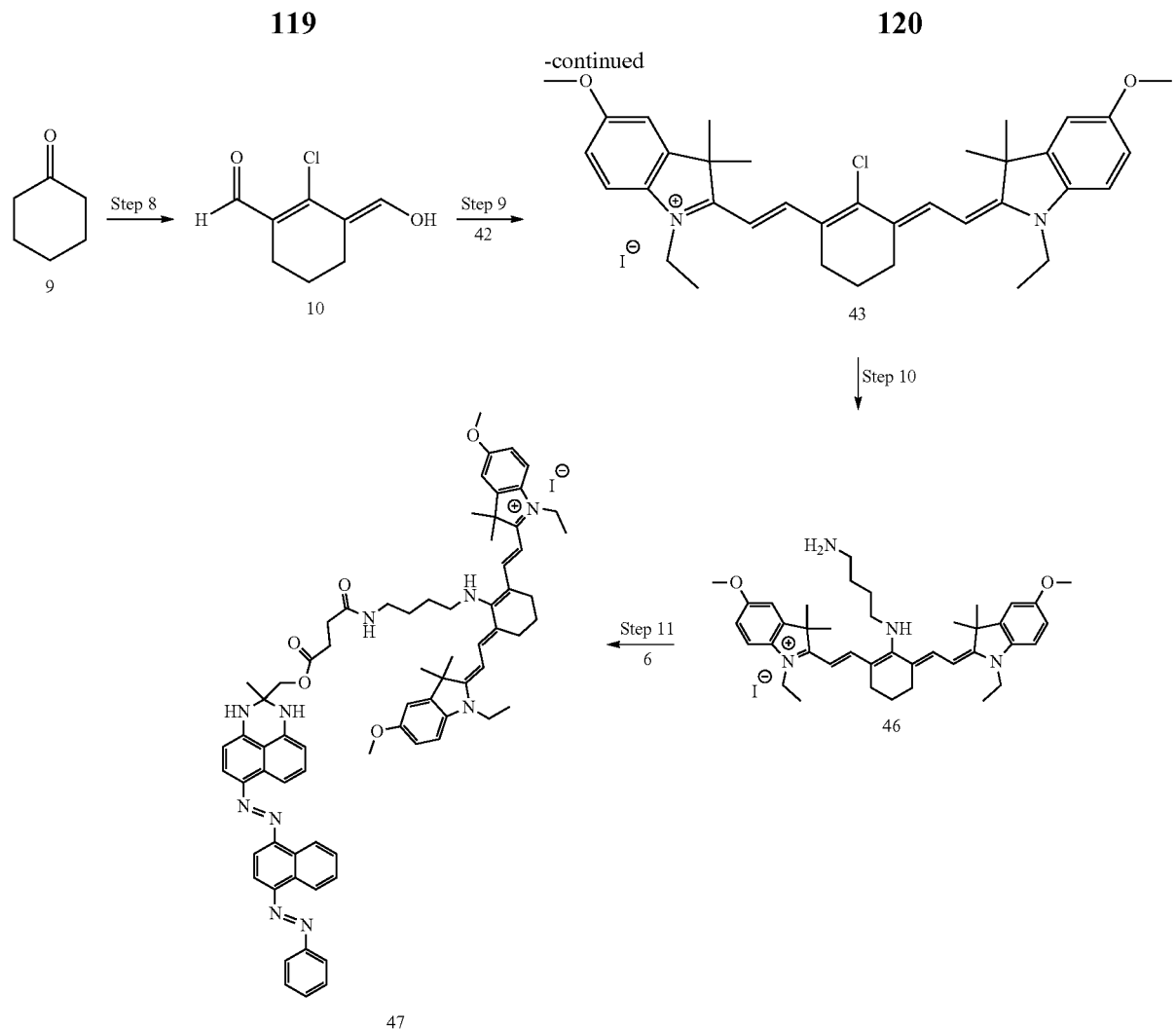

Step 10: Synthesis of 2-((E)-2-((E)-2-((4-aminobutyl)amino)-3-((E)-2-(1-ethyl-5-methoxy-3,3-dimethylindolin-2-ylidene)ethylidene)cyclohex-1-en-1-yl)vinyl)-1-ethyl-5-methoxy-3,3-dimethyl-3H-indol-1-ium iodide (46)

1,4-Diaminobutane (130 mg, 1.47 mmol) and N,N-diisopropylethylamine (0.085 ml, 0.49 mmol) were added into a solution of the chloro derivative 43 (343 mg, 0.49 mmol, its synthesis is described at steps 5-9 of the typical example 11) in acetonitrile (15 ml) and this mixture was refluxed for 5 hrs under Ar atmosphere. Then, the organic solvent was evaporated under vacuum and the residue was purified by silica gel column chromatography using a mixture of dichloromethane/methanol (from 95/5 up to 80/20, v/v) as the eluent, to provide pure 46 as blue black solid (130 mg, yield 35%). Mp 144-146° C. $^{1}$H-NMR (400 MHz, methanol-$d_4$) δ 1.33 (t, 6H, J=7.1 Hz), 1.68 (s, 12H), 1.72-1.77 (m, 2H), 1.80-1.90 (m, 4H), 2.53 (t, 4H, J=6.2 Hz), 2.99-3.03 (m, 2H), 3.72-3.81 (m, 2H), 3.82 (s, 6H), 3.98 (q, 4H, J=7.2 Hz), 5.81 (d, 2H, J=13.2 Hz), 6.89 (dd, 2H, J=2.5 Hz, 8.6 Hz), 7.02 (d, 2H, J=8.7 Hz), 7.05 (d, 2H, J=2.4 Hz), 7.80 (d, 2H, J=13.2 Hz). $^{13}$C-NMR (100 MHz, methanol-$d_4$) δ 11.99, 23.20, 26.17, 29.30, 30.03, 30.88, 39.39, 40.58, 51.37, 56.61, 96.61, 110.44, 110.72, 114.32, 121.07, 137.63, 140.35, 143.29, 158.55, 169.24, 169.33.

Step 11: Synthesis of 1-ethyl-2-((E)-2-((E)-3-((E)-2-(1-ethyl-5-methoxy-3,3-dimethylindolin-2-ylidene)ethylidene)-2-((4-(4-((2-methyl-6-((E)-(4-((E)-phenyldiazenyl)naphthalen-1-yl)diazenyl)-2,3-dihydro-1H-perimidin-2-yl)methoxy)-4-oxobutanamido)butyl)amino)cyclohex-1-en-1-yl)vinyl)-5-methoxy-3,3-dimethyl-3H-indol-1-ium iodide (47)

1-Ethyl-3-(3-dimethylaminopropyl)carbodiimide hydrochloride (EDC-HCl, 31 mg, 0.16 mmol) and 1-hydroxybenzotriazole (HOBt, 22 mg, 0.16 mmol) were added into a solution of the carboxylic acid 6 (83 mg, 0.14 mmol, its synthesis is described at steps 1-4 of the typical example 1) in dry dichloromethane (3 ml) and this mixture was stirred at room temperature for 40 min, under Ar atmosphere. Then, cyanine intermediate 46 (105 mg, 0.14 mmol) and N-methylmorpholine (0.03 ml, 0.29 mmol) were added at 0° C. and the mixture was stirred for 10 min at this temperature and then at room temperature for 20 hrs. Upon completion of the reaction, the organic solvent was evaporated under vacuum and the residue was purified by silica gel column chromatography using a mixture of dichloromethane/methanol (from 95/5 up to 85/15, v/v) as the eluent to provide pure 47 as blue black solid (70 mg, yield 38%). Mp 204-206° C. $^{1}$H-NMR (400 MHz, acetone-$d_6$) δ 1.28 (t, 6H, J=6.8 Hz), 1.64 (s, 3H), 1.66 (s, 12H), 1.72-1.78 (m, 4H), 1.91-1.96 (m, 2H), 2.48 (t, 4H, J=6.3 Hz), 2.55-2.66 (m, 4H), 3.30-3.35 (m, 2H), 3.77 (s, 6H), 3.79-3.83 (m, 2H), 3.99 (q, 4H, J=7.2 Hz), 4.17 (d, 1H; J=10.6 Hz), 4.39 (d, 1H, J=10.5 Hz), 5.79 (d, 2H, J=13.1 Hz), 6.41 (brs, 1H, $D_2O$ exch.), 6.71 (d, 1H, J=7.5 Hz), 6.77-6.84 (m, 3H), 6.97 (d, 2H, J=8.6 Hz), 7.07 (d, 2H, J=2.4 Hz), 7.39-7.43 (m, 1H), 7.46 (brs, 1H, $D_2O$ exch.), 7.56-7.65 (m, 3H), 7.73-7.82 (m, 4H), 8.02-8.06 (m, 2H), 8.08-8.14 (m, 2H), 8.17 (d, 1H, J=8.5 Hz), 8.31 (d, 1H, J=8.4 Hz), 9.05-9.13 (m, 2H). $^{13}$C-NMR (100 MHz, acetone-$d_6$) δ 11.90, 22.67, 23.40, 25.47, 25.86, 27.80, 29.08, 30.84, 31.72, 38.92, 39.35, 49.03, 55.05, 56.30, 67.20, 67.88, 95.05, 106.56, 107.00, 110.12, 110.28, 111.89, 112.16, 112.46, 113.53, 113.89, 118.88, 120.49, 124.02, 124.20, 125.00, 127.69, 128.25, 130.38, 130.69, 132.25, 132.77, 133.61, 134.86, 137.19, 139.54, 140.53, 142.23, 142.84, 147.82, 147.93, 151.55, 154.45, 157.81, 168.36, 168.82, 172.59, 172.85.

Example 13

Synthesis of 1-ethyl-2-((E)-2-((E)-3-((E)-2-(1-ethyl-3,3-dimethylindolin-2-ylidene)ethylidene)-2-((6-((2-methyl-6-((E)-(4-((E)-phenyldiazenyl)naphthalen-1-yl)diazenyl)-2,3-dihydro-1H-perimidin-2-yl) methoxy)-6-oxohexyl)amino)cyclohex-1-en-1-yl) vinyl)-3,3-dimethyl-3H-indol-1-ium iodide (49, Scheme 13)

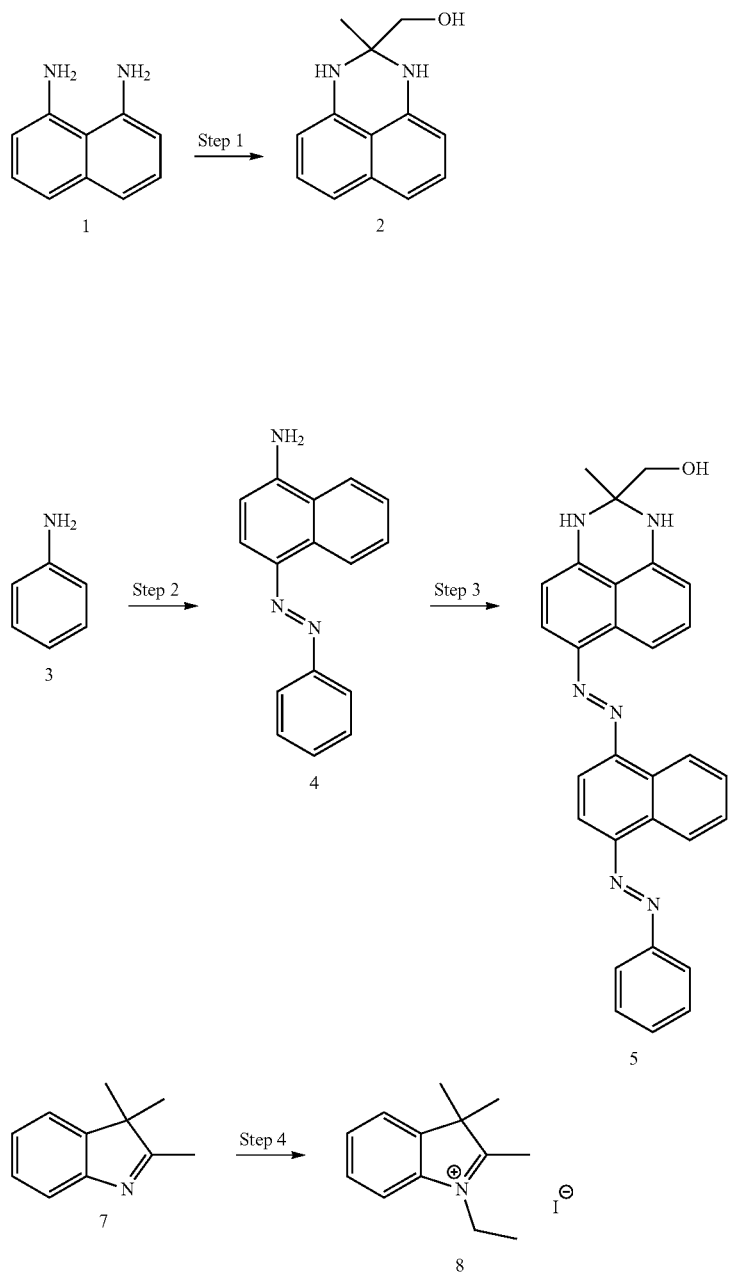

Scheme 13

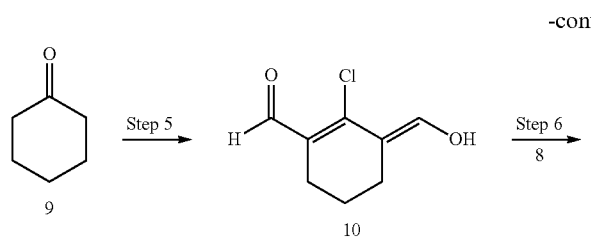
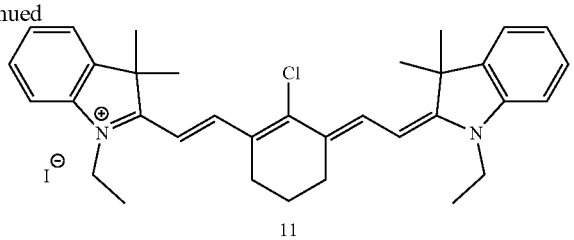
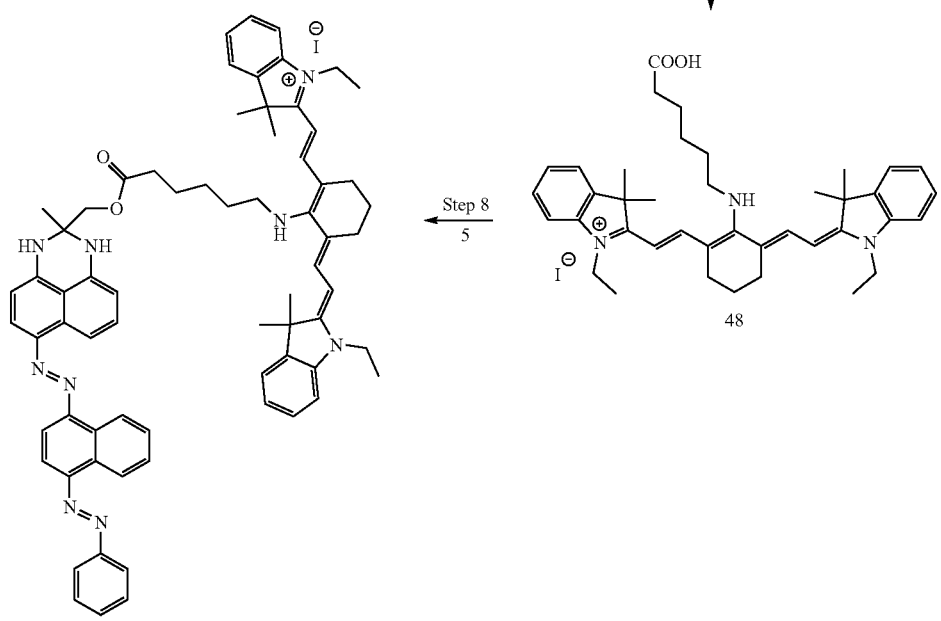

Step 7: Synthesis of 2-((E)-2-((E)-2-((5-carboxypentyl)amino)-3-((E)-2-(1-ethyl-3,3-dimethylindolin-2-ylidene)ethylidene)cyclohex-1-en-1-yl)vinyl)-1-ethyl-3,3-dimethyl-3H-indol-1-ium iodide (48)

6-Aminohexanoic acid (405 mg, 3.08 mmol) was added into a solution of the chloro derivative 11 (400 mg, 0.63 mmol, its synthesis is described at steps 5-7 of the typical example 1) in acetonitrile (6 ml) and this mixture was refluxed for 48 hrs under Ar atmosphere. Then, the organic solvent was evaporated under vacuum and the residue was purified by silica gel column chromatography using a mixture of dichloromethane/methanol (from 98/2 up to 90/10, v/v) as the eluent, to provide pure 48 as blue black solid (320 mg, yield 70%). Mp 141-143° C. $^1$H-NMR (400 MHz, acetone-$d_6$) δ 1.34 (t, 6H, J=7.2 Hz), 1.48-1.55 (m, 2H), 1.62-1.72 (m, 14H), 1.80-1.84 (m, 2H), 1.91-1.96 (m, 2H), 2.33 (t, 2H, J=7.3 Hz), 2.59 (t, 4H, J=6.1 Hz), 3.90 (t, 2H, J=6.9 Hz), 4.08 (q, 4H, J=7.0 Hz), 5.93 (d, 2H, J=13.0 Hz), 7.07-7.14 (m, 4H), 7.32 (t, 2H, J=8.3 Hz), 7.44 (d, 2H, J=6.8 Hz), 7.82-7.87 (m, 3H). $^{13}$C-NMR (100 MHz, acetone-$d_6$) δ 11.82, 22.50, 25.33, 25.97, 27.02, 29.09, 31.70, 34.26, 38.65, 48.49, 51.00, 94.98, 109.64, 121.24, 122.98, 123.50, 129.14, 139.41, 141.13, 143.78, 167.88, 170.39, 174.50.

Step 8: Synthesis of 1-ethyl-2-((E)-2-((E)-3-((E)-2-(1-ethyl-3,3-dimethylindolin-2-ylidene)ethylidene)-2-((6-((2-methyl-6-((E)-(4-((E)-phenyldiazenyl)naphthalen-1-yl)diazenyl)-2,3-dihydro-1H-perimidin-2-yl)methoxy)-6-oxohexyl)amino)cyclohex-1-en-1-yl)vinyl)-3,3-dimethyl-3H-indol-1-ium iodide (49)

1-Ethyl-3-(3-dimethylaminopropyl)carbodiimide hydrochloride (EDC·HCl, 31 mg, 0.16 mmol) and 1-hydroxybenzotriazole (HOBt, 22 mg, 0.16 mmol) were added into a solution of the cyanine carboxylic acid 48 (103 mg, 0.14 mmol) in dry dichloromethane (5 ml) and this mixture was stirred at room temperature for 40 min, under Ar atmosphere. Then, alcohol 5 (66 mg, 0.14 mmol, its synthesis is described at steps 1-3 of the typical example 1) and N-methylmorpholine (0.03 ml, 0.29 mmol) were added at 0° C. and the mixture was stirred for 10 min at this temperature and then at room temperature for 48 hrs. Upon completion of the reaction, the organic solvent was evaporated under vacuum and the residue was purified by silica gel column chromatography using a mixture of dichloromethane/methanol (from 99/1 up to 90/10, v/v) as the eluent to provide pure 49 as blue black solid (110 mg, yield 66%). Mp 203-204° C. $^1$H-NMR (400 MHz, acetone-$d_6$) δ 1.28 (t, 6H, J=7.0 Hz), 1.44-1.51 (m, 2H), 1.58-1.65 (m, 14H), 1.67 (s, 3H), 1.73-1.77 (m, 2H), 1.79-1.84 (m, 2H), 2.19-2.23 (m, 2H), 2.49 (t, 4H, J=6.4 Hz), 3.75 (t, 2H, J=6.9 Hz), 4.03 (q, 4H, J=7.0 Hz), 4.23 (d, 1H, J=11.0 Hz), 4.32 (d, 1H, J=11.0 Hz), 5.83 (d, 2H, J=12.8 Hz), 6.30 (brs, 1H, $D_2O$ exch.), 6.65 (d, 1H, J=7.3 Hz), 6.76 (d, 1H, J=7.5 Hz), 7.04-7.12 (m, 5H), 7.29 (t, 2H, J=7.8 Hz), 7.37-7.43 (m, 3H), 7.58-7.62 (m, 1H), 7.64-7.69 (m, 2H), 7.73-7.82 (m, 3H), 8.02-8.14 (m, 5H), 8.20 (d, 1H, J=8.5 Hz), 8.30 (d, 1H, J=8.3 Hz), 9.09 (d, 1H, J=8.1 Hz), 9.14 (d, 1H, J=7.6 Hz). $^{13}$C-NMR (100 MHz, acetone-$d_6$) δ 11.84, 22.49, 24.99, 25.45, 25.94, 26.93, 29.12, 31.67, 34.46, 38.68, 48.52, 51.13, 67.16, 69.34, 95.09, 106.14, 106.57, 109.67, 111.87, 111.96, 112.39, 113.54, 119.06, 121.25, 123.02, 123.61, 124.01, 124.20, 124.99, 127.69, 128.27, 129.15, 130.38, 130.74, 132.24, 132.76, 133.63, 134.84, 139.43, 140.40, 141.11, 142.56, 143.73, 147.73, 148.24, 151.59, 154.43, 167.98, 170.13, 173.41.

Example 14

Preparation of Polymeric Micelle Comprising a Compound of Formula I

Polymeric micelles were prepared by the thin-film hydration method [Pippa, N., Mariaki, M., Pispas, S., Demetzos, C. (2014)]. Briefly, an appropriate amount of PEO-b-PCL was dissolved in chloroform. An appropriate amount of the compound of example 2 (15, Scheme 2) being dissolved in acetone was added. The mixture was then transferred into a round flask connected to a rotary evaporator (IKA® RV 10 digital). Vacuum was applied and the polymeric thin film was formed by slow removal of the solvent at 42° C. The film was subsequently hydrated in HPLC-grade water, by slowly stirring for 1 h, in a water bath at 42° C. The concentration of PEO-b-PCL in the final micellar dispersion was 5 mg/mL and the concentration of the compound of example 2 was 0.01 mg/mL. The resultant micelles were subjected to two, 3-min-long sonication cycles (amplitude 70, cycle 0.7) interrupted by a 3-min-resting period, using a probe sonicator (UP 200S, dr. hielsher GmbH, Berlin, Germany). The resultant micelles were allowed to anneal for 30 min.

Physicochemical Characterization of Micelles—Dynamic Light Scattering (DLS)

The physicochemical characteristics of the prepared nanosystems were evaluated by measuring their mean hydrodynamic diameter (Dh, nm) and polydispersity index (PDI) [Lagopati, N., 2014]. These parameters were assessed for the physicochemical characterization of loaded micelles immediately after their preparation. 100 µL aliquots were 30-fold diluted in HPLC-grade water; measurements were performed at a detection angle of 90°, at 25° C., in a photon correlation spectrometer (Zetasizer 3000 HSA, Malvern, UK) and analyzed by the CONTIN method (MALVERN software).

Figure 5:
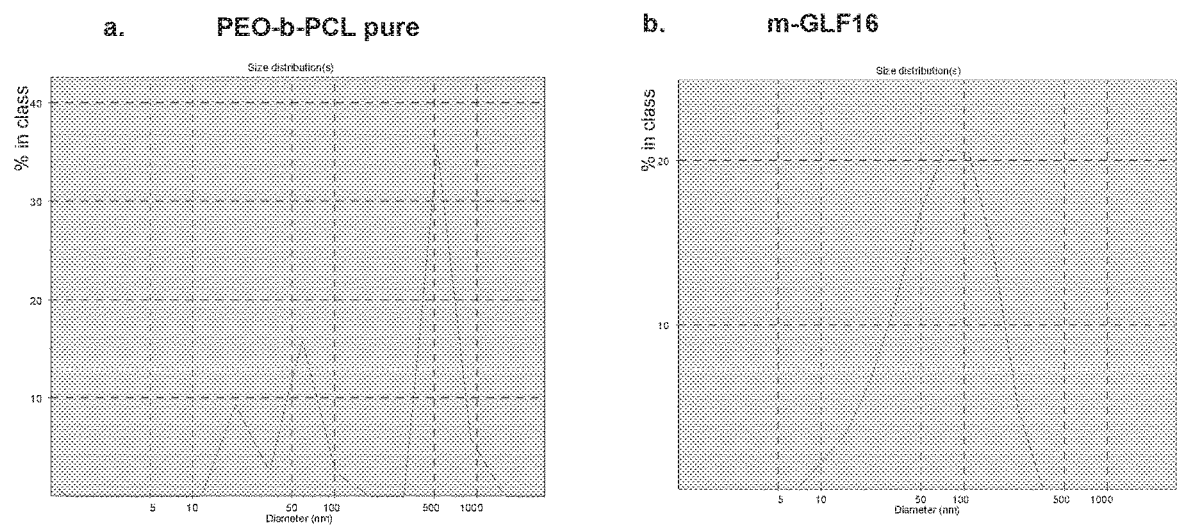
FIG. 5. Size distribution (hydrodynamic diameter (Dh) of (A) pure PEO-b-PCL and (B) polymeric micelles of the compound of example 2 (m-GLF16).

The size (Dh) of pure PEO-b-PCL micelles was found at 95 nm, addition of the the compound of example 2 led to the increase of the Dh at 110 nm, indicating thus its successful incorporation (see FIG. 5).

Physicochemical Characterization of Micelles—Transmission Electron Microscopy (TEM)

Figure 6:
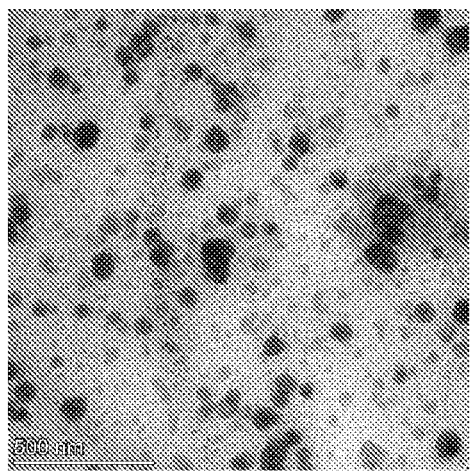
FIG. 6. TEM images of (A) pure PEO-b-PCL micelles and (B) polymeric micelles of the compound of example 2 (m-GLF16).
Figure 6:
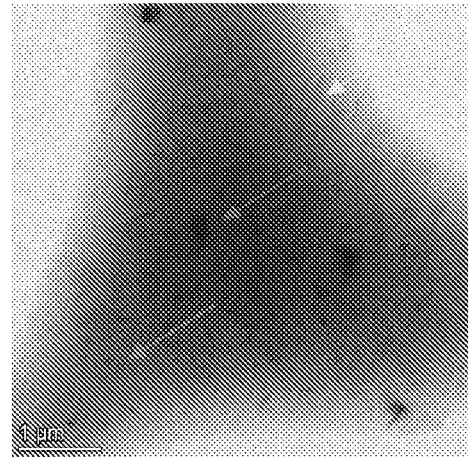

The structure and the shape of the pure PEO-b-PCL as well as the micelles of the compound of example 2 (m-GLF-16) are visualized in FIG. 6 through TEM image acquisition (TEM, CM20, Philips, Amsterdam, The Netherlands). Pure PEO-b-PCL are self-assembled into micellar structures and more specifically into well-defined spherical micelles, where the hydrophobic PCL core can be observed in the centre, surrounded by the less well visible hydrophilic PEO corona (FIG. 6A). The incorporation of the compound of example 2 led to the formation of micelles (red arrow, bottom), warm-like micelles (yellow arrow, top), and larger aggregates (blue arrow, middle) according to the TEM images (FIG. 6B) probably because of a different drug-copolymer co-assembly and an increase in the overall hydrophobic content and changes in the interfacial core-corona energy of the mixed drug-copolymer aggregates. The morphologies that are observed are in line with those appearing in the literature. We should also note that the size of both systems is in general agreement with DLS results. The secondary aggregates which are observed in TEM images are probably due to the dried nature of the sample [Grossen et al., J Nanomat 2016].

Detection of Senescent Cells in Cell Cultures

1-Ethyl-2-((E)-2-((E)-3-((E)-2-(1-ethyl-3,3-dimethylindolin-2-ylidene)ethylidene)-2-((4-(4-((2-methyl-6-((E)-(4-((E)-phenyldiazenyl)naphthalen-1-yl)diazenyl)-2,3-dihydro-1H-perimidin-2-yl)methoxy)-4-oxobutanamido) butyl)amino)cyclohex-1-en-1-yl)vinyl)-3,3-dimethyl-3H-indol-1-ium iodide (15, Scheme 2, Example 2) was used to detect senescent cells in cell spreads using fluorescent microscopy (FIG. 1).

Li-Fraumeni-p21$^{WAF1/Cip1}$ or HBEC-CDC6 Tet-ON cellular systems were grown on cover slips and collected before and after the mentioned respective treatments for induction of senescence. Cover slips were treated as follows:
 a) Cell spreads, immobilized preferably on a microscopy coverslip, are fixed in 4% paraformaldehyde (PFA) for 10 minutes at 4° C.;
 b) Wash with PBS;
 c) Cell membrane permeabilization: Immerse coverslips in solution of 0.3% Triton-X 100 diluted in PBS for 15 minutes;
 d) Wash with PBS;
 e) Apply compound of formula I on cells for 10 minutes in dark conditions;
 f) Wash 3 times with fresh wash buffer [PBS/DMSO (2.5%)/TWEEN-20 (2.5%)];
 g) Incubate cells with 0.3% Triton-X 100 diluted in PBS for 3 minutes;
 h) Wash with PBS;
 i) Apply DAPI 1/5000 for 5 minutes in dark condition;
 j) Rinse samples with $dH_2O$ for 30 seconds;
 k) Cover section using a mounting medium for immunofluorescence.

Figure 2:
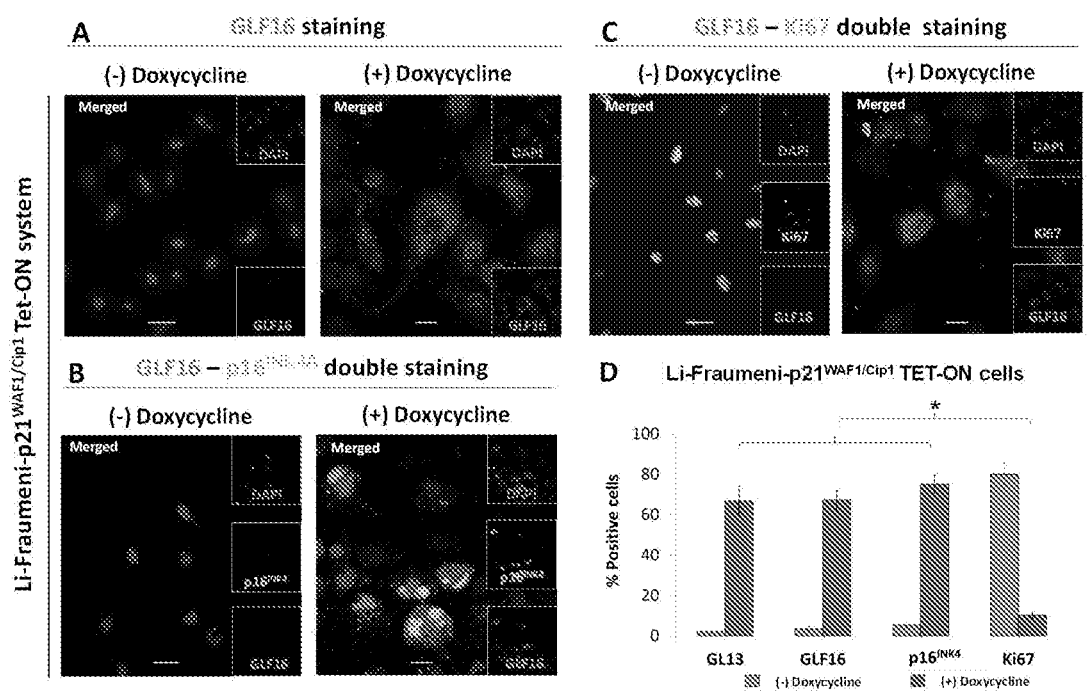
FIG. 2. Detection of senescent cells in culture using a compound of formula I (GLF16, 15, Scheme 2, Example 2). (A-D) Li-Fraumeni-p21$^{WAF1/Cip1}$ Tet-ON cells treated or not with Doxycycline for 6-8 days were fixed, permeabilized and stained with GLF16 (A). GLF16 staining resulted in an intense cytoplasmic signal (corresponding to lipofuscin aggregates) abundant in senescent cells and entirely absent in untreated ones. (B) GLF16 specificity was subsequently evaluated by co-staining with anti-p16$^{INK4A}$ a factor commonly linked with senescence. (C) Specificity of GLF16 was further evaluated by co-staining with the proliferative marker Ki67. An inverse relationship between GLF16 and Ki67 positivity was depicted. (D) Quantification of the percentage of positive cells after staining with the indicated markers depicted as means±SD from six independent experiments. Images were acquired using a confocal microscope equipped with a digital camera and positive cells were evaluated by two independent readers. (E-H) Similar experimental approach as in (A-D) was followed using the HBEC CDC6 Tet-ON cellular system. (1) Results from Quantitative Image-Based Cytometry (QIBC) in HBEC CDC6 Tet-ON cells at the indicated timepoints, depicting cell cycle distribution based on EdU incorporation and DAPI levels (a.u. arbitrary unit). GLF16 mean intensity per cell is indicated by color coding. Bar graphs (lower part) show GLF16 mean intensity per cell alone. * $p<0.05$ for GLF16 versus Ki67 in doxycycline-treated cells, based on the one-way non-parametric ANOVA (Kruskal Wallis Test), for both cellular systems. **** $p<0.001$ for GLF16 mean intensity after one-way non-parametric ANOVA (Kruskal Wallis Test). Objectives 20×, 40×. Scale bars: 10 μm (A, C, E) 20 μm (B, D, F).
Figure 2:
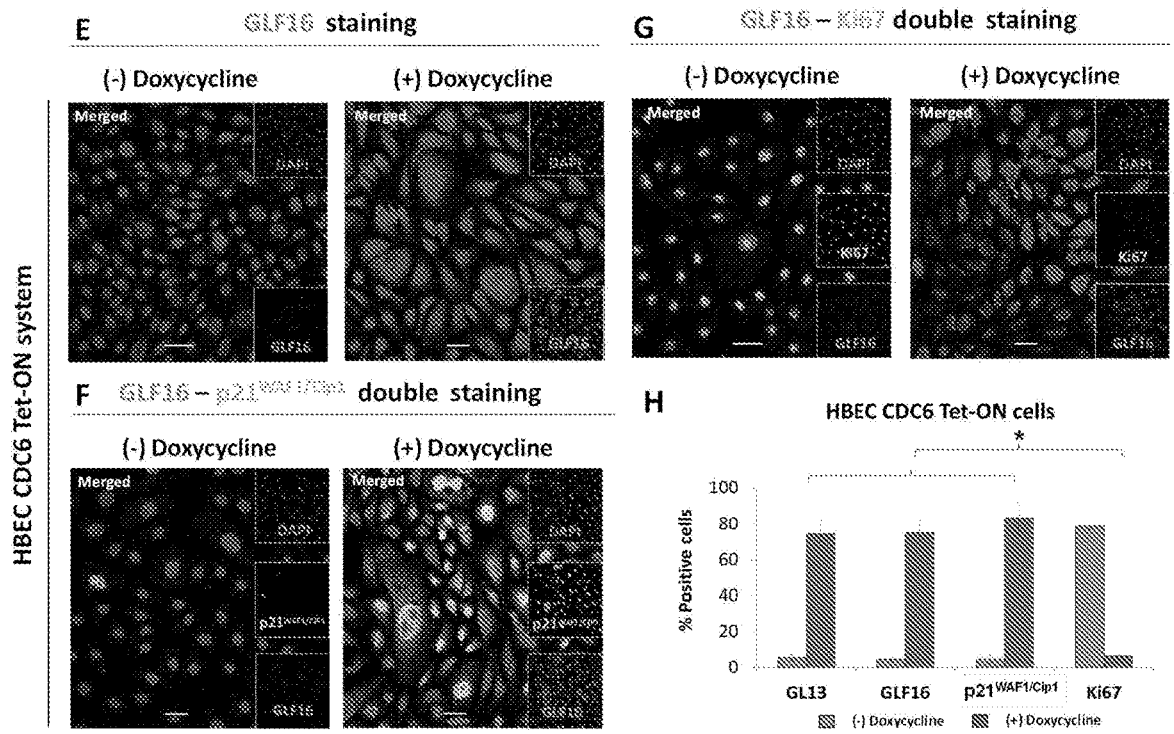
Figure 2:
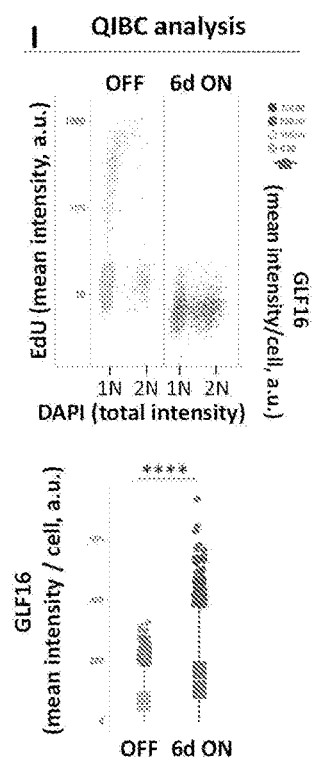

Representative results from the application of this method are shown in FIG. 2. Senescent cells are depicted by red color, due to the presence of the fluorophore cyanine.

The linking of the fluorophore permits ideal visualization of senescent cells by applying conventional fluorescent microscopy, as the positive signal is strong and well discerned. Panels A and E of FIG. 2 present successful application of the new compound 15, designated GLF16, where the treatment marked "(−) Doxycycline" represents negative (absence of staining) control experiments for the specificity of the 15 reaction in these panels. Specificity of compound 15 is further delineated in panels B, C, F, G by the concordant staining presence of the senescence associated factors p16$^{INK4A}$ (A) and p21$^{WAF1/Cip}$ (F) under "(+) Doxycycline" treatment, and lack of expression of the proliferation marker Ki67 (C,G) under the same experimental condition.

Detection of Senescent Cells in Tissue Sections

1-Ethyl-2-((E)-2-((E)-3-((E)-2-(1-ethyl-3,3-dimethylindolin-2-ylidene)ethylidene)-2-((4-(4-((2-methyl-6-((E)-(4-((E)-phenyldiazenyl)naphthalen-1-yl)diazenyl)-2,3-dihydro-1H-perimidin-2-yl)methoxy)-4-oxobutanamido)

butyl)amino)cyclohex-1-en-1-yl)vinyl)-3,3-dimethyl-3H-indol-1-ium iodide (15, Scheme 2, Example 2) was used to detect senescent cells in tissue sections by fluorescent microscopy.

Tissue sections were obtained from paraffin embedded, formalin fixed of: (A) irradiated human laryngeal tumors, (B) chemotherapy-treated breast tissues, (C) liver specimens from aged versus young individuals, (D) K-ras$^{V12}$ induced lung adenomas, (E) Palbociclib-treated human melanoma xenografts, and (F) Bleomycin-induced lung fibrosis mouse model, with established presence of senescent cells. Subsequently, they were immobilized on glass microscopy slides by standard procedures and processed as follows:
  i. Section deparaffinization through a 30 minutes incubation at 60° C., followed by washing in xylene for 15 minutes at room temperature.
  ii. Gradual rehydration of biopsy material, usually fixed tissues, in solutions of descending concentration of ethanol (100%, 96%, 80%, 70%, 50% v/v) for 5 minutes each step and finally in Phosphate-buffered saline (PBS) buffering solution;
  iii. Antigen retrieval by heating in citrate acid solution 10 mM, pH=6. Pre-heat the citrate acid solution for 5 min using steamer and incubate the tissue samples for 15 min more into the heated solution;
  iv. Cooling of heated citrate bath for 20 min in an ice-bath;
  v. Wash 3 times with PBS;
  vi. Application of the compound of formula I on biopsy material for 10 min in dark condition;
  vii. Wash 3 times with fresh wash buffer [PBS/DMSO (2.5%)/TWEEN-20 (2.5%)];
  viii. Incubate biopsy material with 0.3% Triton-X 100 diluted in PBS for 4 minutes;
  ix. Wash 3 times with PBS;
  x. Decrease the tissue autofluorescence using an autofluorescence quenching kit;
  xi. Wash with PBS;
  xii. Apply DAPI 1/5000 for 5 minutes in dark condition;
  xiii. Rinse samples with ddH$_2$O for 30 seconds;
  xiv. Cover section using a mounting medium for immunofluorescence.

Figure 3:
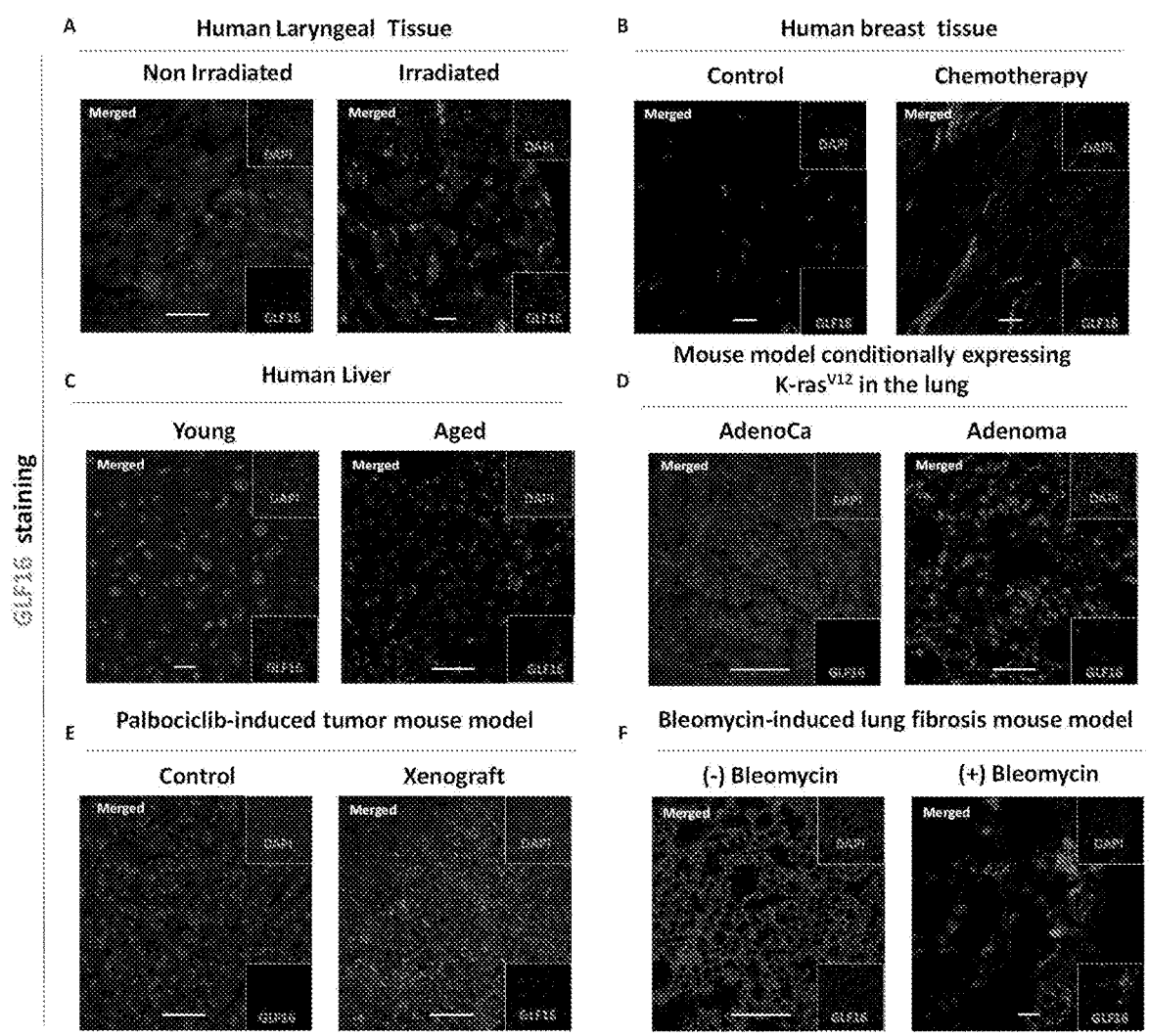
FIG. 3. Detection of senescent cells in tissues using a compound of formula I (GLF16, 15, Scheme 2, Example 2). Representative images of GLF16 staining in human clinical settings and murine systems, known to harbor an increased burden of senescent cells, and respective negative controls (devoid of senescent cells) are depicted. (A) Irradiated human laryngeal tissue, (B) chemotherapy-treated breast tissues and (C) liver specimens from aged individuals were abundant in GLF16-positive cells while in respective controls these positive cells were totally absent. Similar results were obtained in the following murine models: (D) K-ras$^{V12}$-induced lung adenomas, (E) palbociclib-treated human melanoma xenografts and (F) bleomycin-induced lung fibrosis. (G-I). GLF16 specificity and sensitivity was subsequently evaluated by concurrent staining with the proliferation marker Ki67 or senescence-associated markers p21$^{WAF1/Cip1}$ and p16$^{INK4A}$. GLF16 staining coincided with p16$^{INK4A}$ or p21$^{WAF1/Cip1}$ but not with Ki67. Lipofuscin (GLF16) positive macrophages in bleomycin-treated lungs are also evident (H), as previously demonstrated in Evangelou et al. 2017. Objectives 10×, 20×, 40×, 63×. Corresponding scale bars are depicted. Scale bars: 50 μm (A-F), 10 μm (G), 20 μm (H-I).
Figure 3:
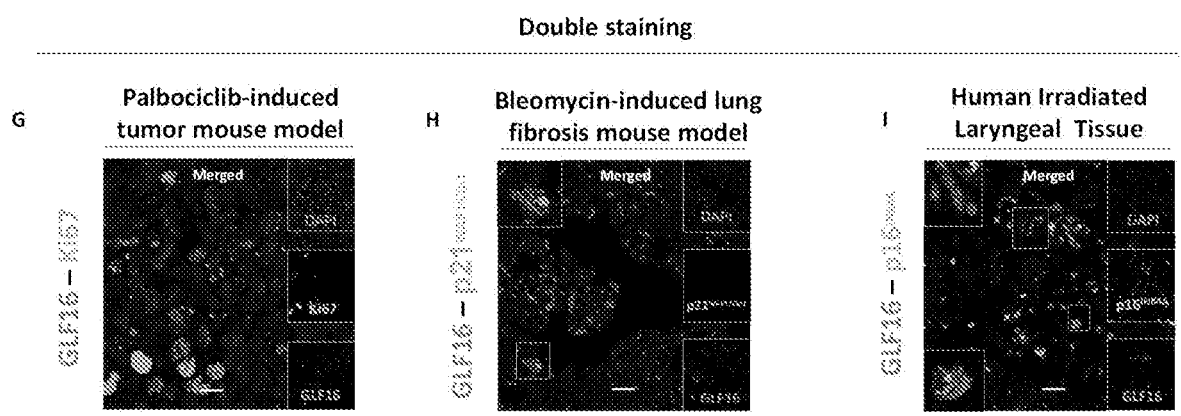

Representative clear results from the application of this method in the aforementioned (radiation, chemo- and drug-treated, aged and adenoma) tissues are shown in FIGS. 3 A-F. Specificity and sensitivity of the staining was evaluated by concurrent staining with the senescence-associated factors p21$^{WAF1/Cip1}$ and p16$^{INK4A}$ and lack of expression of the proliferation marker Ki67 (FIG. 3 G-I).

Detection by Flow Cytometry of Senescent Cells in Cell Culture Along with Other Cellular Senescence Markers 1-Ethyl-2-((E)-2-((E)-3-((E)-2-(1-ethyl-3,3-dimethylindolin-2-ylidene)ethylidene)-2-((4-(4-((2-methyl-6-((E)-(4-((E)-phenyldiazenyl)naphthalen-1-yl)diazenyl)-2,3-dihydro-1H-perimidin-2-yl)methoxy)-4-oxobutanamido)butyl)amino)cyclohex-1-en-1-yl)vinyl)-3,3-dimethyl-3H-indol-1-ium iodide (15, Scheme 2, Example 2) was used to detect senescent cultured cells by flow cytometry.

Li-Fraumeni-p21$^{WAF1/Cip1}$ or HBEC-CDC6 Tet-ON cellular systems were grown in culture without or with Doxycyclin to induce senescence. Subsequently cells were treated and assessed as follows:
  1. Harvest cells from culture.
  2. Centrifuge at 1200 rpm for 5 min at RT.
  3. Wash ×1 in 5 ml PBS at RT.
  4. Resuspend cell pellet in 4% PFA and incubate them for 15 min in RT (fixation)
  5. Centrifuge at 1200 rpm for 5 min at RT.
  6. Resuspend cell pellet in 0.3% Triton-X/PBS and incubate it for 15 min at RT.
  7. Wash ×1 in 2 ml PBS at RT
  8. Centrifuge at 1200 rpm for 5 min at RT.
  9. Incubate samples with 100 μl of GLF16 for 8 min under gently shaking in dark condition
  10. Add 2 ml of wash buffer [PBS/DMSO (2.5%)/TWEEN-20 (2.5%)] and centrifuge at 1200 rpm for 5 min at RT (×2)
  11. Incubate with primary-conjugated antibody/ies for 20 min RT
  12. Centrifuge at 1200 rpm for 5 min at RT (×2)
  13. Apply flow cytometry buffer (PBS/5% FBS)

Figure 4:
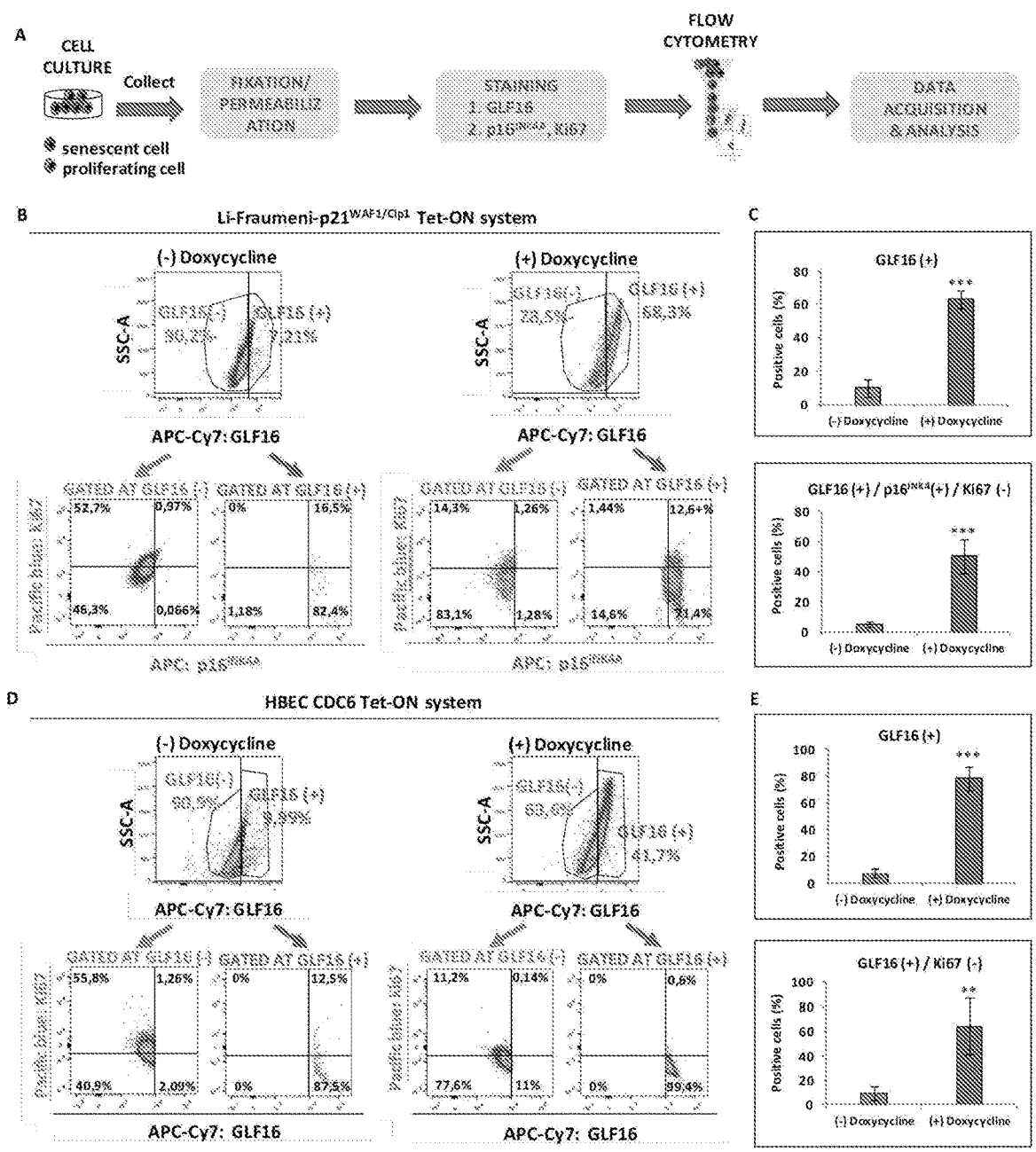
FIG. 4. Detection of senescent cells by flow cytometry using a compound of formula I (GLF16, 15, Scheme 2, Example 2). (A) Experimental workflow implemented. (B, C) Flow cytometry analysis of Li-Fraumeni-p21$^{WAF1/Cip1}$ Tet-ON and (D, E) HBEC CDC6 Tet-ON cells, with or without Doxycycline treatment. Cells were stained with GLF16 and anti-Ki67-Pacific blue. Since HBEC cells do not express p16$^{INK4A}$, only Li-Fraumeni-p21$^{WAF1/Cip1}$ Tet-ON cells were stained with anti-p16$^{INK4A}$-APC. Gating of GLF16 (+) and GLF16 (−) cells subsequently verified co-detection of GLF16 and senescence markers (p16$^{INK4A}$ and absence of Ki67) in the senescent population (induced cells) while the opposite pattern was observed in the non-treated ones. Data presented as mean±SD, from 3 independent experiments.  $p<0.01$, * $p<0.001$ compared to (−) doxycycline by 2-tailed Student's t test.

Brief depiction of method and representative results are depicted in FIG. 4. Panel (A) shows the basic experimental steps, while panels (B,C) the application in Li-Fraumeni-p21$^{WAF1/Cip1}$ and HBEC-CDC6 Tet-ON cells, respectively. Note the rightward signal shift in the "(+) Doxycyclin" treated cells gated by flow cytometry.

Delivery of Micelle-Embedded with Compounds of the Invention for Detection and Isolation of Live Cells.

Figure 7:
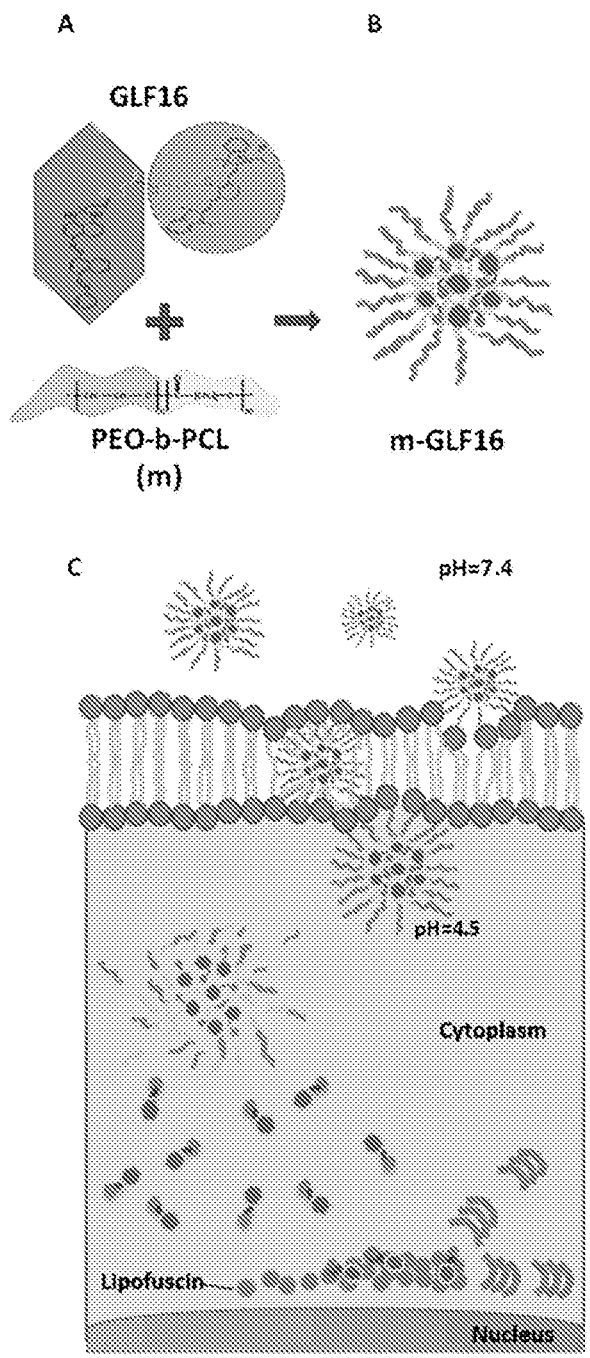
FIG. 7. Live cell delivery of polymeric micelles of the compound of example 2 (m-GLF16) enables isolation of living senescent cells. (A-B) Development of micelle-based composition comprising the compound of example 2. The compound was successfully embedded in a PEO-b-PCL copolymer, where PEO is the hydrophilic and PCL the hydrophobic part of this micelle, forming a delivery platform. (C) Schematic representation of GLF16 internalization and lipofuscin detection. M-GLF16 can enter the cell membrane and due to the pH difference between the intracellular and extracellular environment, it allows the controlled release of GLF16 that subsequently detects and binds to lipofuscin, inducing the detectable fluorescent signal. (D) Schematic of the experimental process validating m-GLF16 incorporation in Li-Fraumeni-p21$^{WAF1/Cip1}$ Tet-ON cells through live cell FACS sorting and immunofluorescence. (E) Proper internalization of m-GLF16 and specific labeling of live senescent cells was validated by flow cytometry and immunofluorescence. Representative pictures (left) and quantification (right) of analysis. Data presented as mean±SD, from 3 independent experiments. $p<0.01$, *$p<0.001$ compared to (−) doxycycline by 2-tailed Students' t test. (F) Upper and middle-panels: doxycycline-treated or control Li-Fraumeni-p21$^{WAF1/Cip1}$ Tet-ON cells carrying m-GLF16 were fixed and stained for indicated senescence and proliferation markers verifying successful identification of senescent cells by m-GLF16. Bottom panel: Quantification of analysis. Data presented as mean±SD, from 3 independent experiments. p<0.01, *p<0.001 compared to (-) doxycycline by 2-tailed Student's t test.
Figure 7:
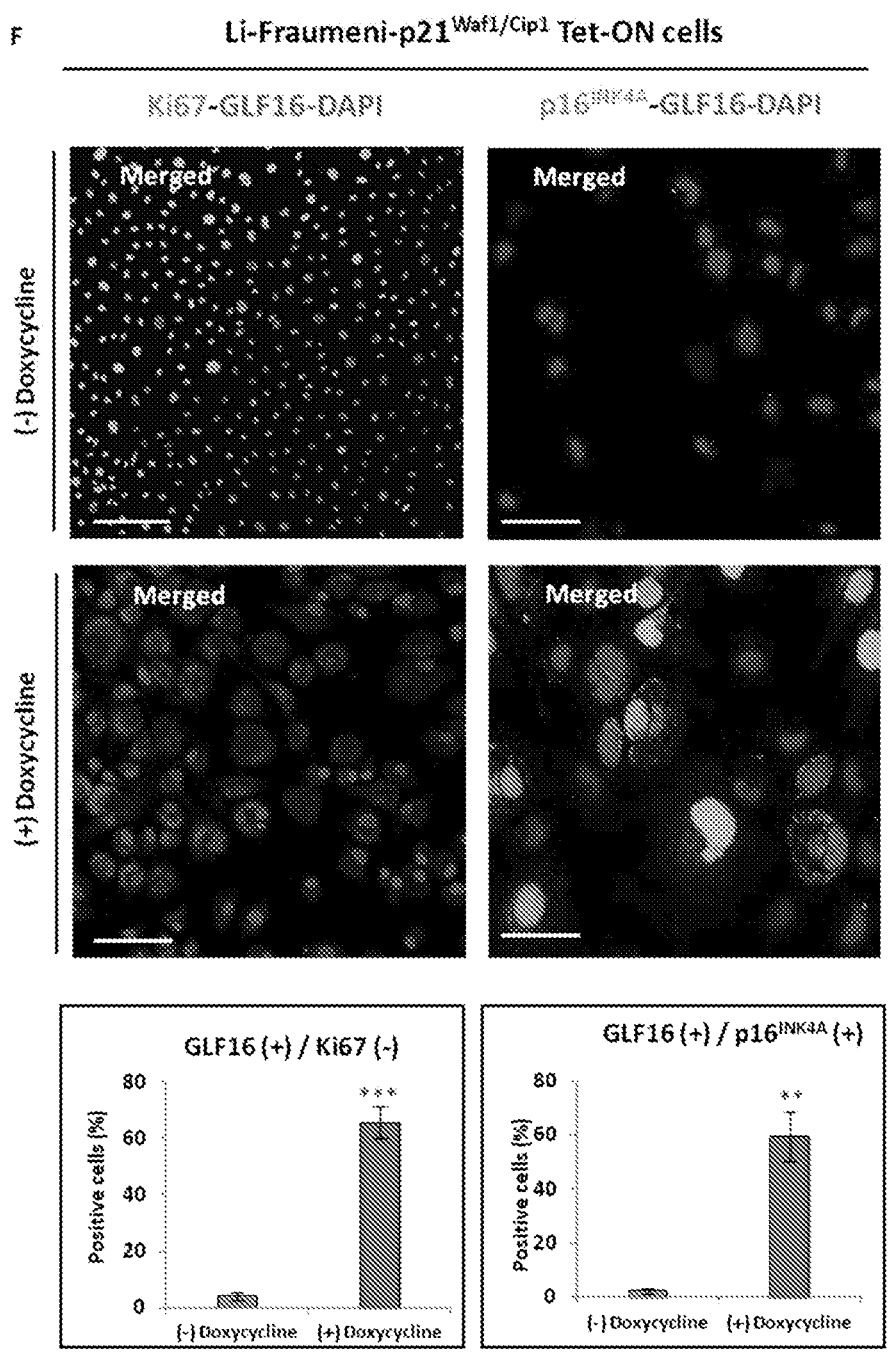

In order to assist in vivo experiments and potential biomedical applications a PEO-b-PCL copolymer (micelle) carrying GLF16, (from now on termed m-GLF16) was generated (see FIGS. 7A-C). The PEO-b-PCL copolymer was selected based on its well-known biocompatibility and biodegradability properties rendering it the material of choice for the encapsulation of hydrophobic compounds. Initially, efficient incorporation of GLF16 into the PCL core was tested, by preparing in parallel pure PEO-b-PCL micelles and comparing them with the corresponding m-GLF16 ones. Indeed, while the size (Dh) of pure PEO-b-PCL micelles was estimated at 95 nm, addition of the GLF16 led to increase of the Dh at 110 nm, indicating successful incorporation.

Next, m-GLF16 was administered in living Li-Fraumeni-p21$^{WAF1/Cip1}$ Tet-ON senescent cells and their non-senescent counterparts, in order to investigate whether GLF16 can be successfully delivered into living cells, eventually interacting with lipofuscin (FIGS. 7D-F). Notably, application of pure PEO-b-PCL copolymer in these cells resulted in absence of any fluorescent signal. Flow cytometry analysis in living cells of the same cellular system, sorted the cells based on m-GLF16 fluorescence (FIG. 7E upper panel). Following mild fixation, a strong GLF16 cytoplasmic signal, that coincided with p16$^{INK4A}$ immunopositivity and lack of Ki67 expression, was evident within Doxycycline-treated (senescent) cells, while it was totally absent in the untreated counterparts (FIG. 7E—bottom panel, F). These findings demonstrate successful delivery of the GLF16 reagent, via m-GLF16 incorporation and subsequent release in living cells. Moreover, given that GLF16 strongly interacts with lipofuscin aggregates, senescent cells may be faithfully identified versus their non-senescent counterparts. Taken together, the synthesis and implementation of the m-GLF16 micelle may allow for the first time accurate isolation, subsequent culturing and tracking of live senescent cells.

REFERENCES

Basisty N, et al., PlosBiol 2020, 18: e3000599.
Binet R, et al., Cancer Res 2009, 69: 9183-9191.
Childs B G, et al., EMBO Rep 2014, 15:1139-53.
Collado M, Serrano M. Nat Rev Cancer 2006, 6: 472-476.
Colas K, et al., Eur J Org Chem 2021, 15: 2133-2144.
Debacq-Chainiaux F, et al., Nat Protoc 2009, 4: 1798-1806.

Dimri G P, et al., Proc Natl Acad Sci USA 1995. 92: 9363-9367.
Evangelou K, et al., Aging Cell 2017, 16: 192-197.
Faget D V, et al., Nat Rev Cancer 2109, 19: 439-453.
Galanos P, et al, Nat Cell Biol 2016, 18: 777-789.
Georgakopoulou E, et al., Aging (Albany NY) 2013, 5: 37.
Gorgoulis V G et al., Cell 2019, 179: 813-827.
Gorgoulis V G, Halazonetis T D. Curr Opin Cell Biol 2010, 22: 816-827.
Gorgoulis V G, et al., J Pathol 2018, 246: 12-40.
Grossen, P., et al., J Nanomat 2016, 7818501
Halazonetis T D, et al, Science 2008, 319: 1352-1355.
Jung T, et al., Ann N Y Acad Sci 2007,1119: 97-111.
Kohli J, et al., Nat Protoc 2021, 16: 2471-2498.
Lagopati, N., et al., Int J Nanomed, 2014, 9: 3219-3230.
Liakou E, et al., Aging (Albany NY) 2016, 8: 1650-69.
Myrianthopoulos V, et al., Pharm & Ther 2019, 193: 31-49.
Ozcan S, et al., Aging 2016, 8: 1316-29.
Petrakis T G, et al., Semin Cancer Biol. 2016, 37-38: 3-15.
Pippa, N., et al., Int J Pharm, 2014, 473: 80-86.
Rodier F, Campisi J. J. Cell Biol 2011, 192: 547-556.
Severino J, et al., Exp Cell Res 2000, 257:162-171.
Zampetidis C P, et al., Mol Cell 2021, 81: 4907-4923.e8.

All references, including publications, patent applications, and patents, cited herein are hereby incorporated by reference in their entirety and to the same extent as if each reference were individually and specifically indicated to be incorporated by reference and were set forth in its entirety herein (to the maximum extent permitted by law).

All headings and sub-headings are used herein for convenience only and should not be construed as limiting the invention in any way.

The use of any and all examples, or exemplary language (e.g., "such as") provided herein, is intended merely to better illuminate the invention and does not pose a limitation on the scope of the invention unless otherwise paragraphed. No language in the specification should be construed as indicating any non-paragraphed element as essential to the practice of the invention.

The citation and incorporation of patent documents herein is done for convenience only and does not reflect any view of the validity, patentability, and/or enforceability of such patent documents.

This invention includes all modifications and equivalents of the subject matter recited in the paragraphs appended hereto as permitted by applicable law.

The invention claimed is:

1. A compound, or a salt or solvate thereof, according to formula I:

T-L-D (I)

wherein

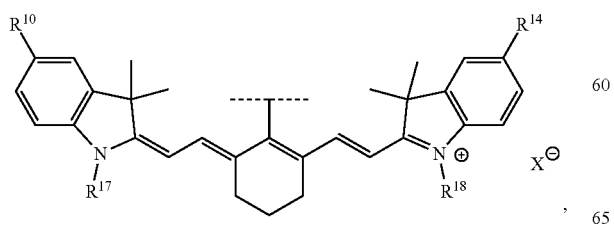

(IXa)

wherein:

$R^{10}$ and $R^{14}$ are independently selected from hydrogen and methoxy;

$R^{17}$ and $R^{18}$ are each independently $C_{1-4}$alkyl; and $X^{\ominus}$ is a counterion;

L is a linking moiety of formula VII:

-[$L^2$]-[$L^3$]-[$L^4$]-[$L^{10}$]-[$L^{11}$]- (VII), wherein:

$L^2$ is —O—, —C(=O)—, —C(=O)O—, —OC(=O)—, or —(CR$^5$R$^6$)$_p$—;

$L^3$ is absent or —(CR$^5$R$^6$)$_p$—;

$L^4$ is absent, —C(=O)—, —C(=O)NR$^5$—, —C(=O)O—, or —(CR$^5$R$^6$)$_p$—;

$L^{10}$ is (CH$_2$);

$L^{11}$ is —NH—;

$R^5$ and $R^6$, at each occurrence, are independently selected from hydrogen, methyl and ethyl;

p is an integer from 1 to 6; and

T is a lipid-targeting moiety of formula $T^1$:

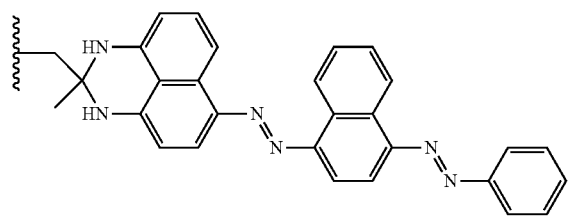

(T$^1$)

2. The compound, or a salt or solvate thereof, according to claim 1, wherein the Linking moiety L is selected from:

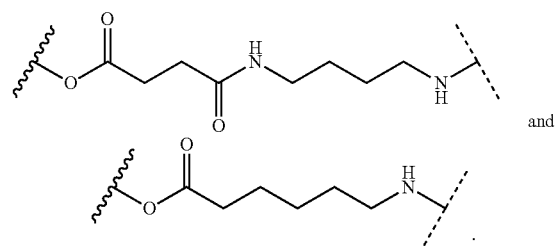

and

3. The compound, or a salt or solvate thereof, according to claim 1, wherein D is a moiety selected from $D^1$, $D^2$, $D^3$, and $D^4$:

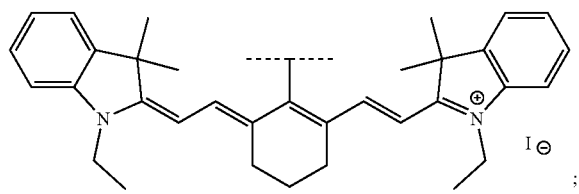

(D$^1$)

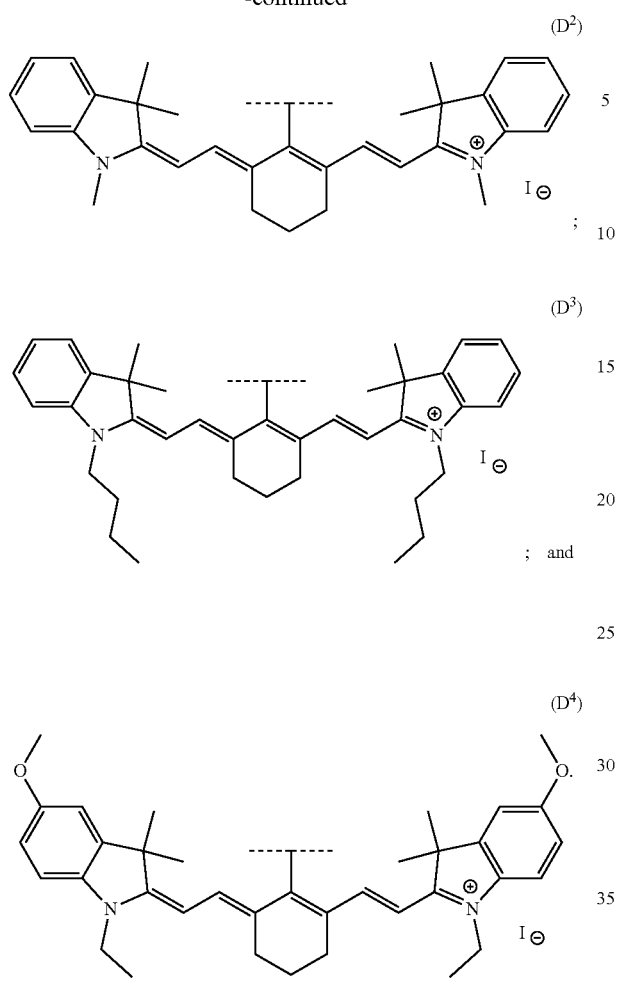
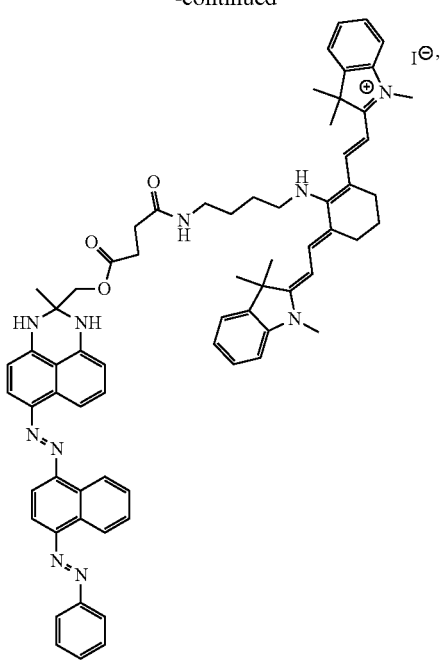
4. A compound selected from the group consisting of:
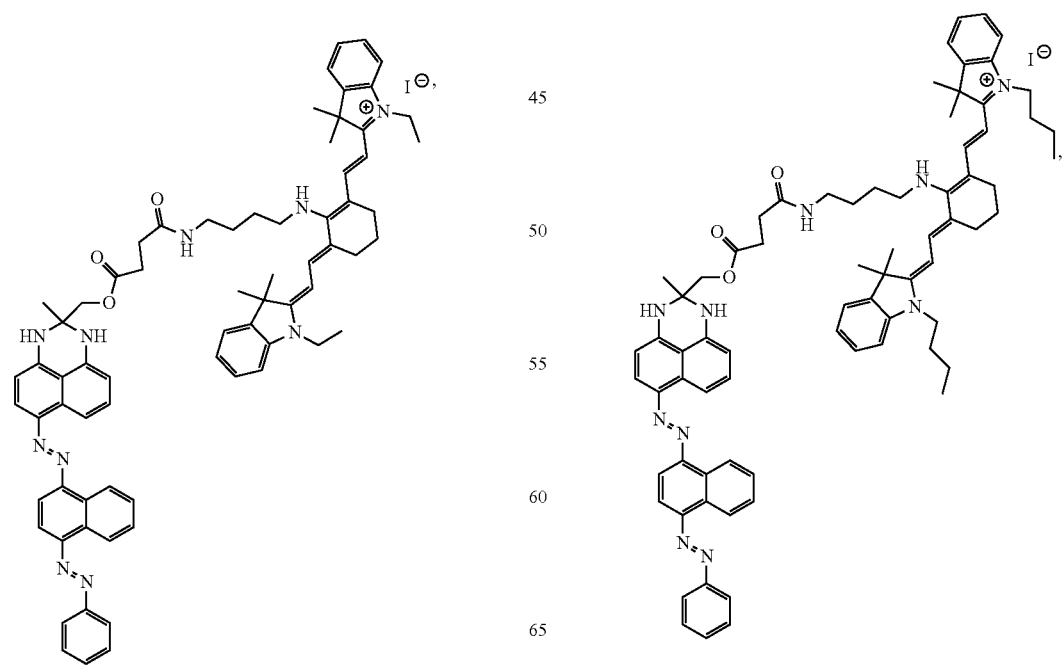

-continued

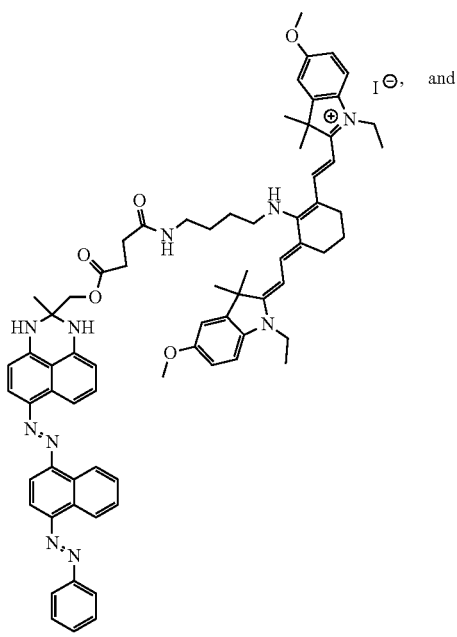

, and

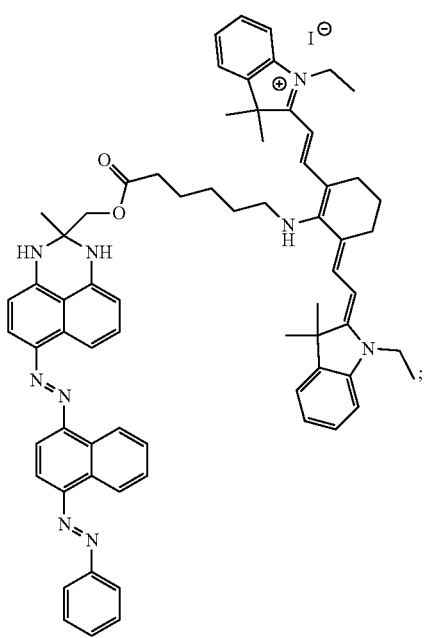

or a salt or solvate thereof.

5. A compound which is:

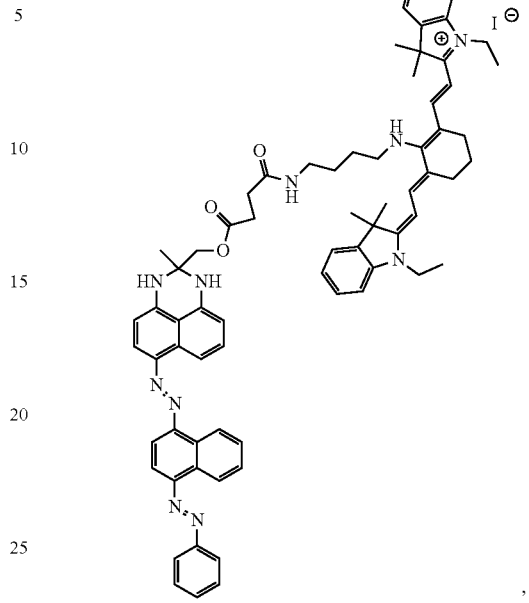

or a salt or a solvate thereof.

6. A pharmaceutical composition comprising a compound according to claim 1, or a pharmaceutically acceptable salt or solvate thereof, and a pharmaceutically acceptable carrier or excipient.

7. A pharmaceutical composition according to claim 6, wherein the pharmaceutically acceptable carrier is a polymeric micelle.

8. A pharmaceutical composition according to claim 7, wherein the polymeric micelle comprises an amphiphilic polymer.

9. A pharmaceutical composition according to claim 8, wherein the amphiphilic polymer is a polyethylene glycol-polycaprolactone block copolymer (PEO-b-PCL).

10. The compound, or a salt or solvate thereof, according to claim 1, wherein the Linking moiety L is:

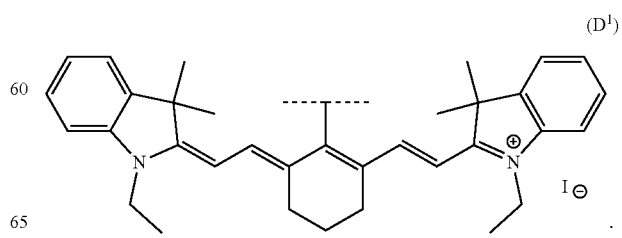

11. The compound, or a salt or solvate thereof, according to claim 1, wherein D is a $D^1$ moiety:

(D$^1$)

12. The compound, or a salt or solvate thereof, according to claim 1, wherein $X^\ominus$ is halide.

13. The compound, or a salt or solvate thereof, according to claim 1, wherein $R^{17}$ and $R^{18}$ are independently selected from methyl, ethyl, and butyl.

14. The compound, or a salt or solvate thereof, according to claim 1, wherein $R^{10}$ and $R^{14}$ are each independently hydrogen.

15. The compound, or a salt or solvate thereof, according to claim 1, wherein $R^5$ and $R^6$ are each independently hydrogen.

16. A pharmaceutical composition comprising a compound according to claim 5, or a pharmaceutically acceptable salt or solvate thereof, and a pharmaceutically acceptable carrier or excipient.

17. A pharmaceutical composition according to claim 16, wherein the pharmaceutically acceptable carrier is a polymeric micelle.

18. A pharmaceutical composition according to claim 17, wherein the polymeric micelle comprises an amphiphilic polymer.

19. A pharmaceutical composition according to claim 18, wherein the amphiphilic polymer is a polyethylene glycol-polycaprolactone block copolymer (PEO-b-PCL).

* * * * *